June 20, 1961 R. H. SLEMMER 2,989,592
AUTOMATIC TELEPHONE SYSTEM
Filed Oct. 5, 1956 61 Sheets-Sheet 1
Fig. 1-A
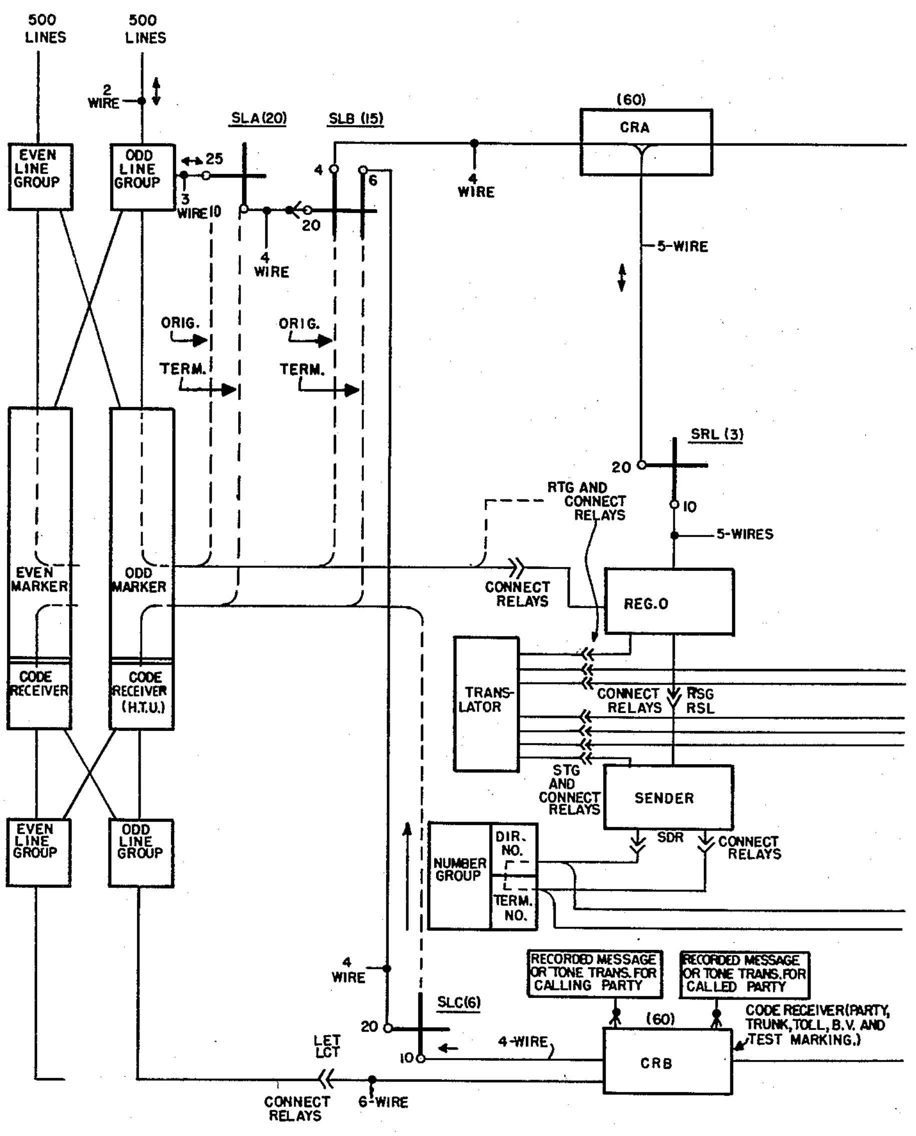
INVENTOR.
ROBERT H. SLEMMER
BY Brown, Jackson, Boettcher & Dienner Fig. I-B
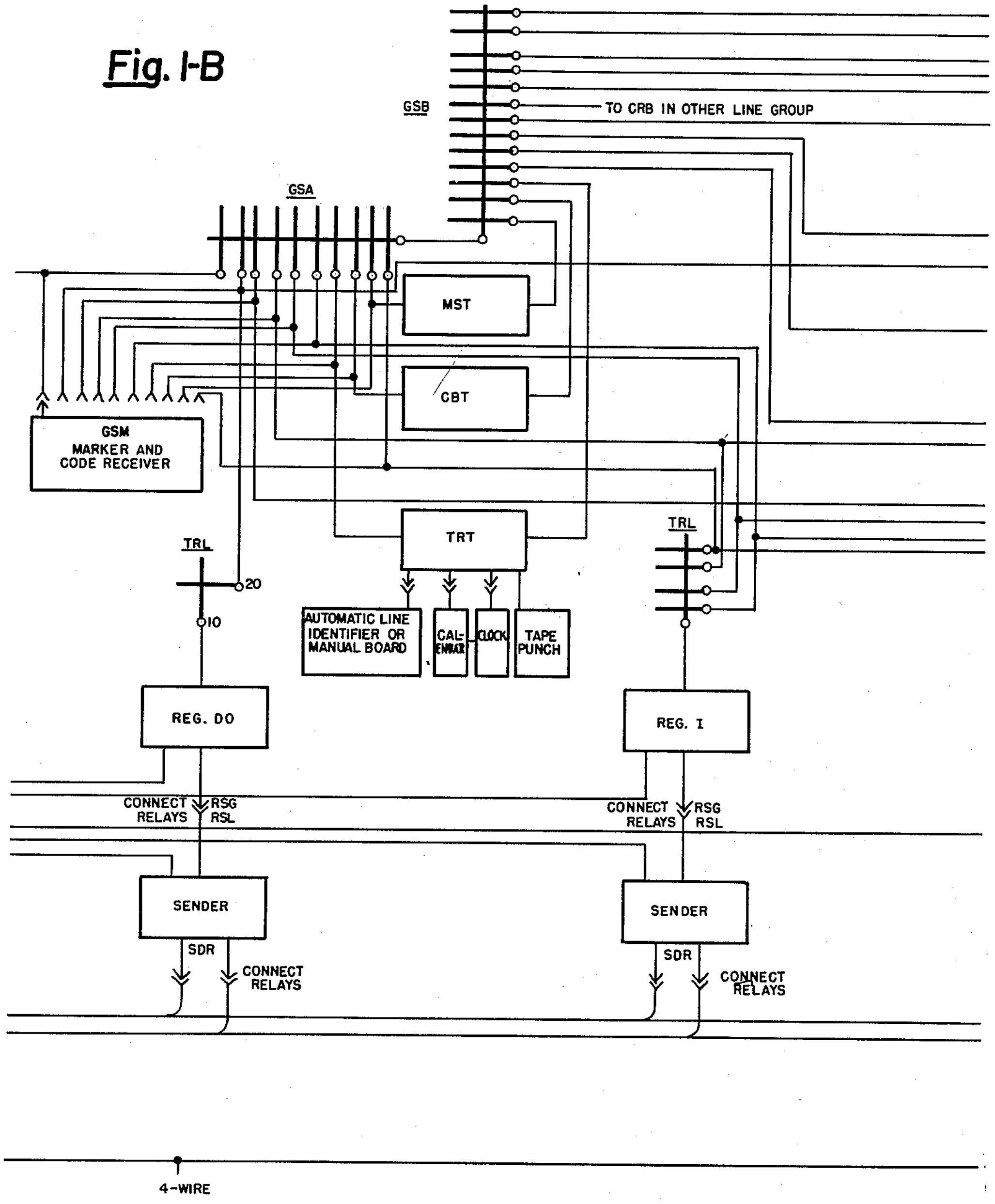
INVENTOR.
ROBERT H. SLEMMER
BY Brown, Jackson, Boettcher & Dienner June 20, 1961 R. H. SLEMMER 2,989,592
AUTOMATIC TELEPHONE SYSTEM
Filed Oct. 5, 1956 61 Sheets-Sheet 3
Fig. 1-C
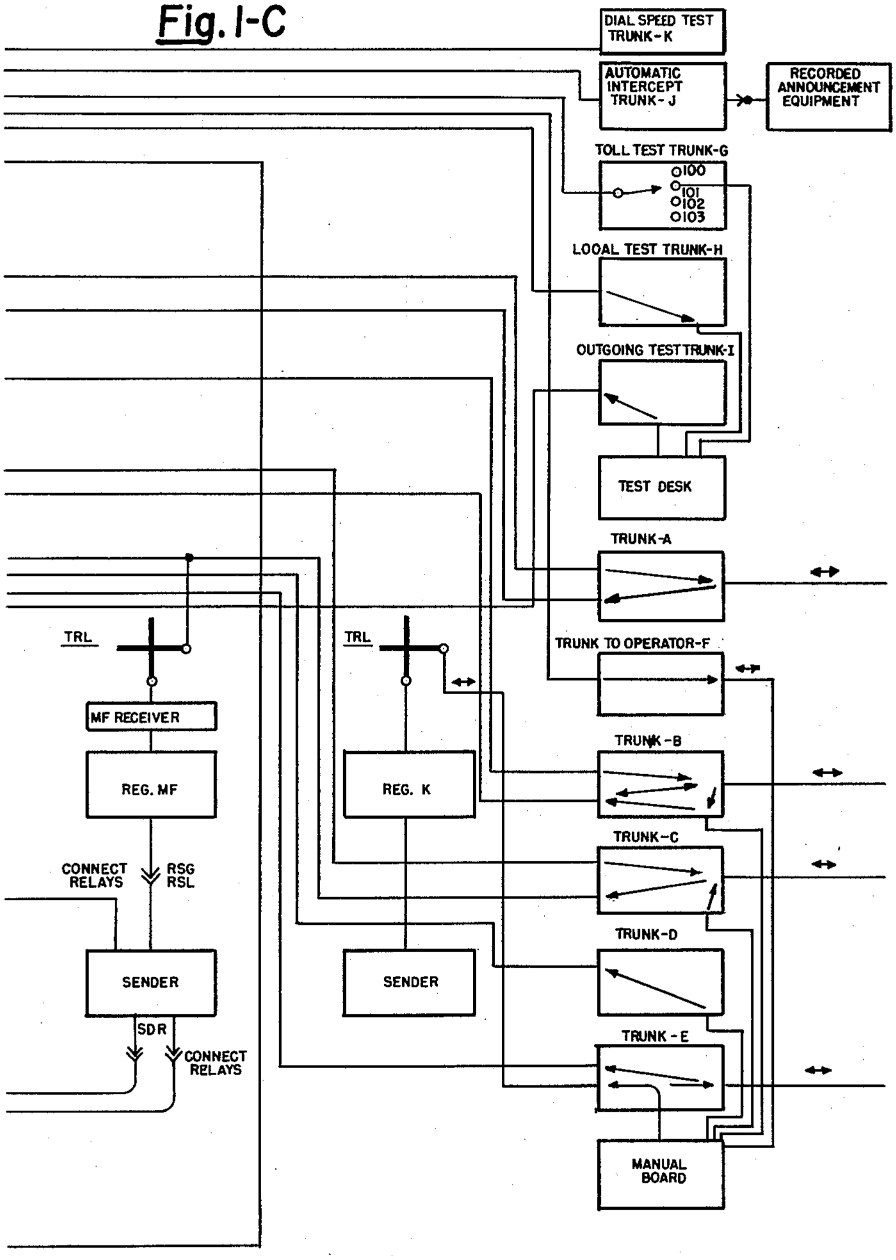
INVENTOR.
ROBERT H. SLEMMER
BY Brown, Jackson, Boettcher & Dienner INVENTOR.
ROBERT H. SLEMMER
BY Brown, Jackson, Boettcher & Dienner June 20, 1961 R. H. SLEMMER 2,989,592

AUTOMATIC TELEPHONE SYSTEM

Filed Oct. 5, 1956 61 Sheets-Sheet 5

INVENTOR.
ROBERT H. SLEMMER

BY Brown, Jackson, Boettcher & Dienner

*Nature of traffic (local, originating, terminating, tandem.)*
LOTM

| | | | Reg. DO Reg. O *** | Reg. DO Reg. O **** | Reg. MF Reg. I *** | Reg. MF Reg. I **** | Reg. K |
|---|---|---|---|---|---|---|---|
| | LLN-NNNN | (2-5 number) | Yes | Yes | Yes | Yes | Yes |
| | N*-LLN-NNNN | (Busy verification) | No | No | Yes | Yes | No |
| | 1YP-LLN-NNNN | (Automatic toll ticketing) | Yes | Not req. | Yes | Not req. | No |
| | 112P-LLN-NNNN | (Automatic toll ticketing) | Yes | Not req. | Yes | Not req. | No |
| | XX'X"-LLN-NNNN | (Area + 2-5 number) | No | Yes | Yes | Yes | Yes |
| | 1YP-XX'X"-LLN-NNNN | (Automatic toll ticketing | Yes | Not req. | Yes | Not req. | No |
| | 112P-XX'X"-LLN-NNNN | +area + 2-5 number) | Yes | Not req. | Yes | Not req. | No |
| | NNN-NNN-LLN-NNNN | (Interim routing) | No | No | No | No | Yes |
| | LLN-NNNN-N | (Codes involving | Yes | Yes | Yes | Yes | Yes |
| | 1YP-LLN-NNNN-N | terminal per | Yes | Yes | Yes | Not req. | No |
| | 112P-LLN-NNNN-N | line. May | Yes | Yes | Yes | Not req. | No |
| | XX'X"-LLN-NNNN-N | also involve | Yes | Yes | Yes | Yes | Yes |
| | 1YP-XX'X"-LLN-NNNN-N | operators lamp | Yes | Yes | Yes | Not req. | No |
| | 112P-XX'X"-LLN-NNNN-N | panel | Yes | Yes | Yes | Not req. | No |
| | NNN-NNN-LLN-NNNN-N | indicator.) | No | No | No | No | Yes |
| | 0 | (Dial assistance) | Yes | Yes | Yes** | Yes** | No |
| 10X | 100 | (600 ohm termination) | No | No | Yes | Yes | No |
| 10X | 101 | (Toll test board) | No | No | Yes | Yes | No |
| 10X | 102 | (1000 cycle tone) | No | No | Yes | Yes | No |
| 10X | 103 | (Supervision test) | No | No | Yes | Yes | No |
| 11X | 110 | (Toll operator) | Yes | Yes | Yes | Yes | No |
| 11X | 113 | (Information) | Yes | Yes | Yes | Yes | No |
| 11X | 114 | (Repair clerk) | Yes | Yes | Yes | Yes | No |
| 11X | 115 | (Local test board) | Yes | Yes | Yes | Yes | No |
| 11X | 116 | (Spare. Columbus uses for mobile.) | Yes | Yes | Yes | Yes | No |
| 11X | 117 | (Local test board) | Yes | Yes | Yes | Yes | No |
| 11X | 118 | (Automatic dial speed tester) | Yes | Yes | Yes | Yes | No |
| 11X | 119 | (Spare) | Yes | Yes | Yes | Yes | No |
| | 121 | (Inward operator) | No | No | Yes | Yes | No |
| | 131 | (Toll information operator) | No | No | Yes | Yes | No |

Fig. 6-A

INVENTOR.
ROBERT H. SLEMMER
BY [signature]

| | | | | | | | |
|---|---|---|---|---|---|---|---|
| IXI | 141 | (Rate and route) | No | No | Yes | Yes | No |
| | 151 | (Call order operator) | No | No | Yes | Yes | No |
| | 161 | (Manual office) | No | No | Yes | Yes | No |
| | 171 | (Manual office) | No | No | Yes | Yes | No |
| | 181 | (Toll station operator or manual office) | No | No | Yes | Yes | No |
| | 191 | (Transfer call to CLR operator) | No | No | Yes | Yes | No |
| | TTC-121 | (Outgoing call | No | No | Yes | Yes | Yes |
| | TTC-131 | from a toll | No | No | Yes | Yes | Yes |
| | TTC-141 | operator to a | No | No | Yes | Yes | Yes |
| | TTC-151 | toll operator | No | No | Yes | Yes | Yes |
| | TTC-161 | in a toll | No | No | Yes | Yes | Yes |
| | TTC-171 | terminating | No | No | Yes | Yes | Yes |
| | TTC-181 | center | No | No | Yes | Yes | Yes |
| | TTC-191 | TTC in same area.) | No | No | Yes | Yes | Yes |
| | XX'X"-TTC-121 | (Outgoing call | No | No | Yes | Yes | Yes |
| | XX'X"-TTC-131 | from a toll | No | No | Yes | Yes | Yes |
| | XX'X"-TTC-141 | operator to a | No | No | Yes | Yes | Yes |
| | XX'X"-TTC-151 | toll operator | No | No | Yes | Yes | Yes |
| | XX'X"-TTC-161 | in a toll | No | No | Yes | Yes | Yes |
| | XX'X"-TTC-171 | terminating | No | No | Yes | Yes | Yes |
| | XX'X"-TTC-181 | center in a | No | No | Yes | Yes | Yes |
| | XX'X"-TTC-191 | different area.) | No | No | Yes | Yes | Yes |
| | XX'X"-IXI | | No | No | Yes | Yes | Yes |
| | 11XX | (TX operator - terminating call) | No | No | Yes | Yes | No |
| | TTC-11XX | (Call to TX operator in same area) | No | No | Yes | Yes | Yes |
| | XX'X"-TTC-11XX | (Call to TX operator in different area) | No | No | Yes | Yes | Yes |
| | XX'X"-11XX | (Call to TX operator in different area) | No | No | Yes | Yes | Yes |
| | LLN | (Manual office) | Yes | Yes | Yes | Yes | Yes |
| | XX'X"-LLN | (Call to manual office in different area) | No | No | Yes | Yes | Yes |

* "0" for example.
** Under certain conditions.
*** In systems using 1YP or 112P codes.
**** In systems not using 1YP or 112P codes.

Fig. 6-B

INVENTOR.
ROBERT H. SLEMMER
BY Brown, Jackson, Boettcher & Dienner

| | | LAFAYETTE-2 522 | LAFAYETTE-3 523 | LAFAYETTE-4 524 | PIONEER-7 747 | SKYLINE-5 755 | SKYLINE-6 756 | PRESIDENT-4 774 | PYRAMID-3 793 | TUXEDO-3 883 | TURNER-4 884 | TUCKER-6 886 | TWINING-6 896 | TWINBROOK-7 897 |
|---|---|---|---|---|---|---|---|---|---|---|---|---|---|---|
| | LAFAYETTE | LOCAL | LOCAL | LOCAL | 747-NNNN | 755-NNNN | 756-NNNN | 774-NNNN | 793-NNNN | 883-NNNN | 884-NNNN* | 886-NNNN | 896-NNNN | 897-NNNN** |
| | TUXEDO | 522-NNNN | 523-NNNN | 524-NNNN | 747-NNNN | 755-NNNN | 756-NNNN | 774-NNNN | 793-NNNN | 883-NNNN | 884-NNNN* | 886-NNNN | 896-NNNN | 897-NNNN** |
| DIALING PATTERN "A" SECOND DIGIT SUPPLIED = 5 | PIONEER | ()22-NNNN | ()23-NNNN | ()24-NNNN | LOCAL | ()()5-NNNN | (X)6-NNNN | ()()4-NNNN | (X)3-NNNN | ()83-NNNN | ()84-NNNN* | ()86-NNNN | ()96-NNNN | ()97-NNNN** |
| | SKYLINE | ()22-NNNN | ()23-NNNN | ()24-NNNN | (X)7-NNNN | LOCAL | LOCAL | (X)4-NNNN | (X)3-NNNN | ()83-NNNN | ()84-NNNN* | ()86-NNNN | ()96-NNNN | ()97-NNNN** |
| | PRESIDENT | ()22-NNNN | ()23-NNNN | ()24-NNNN | (X)7-NNNN | ()()5-NNNN | ()()6-NNNN | LOCAL | (X)3-NNNN | ()83-NNNN | ()84-NNNN* | ()86-NNNN | ()96-NNNN | ()97-NNNN** |
| | PYRAMID | ()22-NNNN | ()23-NNNN | ()24-NNNN | (X)7-NNNN | ()()5-NNNN | (X)6-NNNN | ()()4-NNNN | LOCAL | ()83-NNNN | ()84-NNNN* | ()86-NNNN | ()96-NNNN | ()97-NNNN |
| DIALING PATTERN "B" SECOND DIGIT SUPPLIED = 9 | TURNER | ()22-NNNN | ()23-NNNN | ()24-NNNN | ()47-NNNN | ()55-NNNN | ()56-NNNN | ()74-NNNN | ()93-NNNN | DIRECT | LOCAL* | DIRECT | ()()6-NNNN | ()()7-NNNN** |
| | TUCKER | ()22-NNNN | ()23-NNNN | ()24-NNNN | ()47-NNNN | ()55-NNNN | ()56-NNNN | ()74-NNNN | ()93-NNNN | DIRECT | DIRECT* | LOCAL | ()()6-NNNN | (X)7-NNNN** |
| DIALING PATTERN "C" SECOND DIGIT SUPPLIED = 8 | TWINING | ()22-NNNN | ()23-NNNN | ()24-NNNN | ()47-NNNN | ()55-NNNN | ()56-NNNN | ()74-NNNN | ()93-NNNN | ()()3-NNNN | ()()4-NNNN* | ()()6-NNNN | LOCAL | DIRECT** |
| | TWINBROOK | ()22-NNNN | ()23-NNNN | ()24-NNNN | ()47-NNNN | ()55-NNNN | ()56-NNNN | ()74-NNNN | ()93-NNNN | (X)3-NNNN | ()()4-NNNN* | (X)6-NNNN | DIRECT | LOCAL** |
| | TOLL | ()22-NNNN | ()23-NNNN | ()24-NNNN | ()47-NNNN | ()55-NNNN | ()56-NNNN | ()74-NNNN | ()93-NNNN | ()83-NNNN | ()84-NNNN* | ()86-NNNN | ()96-NNNN | ()96-NNNN** |

*THE 7000 LEVEL MAY NOT BE ASSIGNED IN TURNER.

**THE 4000 LEVEL MAY NOT BE ASSIGNED IN TWINBROOK.

Fig. 7

INVENTOR.
ROBERT H. SLEMMER

BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 9

INVENTOR.
ROBERT H. SLEMMER

BY Brown, Jackson, Boettcher & Dienner

INVENTOR.
ROBERT H. SLEMMER
BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 11

INVENTOR.
ROBERT H. SLEMMER

BY Brown Jackson Boettcher & Dienner

INVENTOR.
ROBERT H. SLEMMER
BY [signature]

June 20, 1961 R. H. SLEMMER 2,989,592

AUTOMATIC TELEPHONE SYSTEM

Filed Oct. 5, 1956 61 Sheets-Sheet 13

INVENTOR.
ROBERT H. SLEMMER
BY Brown, Jackson, Boettcher & Dienner

INVENTOR.
ROBERT H. SLEMMER
BY Brown Jackson Boettcher & Dienner

X=MAKE
—=BREAK

INVENTOR.
ROBERT H. SLEMMER
BY Brown, Jackson, Boettcher & Dienner

INVENTOR.
ROBERT H. SLEMMER
BY Brown Jackson Boettcher & Dienner

June 20, 1961 R. H. SLEMMER 2,989,592

AUTOMATIC TELEPHONE SYSTEM

Filed Oct. 5, 1956 61 Sheets-Sheet 17

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 22

INVENTOR.
ROBERT H. SLEMMER
BY Brown, Jackson, Boettcher & Dienner

INVENTOR.
ROBERT H. SLEMMER

BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 24

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown Jackson Boettcher & Dienner

INVENTOR.
ROBERT H. SLEMMER
BY Brown, Jackson, Boettcher & Dienner

INVENTOR.
ROBERT H. SLEMMER
BY Brown Jackson Boettcher & Dienner

INVENTOR.
ROBERT H. SLEMMER
BY [signature]

June 20, 1961 R. H. SLEMMER 2,989,592

AUTOMATIC TELEPHONE SYSTEM

Filed Oct. 5, 1956 61 Sheets-Sheet 33

INVENTOR.
ROBERT H. SLEMMER
BY [signature]

June 20, 1961 R. H. SLEMMER 2,989,592

AUTOMATIC TELEPHONE SYSTEM

Filed Oct. 5, 1956 61 Sheets-Sheet 34

INVENTOR.
ROBERT H. SLEMMER

BY Brown Jackson Boettcher & Dienner

June 20, 1961 R. H. SLEMMER 2,989,592

AUTOMATIC TELEPHONE SYSTEM

Filed Oct. 5, 1956 61 Sheets-Sheet 35

INVENTOR.
ROBERT H. SLEMMER

BY Brown, Jackson, Boettcher & Dienner

AUTOMATIC TELEPHONE SYSTEM

Filed Oct. 5, 1956

61 Sheets-Sheet 36

INVENTOR.
ROBERT H. SLEMMER

BY [signature]

INVENTOR.
ROBERT H. SLEMMER

BY Brown Jackson Boettcher & Dienner

June 20, 1961 R. H. SLEMMER 2,989,592

AUTOMATIC TELEPHONE SYSTEM

Filed Oct. 5, 1956 61 Sheets-Sheet 38

INVENTOR.
ROBERT H. SLEMMER
BY Brown Jackson Boettcher & Dienner

INVENTOR.
ROBERT H. SLEMMER
BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 40

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Beran Jackson Bottlen & Dennis

June 20, 1961 R. H. SLEMMER 2,989,592

AUTOMATIC TELEPHONE SYSTEM

Filed Oct. 5, 1956 61 Sheets-Sheet 44

INVENTOR.
ROBERT H. SLEMMER
BY [signature]

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER
BY Brown Jackson Boettcher & Dienner

June 20, 1961 R. H. SLEMMER 2,989,592

AUTOMATIC TELEPHONE SYSTEM

Filed Oct. 5, 1956 61 Sheets-Sheet 50

INVENTOR.
ROBERT H. SLEMMER

BY Brown Jackson Boettcher & Dienner

INVENTOR.
ROBERT H. SLEMMER
BY Kenyon Jackson Buckley & Brennan

INVENTOR.
ROBERT H. SLEMMER
BY Brown Jackson Boettcher & Dienner

INVENTOR.
ROBERT H. SLEMMER
BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 54

INVENTOR.
ROBERT H. SLEMMER
BY Brown, Jackson, Boettcher & Dienner

INVENTOR.
ROBERT H. SLEMMER
BY Brown, Jackson, Boettcher & Dienner

INVENTOR.
ROBERT H. SLEMMER

BY Brown, Jackson, Boettcher & Dienner

June 20, 1961 R. H. SLEMMER 2,989,592

AUTOMATIC TELEPHONE SYSTEM

Filed Oct. 5, 1956

61 Sheets-Sheet 57

INVENTOR.
ROBERT H. SLEMMER
BY [signature]

INVENTOR.
ROBERT H. SLEMMER
BY Brown, Jackson, Boettcher & Dienner

INVENTOR.
ROBERT H. SLEMMER
BY Brown, Jackson, Boettcher & Dienner

June 20, 1961 R. H. SLEMMER 2,989,592

AUTOMATIC TELEPHONE SYSTEM

Filed Oct. 5, 1956 61 Sheets-Sheet 60

INVENTOR.
ROBERT H. SLEMMER

BY [signature]

INVENTOR.
ROBERT H. SLEMMER
BY Brown, Jackson, Boettcher & Dienner

United States Patent Office 2,989,592

Patented June 20, 1961

2,989,592

AUTOMATIC TELEPHONE SYSTEM

Robert H. Slemmer, Galion, Ohio, assignor to North Electric Company, Galion, Ohio, a corporation of Ohio Filed Oct. 5, 1956, Ser. No. 614,178
32 Claims. (Cl. 179—7.1)

The present application relates to automatic telephone systems in general, and more particularly to automatic telephone systems of the crossbar type.

The present application is a modification of the crossbar system described in U.S. application Serial No. 522,-233 filed on July 15, 1955 and in U.S. patent application Serial No. 561,975 filed on January 27, 1956, both of which are assigned to the assignee of the present application.

The basic operation of the system of the present application is similar to the operation of the system described in the aforementioned patent applications, and additionally includes more detailed descriptions of the registers, senders and translator circuits, coin box trunks, toll recording trunks, measured service trunks, inter-toll arrangements, and other switching arrangements.

An object of the present invention is to provide a new and novel crossbar type telephone exchange, and particularly to a system in which a novel register sender translator switching arrangement are connected in a novel manner. A feature of the invention is the manner in which common translator means is used by both registers and senders. Briefly stated the register seizes the translator for the purpose of obtaining information in the matter of calls which the register fails to recognize. The register then seizes the sender and signals same to seize the translator to obtain the necessary routing and digit handling information necessary to further extension of the call. The translator when so consulted, in turn examines the digital information for the call as stored in the register and transmits the necessary data to the sender. Such system obviously constitutes an expeditious and economical switching arrangement, and finds especial application in its use in effecting rapid extension of calls to destinations identified by distant trunk codes, area codes, special service codes and local subscriber codes as set forth in detail in the following specification.

A further feature of the invention is the manner in which the novel equipment completes calls through an office to their destination which calls arrive with one or more digits "lost" as a result of the operation of prior switching equipment. A particular feature is the manner in which the register means analyzes the different calls and the manner in which the associated register equipment routes the incoming digits to appropriate storage bins to compensate for the lost digits, and in certain instances reconstructs or substitutes for the lost digit or digits.

An additional feature of the invention is the manner in which the switching equipment is operative in establishing ticketing calls to extend a connection from the incoming trunk (such as free service or ticketing trunks) over a group selector stage to a ticketing trunk and back over the same group selector stage to the desired line. The economies inherent in such systems are obvious.

These and many other features of the invention will be apparent with reference to the specification, drawings and claims set forth in detail hereinafter.

FIGURES 1A, 1B, and 1C when arranged side by side constitute a schematic diagram of the crossbar system.

FIGURE 2 schematically illustrates connections through a single group selector stage.

FIGURE 3 schematically illustrates connections through a system comprising a regular group selector and a toll group selector.

FIGURE 4 schematically illustrates connections through a system comprising first and second regular group selector stages and a toll group selector.

FIGURE 5 schematically illustrates connections through a system comprising first and second regular group selector stages, and first and second toll group selector stages.

FIGURES 6A and 6B when arranged end to end constitute a chart illustrating codes incoming to the various registers.

FIGURE 7 constitutes a chart illustrating the manner in which the equipment operates with the loss of digits of codes incoming to Register I (Reg. I).

FIGURES 8–13 constitute a detailed schematic of Register O (Reg. O).

FIGURES 57–64 constitute a detailed schematic of Register I (Reg. I).

Figure 65:
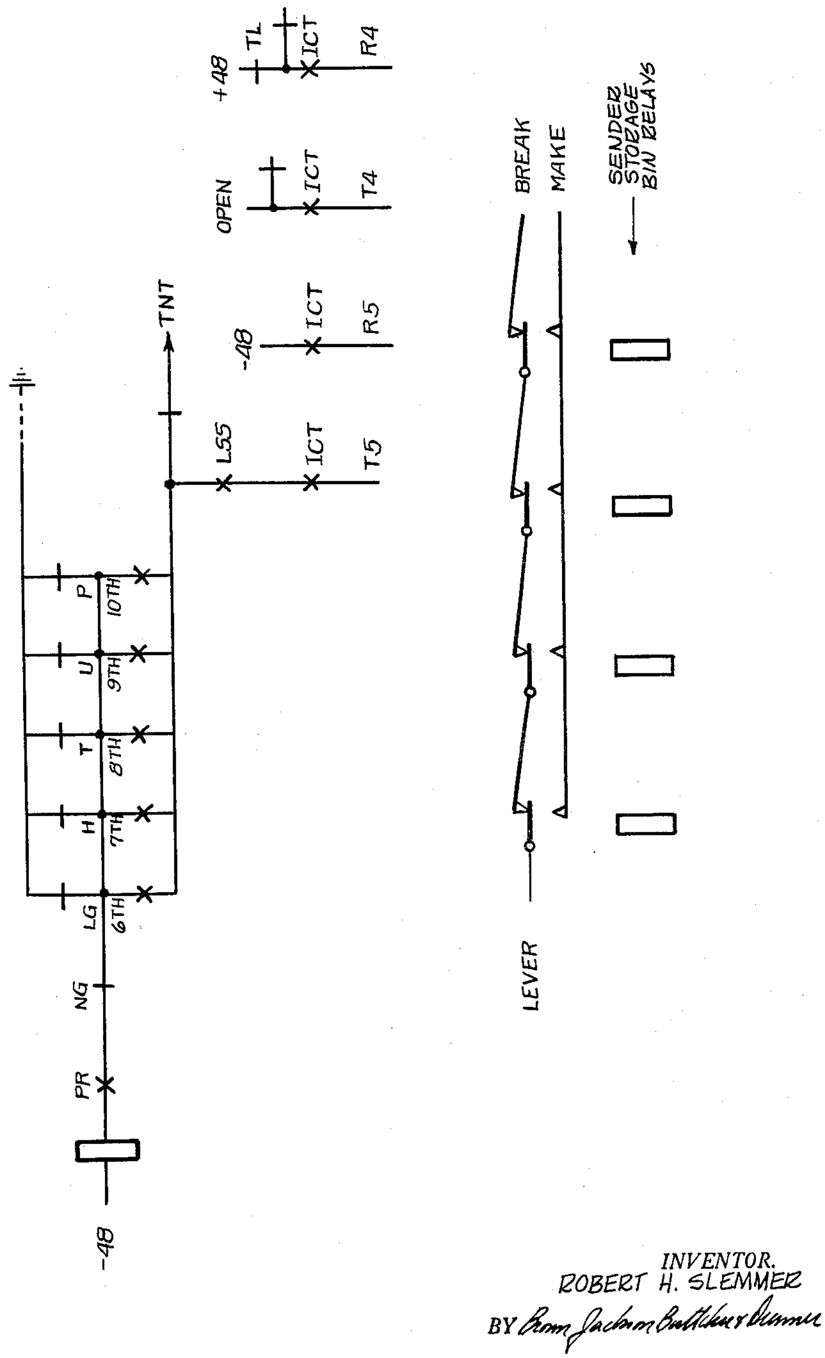

FIGURE 65 constitutes a schematic diagram of certain sender contacts.

*Index*

General
Call From Subscribers Line as Extended to Reg. O
Incoming Call From Trunk to Reg. I Call From Manual Board Through Toll Switching Trunk to Reg. I
Incoming Call From Trunk to Reg. DO
Incoming Call From Trunk to Reg. MF
Calls From Manual Board Through Reg. K
Codes Incoming to Registers
Handling Lost Digits in Reg. I
Marking Signals From Reg. O to Sender
Marking Signals From Reg. I to Sender
The Sender
Response of System to Various Codes
Certain Automatic Ticketing Arrangements
Trunk Arrangements
Completion of Exemplary Calls 1. Local to Local
2. Coin Box to Local
3. Measured Service
4. Local to Special Service or Long Distance Operator Trunk
5. Local to Trunk Call (Free Service)
6. Automatic Toll Ticketing Call From Local or Trunk to Trunk
7. Call From Free Service Trunk
8. Automatic Toll Ticketing Call From Trunk to Local
9. Local Manual Operator Calls
10. Call From Toll or Intertoll Trunk Common Group Selector
Local and Toll Group Selector
First and Second Local Group Selectors and Toll Group Selector
First and Second Local Group Selectors and First and Second Toll Group Selectors
Code Recognition by Use of Relays
Certain More Detailed Register Description
Recognition in Reg. I
Translation by Use of Neon Lamps
Additional Details of Register-Sender-Translator Cooperation
Additional Consideration of Contact Fans For Placing Potentials on Tip and Ring
Additional Details Relative to Register-Translator Cooperation
Additional Details Relative To Sender-Translator Cooperation
Relay "ALT" in Sender Primary Route Only
Primary and Alternate Routes
Toll and Free Service Trunks To Same Destination Additional Consideration of Digital Handling in Reg. I Lead M2
Lead M1
Storage of Incoming Digits in General
1. Automatic Ticketing Codes
2. Tandem Call From Service Trunk With One Lost Digit
3. Tandem Call From Free Service Trunk With Two Lost Digits
4. Tandem Call From Free Service Trunk With One or Two Lost Digits (ambiguous case)
5. Free Service Trunk Call to Local With One Lost Digit
6. Free Service Trunk Call to Local With Two Lost Digits
7. Free Service Call to Local With Three Lost Digits
8. Tandem Call From Toll Trunk With One Lost Digit
9. Toll Trunk Call to Local With One Lost Digit
10. Toll Trunk Call to Local With Two Lost Digits
11. Toll Trunk Call to Local With Three Lost Digits
12. Call From Free Service Trunk Which Becomes Ticketed
13. Busy Verification Call A More Detailed Consideration of Lead D1 of FIG. 49 and Associated Circuitry
Certain Transfer Relays in Registers
Additional Consideration of Coin Box Calls
No Code Provisions in Translator

*General*

The crossbar system includes automatic switching equipment providing communication paths between a plurality of associated subscriber lines. The subscriber lines are divided into standard five-hundred line groups each group being initially associated with twenty SLA units having twenty-five lines each assigned thereto. When less than five-hundred subscriber lines are required in a line group, the frames can be equipped with crossbar switches in twenty-five line units. Group selectors are provided for trunking between line groups, trunk groups, or combinations thereof. Any portion of a line group can be added to an existing partially equipped line group by merely plugging in additional line relay equipment and crossbar switches commensurate with the number of lines to be added. When lines are added to a group, trunking equipment must also be provided to accommodate the increased traffic. All selection stages use crossbar switches in a link arrangement operating on a "by-path" system. A "by-path" system is one in which a by-path or test channel is set up from the calling line or trunk through the marker to the point of destination or order to verify idle or busy condition, and also to select an idle vertical at each stage which when operated will provide a connection between the calling line and end destination.

Registers and sender units control the operation of the switching equipment in the exchange. The standard register and sender design enables this equipment to be used in enlarging most existing types of switching systems. Especially designed registers and senders can be provided to permit enlarging those types of switching using reverting pulsing on non-decimal control.

*General—Line connecting equipment*

Crossbar switches are used for both originating and terminating calls and twenty-five subscriber lines appear on one crossbar switch (SLA). This is the only appearance of these lines in the equipment. The crossbar switch operates as a line finder in conjunction with a line guard circuit in the marker on originating calls, and as a connector controlled by the marker on terminating calls. Further line group crossbar equipment (SLB, CRA, SRL) is operative to extend the calling line to register and group selector equipment (GSA and GSB).

*General—Group selectors*

The group selector is a selecting stage comprising two groups of cross bar switches GSA and GSB. Connections are established through the crossbar switches by means of group selector markers GSM operating on the "by-path" principle. Group selectors are arranged in a maximum of eight frames of thirty inlets each, all of which are served by two markers (GSM) which handle succeeding calls in alternate sequence. Normally two GSA frames of thirty inlets each make joint use of two GSB frames of two hundred outlets, each having a switching arrangement of sixty inlets each of which has access to any of four hundred outlets. The group selectors extend the calls to a trunk of a trunk group on the equipment for extending calls to the desired local line (CRB, etc.).

*General—Registers*

Whenever lines or trunks originate calls, a register becomes associated with the line or trunk. The register provides dial tone when required, accepts all the digits dialed over the connection, transfers the dialed information to the sender, and provides the path over which the sender will eventually send information to the markers and trunks. The register has the ability to recognize special service codes as well as its own local office codes. In case the register has not recognized the dialed information as a local office code or a special service code, the services of a translator may be utilized to obtain the necessary information.

*General—The sender*

In each connection, the register seizes an associated sender, and the sender is controlled to operate by the register as follows:

(1) On calls to local numbers or special services the register transfers the first one, three, or four digits to the sender which operates to select the required number group circuit or establish the required service routing;

(2) On inter-office calls, the register retains the digital information received thereby, and the sender engages a translator which in turn obtains the digital information from the register and provides all necessary routing and handling information pertaining to the call;

(3) On operator's calls key-pulsed over an operator's trunk into the register, switching through the local office is not required and the sender does not utilize the services of a number group circuit or the translator. Instead the sender simply sends the digits over the trunk on a ten or twenty p.p.s. basis without any deletions or additions.

The sender is capable of sending as many as three routing digits as received from a translator over a trunk. It can delete as many as six of the digits received in the register. It can direct calls to alternate routes when necessary. It can pulse information over a trunk circuit on a multi-frequency basis as well as a ten p.p.s. or twenty p.p.s. basis. It is equipped for the usual sender features such as dial stop signals, etc. It is operative with automatic ticketing, with automatic line identification or with operator line identification.

*General—Number group circuit*

Terminal per station service is provided by a number group circuit which translates the directory number into a terminal location. Number group circuits are equipped with terminals for running jumpers to associate any directory number in the switchboard with the desired terminal and to indicate the desired ringing for the station. It will also indicate P.B.X trunk groups or official telephones. If jumpers are omitted from terminals in a number group circuit, the call will be automatically directed to intercept equipment. Complete intercept is provided for all unused numbers. The number group circuit replaces the conventional IDF.

*General—Translator*

On inter-office calls other than special service calls, the translator provides all necessary information to enable to sender to establish the connection. The translator is also operative to control the register as to its time of selection of associated sender equipment. That is, in the interest of providing the most efficient use of the sender equipment the translator controls the register to seize the sender equipment at different times during the establishment of different types of calls thereover. The translator analyzes the first three or six digits as necessary and as a result of such analysis delivers the following information:

Crossbar routing digits
Trunk routing digits
Alternate routing information
Digit deletion
Type of pulsing to be used
Free service or toll classification
Dial stop information

*General—Markers*

Two types of markers are used in the crossbar system. One type is associated with line groups and the other type is associated with group selectors. In the subscriber line group stage, two line groups are associated together (even and odd) and make joint use of two markers by means of by-path testing. The markers establish a conversation connection through the crossbar switches. In order to perform this function, the marker contains identification circuits to identify the origin of the call. A code receiver in the marker receives directing information from the sender. The line group marker also has facilities for determining the class of service of the line originating the call and passes this information to the register for subsequent use. In addition the line group marker has facilities for detecting reverting calls and passes this information to the CRB to enable same to adjust the office equipment for a reverting call. The line group marker handles both originating and terminating traffic through both associated line groups (even and odd). The group selector marker, however, handles calls in one direction only, since traffic progress through the group selector is in only one direction. In conjunction with the sender, the group selector marker provides automatic alternate routing. The group selector marker is arranged to select any idle trunk in trunk groups ranging in size from ten to eighty trunks on a full availability basis.

*General—Inter office trunks*

All standard types of inter office trunks including multi-frequency trunks are available. The trunks terminate on the group selector or toll board or a combination thereof. All trunks that are incoming to the group selector have access to a register through a trunk register link switch. All trunks that are outgoing from the toll board (with the exception of multi-frequency trunks) will also have access to a register. On outgoing calls talking battery will be supplied over the group selector to the originating local subscriber by the trunk. Talking battery will be supplied over the group selector to the terminating local subscriber by the trunk on incoming calls, such potential being supplied by a metallic cut-through which extends over the CRB engaged on this type of call. On calls from a trunk to a local subscriber the switch train will be held by the trunk. On tandem traffic (trunk to trunk) the switch train will be held by the outgoing trunk.

*General—Intra office trunks*

All standard types of trunks will be available, such as CLR, PCLR (paystation CLR), OGT, local and toll information, toll inward, etc. Trunks that are inward to the toll board such as CLR, TX, etc. will be accessible over the group selector and will supply talking battery for the originating local subscriber when required. Trunks which are outward from the toll board, such as OGT, etc., will terminate in a group selector, and will supply talking battery to the terminating local subscriber when required. The switch train will be held from the trunk in both cases. The OGT trunk will incorporate such features as the delayed ring and coin control. The PCLR trunk which handles pre-pay station traffic to the toll board will incorporate the feature of automatic coin disposal after hang-up by both the operator and local subscriber. The trunk also includes manual coin disposal.

*General—Subscriber terminating trunk CRB*

Each five-hundred line group has access to a certain number of CRB's. The CRB's are used on all terminating calls to a particular line group. Talking battery will be supplied to both originating and terminating subscriber in the case of local to local calls, and will provide a metallic cut-through circuit for all other types of calls except through official lines. The ring trip relay is located in the CRB. The CRB also contains features for the handling of reverting calls on a directory number basis.

*General—Manual desks*

Standard types of manual desks may be used for information, repair, test, toll, dial service assistance or service observation.

*Call from subscriber line as extended to register O*

A call from a subscriber line, regardless of termination, is extended over Register O. With reference to the schematic showing of FIGURES 1A, 1B and 1C, the two groups of five-hundred two-wire lines are connected from subscriber premises, each group entering boxes entitled "Even Line Group" and "Odd Line Group" respectively. Referring to the aforementioned applications, each box represents the associated line relay circuits in the associated subscribers line switching circuits SLA and also the associated line entrance originating circuit LEO, which circuits effect connections of the lines to the even and odd markers. Thus each five-hundred line group terminates in twenty (20) SLA switches and has its own LEO circuit by means of which each five-hundred line group has access to both even and odd markers. Each marker has facilities for cooperating with twenty SLA's, connecting relays being provided to switch a particular marker between one group of SLA's or another.

Assuming first that a party on one of the five hundred lines of the odd line group removes his receiver to initiate a call, the connection lands in an associated line circuit in the associated SLA circuit, and the operation of his line relay completes a circuit to the associated LEO circuit which selects either the even or odd marker, as indicated by the lines from the box "Odd Line Group" to "Even Marker" and "Odd Marker."

Assuming first that the "Odd Marker" is selected, the identity of the calling line group "Even" or "Odd" is registered in the marker, and a loop is extended from contacts of the calling line circuit to the marker by means of which the marker ascertains the identity of the SLA (1—20) containing the calling line, and the identity of the calling line (1—25) in the SLA switch.

The marker now operates to connect the calling line to an idle register. Briefly the marker, (through contacts of "Connect Relays" operated by the marker and shown in this drawing between the marker and the register, but actually located in the SRL circuit containing the SRL crossbar switch), tests for and selects an idle register, and first closes appropriate horizontal magnets and then vertical hold magnets in the proper SLA, SLB and SRL crossbar switches to route the calling line into the selected idle register over crossbar crosspoints. The paths for operating the horizontal and vertical magnets of these switches are indicated by dotted lines associated with the originating path "ORIG" issuing from the "Odd Marker." The subscriber's line marker over contacts of the "connect" relays also signals the Reg. O as to the origin of the call, giving one signal if the call originated at a coin box line, an alternative signal if the call originated at a measured service line (usually P.B.X line), and no signal if the call originated at a flat rate (regular subscriber) line, the marker having made a tone test over the sleeve conductor to detect a coin box line or a measured service line.

The path from the calling line into the register may be traced from one of the lines of the five-hundred lines associated with the Odd Line Group, through the box "Odd Line Group" over the crosspoints of an SLA crossbar switch, over the crosspoints of an SLB crossbar switch, the CRA circuit, the crosspoints of an SRL crossbar switch, and into the register (Reg. O). Register O is a seven digit register which can be expanded to eleven digits plus party register.

Upon the closure of the SRL crossbar crosspoints to extend the calling connection into the register designated "Reg. O," the register signals the CRA circuit which in turn places ground on the sleeve wire of the calling line and back over the SLA and SLB crosspoints, operating the cut-off relay in the line circuit (not shown for purposes of simplicity). The ground signal is also extended back into the marker to control same to release for use with other calls. The calling SLA and SLB switch vertical magnets are held by the same ground as the marker releases.

When connections have been extended into the register (Reg. O), the calling party receives dial tone from the register, and dials the called number into the register over the line loop including tip and ring connections, the CRA circuit holding the subscriber's tip and ring connections to the group selector stage open at this time.

Prior to completion of the description relative to extension of the call beyond the register O consideration is given to the operation of the equipment in accepting calls from trunks and extending same into register I. Such sequence in the description facilitates consideration of the various codes which are received by the different registers.

*Trunk arrangements*

Brief consideration is first given to a number of the various classes of trunk arrangements which may be used in the tandem office. Referring to FIGURES 1A, 1B, and 1C, a short systematic explanation of trunk arrangements therein is now set forth.

*Trunk A*

Trunk A illustrates:

(1) A trunk arrangement which is used with incoming calls from certain sub-offices which require a dropout register DO; such operation results responsive to removal of the receiver at the sub-office; and such calls are routed by the sender through the group selector.

(2) A trunk arrangement for extending outgoing calls to the sub-office over the group selector and Trunk A.

*Trunk B*

Trunk B is representative of such trunks as tributary trunks, free service trunks, ticketing trunks, and intertoll trunks; the particular type of trunk determining which combination of arrangements 1–4 below are included:

(1) Arrangements in which the trunk in response to incoming calls from the distant office engages a Reg. I; such calls are routed by the sender through the group selector.

(2) Alternative arrangements wherein the trunk routes incoming calls from the distant office to the toll board.

(3) Arrangements whereby the toll board may engage a Reg. I, the sender outpulsing directly over the trunk.

(4) Arrangements whereby outgoing calls to the distant office are made through the group selector via Trunk B.

*Trunk C*

Trunk C may include:

(1) Arrangements whereby incoming calls from the distant office engage a register designated "Reg. MF" via TRL crosspoints and a multi-frequency receiver designated "MF Receiver." As an "end of pulsing" signal arrives over the trunk it is not necessary for Reg. MF to consult a translator to determine when to engage a sender, but the sender is engaged upon receipt of the "end of pulsing" signal. The sender has access to the number group circuits and the translators and routes the incoming call through the group selector.

(2) Arrangements whereby outgoing calls to the distant office connected to Trunk C are made through the group selector via Trunk C.

*Trunk D*

Trunk D is representative of a local OGT through which the operator completes calls to local subscribers, a toll switching OGT through which the operator completes outgoing long distance calls (even across the country), or a busy verification trunk BV.

*Trunk E*

Trunk E illustrates:

(1) Trunk arrangements wherein the manual board operator can plug into trunk E which engages Reg. K over TRL crosspoints, Reg. K being able to accommodate up to fourteen digits keyed into it from the operator's keyset on a D.C. code basis. Reg. K has a sender associated with it which outpulses over the trunk on a 10 p.p.s. or 20 p.p.s. basis, the digits stored in Reg. K to establish the long distance connection.

(2) Arrangements whereby incoming calls over Trunk E engage a Reg. I over TRL crosspoints. The sender extends connections through the group selector.

*Trunk F*

Trunk F is representative of dial assistance (DSA) trunks, combined line recording trunk to operator (CLR), paystation trunk to operator (PCLR), local information trunk (113), repair clerk trunk (114), mobile operator trunk (116), toll inward trunk (121), toll information trunk (131), rate and route trunk (141), toll station operator trunk (181), transfer to CRL trunk (191), delayed TX call operator trunk (11XX), and manual intercept operator trunk, and includes arrangements wherein calls through the group selector reach the manual board.

*Trunk G*

Trunk G illustrates:

(1) Arrangements whereby incoming calls from trunks through the group selector reach a toll trunk. An additional digit received in the toll test trunk from the sender selectively routes the call through the trunk to a 600 ohm termination (if 100 was originally dialed or pulsed), to the test desk (if 101 was originally dialed or pulsed), to a 1000 cycle tone source (if 102 was originally dialed or pulsed), or to a supervision test circuit (if 103 was originally dialed or pulsed).

*Trunk H*

Trunk H illustrates:

(1) Trunk arrangements whereby calls through the group selector reach a local test trunk.

*Trunk I*

Trunk I illustrates:

(1) Trunk arrangements whereby the test desk engages a Reg. I for completing test calls through the group selector.

*Trunk J*

Trunk J illustrates:

(1) Arrangements whereby calls are routed through the group selector to recorded automatic intercept announcement equipment by means of which the calling party receives a recorded announcement to the effect that he has dialed a wrong number.

*Trunk K*

Trunk K illustrates:

(1) Arrangements whereby calls through the group selector reach a dial speed test trunk.

It should be observed that a call signal lead extends from each trunk to the group selector marker by means of which the group selector marker is engaged at the proper time by the associated register. Also, connections (not shown) extend from each trunk into the group selector marker by means of which the marker tests the trunk as to its idle or busy condition.

Consideration is now given to the signals which are transmitted by the different trunks to the register which is seized for use therewith.

*Incoming call from a trunk to register I*

Reg. I includes storage facilities for eleven digits plus storage facilities for the calling party digit (referred to hereinafter as the party bin) and is operative to register the digits received from different ones of the trunks. Digits can be represented by D.C. coded signals or D.C. pulsed signals. The D.C. coded signals are stored in the register on a one or two-out-of-four coded basis. Assuming, for exemplary purposes, that a call incoming to the office is received over an incoming trunk, such as Trunk B, and is extended through the trunk as indicated by the arrow and over TRL crosspoints into Register I. The trunk over which the connection is established identifies the class of trunk to which it is assigned and provides appropriate signals to the sender for conditioning same to effect the proper handling for such type of call.

When a local "Test Trunk" (such as D and I) is connected to the register, the register signals the sender to disregard a busy condition of the called line, so that the sender can send the proper conditioning code to the CRB circuit. When a toll trunk from a toll center connects to the register, marking is extended to the sender which enables the sender to send the proper code to the CRB circuit to condition same for delayed ringing. Certain toll trunks from a distant point mark Reg. I to provide prefix type busy verification, it being possible also for these trunks to provide uniform delayed ringing. Automatic ticketing trunks from a non-recorder office mark Reg. I to include a toll recording trunk in the connection. Keyset trunks mark Reg. I as to whether direct outpulsing is required. Free service trunks mark Reg. I for free service. Toll and intertoll trunks mark Reg. I for toll service.

Reg. I and Reg. O can recognize access codes for automatic toll ticketing, area codes, four local office codes, local and toll special service codes, and any preassigned busy verification prefix digit.

In addition to handling traffic in which all the digits of the dialed number are received, Reg. I is designed to accommodate, in so far as possible, traffic from offices using "step-by-step" or "direct-control" equipment in which one or more of the digits of the dialed number will be lost in switching the "direct-control" equipment.

On a call from a trunk such as Trunk B (see also FIG. 4 in the above identified patent application having Serial No. 561,975), the trunk signals over a coil signal path (such as 236′ of the group 235′—238″) in the aforementioned application to the guard and connect relays circuit of an associated TRL Circuit (see previously identified patent application Ser. No. 561,975) whereby the calling trunk is switched over the TRL crossbar crosspoints to an idle twelve digit register (Reg. I) which may be equipped for only seven digits if only seven digits maximum are required. Upon landing in the register, the trunk signals to the register the class of the calling trunk.

Twenty-five variations of class marking designations are provided by D.C. signals over two marking leads extending from each Reg. I trunk over TRL crosspoints into Reg. I as follows:

| Class desig. | M1 lead signal | M2 lead signal | M1 signal meaning | M2 signal meaning |
|---|---|---|---|---|
| KSO | O | + | Automatic ring | Keyset. |
| KS1 | + | + | Delayed ring | Do. |
| KS2 | R | + | Direct outpulsing | Do. |
| KS3 | −R | + | do | Do. |
| KS4 | — | + | Test | Do. |
| TL0 | O | +R | No lost digits | Toll. |
| TL1 | + | +R | No lost digits | Do. |
| TL2 | + | +R | No lost digits | Do. |
| TL3 | −R | +R | 1, 2, or 3 uniform lost digits. | Toll. |
| TL4 | — | +R | Optional delayed ring-optional prefix BV. | Do. |

See note at end of table.

| Class desig. | M1 lead signal | M2 lead signal | M1 signal meaning | M2 signal meaning |
|---|---|---|---|---|
| N0 | O | O | | Free service (no lost digits). |
| N1 | + | O | | ↓ |
| N2 | +R | O | | |
| N3 | —R | O | | |
| N4 | — | O | | |
| TT0 | O | —R | May or may not lose part of toll ticketing access code. | Ticketing. |
| TT1 | + | —R | | Do. |
| TT2 | +R | —R | | Do. |
| TT3 | —R | —R | First digit received is party digit. | Ticketing. |
| TT4 | — | —R | May or may not lose part of toll ticketing access code. | Do. |
| FS0 | O | -------- | One lost digit | Free service. |
| FS1 | + | -------- | One or two lost digits; tolerate one ambiguous digit. | Do. |
| FS2 | +R | -------- | One or two lost digits; tolerate one ambiguous digit. | Do. |
| FS3 [1] | —R | -------- | One or two lost digits; tolerate one ambiguous digit. | Do. |
| FS4 | — | -------- | One or two lost digits | Do. |

NOTE.—+=positive battery; —=negative battery; +R=positive resistance battery; —R=negative resistance battery; O=open lead.

[1] Alternatively FS-3 marking can be used to indicate 3 lost digits with optional strapping in Reg. I.

From the foregoing it can be seen that:

(1) Toll trunks (or intertoll trunks) mark Reg. I as to whether they will deliver:

(*a*) no lost digits (*b*) one, two, or three lost digits (uniform for the lost digit category trunks)

(2) Free service trunks mark Reg. I as to whether they will deliver:

(*a*) no lost digits (tandem or terminating traffic)

(*b*) one or two lost digits, non-uniform. In the case of two lost digits, the register supplies a second digit (tandem or terminating traffic)

(*c*) three lost digits (terminating traffic)

(*d*) one lost digit (tandem or terminating traffic)

(3) Ticketing trunks mark Reg. I as to whether:

(*a*) The 112 part of the 112P toll ticketing access code or the 1Y part of the 1YP toll ticketing access code may be partially missing.

(*b*) The digit first received is the "P" digit of the toll ticketing access code 112P or 1YP.

NOTE.—For accommodating 112P ticketing codes received with one or two digits missing resulting in 12P or 2P received in Reg. I, 1YP wiring must be connected the Y=2.

It should be observed that on a call from a free service trunk which is automatically ticketed or not according to destination, the "Y" digit of a 1YP code or digit "2" of a 112P code arriving first, must not conflict with the second or third digit of an office code received over a free service code as the first digit on lost digit calls.

Thereupon the calling trunk pulses the called number into the register (Reg. I).

Toll (and intertoll) traffic may arrive in Reg. I with one, two, or three lost digits, but in a given office all toll (and intertoll) traffic arriving with lost digits must arrive with the same number of lost digits.

Toll terminating traffic or toll traffic requiring tandem switching, may arrive at the Reg. I with a uniform single lost digit. The toll trunk will mark Reg. I to indicate toll origin and a single lost digit, and accordingly the received digits will be registered in the proper storage bins as though no lost digit had occurred. The register will not, upon extending the received digital information to the sender, supply a special marking for the lost digit. The two received digits in the second and third bins will enable the translator to determine the required routing and handling information.

Toll terminating traffic, other than calls to toll special service operators or calls requiring tandem switching, may arrive at the Reg. I with a uniform two or three lost digits. The received digits will be registered in the proper storage bins and the local office code will be reconstructed by the Reg. I. If more than one local office code is involved, three lost digits cannot be accommodated.

Free service traffic, requiring tandem switching, may arrive at the Reg. I with a uniform or non-uniform one or two lost digits. The received digits will be registered in the proper storage bins as though no lost digits had occurred. The register will not supply special marking for the first lost digit but will supply a second digit to provide the translator with sufficient digital marking to determine the required routing and handling information.

Terminating free service traffic may arrive at the Reg. I with one, two, or three lost digits and the local office code will be reconstructed by the Reg. I. If more than one local office code is involved, three lost digits cannot be accommodated.

Thus in many respects the system of this application can easily accommodate switching for more advanced "numbering plan" situations than any of the presently known types of "direct-control" equipment.

FIGURE 7 illustrates the principle of dealing with lost digits and will be discussed in a subsequent section.

It should be appreciated that although for simplicity a point in the drawings may indicate the point of juncture of a trunk such as Trunk B, a TRL input, and the group selector, this point exists within the trunk in the same manner that the similar point of juncture of an SLB vertical, an SRL input, and the group selector is located in the CRA circuit.

*Call from manual board through toll switching trunk to Reg. I*

To complete calls through the automatic switching apparatus a manual operator may plug into a Toll Switching Trunk D which has access over TRL crosspoints to a Reg. I. Thereupon the operator dials or keys the called number into Reg. I, trunk D marking Reg. I upon landing so that Reg. I can set itself up for dial pulse receiving or keying receiving.

With dial pulsing Reg. I will call in a translator, but with key pulsing a key pulsing completion signal notifies Reg. I at the time that the senders should be seized. In such event, Reg. I does not call in the translator.

*Incoming call from trunk to register DO*

In certain step-by-step offices near the instant crossbar office, the subscriber in lifting his receiver, engages a link in the step-by-step office, and a "drop-out" register DO in the instant crossbar main office over an incoming trunk A and TRL crosspoints. The nature of the first digit dialed, or the first three digits dialed, determines whether the call is to be completed in the step-by-step office or in or through the crossbar office. If the call is to be completed in the step-by-step office, register DO is released. If the call is to be completed in the crossbar office, the link is released in the step-by-step office, and the dialed digits are received in the register DO. The reason for providing special drop-out registers rather than using regular register O's is that an abbreviated type of register can be used (without coin box facilities, for example), and also the fact that provision must be made for reaching the register DO from a trunk over TRL crossbar switch crosspoints.

The use of register DO's has the advantage that when three digits are necessary to determine a route out of the sub-office, and through the main office, these three digits are also received in the main office and can be used to designate the destination. Obviously, if the first three digits of a 2–5 number were used in the sub-office only the last four digits would be received in the main office, and the main office would have no way of knowing the destination office of the call. Drop-out registers, such as DO, have access to associated senders over RSG and RSL circuits, and to translators over RTG guard circuits and connect relays.

Outgoing calls to trunk A are made through the group selector as will be understood.

*Incoming calls from trunk to register MF*

Over certain trunks such as trunk C, code signals are received on a multi-frequency basis. Accordingly these trunks are given access over TRL crossbar switch crosspoints to multi-frequency receivers which receive the multi-frequency codes and translate them into D.C. codes to the registers MF.

After the signals have been received, a completion signal is received over the trunk which is relayed through the MF receiver to the register MF. Accordingly Reg. MF does not need to engage a translator. Upon receipt thereof, the register seizes a sender via RSG and RSL guard and connect circuits.

Outgoing calls to trunk C are completed through the group selector as will be appreciated.

*Calls from manual board through intertoll trunk into Reg. I*

The operator may plug into trunk B and key the call through trunk B into Reg. I, giving Reg. I an "end of pulsing" signal which enables Reg. I to engage a sender without consulting a translator. The sender directly outpulses the digits received in Reg. I over trunk B to the distant office in 10 p.p.s. or 20 p.p.s. form, which routes the call to its destination.

*Calls from manual board into Reg. K*

As Reg. I has a maximum receiving capacity of eleven digits, it is necessary in some instances for an operator to be able to send fourteen digits. A special trunk, such as E, is made accessible from a manual board and is connected over TRL crossbar switch crosspoints to a special register, such as register K, which has a maximum receiving capacity of fourteen digits. The operator key sends up to fourteen digits into register K and then a sender completion signal. Thereupon the sender associated with register K in 1:1 relationship retransmits the stored digits over the trunk in 10 p.p.s. or 20 p.p.s. form.

Calls incoming through the associated trunk are connected to a Reg. I over other TRL crosspoints and Reg. I routes the call through the group selector.

*Codes incoming to registers*

The called number as received by the various types of registers may take various forms.

One of these forms is a 2–5 directory number which we shall designate LLN—NNNN in which L=a letter represented by fingerholes 2–9 on the conventional telephone dial; and N=a digit 1–0 as represented by fingerholes 1–0 on the conventional telephone dial. The portion LLN represents the office code; while the portion NNNN represents the thousands, hundreds, tens, and units digits of the called directory number.

Another form is N—LLN—NNNN in which the 2–5 directory number is prefixed by a digit such as zero whereby a distant manual operator may busy verify a called number, even though that number is busy, by "over-riding" the busy condition.

Another form is 1YP—LLN—NNNN in which the 2–5 directory number is preceded by the automatic toll ticketing code 1YP in which Y is any digit 2–0 (i.e. not 1); and P is the calling party identification digit, dialed by the calling party.

An alternative form which may be used for automatic toll ticketing is 112P—LLN—NNNN in which the 2–5 directory number is preceded by an automatic toll ticketing code 112P in which P is the calling party identification digit dialed by the calling party.

Another form is XX'X"—LLN—NNNN in which the 2–5 directory number is preceded by an area code XX'X" in which X may be any digit from 2–9; X' may be 0 or 1; and X" may be any digit from 1–0 if $X'=0$, and any digit 2–0 if $X'=1$.

Another form is 1YP—XX'X"—LLN—NNNN in which the 2–5 directory number is preceded by an area code XX'X" and by an automatic toll ticketing code 1YP.

Another form is 112P—XX'X"—LLN—NNNN in which the 2–5 directory number is preceded by an area code XX'X" and by an automatic toll ticketing code 112P.

Another form is a code such as

NNN—NNN—LLN—NNNN keyed by an operator into Reg. K in which the first NNN may be an intertoll code to select a trunk from a first toll center to a second toll center; and the second NNN may be an intertoll code to select a trunk out of the second toll center to the destination office; and the remaining LLN—NNNN is the 2–5 directory number of the called party in the destination office.

To certain of the foregoing codes may be suffixed, a party digit P (from 1–0) on a terminal per line basis as follows:

LLN—NNNN—P
1YP—LLN—NNNN—P
112P—LLN—NNNN—P
XX'X"—LLN—NNNN—P
1YP—XX'X"—LLN—NNNN—P
112P—XX'X"—LLN—NNNN—P
NNN—NNN—LLN—NNNN—P

Another form is "0" dialed to reach a dial service assistance operator. Other forms may be the following codes over a trunk from a distant point for test purposes:

100 which extends the tested trunk to a 600 ohm termination to test for balance of voice repeaters. The test man may then apply tests to the trunk thus terminated;
101 which routes the call to a toll test board for communication purposes;
102 which extends the tested trunk to a 1000 cycle tone source;
103 which extends the tested trunk to a reverse battery supervision termination.

Other forms are:

110 to reach a toll operator;
113 to reach an information operator;
114 to reach a repair clerk;
115 to reach a local test board;
116 (spare) This might be used to reach a mobile operator who will extend the connection to a mobile station;
117 to reach a local test board;
118 which may be dialed by a test man at a subscriber's premise to reach an automatic dial speed tester.

Other forms are:

121 to reach an inward operator;
131 to reach a toll information operator;
141 to obtain rate and route information;
151 to reach a call order operator;
161 to reach a manual office;
171 to reach a manual office.

Further forms are:

11XX to reach the register from a trunk on a terminating call to signal a TX operator to complete a delayed call. The 11X designates TX service and the last X selects a particular team of ten teams of TX operators. The first X represents a choice of digit which thereafter is fixed. The last X may vary from call to call.

TTC—11XX in which T may be considered as representing a digit from 2–9 and C is preferably 0. The TTC routes the toll operator originated call to a "Toll-Terminating Center" and the 11XX selects a TX operator team or a particular TX operator in the toll terminating center.

XX'X"—TTC—11XX in which XX'X" is an area code. The combination of the toll area code and "Toll-Terminating Center" code dialed by the originating toll operator determines a particular toll terminating center in a particular area. The 11XX determines a particular delayed call (TX) operator team or a particular TX operator in that center.

XX'X"—11XX in which the area code plus the 11XX code routes the call to a TX operator team or a particular TX operator in a center which does not require a special TTC code.

Code LLN is used to reach a manual office in the same area.

Code XX'X"—LLN is used to reach a manual office in a different area.

FIGURES 6A and 6B list these codes systematically and indicate which registers may receive the various codes.

*Handling the problem of lost digits in Reg. I*

The foregoing description has been concerned with the explanation of the manner in which calls incoming from trunks and incoming from local subscribers are forwarded to registers such as Reg. I, O, K and DO. In operating sequence, the register in use now operates to analyze the nature of signals received, and determines the nature of the signals which must be transmitted to effect further extension of the connection in the direction of the desired party.

Prior to description of the register operation, it is noted that a special problem arises whenever calls over incoming trunks to Reg. I are received from step-by-step type offices in which a digit or digits of an office code LLN may be expended in the step-by-step office in reaching the trunk. Obviously the call arrives in Reg. I minus these digits.

It is believed that the described system can provide free service tandem switching on a 2–5 numbering basis, for more adverse "numbering plan—situations" than any of the presently known types of "direct-control" equipment.

*General description*

For example, FIGURE 7 illustrates an unusually adverse numbering plan situation and the extent to which the equipment can provide tandem switching. In the illustration, the LAfayette-2 office is serving as the tandem switching center. All of the connecting offices are of the "direct-controlled" type of equipment. With certain restrictions noted, a subscriber in any office may place a call to any office in the free service area by dialing only the 2–5 numbering plan directory listing of the called subscriber. The equipment will correctly route the call to the terminating office, even though some of the digits identifying the terminating office were lost in switching the call through the originating office.

The tabulation is arranged to list the digits as received by a register in the switching equipment associated with the LAfayette-2, LAfayette-3, and LAfayette-4 offices which is the tandem center under consideration, and for each office when a call is being placed from that office to any other office in the switching plan. The received digits are listed in the 2–5 numbering plan form, i.e., LLN NNNN wherein LLN is the office code. In the tabulation, when a digit is not extended to the register, it is indicated by ( ). For instance, ( )22 NNNN indicates that the first digit of the office code was lost in switching through the originating office. As the last listing, opposite "TOLL," is indicated the situation where terminating toll traffic arrives with a uniform single lost digit. Where the word "LOCAL" appears instead of digital information, the call is switched within the local office and does not require tandem switching. Where the word DIRECT appears, all three digits of the office code would be lost in the originating office and therefore tandem switching cannot be accommodated. If desired, these offices could be provided with dropout registers in the tandem center in which case all digits would be received and therefore tandem switching could be provided. No restrictions of number assignments would then be required in the TUrner or TWinbrook offices.

In certain cases, restrictions in assigning levels is required when drop-out registers are not equipped, because for example, traffic arriving fom TWining and TWinbrook (dialing pattern "C") will arrive with the first received digit having the value 4 when this traffic is destined to either PIoneer or TUrner. Therefore the register, when determining from the value of the first digit received the proper storage bin in which to register the digit, is required to register the digital value 4 temporarily in the party digit storage bin until it can determine from the value of the second digit received whether the digital value 4 should be transferred to the second digit storage bin or the third digit storage bin. In dialing pattern "C," the value 7 for the second received digit (traffic to PIoneer) indicates to the register to transfer the first digit received from the party bin to the second digit storage bin and that the received digital value 7 is to be stored in the third digit storage bin. When the value of the second digit received is not 7, the register transfers the first digit received to the third digit storage bin and the second received digit to the fourth digit storage bin. The subsequently received digits are stored consecutively as they are received. For this reason the register cannot accommodate traffic to TUrner when the value of the second digit received has a value 7.

A similar situation occurs in dialing pattern "B" (traffic originating from TUrner and TUcker) wherein traffic destined to either PResident or TWinbrook arrives with the first received digit having the digital value 7. The digital value 7 for the first received digit in dialing pattern "B" indicates to the register to temporarily store this digit in the party bin until it receives the second digit. When the value of the second received digit is 4 (traffic to PResident), the register stores the second received digit in the third digit storage bin and transfers the first received digit from the party bin to the second digit storage bin. When the value of the second received digit is not 4 (traffic to TWinbrook), the second digit received is stored in the fourth digit storage bin and the first digit received is transferred from the party bin to the third digit bin.

Such a situation wherein the value of the first received digit is the same, but of different digital positions for different offices does not occur in dialing pattern "A"; therefore the value of the first received digit is sufficient to indicate the proper storage bin in which the digit should be stored.

The dialing pattern with which the register is working on any given call, is marked to the register by the incoming trunk. For any given office, the dialing patterns are predetermined by the office codes assigned to the local and connecting offices. At the time of installation, the trunks and Incoming Registers are strapped according to engineering specifications to accommodate the specific dialing patterns encountered.

With reference to FIGURE 7 a more specific consideration of the operation of the equipment is now set forth. As there shown, a plurality of offices having free service dialing facilities in or through the tandem equipment associated with the illustrated local office are listed in a vertical column at the left, and in this position represent calls originating at these offices.

Horizontally across the top of the chart these same offices are listed as destinations.

At the rectangular intersections of columns and rows are given the digits incoming into the equipment, the symbol ( ) representing a lost digit.

For example, the local office (schematically illustrated in FIGURES 1A, 1B and 1C) is Lafayette, and contains three offices: LAfayette-2, LAfayette-3, and LAfayette-4, which digitally are respectively as follows: 522, 523, 524 as will be appreciated by reference to a metropolitan dial.

When any Lafayette subscriber dials a local subscriber in the LAfayette-2 office, the digits 522—NNNN will be received in Reg. O.

When any Lafayette office dials a subscriber in the PIoneer-7 office, the digits 747—NNNN will be received in Reg. O.

Generalizing, whenever a subscriber in a LAfayette office dials a 2–5 number to reach a subscriber in any office in the exchange served by the local switching equipment, Reg. O receives the complete 2–5 number.

It has been assumed that the exchange TUxedo has dropout registers (Reg. DO) in the main office switching equipment, and accordingly when a subscriber in Tuxedo dials any office the calls are extended over trunks from Tuxedo into dropout registers (Reg. DO) (FIGURE 1B), and a complete number is received in the dropout registers. The TUxedo office is accordingly grouped on the chart (FIGURE 7) with LAfayette.

Calls from subscribers in the TUxedo office will be considered for the purposes at hand as arriving over trunks having access over TRL crosspoints to Reg. DO's and accordingly all digits will be received.

However, calls from subscribers in the PIoneer, SKyline, PResident, PYramid, TUrner, TUcker, TWining, and TWinbrook offices will be considered for the present description as arriving over trunks having access over TRL crosspoints to Reg. I's. Accordingly it will be assumed that calls may arrive in Reg. I with one or two digits missing, the missing digit being indicated by the symbol ( ).

Prior to the consideration of a detailed description of lost digit handling, it should be observed that offices 883, 884, and 886 have the same first two digits, and hence on a call from the TUrner office, to the TUxedo office the equipment at TUrner office cannot tell from the first two digits what the destination is and must wait for the third digit. Accordingly the call would arrive in Reg. I of the office being described minus three digits, to be tandem switched to Tuxedo. As all office digits have been lost, this is not feasible and accordingly the chart states that direct trunks must be provided.

Also it should be observed that in case any office is calling the same office, this would be a local call and accordingly is marked LOCAL, not involving calls to Reg. I.

While toll calls in many instances arrive with no lost digits, the last item in the origin column at the left is indicated as TOLL, and the associated line illustrates toll calls to the various destinations arriving with a single lost digit as in the case where a toll selector is interposed between intertoll trunks and Reg. I. It will be observed that the second and third digits provide information discretely distinguishing the destinations and accordingly Reg. I recognizes same.

In Reg. I, digits are stored on relay groups comprising four relays for each group, these relays being designated: 1, 2, 4, and 7. Each group of relays hereinafter is designated as a digit storage bin. The ten digits are stored as follows by the operation of the relays:

Digit value 1—Relay 1 operated
Digit value 2—Relay 2 operated
Digit value 3—Relays 1 and 2 operated
Digit value 4—Relay 4 operated
Digit value 5—Relays 1 and 4 operated
Digit value 6—Relays 2 and 6 operated
Digit value 7—Relay 7 operated
Digit value 8—Relays 1 and 7 operated
Digit value 9—Relays 2 and 7 operated
Digit value 0—Relays 4 and 7 operated

*One lost digit*

In the case of one lost digit, as for example when digits ()93—NNNN are received in Reg. I on a call received over an incoming toll trunk, such as B, which is being extended from a distant toll operator through a toll selector and the illustrated exchange to PYramid-3, the trunk (such as B) marks Reg. I to skip the first digit storage bin, and Reg. I directs the first received digit into the second storage bin, and subsequent digits into the next bins in order.

Likewise, when digits ()56—NNNN are received in Reg. I on a call from TWining to SKyline 6, which are being extended over the illustrated exchange the incoming trunk (such as trunk B) marks Reg. I to skip the first storage bin. The equipment is similarly operative for other calls involving the first lost digit.

In each of the calls above described the translator equipment was necessarily used for the purpose of providing the proper routing and handling information to extend the connection to the desired destination. However, on calls to the local offices, LAfayette-2, LAfayette-3, and LAfayette-4, the translator is not required, and a number group circuit is seized for call extension purposes. with the receipt of calls directed to the local offices (LAfayette-2, etc.) the value of the second digit "2" received enables Reg. I to recognize the call as a local office call inasmuch as no other second or third digit first received in Reg. I on calls to other offices is "2." This recognition results in a special relay in Reg. I operating to place "5" in the first relay storage bin in the register. Reg. I calls in a sender after the seventh digit. The first four digits are transferred to four relay storage bins in the sender, and on the basis of these four digits the sender calls in the number group circuit associated with the called office and the required thousands group in this office.

It should be observed that in general Reg. I is arranged to recognize four local office *codes*; that these office codes may comprise one or two office names having different digital values indicated by the first two letters; and that the third digit can have any value 1–0. For example:

| | | |
|---|---|---|
| EM1<br>EM2<br>EM3<br>EM4 | AD1<br>AD2<br>EM1<br>EM2 | AD1<br>AD2<br>EM3<br>EM4 |

*Two lost digits*

In the cases in which the call arrives in Reg. I with the two lost digits, as for example on a call from SKyline to PIoneer-7 in which digits ()()7—NNNN are received over an incoming trunk, such as illustrated trunk B, the incoming trunk marks Reg. I to skip the first two digit storage bins. However the translator must be supplied with discrete digital values for the second and third digits and accordingly Reg. I must supply a digit in the second digit storage bin.

The solution of this problem lies in grouping the offices in the origin column according to dialing patterns used to reach the various destinations, so that non-conflicting digits can be supplied in the second bin of Reg. I. In this arrangement, LAfayette and TUxedo may be considered in one category by themselves and Toll by itself. The offices PIoneer to TWining then will need to be grouped further. It should be recalled that this grouping is in relation to free service extended area calls.

Referring to the LAfayette-2 column, it will be seen that on all calls, Reg. I received digits ( )22. Accordingly no grouping is indicated by this column. Similarly for LAfayette-3 and LAfayette-4 columns.

Again referring to the PIoneer-7 column it will be seen that on calls from PIoneer, SKyline, PResident, and PYramid, digits ( )( )7—NNNN are received in Reg. I or else the call is local; whereas on calls from TUrner, TUcker, TWining, TWinbrook, digits ( )47—NNNN are received in Reg. I. Accordingly, these offices may be divided further into these two categories. The remaining columns are similarly divided. It is also necessary in making the division to determine whether in any origin group the same digits are received in Reg. I to reach different destinations. If so the origin group must be divided.

Looking over the first origin group comprising PIoneer, SKyline, PResident, and PYramid, no conflict of this sort is found.

However, looking over the second origin group comprising TUrner, TUcker, TWining, and TWinbrook, it will be seen that the digits ( )( )6—NNNN are received in Reg. I to get to TUcker and also TWining. Accordingly, division of the second group must be made, placing TUrner and TUcker in one origin group and TWining and TWinbrook in another origin group.

We then have three free service Reg. I origin groups as shown in the chart:

(1) PIoneer, SKyline, PResident and PYramid.
(2) TUrner and TUcker.
(3) TWining and TWinbrook.

Different second digits are therefore assigned to different origin groups for the benefit of the translator. A wise selection will conserve on translator terminals.

Looking at the first origin group it will be seen that the first two digits are not received on calls to PIoneer-7, SKYline-5, SKyline-6, PResident-4 and PYramid-3; i.e. to offices 747, 755, 756, 774 and 793 respectively. As 5 is the most common second digit, 5 will be supplied as the second digit, as a result of which ( )57, ( )55, ( )56, ( )54, and ( )53 are assigned for use by the first origin group to reach PIoneer-7, SKyline-6, PResident-4, and PYramid-3 respectively. Looking at the second origin group it will be seen that the first two digits are not received by Reg. I on calls to TWinning-6 and TWinbrook-7; i.e. to offices 896 and 897 respectively. As 9 is the common second digit and does not conflict with the 5 already assigned in the first origin group, 9 will be assigned to the second origin group thus giving ( )96 and ( )97 for the second origin group to reach TWining-6 and TWinbrook-7 respectively.

Looking at the third origin group, it will be seen that the first two digits are not received by Reg. I on calls to TUxedo-3, TUrner-4, and TUcker-6, i.e. to offices 883, 884, and 886. As 8 is the common second digit and does not conflict with the 5 and 9 already assigned in the first and second origin groups, 8 will be assigned to the third origin group, thus giving ( )83, ( )84, and ( )86 for the third origin group to reach TUxedo-3, TUrner-4, and TUcker-6 respectively.

Obviously the second and third digit combinations are also selected so as not to conflict within a complete origin group.

It should be observed further than any second digit value from 2 to 0 can be assigned as long as no conflict of second and third digit combinations occur within an origin group or between origin groups as the translator must require discrete second and third digit combinations; and that there is no possibility of "0" conflicting with other second digits inasmuch as letters do not appear in the tenth fingerhold of a metropolitan dial.

On calls from the second origin group to office 774, the first digit is missing, and digits 74 are received as the second and third digits. On calls from the second origin group to office 897, the first two digits are missing, so that 7 is received as the third digit. If the fourth "thousand" group were present in office 897, the first two digits received would also be 74. Accordingly the 4000 group of local lines may not be assigned in TWinbrook.

A similar situation obtains on calls from origin group 3 to office 747 and 884, and accordingly the 7000 group of local calls may not be assigned in Turner.

It should also be observed, for example, that on a call from TUcker-6 to PResident-4, the first digit received is 7 (the second digit of the office code) whereas on a call from TUcker-6 to TWinbrook-7 the first digit received is also 7 (the third digit of the office code). Accordingly whenever Reg. I receives the digit 7 as the first digit over a free service trunk which delivers one or two lost digits, it directs the 7 into the calling party bin as a convenient place to store it incidentally until the next digit is received. If a 4 is received, the call is determined for the PResident-4 office as no 4000 group is equipped in TWinbrook-7 and the Reg. I transfers the 7 to the second bin and places the 4 in the third bin. If a digit other than 4 had been received however, Reg. I would transfer the 7 to the third bin and this other received digit to the fourth bin.

Summarizing, the register codes the incoming signals so that the translator may recognize the various offices as follows:

LAfayette-2 by 522 or ( )22
LAfayette-3 by 523 or ( )23
LAfayette-4 by 524 or ( )24
PIoneer-7 by 747, ( )47, or ( )57
SKyline-5 by 755 or ( )55
SKyline-6 by 756 or ( )56
PResident-4 by 774 or ( )74 or ( )54
PYramid-3 by 793 or ( )93 or ( )53
TUxedo-3 by 883 or ( )83
TUrner-4 by 884 or ( )84
TUcker-6 by 886 or ( )86
TWining-6 by 896 or ( )96
TWinbrook-7 by 897 or ( )97

*Marking signals from Reg. O to sender*

It will be recalled that the paths for connections incoming from subscribers and from incoming trunks have been traced to the registers such as Reg. I, of the illustrated tandem office. The trunks as connected to the registers signal the registers as to the class of the trunk which is connected thereto. The incoming digits were extended over the trunk to the register for storage in the register storage bins and the register analyzed the incoming digits, and, as necessary, supplied digits to the registered digit group.

If the register at this time recognizes the registered code as a local, special service call, or area code, the register does not require a translator, and conditions itself to seize the sender directly.

In the event that the register does not recognize the code, the register seizes the translator via appropriate guard circuits, and the translator upon examining the code signals the register at such time as the sender is needed.

Four special marking leads designated M1, M2, M3, and M4 extend between Reg. O and the sender, over which the following signals are sent.

*M1 lead*

From Register to Sender
—R=Coin box line is calling.
— =Measured service line is calling.
Nothing=Flat rate line is calling (regular subscriber).

From Sender to Register
Grd.=hold for relay CB (coin box).

*M2 lead*

From Register to Sender
— =call is to a local line or a special service.
Nothing=call to a trunk requiring translator services.

*M3 lead*

From Sender to Register

+=Register disconnect.

−=Proceed (signal to call in group selector).

− −=Transfer. Operates relays SDT1, SDT2, SDT3 (second application).

*M4 lead*

From Register to Sender

Grd.=Eight digit or eleventh digit is being received in register: wait. This is the called party digit P in certain terminal-per-line central offices.

*Marking signals from Reg. I, DO, MF to sender*

Four special marking leads designated M1, M2, M3 and M4 extend between registers such as Reg. I, DO, and MF and the sender over which the following signals are sent:

*M1 lead*

From Register to Sender

+R=Call is from toll (or intertoll) origin.

+=Call is from delayed ring toll origin.

−R=Call is from trunk always requiring automatic ticketing.

−=Call is from test trunk.

Nothing=Call is from free service trunk.

From Sender to Register

− =Congestion has been encountered.

−R=Line busy has been encountered.

+=Trunk to trunk call.

This requires originating trunk to replace its battery feed with a forward loop.

*M2 lead*

From Register to Sender

− =Call is to a local line or a special service.

Nothing=Call to a trunk requiring translator services.

+=Call is from a trunk requiring no local switching, which is engaged by a local manual operator position equipped with a keyset. This requires the sender to out-pulse directly without recourse to the translator.

From Sender to Register

+=Normal disconnect or second dial stop disconnect (this disconnect signal is sent if sender receives second dial stop signal after out-pulsing has commenced. A dial stop signal received by the sender before pulsing has commenced is not counted).

*M3 lead*

From Sender to Register

+=Register disconnect as a result of timeout in sender. In the process of this disconnect the trunk is conditioned to deliver a recorder signal (120 IPM) to the originating end.

− =Proceed to call in group selector.

− =Transfer leads for sender to look at bins 8 through 11 (second application).

*M4 lead*

From Register to Sender

Grd.=Eighth digit or eleventh digit is being received in register; wait. This is the called party P digit in certain terminal-per-line central offices.

*Sender*

The sender, as its name implies, transmits operating impulses to the further switching equipment to control same to establish the call to the desired line. The sender is arranged for the following types of pulsing:

Code pulsing within the crossbar equipment, dial pulsing at 10 or 20 pps., multi-frequency pulsing at 7 digits per second, code pulsing on a trunk of zero resistance loop at 10 digits per second, and code pulsing to a toll ticketing recorder at 10 digits per second. The sender is also arranged for dial outpulsing from an operator's keyset and for calls which are switched through the crossbar equipment but require no outpulsing.

At the outset it should be understood that the register will not be released until the sender has completed its functions, and as a consequence, the digital information which has been stored in the register need not be re-registered in the sender equipment. Instead this information is continuously available to the sender over 28 information leads. Registration is on a 1 or 2 out of 4 coded basis, therefore, 28 leads will accommodate seven digits. On calls requiring more than 7 digits certain leads are cleared of their initial information, and the remaining digital information is placed on these leads at the time it is required by the sender. In addition to the 28 information leads, 4 leads are provided for signals between the sender and register. Two of these leads are bi-directional as signals are first passed over them from the register to the sender, the sender in turn passes signals to the register over these same leads as it goes through its functions. The third lead is uni-directional and is used only to pass signals from the sender to the register. The fourth lead is a spare. Two remaining leads are to be accounted for i.e., sender tip and sender ring.

Signals are passed over these tip and ring leads to the sender as various switching stages are reached during the functioning of the sender. The pulsing from the sender is delivered over these same leads to the various code receivers or out on a trunk.

Upon command from the register, the sender will set itself up for local or special service calls or for direct outpulsing. If no command is received from the register the sender will call in a translator after a delay of 20 milliseconds. For example, assume the register has signalled the sender that the call is local or special service. The sender places relays on 16 leads corresponding to the first four digits. Over paths established by the storage relays pulled from these leads, the sender seizes a number group or goes to special services.

If the paths established were such that a number group was selected, the last three digits of the dialed number are fed to the number group via breaks of the number group transfer relays. The number group then pulls the number group transfer relays and returns translated hundreds, tens and units digits to the sender. Line group and party information is given to the sender via unswitched or uni-directional leads. Information concerning class or origin of call was given to the sender by the register. The sender, now having all the information required to complete a local call, passes a signal to the register which causes a group selector marker code receiver to be engaged. Upon receipt of a code start from the group selector marker, the sender delivers two digits to the group selector marker code receiver. The group selector then selects the line group level. Upon receipt of the next code start, the sender delivers the class and party digits to an STT. Upon receipt of the next code start, the sender delivers the hundreds, tens and units digits to the terminating marker code receiver. Receipt of the next back signal will initiate the release of the sender. The foregoing assumes that only one group selector stage was required to reach the line group involved.

The paths established by the storage relays may have indicated that the call's destination was a special service sender, passes a signal to the register, causing a group selector marker code receiver to be engaged. Over contact fans on the special service relays and storage relays, the sender generates the codes to be sent to the group selector marker to reach the desired special service level. These codes are sent upon receipt of a code start from the group selector marker. Receipt of a back signal initiates the release of the sender.

The sender will also condition itself for direct outpulsing from an operator's keyset on command from the register. In this case a trunk is seized immediately. The operator keys the digits on her keyset and when the start key is pressed the sender outpulses the digits at 10 pps. When the sender has pulsed all the digits, a release sequence is initiated. Note that this type of call does not require any switching through the Crossbar equipment.

If no command is received from the register, the sender will deliver a call signal to a translator after a delay of 20 milliseconds. The sender-translator guard then pulls the sender-translator link relays. The translator looks at the first 3 or 6 dialed digits as necessary. This information is passed to the translator via break contacts of the translator transfer relays. The translator then pulls the translator transfer relays and indicates to the sender (*a*) the group selector digits to be sent, (*b*) the trunk routing digits to be sent, (*c*) the number of digits of the dialed number to be deleted, (*d*) the type of pulsing to be used, (*e*) whether or not a dial stop trunk is involved, (*f*) whether the destination is toll or free service, and (*e*) whether or not a toll train is involved.

This information is stored on memory relays in the sender. The sender, now having all the information necessary to complete the call, passes a signal to the register which causes a group selector marker code receiver to be engaged. Upon receipt of a code start from the group selector marker, the sender delivers two digits to the group selector marker code receiver. The digits furnished to the sender by the translator for getting through the group selectors are the AGS, BGS and CGS digits.

If only one group selector stage is required to reach the trunk, such stage is considered to be the last group selector and the BGS and CGS digits are sent to the group selector marker code receiver. If two group selectors stages are required to reach the trunk, then a dummy digit (4) and the AGS digit are sent to the group selector marker code receiver in the first stage of switching, and BGS and CGS digits are sent to the group selector marker code receiver in the second, or last, stage of switching before reaching the trunk.

Upon completion of the switching through the group selector stages, the sender sets itself up for outpulsing of the type indicated by the translator and seizes a trunk. A dial stop type trunk is defined as one which requires a "stop" and then a "go" before pulsing can begin. The sender will seize the trunk, and start pulsing after a delay of 100 milliseconds, if the trunk is not a dial stop type trunk. If the translator has indicated that the trunk is a dial stop type trunk as defined above, then the sender must receive a "stop" and then a "go" before pulsing can begin. In this case the pulsing actually starts 100 milliseconds after receiving the proper "go." Multifrequency trunks are always dial stop type trunks; however, the KP signal is sent during the 100 millisecond timing period. With dial pulse trunks, a stop received during the inter-digital time is a legitimate dial stop. The sender will complete the interdigital time and wait for a "go." If a stop is received during the pulsing of a digit, the sender will give a CBY signal to the register and release. If a stop is received on a multi-frequency type trunk after pulsing has started, the sender will give a CBY signal to the register and release.

The sender sends the routing digits supplied by the translator. If there are no routing digits, the register advance chain is arranged to skip to the first dialed digits. The translator indicates how many of the dialed digits to delete, from 0 to 6, starting with the first dialed digit. When register advance relay 7 is reached, a "transfer digits" signal is sent to the register. If more than seven digits have been dialed the register clears certain leads and re-uses them for the additional digits. When the sender has transmitted the last of the dialed digits, a release sequence is started.

The sender is arranged for sending to a toll recording trunk. If the sender is seized by an incoming register, the register may give the sender direct toll ticketing marking. If the sender is seized by Register O, or if the incoming register does not give the sender direct toll ticketing marking, it must make its own analysis of origin and the destination to determine if a toll recording trunk is required. In either case the sender will deliver the digits "68" to the group selector marker code receiver. The group selector then selects a toll recording trunk. At this point the sender transfers the sender tip and ring to the PG pulse generator, and sets itself up for code pulsing at 10 digits per second to the toll recording trunk. Upon receipt of a code start signal from the toll recording trunk, the sender sends the party digit plus the dialed number.

It should be remembered that this is a translator type call, and the information given to the sender by the translator is stored and will be used only when outpulsing on the trunk. While the sender is sending the party digit and dialed number to the toll recording trunk, the sender is running through the register advance chain. At this time, therefore, the translator routing and delete information is made ineffective with overriding circuitry. After sending the party digit and the dialed number to the toll recording trunk, the sender sends an additional digit called the "ST" signal which is a signal to the toll recording trunk that it has received all the digits. The sender then transfers sender tip and sender ring from the PG pulse generator back to the crossbar code sender. The sender starts itself back into the crossbar code sender in order to go through remaining stages of group selectors to reach the outgoing trunk level. From this point on the sender operation is similar to that which occurs with a regular trunk call.

The sender is arranged to time out after a period of five seconds if it becomes stuck during its operation. If the sender times out, a call signal will be delivered to the call progress indicator. Grounds over various leads are fed into the call progress indicator to give a permanent record of the state of the sender when it timed out.

*Group selector routing digits from sender*

| | |
|---|---|
| 0X, 1X, 2X, 3X | Line groups. |
| 7X | Local special services. |
| 72 | "0" (call from other than coin box). |
| 60 | "110" (call from coin box) routes call through PCLR trunk. |
| 70 | "110" (call from other than coin box) routes call through CRL trunk. |
| 62 | "0" (call from coin box). |
| 67 | Coin box trunk. |
| 68 | Toll recording trunk. |
| 66 | Measured service trunk. |
| 50 | Local SPL service second. |
| 90 | Toll SPL service second. |
| 50 | Local auto intercept. |
| 90 | Toll auto intercept. |
| 51 | Local manual intercept. |
| 91 | Toll manual intercept. |
| 92 | "121" inward (toll board). |
| 93 | "131" information. |
| 94 | 10X (toll SPL service). |
| 8X | 11XX (4th digit to CGS or PTY). |
| 4X | Translator calls (which go to 2nds). |

*Response of system to various codes*

Following is a table indicating the operation of (1) the registers in recognizing or not recognizing the various codes, and their corresponding operation in calling in the translator as necessary to determine after what digit the sender should be seized; (2) the nature of certain signals transmitted from the register to the sender; (3) the operation of the senders in analyzing the digits and calling in the translator as necessary; and (4) the operation of the translators in furnishing information to the registers and senders.

| Type of call | Register | Sender |
|---|---|---|
| 0 Assistance operator | Reg. O, Reg. DO and Reg. I recognize. Do not call in translator. Call in sender via RSG and RSL after 1st digit. Digit "0" is passed into sender. | Sender receives recognition signal from register and accordingly does not call in translator. Analyzes digit "0" and routes the call through the local office to the assistance operator. Outpulsing may or may not be required. |
| 110 Toll operator<br>113 through 119 Service operators reached by subscribers. | Reg. O, Reg. DO and Reg. I when engaged by a free service trunk recognize. Do not call in translator. Call in sender via RSG and RSL after third digit. All digits are passed into sender. | Sender receives recognition signal from register comprising "local or special service" signal and accordingly does not call in translator. Analyzes the three digit code and routes the call through the local office to the appropriate toll operator or service operator. Outpulsing may or may not be required. |
| LLN—NNNN (call to local subscriber) | Reg. O, Reg. DO and Reg. I recognize first three digits. Do not call in translator. Call in sender via RSG and RSL after 7th digit. All digits are passed into sender. | Sender receives recognition signal from register comprising "local or special service" signal and accordingly does not call in translator. On the basis of the first four digits received and stored therein (LLN—N), the sender calls in an appropriate number group circuit. Last three digits extend from register through sender into selected number group circuit. Number group circuit returns MDF terminal information to sender which routes call accordingly through local office to called local subscriber. |
| LLN—NNNN (call to distant subscriber) | Reg. O, Reg. DO and Reg. I do not recognize the first three digits. Accordingly they call in a translator via RTG after the third digit. First three digits are passed into translator. Translator advises register whether to call in sender after 3rd, 4th, 5th, 6th, or 7th digit so that outpulsing can begin as soon as feasible. | Because no recognition signal is received from registor, the sender calls in a translator, passing as many digits as have been received up to a maximum of six into the translator. On the basis of the first three digits, the translator may store a primary routing digit and one to three alternate routing digits in sender. The translator also conditions the sender to delete from none to six of the digits stored in the register, beginning with the first of said digits. The sender in conjunction with the group selector routes the call over the primary route; or if this is busy, over the alternate route, if idle, to the called subscriber in the distant exchange. |
| 1YP or 112P—LLN—NNNN (call to local subscriber). | Reg. I recognizes automatic ticketing code, and accordingly directs calling party digit P into correct storage bin. 1Y or 112 is wiped out. From here on refer to LLN—NNNN (local) above. | Refer to LLN—NNNN (local) above. Additionally if call originated on a toll ticketing trunk which engaged Reg. I, toll ticketing marking is passed from the trunk to Reg. I and thence to the sender. This marking is only received by sender in the case of calls from trunks over which all calls must be automatically ticketed. Sender routes call through group selector so as to include a toll recording trunk TRT in connection. |
| 1YP or 112P—LLN—NNNN (call to distant subscriber). | Reg. O, Reg. DO and REG. I recognize automatic ticketing access code and accordingly direct calling party, digit P into correct storage bin. 1Y or 112 is wiped out. From here on refer to LLN—NNNN (distant) above. | Refer to LLN—NNNN (distant) above. Sender routes call through group selector so as to include a toll recording trunk TRT in connection. Translator indicates that destination is such that automatic ticketing is in order. Thus a call over a free service trunk will be automatically ticketed because of destination. A call over a ticketing trunk will be automatically ticketed because of origin as well as destination. |
| N[1]—LLN—NNNN (local busy verification).<br>0[1] for example.<br><br>[1] Should not conflict with the first digit of any office code used. | Trunk signals Reg. I to receive first digit as busy verification prefix N.[1] Register recognizes LLN code and consequently does not call in translator. Register calls in sender after 8th digit received. This code is not recognized except by Reg. I when engaged by incoming toll trunks having optional busy verification facilities. Reg. I extends "Test" call signal to sender. | Sender receives recognition signal from register comprising "local or special service" signal and does not call in translator. And on the basis of first four directory digits received LLN—N and stored therein, the sender calls in the appropriate number group circuit. Last three digits extend from register through sender into selected number group circuit. Number group circuit returns MDF terminal information to sender. Sender in routing call through local office to called local subscriber, gives CRB circuit the test indication (see Serial No. 522, 233) which causes the SLM to disregard any busy condition of the called line. |
| XX'X"—LNN—NNNN | Reg. O, Reg. DO and Reg. I recognize area code by second digit "0" or "1" and accordingly do not call in translator. Calls in sender after 10th digit. However in this case, register does not send recognition signal to sender. | Sender not receiving recognition signal from register passing first six digits into translator. On the basis of these six digits the translator may store a primary routing digit and one to three secondary routing digits in sender; also conditions sender to delete from none to six of the digits stored in the register, beginning with the first digit dialed. Sender routes call through group selector so as to pick up a toll ticketing recorder on calls from subscribers in systems having complete automatic line identification wherein local subscribers may not have to dial an automatic ticketing access code. |
| 1YP or 112P—XX'X"—LLN—NNNN | Reg. O, Reg. DO and Reg. I recognizes toll ticketing access code. Party digit P is stored. 1Y or 112 is wiped out. From here on refer to XX'X"—LLN—NNNN above. | See XX'X"—LLN—NNNN above. |
| 100, 101, 102, 103—Test codes | Reg. I recognizes only when handling toll traffic. Does not call in translator. Calls in sender after third digit. All digits are passed into sender. | Sender receives recognition signal from register that Code is "local or special service." Does not call in translator but analyzes the three digit code, determining that it is special service and routes the call through the local office to the particular test service, no outpulsing being required. |
| 121, 131, 141, 151 Service operators reached by operators.<br>191<br>161, 171, 181 Manual offices or toll stations | Reg. I recognizes only on toll traffic. Does not call in translator. Calls in sender after third digit. All digits are passed into sender. | Sender receives recognition signal from register that code is "local or special service". Does not call in translator but analyzes the three digit code, determining that it is special service and routes the call through the local office to the particular service operator or manual office, no outpulsing being required. |

See note at end of table.

| Type of call | Register | Sender |
|---|---|---|
| LLN (manual office) | Neither Reg. O, Reg. DO or Reg. I recognize. Accordingly, either register calls in a translator after the third digit. These three digits are passed into the translator. Translator advises register to call in sender after the third digit (i.e. Immediately as no more digits are to be expected). | Because no recognition signal is received from register, the sender calls in a translator, passing these three digits into the translator. On the basis of these digits, the translator may store a primary routing digit and one to three alternate routing digits into sender. The translator also conditions the sender to delete from none to three of the digits stored in the register, beginning with the first of said digits. The sender routes the call directly or over the primary route; or if this is busy, over the alternate route, if idle, to the called manual office, signaling an operator who answers the call, ascertains the wanted called subscriber verbally and extends the connection to the wanted subscriber. |
| 11XX | Reg. I recognizes on toll traffic only and calls in sender at end of fourth digit. | Sender receives recognition signal from register that code is "local or special service". Does not call in translator but analyzes the first four digits as calling for a TX operator and routes the call through the local office to a TX trunk. Code signaling may or may not be sent to the TX trunk to light the appropriate lamp or group of lamps. |
| LLN—NNNN—N (distant)<br>1YP—LNN—NNNN—N<br>112P—LLN—NNNN—N<br>XX'X"—LLn—NNNN—N<br>1YP—XX'X"—LLN—NNNN—N<br>112P—XX'X"—LLn—NNNN—N<br>NNN—NNN—LLN—NNNN—N | Same as corresponding codes above | Same as corresponding codes above. If the subscriber dial has delivered the first pulse of the last N digit by the time the sender has outpulsed the last digit of the 2-5 number, the sender waits for the completion of reception of the said digit at which time it will outpulse that digit and disconnect. |
| NNN—NNN—LLN—NNNN (for example). | This is a present code, the first six digits of which do not conform to the "numbering Plan Area" dialing arrangement but interim consideration is being given. This code is keypulsed from a toll operator position through the local end of an intertoll trunk into Reg. K which is a 14 digit register having its own sender. The sender proceeds to out-pulse all of these digits. The first three of which select a trunk of a trunk group to a distant toll center. The next three digits select a trunk of a trunk group from the distant toll center to the destination office. The last seven digits (i.e. 2-5 number) selects the called party through the destination office. Of course, Reg. K will be used for lesser number of digits. | |
| TTC—121 through 191 | The toll board keys these codes through the local end of an intertoll trunk into Reg. K. The associated sender outpulses these digits. The three digit terminating toll center code TTC routes the call through the distant office to a terminating toll center. The service code 121 for example routes the call to a service operator in the toll center. This code also may be received by Reg. I from a local operator trunk on a keyset basis and the "end of pulsing" signal will tell the register to engage a sender. | No recognition signal is received by the sender (as engaged by Reg. I) and accordingly the sender calls in the translator. The translator does not recognize the code and accordingly provides routing and handling information to the sender which enables the sender to extend the call to the homing office and the sender repeats the TTC-121 to this office which routes the call to the TTC center toll service operator. |
| XX'X"—TTC—121 through 191 | The toll board pulses these codes through the local end of an intertoll trunk into Reg. I. The associated sender outpulses these digits. The area code plus the TTC code received in the distant office routes the call to the determined terminating toll center in the given area. The service code 121 for example routes the call to a service operator in the determined terminating toll center. This code also may be handled by Reg. I from an operator's keyset and the "end of pulsing" signal will tell the register to engage a sender. | This code may also be handled by sender (As engaged by Reg. I) in similar fashion. |
| XX'X"—131 through 191 | The toll board pulses these codes through the local end of an intertoll trunk into Reg. K. The associated sender outpulses these digits. The area code plus the toll service code received in the distant office routes the call to a toll special service operator in the special toll center of the designated area. This code also may be handled by Reg. I from an operator's keyset and the "end of pulsing" signal will tell the register to engage sender. | No recognition signal is received by the sender (as engaged by Reg. I) and accordingly the sender calls in the translator. The translator does not recognize the code and accordingly provides routing and handling information to the sender which enables the sender to extend the call to the homing office and the sender repeats the XX'X"—131 code to this office which routes the call to a special service operator in the special toll center of the designated area. |
| XX'X"—LLN | The toll board pulses these codes through the local end of an intertoll trunk into Reg. K. The associated sender outpulses these digits. The area code XX'X" plus the manual office code LLN routes the call through the distant office to a manual office in the determined area. This code also may be received by Reg. I from an operator's keyset and the "end of pulsing" signal will tell the register to engage sender. | No recognition signal is received by the sender (as engaged by Reg. I) and accordingly the sender calls in the translator. The translator does not recognize the code and accordingly provides routing and handling information to the sender which enables the sender to extend the call to the homing office, and the sender repeats the XX'X"—LLN to this office which routes the call to the manual office in the distant area. |

NOTE.—It should be understood that Reg. MF can receive any signal that Reg. I receives but in most cases will not receive a dial assistance code "0" inasmuch as any office sending multi-frequency signals in most cases will be large enough to have a local operator. Also multi-frequency signaling is always concluded by an "ST" signal which is an end of pulsing signal, so that Reg. MF is advised when to engage a sender and does not have to engage a translator for this purpose.

*Certain automatic ticketing arrangements*

The following description is directed to a general discussion of certain additional considerations which are preferred to automatically ticketed calls, and amplifies the comments set forth in the chart above.

1. The sender is arranged to include a toll recording trunk (TRT) in every connection unless prevented.

2. On calls from local subscribers (through Reg. O or Reg. DO) or from free service trunks (through Reg. I) the destination determines whether the sender is prevented from including a toll recording trunk (TRT) in the connection.

(a) On calls to a local subscriber or a special service operator, the register (Reg. O, Reg. I, Reg. DO, Reg. MF) recognizes the local office code or special service code and passes this information into the sender, which information enables the sender to prevent the inclusion of a TRT.

(b) On calls to free service trunks, the translator gives a free service indication to the sender which enables the sender to prevent the inclusion of a TRT.

(c) On non-free service destination calls involving the translator (i.e. long distance toll calls), the translator does not give a free service indication to the sender, and accordingly the sender includes a TRT trunk in the connection.

(1) In 1YP or 112P systems, 1YP or 112P may be only partially received; the calling party digit P in such case is directed into the correct storage bin, and the ensuing digits are directed into the appropriate storage bins. However if the calling party does not dial the complete 1YP or 112P digits, the called area and/or office code arrives with a missing digit(s) and the digits stored in the storage bins may result in the register falsely recognizing a local office code or local service code; or in the translator, falsely recognizing a free service code; or in the translator, returning a non-recognition signal to the sender (calling in a TRT). A wrong local call, a local service call, or a free service call may ensue. If the sender attempts to route the call to a Bell center as a result of the translator not recognizing the code, and not operating a free service relay in the sender and calling in a TRT, the call fails when the sender looks for the calling party digit in the calling party bin. The sender dismisses connections, placing the trunk on lockout.

(2) In systems using complete automatic identification not requiring 1YP and 112P codes, the system operates without requiring the pulsing of the calling party digit first for completing connections. However on free service calls, an access code such as 1Y or 112, or a single digit access code in most instances will be used at the distant office to prevent reception of codes with missing digits, as Reg. I cannot deal with missing digits on non-free service calls.

3. On calls from tool trungs( or intertoll trunks), the trunk marks the register, which marks the sender that the call is of toll origin, and the sender prevents inclusion of a TRT trunk in the connection.

4. On calls from ticketing trunks, the ticketing trunk marks the register which in turn marks the sender that the call is of ticketing trunk origin (i.e. this is a recorder office for a non-recorder office and that every call should be ticketed regardless of destination—except calls to special service trunks). The sender is marked to include a TRT trunk regardless of destination, but not if a local special service code has been received.

(a) In 1YP and 112P systems, 1Y or 112 may be only partially received, the calling party P in such case is directed into the correct storage bin and the ensuing digits are directed into the correct storage bins. However, if the calling party does not dial the complete 1YP or 112P, the called area and/or office code arrives with missing digit(s) and the digits stored in the storage bins may result in the register falsely recognizing a local office code or special service code; or in the translator falsely recognizing a free service code; or in the translator returning a non-recognition signal to the sender. Except in the case of a special service code, with a TRT called in by trunk marking, the sender will try to send the calling party digit first to the TRT and failing to find such in the calling party bin, dismisses connections, placing the trunk on lockout.

(b) In systems using complete automatic identification not requiring 1YP and 112P codes, the system does not require pulsing of the calling party digit first to a TRT as a requisite for completing connections; however an access code, such as 1Y, 112, or a single digit access code in most instances will be used at the distant office to prevent reception of codes with missing digits, as Reg. I cannot deal with missing digits on non-free service calls.

*Call extension by register*

Following is a description of the completion of various exemplary types of call from the register to the desired destination.

*Local to local call*

On a call from a local subscriber to a local subscriber, the called number was dialed into register Reg. O which seized the sender after the seventh digit. On the basis of the first four digits stored in the sender, the sender selected the proper number group circuit whereupon the hundreds, tens, and units digits were passed into the number group which returned information to the sender as to the line group location of the called line; information as to the MDF terminal in the line group to which the called line is connected; and information as to the party code assigned to the called party.

Thereupon the sender dismisses the number group circuit, and proceeds to advance the call through the local office as follows. The sender first transmits the "proceed" signal over the M3 lead to the register. The register responsively signals the CRA circuit to give a call signal over the sleeve connections to the group selector marker stage, which in turn identifies the calling CRA and extends a connection from the register to the code receiving in one of the two group selector markers assigned to the call. The code receiver thereupon gives a start signal over tip and ring connections to the sender, and the sender responsively sends two digit information signals over tip and ring connections to the group selector code receiver, which enables the group selector marker to test for an idle CRB in the selected line group, and to close appropriate GSA and GSB crossbar switch crosspoints to route the call into the selected CRB circuit.

The code receiver in the selected CRB circuit sends a start signal over tip and ring connections to the sender, which thereupon sends two signals over tip and ring connections to the CRB circuit code receiver. The first signal advises the CRB circuit that the call is of local origin, whereby the CRB can adjust itself accordingly, and the second signal designates the required ringing code.

The CRB circuit engages a subscriber line marker, and extends the connections into the selected marker code receiver. The marker code receiver sends a start signal over tip and ring connections to the sender which sends over tip and ring connections, three digit information bearing signals to the marker indicative of MDF terminal locations.

As a result thereof the marker tests the called line for idle, busy, or lockout conditions and if the line is found idle extends a connection from the calling CRB circuit to the called line over crossbar switch, SLC, SLB and SLA crosspoints, whereupon the CRB circuit dismisses the subscriber line marker, sends a completion signal to the sender, and rings the called line. The sender sends a "register disconnect" signal to Reg. O. Reg. O signals the CRA to extend the calling tip and ring connections into the CRB, holding the CRB. Reg. O thereafter releases the SRL circuit and itself. Shortly thereafter the sender releases itself. When the called party removes his receiver, ringing is tripped and conversation can ensue.

*Coin box to local call*

On a call from a coin box to a local party the operation of the system is similar to that just described. The marker identifies the calling line as a coin box line and passes this information to Reg. O. Register O tests for the presence of a deposited coin or coins and passes this information into the sender. Accordingly, the first two digits (67) transmitted by the sender to the code receiver in the group selector marker enable the marker to close GSA and GSB crosspoints to an idle coin box trunk CBT, and the group selector marker is dismissed. The coin box trunk is capable of performing essential functions in the manner described more fully in the previously identified application having Serial Number 561,975. However, as shown herein, the coin box trunk is reached through the group selector, rather than through a CRA, and since the CBT's are in a single group an economy can be effected trafficwise. The CBT circuit sends a call signal to a group selector marker which connects its code receiver to the connection and gives a start signal back through the CBT circuit to the sender.

The sender thereupon sends two digits to the group selector marker code receiver which routes the call to an idle CRB in the selected line group. The circuit then extends from the calling coin box through SLA and SLB crossbar crosspoints, the CRA circuit, GSA and GSB crosspoints, through the CBT circuit, through other GSA and GSB crosspoints to the CRB circuit of the selected line group.

The call from here on is extended as described and the called bell is rung. However the CBT circuit included in the connection supervises collect and refund.

It is apparent, however, that if the connection does not reach a coin box trunk (CBT), Reg. O will control refund of the coin.

*Measured service call*

The establishment of this call is much the same as establishment of the coin box call just described. The marker identifies the calling line as a measured service line and passes this information to Reg. O. As a result thereof the sender initially transmits digits "66" to the group selector marker code receiver, which accordingly routes the call to a measured service trunk MST. The group selector marker is then dismissed. The MST trunk now sends a call signal for a group selector marker, which connects its code receiver to the connection and gives a start signal back through the MST circuit to the sender.

The sender thereupon sends two digits to the group selector marker code receiver which routes the call to an idle CRB in the selected line group.

The circuit then extends from the calling measured service line through SLA and SLB crosspoints, the CRA circuit, GSA and GSB crosspoints through the MST trunk, through other GSA and GSB crosspoints to the CRB circuit of the selected line group.

The call from here on is extended as described and the bell at the called station is rung.

When the called party answers, the MST trunk applies booster battery to the sleeve to actuate the service meter of the calling single party line which may be a P.B.X line.

*Local to special service or long distance operator trunk*

On a call from a local subscriber to a special service trunk, the call lands in Reg. O as previously described. The calling party receives dial tone and dials the special service code or long distance operator code. Let us assume that the calling party dials 110 to reach the long distance operator.

The digits 110 are stored in the first three storage bins of Reg. O consecutively as dialed. Reg. O recognizes the long distance toll operator code 110 which is a special code of the group 11X recognized by the register. Accordingly, Reg. O does not call in the translator but engages a sender immediately.

Digits 110 are passed into the sender and are stored in the first three storage bins in the sender. The sender also receives the "local or special service" signal from the register, and accordingly does not call in the translator but analyzes the three digit code, gives the "proceed" signal to the register which signals the CRA to extend a call signal to the group selector marker stage.

The code receiver in the assigned group selector marker gives a start signal to the sender, and the sender transmits digits "70" to the group selector marker which routes the call over GSA and GSB crosspoints to the toll operator at the manual board via Trunk F. After the sender has completed its sending to the group selector marker, a completion signal consisting of battery on the ring side of the line from the operator trunk is transmitted to the sender which in turn signals the register, causing the CRA circuit to extend tip and ring connections. Thereafter the register releases the SRL circuit and itself. Shortly thereafter the sender releases.

As soon as the operator answers, conversation can ensue. The operator of course can manually extend the connection for the subscriber over long distance connections. Other 11X calls may be similarly described.

*Local to trunk call (free service)*

In the case of a call from a local subscriber to a distant subscriber on a free service basis, register Reg. O receives the code LLN—NNNN, but does not recognize the LLN, and accordingly calls in the translator to determine whether the sender should be seized after the 3rd, 4th, 5th, 6th or 7th digits. The time of sender seizure is important in that outpulsing by the sender should begin as early as possible to conserve register time and subscriber waiting time. The translator is released and the register calls in the sender.

As the sender receives no recognition signal from the register, it calls in the translator immediately. The translator via the sender looks at the first three digits LLN in the register, and returns a primary routing digit and three alternate routing digits (if required) to the sender together with other information such as:

Digit deletion signals,
Type of outpulsing signals,
Routing information through group selector,
Free service signal,
Other information if required.

As soon as the translator transmits such information, it releases.

Thereupon the sender signals the register which signals the CRA to send a call signal to the group selector marker. The group selector marker attaches itself to the calling connection, and gives a start signal to the sender. The sender sends two digit information signals to the group selector marker code receiver enabling the group selector to test for an idle trunk in the designated trunk group, and to extend connections through GSA and GSB crossbar switch crosspoints into the selected trunk.

Thereupon the sender transmits any required routing digits to the trunk followed by any digits of the LLN—NNNN number which are not to be deleted. There may be dial stop and start signals.

After all outpulsing has been done, the sender signals the register, which signals the CRA to extend the tip and ring connections from the calling party to the trunk. The trunk provides talking battery for the calling party and holds the calling connections. The register releases itself and the TRL circuit. The sender releases. As the called party removes his receiver, conversation may ensue.

*Automatic toll ticketing call from local or trunk to trunk*

(1) Calling line is extended to Reg. O: (calling trunk B to Reg. I)

(2) Register receives 1YP or 112 P. 1Y or 112 enables register to direct digit P into proper calling party bin. Digits 1Y or 112 are wiped out.

(3) Register receives digits of called number.

In case of XX'X"—LLN—NNNN, register recognizes the area code and does not call in sender until after the 10th digit. However the register does not send recognition signal to sender.

In case of LLN—NNNN, register does not recognize first three digits. Register calls in translator which enables register to call in sender after 3rd, 4th, 5th, 6th or 7th digit. Register does not send recognition signal to sender.

(4) Sender calls in translator which returns data to sender including routing digits if necessary, deletion signals, class of service signals, etc.

On a call involving Reg. O, if a free service destination signal is received from the translator, the sender is marked to not call in a toll recording trunk TRT; but if said free service signal is not received, the sender is marked to call in a TRT trunk.

(On a call involving Reg. I the same holds but additionally if Reg. I has been marked by an incoming trunk for toll ticketing regardless of destination, Reg. I marks the sender to call in a TRT trunk.)

(5) Thereupon the sender signals the register with the "proceed" signal which signals the CRA circuit, calling a group selector marker which returns a start signal to the sender.

(6) The sender transmits the digits 68 to the group selector marker.

(7) In response thereto the group selector marker extends connections through GSA and GSB crosspoints to an idle TRT trunk which is connected directly to its associated tape punch. The group selector marker releases.

(8) The TRT circuit sends a start signal to the sender which transmits the calling party digit and the called number. Comprising P—XX'X"—LLN—NNNN. (Of course the area code may not be present.) The calling party digit is stored in the TRT and the called number including office code (and area code if present) is punched in "2 out 5" code on tape by the tape punch associated with the TRT. The sender sends an "end of pulsing" signal to the TRT circuit.

(9) As soon as the TRT circuit receives the "end" signal referred to above, it transfers its tip and ring connections from its code receiver and switches these leads metallically through. A signal consisting of ground on the sleeve conductor will be extended by the TRT circuit to the group selector marker, constituting a call signal which calls in a group selector marker (which may be the same or a different one).

(10) The group selector marker gives a start signal to the sender which thereupon sends the Band C digits to the group selector marker code receiver.

(11) In response thereto the group selector marker tests for and selects an idle trunk and closes other GSA and GSB crosspoints, extending connections through the group selector to the called trunk, whereupon the group selector marker releases.

(12) The trunk gives a start signal (over tip and ring connections) to the sender.

(13) Thereupon the sender transmits to the trunk as required: routing digits and any non-deleted parts of the called area, office, and directory number digits to route the call to the called subscriber.

(14) The sender signals the register with the "disconnect" signal that sending has been completed. The register causes the CRA circuit to extend the calling connections through the group selector crosspoints into the trunk, the connections being held by the trunk over the 5-wire, responsive to the calling party. The register and SRL circuits release, in turn releasing the sender. When the CRA extended connections to the called outgoing trunk, it signals to TRT over the C-conductor to call in the automatic line identifier ALI. The TRT as a result thereof calls in a common automatic line identifier ALI and passes the calling party digit P thereto.

When Reg. O is involved:

On the basis of the calling party digit received and the calling line identification, the ALI circuit constructs the calling directory number and passes it, including the local office code, to the tape punch associated with the TRT circuit. The ALI circuit releases and is available for other calls.

When Reg. I is involved:

The ALI circuit determines that an incoming trunk from a particular calling office is involved and causes this office code to be punched by the tape punch associated with the TRT, whereupon the ALI circuit releases. A momentary answer signal is extended from the TRT trunk over the C-lead to the incoming trunk which relays this signal over the M-lead to the distant end of the trunk which signals the line identifier at the calling office. This signal causes the line identifier to ascertain and send the calling subscriber's line number over the E-lead to the trunk at this office which relays it to the tape punch associated with the TRT circuit. Thereafter the TRT circuit causes the tape punch to punch the calling party digit on the tape. This assumes that the calling party was on a terminal per line arrangement. However, for a terminal per station arrangement, the trunk at the calling end can temporarily store the party digit (as well as transmit it over the trunk) and feed this digit to the distant automatic line identifier which can utilize it in combination with the line identification to construct the calling party directory number which is fed over the trunk to the tape punch associated with the TRT circuit. In this case the TRT circuit withholds punching of the party digit stored therein. Alternatively the distant trunk can withhold from relaying the party digit and the sender and TRT circuits can be alternatively strapped to not require reception of the party digit.

(15) When the called party answers, the outgoing trunk relays the answer signal to the TRT trunk which calls in the common calendar circuit which directs the tape punch associated with the TRT circuit to punch a day or night signal, the month, the day and the hour of the day including tenths and the first minute punch on the tape whereupon the calendar releases.

(16) The TRT circuit also engages the common clock circuit and during conversation the clock circuit delivers quarter minute pulses to the TRT circuit which counts the pulses and punches minute punches on the tape as long as conversation ensues.

(17) If the called party releases first, the outgoing trunk signals the TRT circuit which stops the minute punches.

(18) When the calling party hangs up, the trunks release, in turn releasing SLA, SLB, GSA, and GSB crossbar switches and associated equipment.

(19) It should be appreciated that the tape punch receives a "2 out of 5" code and punches the tape accordingly, once for each digit and once for each minute.

*Call from free service trunk*

A call from a free service trunk (Trunk B for example) lands in Reg. I over TRL crosspoints. In most cases the call arrives from direct control equipment with one or more missing digits. However, in situations in which the trunk works with distant register-sender type equipment, all digits may be received.

The free service trunk marks Reg. I for free service and conditions wherein a digit or digits are missing, and transmits the incoming digits to Reg. I.

On calls to a local office, Reg. I recognizes the local office code, calls in the sender after the seventh digit. The sender calls in the proper number group circuit which gives the sender the terminal location of the called party. The sender proceeds to route the call through the local office the same as for a local to local call hereinbefore described.

On calls to a free service trunk the Reg. I does not recognize the office and so calls in the translator which advises Reg. I to call in a sender after the 3rd, 4th, 5th, 6th, or 7th digit end is then released by Reg. I. The sender does not receive a "local or special service" recognition signal from Reg. I and accordingly calls in a translator which gives the sender landing and routing data and conditions the sender to not call in a TRT trunk. The sender releases the translator. The sender proceeds to route the call through the group selector and over the trunk as hereinbefore described.

On calls to long distance trunks requiring ticketing, the translator gives the sender the handling and routing data, but does not send a signal to the sender to advise it not to call in a TRT trunk. Accordingly the sender controls selection of a group selector and sends "68" to the group selector marker, which calls in a TRT trunk. The group selector marker then releases; the TRT trunk calls in a group selector marker; the sender sends the trunk B and C routing digits to the group selector marker; the group selector marker routes the call to the required trunk; the sender outpulses over the trunk if required to route the call to the desired called party. Recording of the call through the TRT circuit takes place as would be understood from what has preceded.

On calls to special service, Reg. I recognizes special service in general by the first or second digit "1" accordingly as it receives none or one lost digits; and the specific special service by the value of the third or the third and fourth digits. Calls to special service may not arrive with more than one lost digit. Reg. I reconstructs the lost digits by placing them in the proper bins, does not call in a translator but calls in a sender after the third digit, gives the sender the "local and special service" signal, and stores these digits in the sender. The sender analyzes the special service code, gives the proceed signal to the register which signals the CRA circuit which calls in a group selector marker; and sends two digits which enables the group selector marker to complete the connection to the special service trunk. When this trunk is reached, battery in the trunk on the ring conductor signals the sender which releases register, SRL, and sender.

*Automatic toll ticketing call from trunk to local*

(1) Calling Trunk B is extended over TRL crosspoints into Reg. I and marks Reg. I for automatic ticketing and information indicating whether no digits, or one, two, or three digits will be missing.

(2) Assuming that 112P—LLN—NNNN was dialed in the distant office and that the call arrives in Reg. I with one digit missing, Reg. I counting chain stores digit "1" in the second storage bin as received. Upon receipt of digit "2" Reg. I recognizes the call as requiring automatic ticketing, and operates a marking relay therein after which the second storage bin and counting chain are cleared. With the marking relay operated, the next digit, "P," received, which is the calling party digit is routed into the party bin.

(3) When the digits LLN—NNNN, which are the directory digits of the local called party are received, they are stored in bins 1–7 respectively.

(4) From the digits LLN stored in bins 1–3, Reg. I recognizes the local office, and accordingly does not call in a translator, but calls in a sender after the 7th digit; signals the sender that the call is to be automatically ticketed regardless of destination (—R on lead M1 between register and sender); signals the sender that the call is to "local or free service" (— on lead M2 between register and sender); and stores digits LLN—N in the first four storage bins in the sender.

(5) The sender determines from the digits LLN—N stored therein which number group circuit to call in and calls said number group circuit in.

(6) The number group circuit looks back through the sender into register bins 5–7 at the directory hundreds, tens and units digits of the called number, and sends such information (the five-hundred line group, designation digits, MDF termination hundreds, tens and units digits, and a party "digit") into the sender, and the sender responsively releases the number group circuit.

(7) Thereupon, the sender gives the "proceed" signal to the register (over the M3 lead). The register gives a proceed signal to the CRA circuit which extends S-wire ground to the group selector which identifies the calling CRA, and extends the tip and ring connections into the group selector marker code receiver, which returns a start signal to the sender.

(8) The sender transmits the digits 68 to the group selector marker code receiver.

(9) In response thereto the group selector marker tests for an idle TRT trunk, and extends connections through GSA and GSB crosspoints into the idle TRT trunk which is connected directly to its associated tape punch. The group selector marker releases.

(10) The TRT circuit sends a start signal to the sender which transmits the calling party digit and the called number to the tape punch associated with the TRT circuit (i.e. P—LLN—NNNN). The sender sends an "end of pulsing" signal to the TRT circuit.

(11) As soon as the TRT circuit receives the "end of pulsing" signal referred to above, it transfers its tip and ring connections from its code receiver and switches these leads metallically through. The TRT circuit extends ground to the group selector marker, constituting a call signal which identifies the calling TRT circuit and calls in a group selector marker (which may be the same or a different one).

(12) The group selector marker gives a start signal to the sender which sends the B and C digits which we shall term XX digits when applied to a call to local (for routing the call to the called five-hundred line group) to the group selector marker code receiver.

(13) In response thereto the group selector marker tests for and selects an idle CRB in the designated five hundred line group and closes other GSA and GSB crosspoints, extending connections through the group selector to the idle CRB selected, whereupon the group selector marker releases.

(14) The CRB gives a start signal (over tip and ring connections) to the sender.

(15) Thereupon the sender transmits the class and called party signals to the CRB.

(16) The CRB circuit calls in a subscribers line marker which gives a start signal back to the sender.

(17) Thereupon the sender transmits the hundreds, tens and units digits representing MDF terminal locations to the code receiver in the subscribers line marker and the marker tests the idle, busy, or lockout condition of the called line. Assuming the called line idle, the subscribers line marker extends connections from the CRB over SLC, SLB and SLA crosspoints to the called line and releases.

(18) The CRB gives the completion signal to the sender (over tip and ring connections).

(19) The sender signals the register with the "disconnect" signal that sending has been completed. The register causes the CRA circuit to extend connections through the group selector crosspoints into the CRB circuit, the call being held from the calling trunk, responsive to the calling party. The register and SRL circuits release, in turn releasing the sender.

(20) When the CRA extended connections to the called CRB, it signalled the TRT circuit over the C-conductor to call in the automatic line identifier.

(21) The ALI circuit determines that an incoming trunk from a particular calling office is involved and causes this office code to be punched by the tape punch associated with the TRT, whereupon the ALI circuit releases.

(22) A momentary answer signal is extended from the TRT trunk over the C-lead to the incoming trunk which relays this signal over the M-lead to the distant end of the trunk which signals the line identifier at the calling office. This signal causes the line identifier to ascertain and send the calling subscribers line number over the E-lead to the trunk at this office which relays it to the tape punch associated with the TRT circuit. Thereafter, the TRT circuit causes the tape punch to punch the calling party digit on the tape. It is apparent that a manual operator may perform the same functions which are accomplished by the AL1 circuit.

(23) When the called party answers, the CRB transmits the answer signal to the TRT trunk. (From here on see the section on "Automatic Toll Ticketing Call From Local or Trunk to Trunk," starting with item (15).)

*Local manual operator calls*

VIA TRUNK B

A manual operator associated with the manual board can plug into a trunk such as B, a trunk such as C, and a trunk such as D.

If she plugs into trunk B, the call is automatically routed into Reg. I and will mark Reg. I to receive coded D. C. pulses from the operator's keyset, and will also mark Reg. I for direct outpulsing.

The operator keys the called number into Reg. I, and Reg. I outpulses directly over the trunk with loop pulsing at 10 p.p.s. or 20 p.p.s. to establish the called connection to a distant subscriber or a distant operator (1X1 codes; 11XX codes; TTC codes; 6X′X″ codes).

VIA TRUNK C

If the operator plugs into Trunk C, the trunk establishes a connection directly to the trunk line, and the operator pulses directly over the trunk line with multi-frequency pulsing to establish the called connection to a distant subscriber or a distant operator.

VIA TRUNK D

If the operator plugs into Trunk D, the call is automatically routed into Reg. I, marking Reg. I to receive coded D. C. pulses from the operator's keyset. The operator accordingly keys the called number into Reg. I.

If the call is to a local subscriber line in the LAfayette-2 office, LAfayette-3 office, or LAfayette-4 office, Reg. I recognizes the local office code, calls in a sender after the seventh digit and the call is routed by the sender successively to the group selector marker, the CRB, the subscribers line marker, and the called subscriber. The first digit sent by the sender to the CRB, advises the CRB to cut through metallically and the connections are held by trunk B.

Various trunks represented by trunk D also mark the register as required for automatic ring, delayed ring, or busy override; the register marks the sender; and the sender over tip and ring advises the CRB on the first digit sent to the CRB as to the origin of the call.

If the call is via trunk D to a distant office, Reg. I does not recognize the office code and calls in the translator at the end of the third digit. If the call is to a manual office, the translator advises Reg. I to call in a sender immediately after all digits have been received. If the call is not to a manual office, the sender advises Reg. I to call in a sender after the 3rd, 4th, 5th, 6th or 7th digit received so that outpulsing can begin as soon as possible to conserve register time and subscriber waiting time. The sender calls in the translator which gives the sender the necessary handling and routing information. The sender routes the call through the group selector to an idle trunk toward the destination. In the case of a manual office, the operator is automatically signalled, no outpulsing being required. In the case of a call to an automatic office, if no routing digits are involved, the sender sends the 2–5 number (from none to six of these digits may be deleted as a result of instructions received by the sender from the translator). If routing digits are involved the sender sends a primary or one to three alternate routing digits to route the call through tandem points to the terminating office; and then sends the 2–5 number (from none to six digits of which may be deleted). Originating 1X1, 11XX, TTC, and area +TTC codes may be dialed into Reg. I and handled.

VIA TRUNK K

The operator plugs into trunk E if there are more than eleven digits in the called number (for example, if the called number including routing codes is represented by the code NNN—NNN—LNN—NNNN), and trunk E engages a Reg. K (a 14 digit register) through TRL crosspoints.

The operator accordingly keys the digits of called number into Reg. K on a D. C. coded basis and Reg. K stores them. The sender is associated with Reg. K in 1 to 1 relation and outpulses these digits on a 10 p.p.s. or 20 p.p.s. basis to route the call to the called party. There may be dial stops and starts.

*Calls from toll or intertoll trunks*

Calls from toll or intertoll trunks arrive over trunks, such as trunk B, which gains access to Reg. I over TRL crosspoints; or Trunk C which gains access to Reg. MF over TRL crosspoints and a multi-frequency receiver.

Reg. I engages a translator if the call is not recognized but it is not necessary for Reg. MF to engage a translator as an "end of signaling" signal is received which advises the Reg. MF to call in a sender, the sender called in by Reg. MF being somewhat abbreviated. For example, it receives D. C. coded pulses only from the MF Receiver and does not have to be marked and switched to accommodate both dial pulsing and D. C. coded signals.

According to destination, the sender called in by Reg. I or Reg. MF calls in the number group, or the translator, or neither.

The sender calls in a group selector and routes the call to the local called party or trunk as previously described.

Trunk B marks Reg. I as required for lost digits, delayed ring or prefix busy verification, and Reg. I marks the sender as required which advises the CRB as required.

Trunk C does not have to give special marking to Reg. MF as all trunks entering MF call for the same features. No lost digits are received in Reg. MF as all calls into Reg. MF are from or through an adjacent office which is a register sender type office.

Calls from toll or intertoll trunks may be extended to local subscribers, distant subscribers over free service trunks, to toll special service operators, to toll trunks, and to intertoll trunks, the manner of call extension over the registers having been described more fully hereinbefore.

*Test desk calls*

To make test calls to local lines, the test man at the test desk can plug into Trunk I which gains access to Reg. I over TRL crosspoints. The test trunk marks Reg. I for a test call and Reg. I marks the sender which marks the CRB over tip and ring connections. Accordingly the sender sends to the group selector marker, the CRB, and the subscribers line marker, which route the call to the called line. However, the test marking in the CRB on the first digit sent to the CRB prevents ringing and causes the CRB to disregard the busy condition of the called line if the line is busy. The test desk can make tests of the line.

Trunks A, B, C, and E have jacks on the test desk, whereby the test man can plug into these trunks outgoing, and dial pulse or multi-frequency pulse and test over these trunks. If the code 100 is pulsed, the switching equipment at the distant end routes the trunk to a 600 ohm termination for test purposes. Code 101 routes the call to the distant test desk for communication purposes. Code 102 routes the trunk to a 1000 cycle tone for test purposes. Code 103 routes the call to a supervision test circuit for test purposes.

Incoming calls over Trunks B and C may register test codes 100, 101, 102 and 103 and the sender will route the call to toll test trunk G, the last digit being repeated by the sender into the trunk which selectively routes the local 600 ohm termination, test desk, etc.

*Long distance calls which translator does not recognize*

If a long distance code such as XX'X"—LLN or just LLN is received in the translator and is not recognized, the translator returns routing and handling information to the sender, routing the call through the group selector and over an appropriate trunk such as Trunk B or Trunk C to the homing office. The sender outpulses the complete called number to enable the homing office to attend to the completion of the call. The sender however completes the call or places the calling line or trunk on lockout as the case dictates.

If the calling subscriber failed to dial the party digit P, such calls from Reg. O or Reg. DO in systems using a 1YP or 112P automatic ticketing code would be locked out when the sender tries to send the party digit and does not find it.

In systems arranged for complete automatic line and party identification, appropriate alternate strapping in the sender allows the call to progress without the party digit P in the party bin in Reg. O or DO.

Such calls cannot be completed over Reg. I from direct-control offices unless an access code is provided, as the translator recognizes no long distance toll calls minus a digit or digits. However with alternate strapping in the sender calls arriving with no lost digits from register-sender systems may be allowed to progress without the party digit.

*Automatic intercept calls*

If the sender calls in a number group circuit, and the number group circuit, in its examination for the hundreds, tens and units digits in the register, is not able to provide the necessary information back to the sender because *all jumpering* for this combination is missing in the number group for this directory number (i.e., in instances where directory number is not equipped), the sender supplies digits to the group selector marker causing the group selector to route the call to an automatic intercept recorded message unit via Intercept Trunk J, or if the sender receives an unequipped local special service code or toll special service code, the sender, recognizing the special service code but knowing that the special service code received is unequipped, supplies digits to the group selector, causing the group selector to route the call to an automatic intercept recorded message unit via Intercept Trunk J.

*Manual intercept calls*

If the sender calls in a number group circuit, and the number group circuit, looking back through the sender at the hundreds, tens and units digits in the register is not able to provide information back to the sender because *one or more but not all* jumpering for this combination is missing, (a device used for changed numbers), the sender supplies digits to the group selector marker causing the group selector to route the call to a manual intercept operator over a trunk such as Trunk F.

*System comprising a common group selector stage*

According to a novel feature of the invention, the switches in certain stages of the system are connected to effect extension of a call in what is designated as a wrap-around manner. Briefly stated (and as is first schematically shown in FIGURE 2) a common group selector consisting of a first switch GSA and a second switch GSB are connected so some calls inward to the selector are extended over GSA and GSB crosspoints to an idle circuit (a TRT circuit in the case of automatic ticketed calls), and subsequently back over the crosspoints GSA and GSB switches in the same stage of group selection to an idle trunk on the desired level. The wrap-around circuit wherein two segments of the same connection are extended over the same stage provides obvious economy in a switching installation and constitutes one of the novel features of the disclosure.

Figure 2:
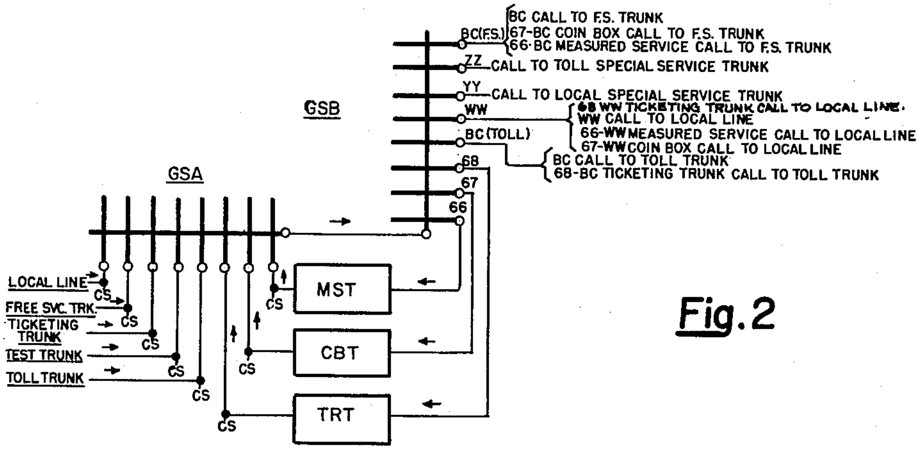

Referring to FIGURE 2, the common group selector is indicated by a first switch GSA and a second switch GSB. Actually a group selector unit comprises six GSA switches connected to eight GSB switches, to thereby provide switching from sixty inlets represented as verticals on GSA switches to four hundred outlets represented as horizontals on GSB switches, these outlets being arranged in a maximum of forty groups, i.e. "levels" of destinations each containing a plurality of inter or intra office trunks. Each group selector unit is served by two common markers. One or more of such group selector units is served by two common markers. One or more of such group selector units may constitute a common group selector stage with discrete inlets, but certain outlets in parallel.

As shown in FIGURE 2, local lines, free service trunks, ticketing trunks, test trunks, and toll trunks have access to the group selector via GSA verticals. It should be observed that local lines, free service trunks, ticketing trunks, and toll trunks also have access to group selector markers over the call signal paths labled "CS." (The term "toll" in this connection shall include both toll and intertoll.) The term "local lines" includes regular subscriber lines (i.e. flat rate lines) measured service lines, and coin box lines.

*Calls to toll special service trunks*

Calls form toll trunks to toll special service trunks, for example, "121" toll inward trunks may be traced through the GSA and GSB switches to levels out of the GSB switches indicated as ZZ, various toll special services being represented by different digital values of ZZ. The ZZ indicates that the sender routes the call to the various special service levels by transmitting variations of digits ZZ to a group selector marker, which tests the trunks on the various levels and closes appropriate GSA and GSB crosspoints to direct calls to idle trunks on the respective levels. The sender provides these digits without calling in a translator or number group circuit.

*Calls to local special service trunks*

Regular subscriber lines (i.e. flat rate lines), measured service lines, coin box lines, free service trunks and ticketing trunks gain access to local special service trunks (for example 113 information trunks) by the sender transmitting variations of digits YY to a group selector marker, whereby the group selector marker tests trunks on the desired level and closes appropriate GSA and GSB crosspoints to route the call to an idle trunk on the respective YY level. The sender provides these digits without calling in a translator or number group circuit.

*Call to local lines*

Regular subscriber lines, free service trunks, toll trunks, and local test trunks gain access to local lines as a result of a sender obtaining from a number group circuit the WW digits corresponding to the called five-hundred line group sending the respective WW digits to a group selector marker which tests the CRB's on the respective level, and closes appropriate GSA and GSB crosspoints to route the call to an idle CRB on the respective WW level.

Measured service lines are detected by the subscribers line marker in the same way that coin box lines are. The marker passes this information to Reg O which in turn passes the marking to the engaged sender. The sender calls in the number group circuit corresponding to the dialed directory number, and ascertains the terminal information of the called line including information as to the called five-hundred line group containing the called line. As a result thereof, measured service lines gain access to local lines by a sender transmitting 66 to a group selector marker, which tests the MST trunks on this level and closes appropriate GSA and GSB crosspoints to route the calling measured service lines to an idle MST trunk on this level, whereupon the group selector marker releases and the MST trunk calls in a group selector marker (which may be the same or a different one). The group selector marker gives a start signal back through the MST circuit to the sender which transmits to the group selector marker the particular values of the digits WW necessary to route the call to the required five-hundred lines group. The group selector marker tests the CRB's on the respective level, and closes appropriate GSA and GSB crosspoints to route the call to an idle CRB on the respective WW level. This procedure may be indicated by "66—WW."

Coin box lines are detected by the subscribers line marker which passes this information to Reg. O which in turn passes the marking to the engaged sender. The sender calls in the number circuit corresponding to the dialed directory number and ascertains the terminal information of the called line including information as to the called five-hundred line group containing the called line. As a result thereof, coin box lines gain access to local lines by a sender transmitting 67 to a group selector marker which tests the CBT trunks on this level, and closes appropriate GSA and GSB crosspoints to route the calling coin box line to an idle CBT trunk on this level, wherein the group selector marker releases and the CBT trunk calls in a group selector marker (which may be the same or a different one). This group selector marker gives a start signal back through the CBT circuit to the sender which transmits to the group selector marker the particular values of digits WW necessary to route the call to the required five-hundred line group. The group selector marker tests the CRB's on the respective level, and closes appropriate GSA and GSB crosspoints to route the call to an idle CRB on the respective WW level. This procedure may be indicated by "67—XX."

Ticketing trunks identify themselves to Reg. I over leads which pass through TRL crosspoints from the trunk to Reg. I which relays this information to the engaged sender. The automatic ticketing access code and called number are received over the trunk in Reg. I, the calling party digit and the called number being stored in Reg. I. The sender calls in the number group circuit corresponding to the dialed directory number received by Reg. I and ascertains the terminal information of the called line including information as to the called five-hundred line group containing the called line. As a result thereof, ticketing trunks gain access to local lines as follows.

The sender in accordance with the ticketing trunk marking received from the register transmits 68 to a group selector marker which tests the TRT trunks on this level and closes appropriate GSA and GSB crosspoints to route the calling ticketing trunk to an idle TRT trunk on this level, whereupon the group selector marker releases and the TRT trunk gives a start signal to the sender. The sender transmits the calling party digit to the TRT trunk which stores it; and the called number to the tape punch associated with the TRT circuit. Thereupon the TRT circuit calls in a group selector marker (which may be the same or a different one), and the marker gives a start signal to the sender which transmits to the group selector marker the particular values of digits WW necessary to route the call to the required five-hundred line group. The group selector marker tests the CRB's on the respective level, and closes appropriate GSA and GSB crosspoints to route the call to an idle CRB on the respective level, whereupon the group selector marker releases. Other details of this type of call have been described hereinbefore. This procedure may be indicated by "68–WW."

*Calls to free service trunks*

Regular subscriber lines and free service trunks gain access to free service trunks as a result of a sender obtaining from a translator, the B and C digits corresponding to the called trunk group, and sending the respective B and C digits to a group selector marker which tests the trunks on the respective level, and closes appropriate GSA and GSB crosspoints to route the call to an idle trunk on the respective trunk level.

Measured service lines can also gain access to free service trunks. With indication of such call, the subscribers line marker identifies the measured service lines to Reg. O which in turn identifies the line to the engaged sender; the sender obtains from a translator the Band C digits corresponding to the called trunk group, and engages a group selector marker which gives a start signal to the sender. The sender sends 66 to the group selector marker, which test the MST trunks on this level and closes appropriate GSA and GSB crosspoints extending the calling measured service line to the MST trunk whereupon the group selector marker releases; the MST trunk calls in a group selector marker which gives a start signal to the sender which sends the Band C digits to the group selector marker; the group selector marker tests the trunks on the respective BC level and closes and appropriate GSA and GSB crosspoints to extend the connection from the MST trunk to an idle trunk on this level, whereupon the group selector marker releases. This procedure may be indicated by "66—BC."

Coin box lines gain access to free service trunks in a similar manner, the sender first sending "67" to engage an idle CBT trunk and subsequently BC to extend the connection from CBT trunk to an idle trunk on the BC level. This procedure may be indicated as "67—BC."

*Calls to toll trunks*

Regular subscriber lines, measured service lines, free service trunks, and ticketing trunks gain access to toll trunks as a result of a sender obtaining from a translator the values of the Band C digits corresponding to the called trunk group, and first sending 68 to a group selector marker to extend the calling connection from a CRA circuit or trunk, as the case may be, over GSA and GSB crosspoints to an idle TRT circuit. The sender subsequently sends the B and C digits to a group selector marker to further extend the connections from the TRT circuit over other GSA and GSB crosspoints to an idle trunk on the required BC level.

On a call from regular subscriber lines, measured service lines, and free service trunks, the sender is marked for automatic toll ticketing as a result of toll destination marking from the translator. It should be observed that the marking for automatic toll ticketing in the sender takes precedence over the measured service marking in the sender on a call from a measured service line to a toll destination. On a call from a ticketing trunk, the sender is marked for automatic toll ticketing, not only as a result of toll marking from the translator, but also as a result of ticketing trunk identification passed from the trunk to the register and from thence to the sender. This procedure may be indicated as "68—BC."

Toll trunks gain access to toll trunks as a result of a sender obtaining from a translator the values of the B and C digits corresponding to the called trunk group. The translator returns toll destination marking to the sender, but the calling toll trunk marks Reg. I over TRL crosspoints as having received a call from toll origin. This marking is relayed to the sender, and nullifies the toll destination marking received from the translators as far as calling a TRT trunk is concerned. Accordingly the sender calls in a group selector, and upon receiving the start signal from this marker sends the B and C digits. As a result the group selector marker extends connections from the calling toll trunk to an idle toll trunk on the required level.

*Special situation*

Some called offices have both free service trunks and toll trunks between the switching apparatus being described and the distant office. When the sender calls in the translator relative to the received called office code, the translator returns free service marking to the sender and ABC digit code in which $B=8$. Thus on calls from local lines including regular subscriber lines, measured service lines, coin box lines, and free service trunks, the sender sends 8C for the BC digits to a group selector marker which routes the call over appropriate GSA and GSB crosspoints to an idle trunk on the free service trunk level to the required destination.

However, on calls from toll trunks, the toll marking from the trunk over TRL crosspoints to the register and thence to the sender causes the sender to alter the value of the B digit from $B=8$ to $B=5$. Thus on calls, from toll trunks, the sender sends 5C for the BC digits to a group selector marker which routes the call over appropriate GSA and GSB crosspoints to an idle trunk on the toll trunk level to the required destination.

Also, on calls from ticketing trunks, the ticketing trunk by marking transmitted from the trunk over TRL crosspoints to the register and thence to the sender, causes the sender to call in a TRT trunk and alter the value of the B digit from $B=8$ to $B=5$. Thus on calls from ticketing trunks, the sender sends 68 to a group selector marker to extend a connection from the calling ticketing over GSA and GSB crosspoints to an idle TRT trunk. Subsequently the sender transmits 5C to the group selector marker called in by the TRT trunk to extend the connection over GSA and GSB crosspoints from the TRT trunk to an idle trunk on the toll trunk level to the required destination.

This is summarized in the following chart.

that toll trunks gain access to the toll group selector via GSTA verticals. It should be observed that local lines, free service trunks, ticketing trunks, and test trunks also have access to local group selector markers over the call signal notes indicated "CS"; and that toll trunks have access to toll group selector markers over the paths indicated as "CS."

*Calls to toll special service trunks*

Calls from toll trunks to toll special service trunks (for example) to "121" toll inward trunks are extended through GSTA and GSTB crosspoints as a result of a sender calling in a toll group selector marker and sending thereto the digits zz supplied by the sender, enabling the marker to close appropriate crosspoints.

*Calls to local special service trunks*

Regular subscriber lines, measured service lines, coin box lines, free service trunks and ticketing trunks are extended through GSA and GSB crosspoints in the "wrap-around" manner as a result of a sender calling in a local group selector marker, and sending thereto the digits YY supplied by the sender, thereby enabling the marker to close the appropriate crosspoints.

*Calls to local lines*

Regular subscriber lines, free service trunks, and local test trunks are extended to local line groups through GSA and GSB crosspoints as a result of a sender ascertaining the WW digits of the called five-hundred line group from a number group circuit, calling in a local group selector and sending thereto the indicated WW digits, enabling the marker to close appropriate crosspoints.

Toll trunks are extended to local line groups through GSTA, GSTB, GSA, and GSB crosspoints (the crosspoints being in the same GSA and GSB over which the call was extended to the TRT) as a result of a sender ascertaining the WW digits of the called five-hundred line group from a number group circuit, calling in a toll group selector marker and sending thereto the WW digits which extends the calling toll trunk over GSTA and GSTB crosspoints to an idle junctor of the group labeled WW (FIGURE 3) leading to the local group selector. As a result thereof, a local group selector marker is called in over the call signal path "CS" associated with the "WW" junctor and the sender sends the same "WW" digits thereto. The local group selector marker extends the particular WW junctor over GSA and GSB crosspoints to an idle CRB in the required WW line group.

| From ↓ / To→ | ZZ (toll sp. serv.) trunk | YY[1] (local sp. serv.) trunk | WW (local lines) trunk | BC (free service) trunk | BC (toll) trunk |
|---|---|---|---|---|---|
| Reg. sub. line | | YY | WW | BC | 68—BC. |
| Meas. serv. line | | YY | 66—WW | 66—BO | 68—BC.[2] |
| Coin box line | | YY | 67—WW | 67—BO | |
| Free serv. trunk | | YY | WW | BO | 68—BO. |
| Ticketing trunk | | YY | 68—WW | | 68—BC. |
| Toll trunk | ZZ | | WW | | BC. |
| Local test trunk[3] | | | WW | | |

[1] Dial assistance only accessible to regular local subscribers.
[2] Measured service line call to toll trunks results in sender calling in a TRT trunk rather than a MST trunk.
[3] This includes test desk trunk and BU trunk.

*System comprising local and toll group selector stages*

Figure 3:
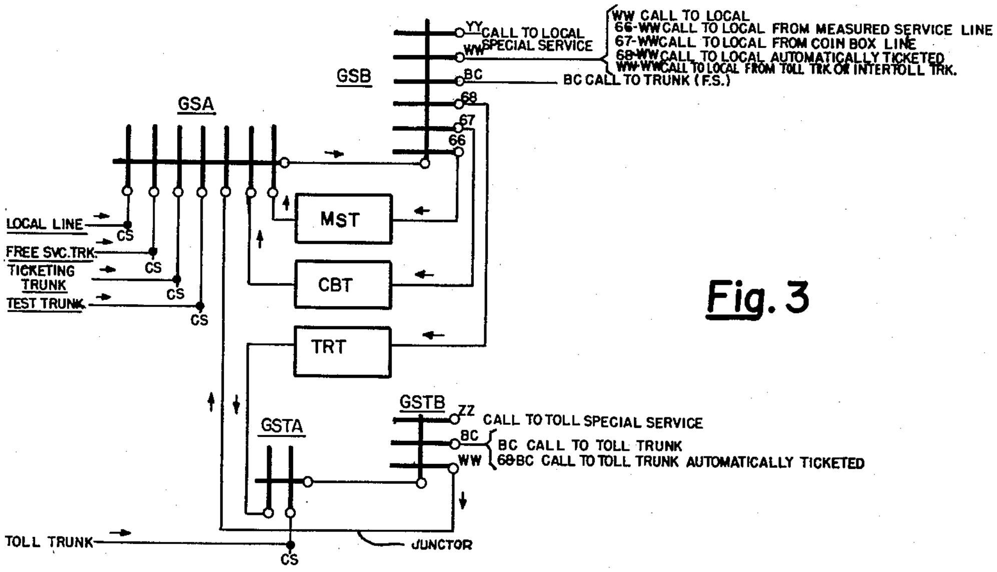

Referring now to FIGURE 3, the local group selector stage is indicated by a first switch GSA and a second switch GSB: and the toll group selector stage by a first switch FSTA and a second switch GSTB. The same general remarks apply to GSA and GSB as for FIGURE 2. Similar remarks apply to GSTA and GSTB.

At the left we find, for example, that local lines, free service trunks, ticketing trunks, and test trunks have access to the local group selector via GSA verticals; and Measure service lines are extended to local five-hundred line groups by the sender sending 66 to pick up an MST trunk through GSA and GSB crosspoints, and then WW to route the TRT trunk to an idle CRB on the required level through the crosspoints of the GSA and GSB in which the connection was established to the MST.

Coin box lines are extended to local five-hundred line groups by the sender sending 67 to pick up a CBT trunk through GSA and GSB crosspoints, and then WW to route the TRT trunk to an idle CRB on the required level through the crosspoints of the GSA and GSB which was used to select the CBT trunks.

In extending ticketing trunks to local five-hundred line groups, the sender sends 68 to the local group selector marker to extend connections from the calling ticketing trunk to an idle TRT trunk, whereupon the local group selector marker releases. The TRT trunk gives a start signal back to the sender, which sends the calling party digit to the TRT trunk for storage. The sender also sends the called number to the tape punch associated with the TRT trunk. The TRT trunk over its associated outgoing called signal lead CS calls in a toll group selector marker which returns a start signal back through the TRT trunk to the sender. The sender having consulted the appropriate number group circuit has ascertained the WW line group destination of the called line, sends these digits to the toll group selector marker which tests the group of WW junctors which extend from the toll group selector back to the inputs of the local group selector, and closes appropriate GSTA and GSTB crosspoints to extend connections from the calling TRT circuit to an idle WW junctor. Thereupon a call signal is received from the TRT circuit over GSTA and GSTB crosspoints, and the WW junctor to the local group selector which calls in a local group selector marker to give a start signal back over the WW junctor, the GSTA and GSTB crosspoints, the TRT circuit, and GSA and GSB crosspoints, the calling trunk, TRL crosspoints, and the register to the sender which sends the same WW digits to the engaged local group selector marker. The marker then tests the CRB's on the WW level, and closes appropriate GSA and GSB crosspoints to extend the WW junctor to an idle CRB circuit, and the local group selector marker releases. Further details of the call areas have been described hereinbefore and will not be repeated. This procedure may be indicated as "68—WW WW."

*Calls to free service trunks*

Regular flat rate subscriber lines and free service trunks are extended to free service trunk levels, indicated as BC levels, by the engaged sender calling in a local group selector and sending the particular value of digits (obtained by calling in a translator) thereto, whereby the group selector marker tests the trunks on the BC level and closes appropriate GSA and GSB crosspoints of the same local group selector which has been previously seized, to extend the calling connection to an idle free service trunk on this level.

Measured service lines are extended to a free service trunk by the sender sending 66 to reach an MST trunk over GSA and GSB crosspoints, and subsequently BC (obtained from the translator by the sender Z to reach a free service trunk through other crosspoints of the same GSA and GSB switches.

Coin box lines are similarly extended by the sender sending 67 to include a CBT trunk and subsequently BC to reach a free service trunk, all over the crosspoints of the same local group selector switches.

The foregoing examples are each concerned with the practice of the so-called "wrap-around" feature of the invention, whereby different sets of crosspoints of a single switch are used at different stages in a connection.

*Calls to toll trunks*

Regular subscriber lines, measured service lines, coin box lines, free service trunks, and ticketing trunks are extended to toll trunks by the sender sending 68 to extend a connection from the calling line or trunk over appropriate GSA and GSB crosspoints to an idle TRT trunk, and subsequently BC digits (as obtained by the sender from a translator) to extend connections from the engaged TRT trunk via GSTA and GSTB crosspoints to an idle trunk on the particular BC toll trunk level.

Toll trunks are extended to automatic toll trunks by the sender sending BC digits (as obtained from a translator) to extend connections from the calling toll trunk via GSTA and GSTB crosspoints to an idle trunk on the particular BC toll trunk level.

*Special case*

If a called office is reached over free service trunks and toll trunks, the free service trunks are reached through GSB outputs by the sender transmitting 8C as the BC digits to a local group selector marker. The toll trunks are reached through GSTA and GSTB crosspoints from toll origins by the sender sending 5C to the toll group selector marker. The toll trunks are reached from ticketing trunks by the sender sending 68 to the local group selector marker to reach a TRT trunk through GSA and GSB crosspoints, and subsequently 5C to the toll group selector marker to reach a toll trunk through GSTA and GSTB crosspoints.

This is summarized in the following chart.

| From ↓ \ To→ | ZZ (toll sp. serv.) trunk | YY (local sp. serv.) trunk | WW (local line) trunk | BC (free service) trunk | BC (toll trunk) |
|---|---|---|---|---|---|
| Reg. sub. line | | YY | WW | BC | 68—BC. |
| Meas. serv. line | | YY | 66—WW | 66—BC | 68—BC. |
| Coin box line | | YY | 67—WW | 67—BC | |
| Free serv. trunk | | YY | WW | BC | 68—BC. |
| Ticketing trunk | | YY | 68-WW-WW | | 68—BC. |
| Toll trunk | ZZ | | WW-WW | | BC. |
| Local test trunk | | | WW | | |

NOTE.—Access digits for terminating points reached over local and toll group selector stages (Figure 3).

*System comprising a local group selector stage, a toll group selector stage, and a combination second selector stage*

Figures 4, 5:
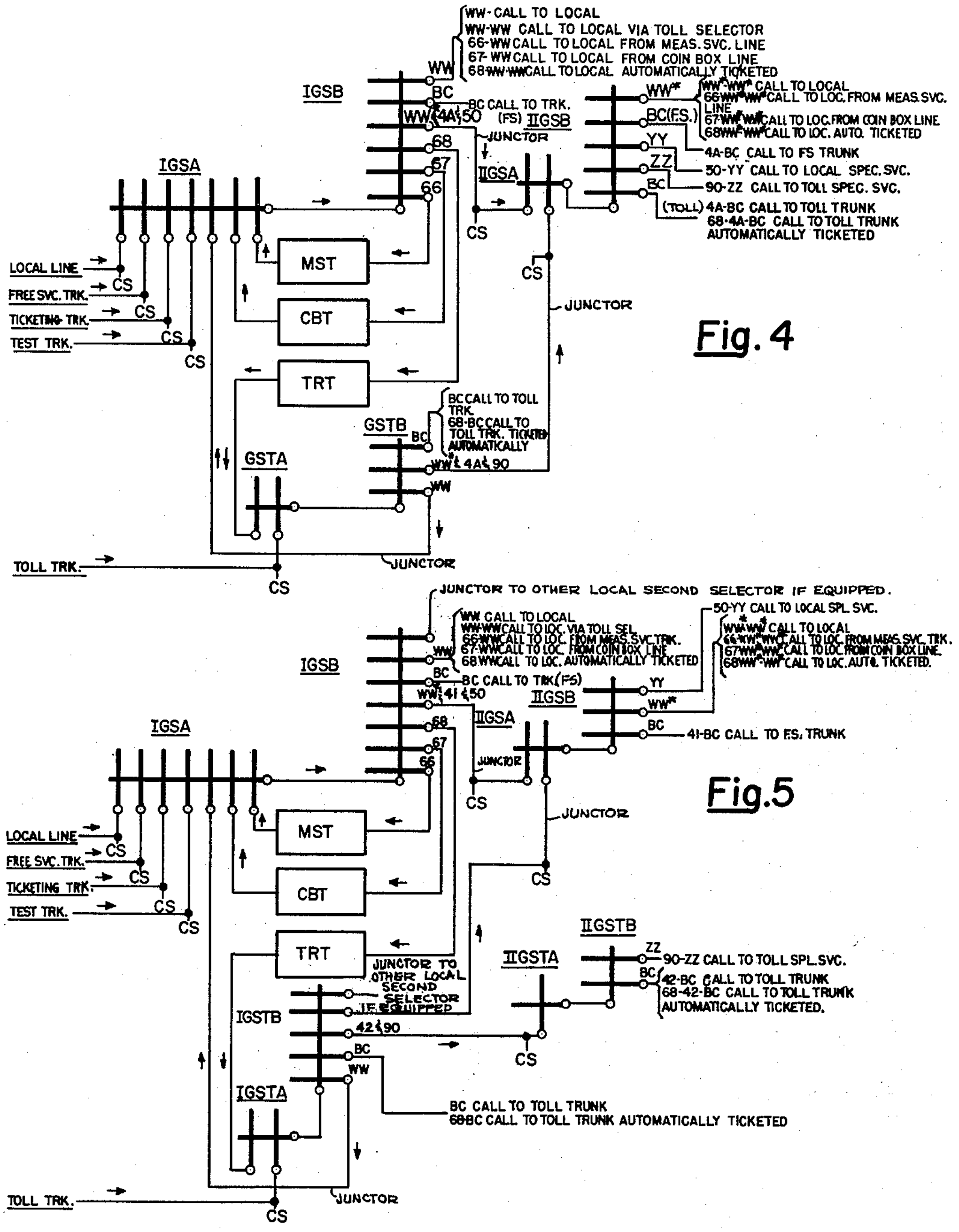
Figure 8:
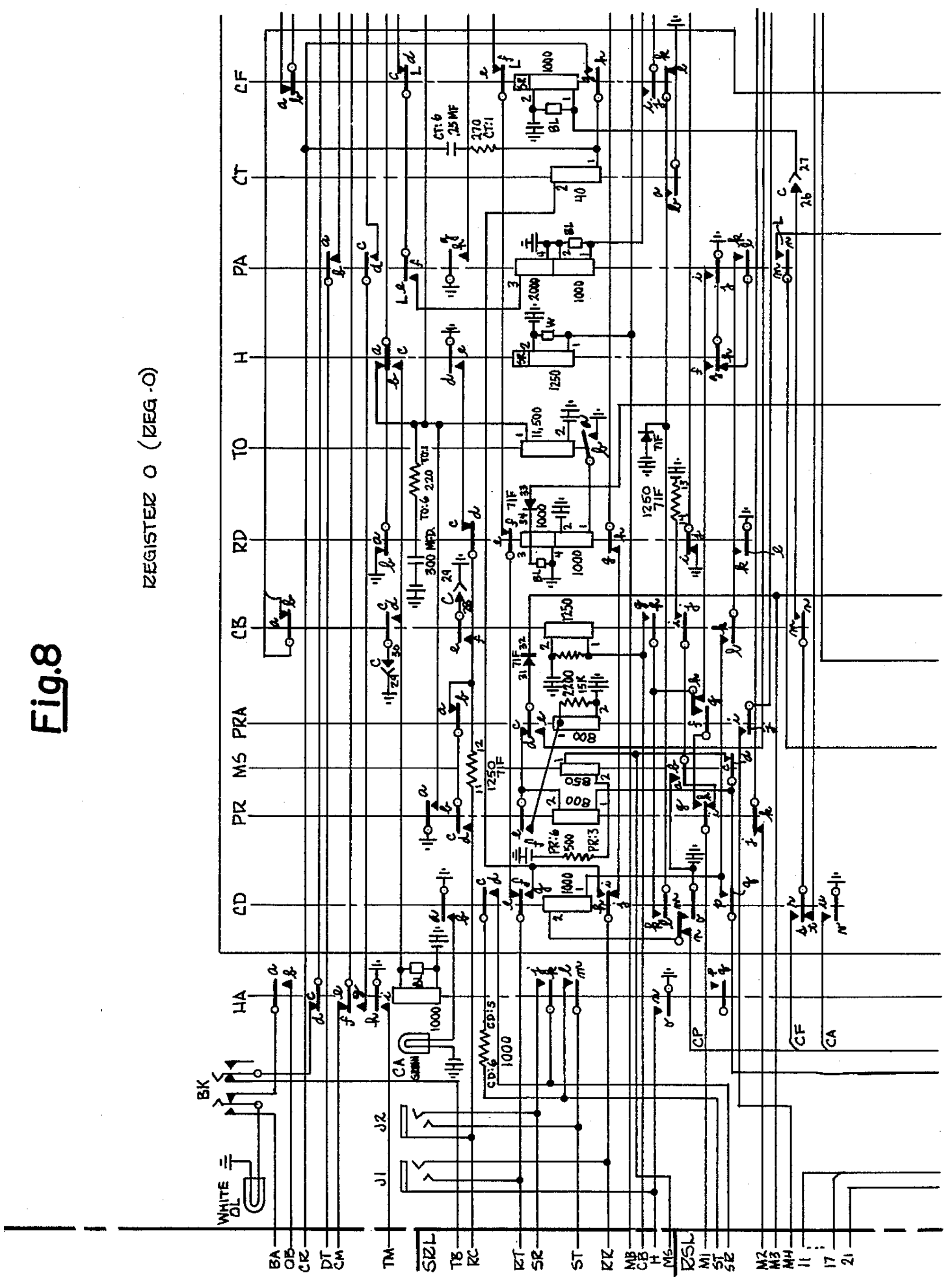

Referring to FIGURE 4, the local group selector stage is indicated by a first switch IGSA and a second switch IGSB: the toll group selector stage is indicated by a first switch GSTA and a second switch GSTB; and the combination second group selector stage is indicated by a first switch IIGSA and a second switch IIGSB. This might result from expansion of a system having local and toll group selectors.

At the left of FIGURE 4, for example, local lines, free service trunks ticketing trunks, and test trunks are shown as having IGSA verticals; and that toll trunks have access to the toll group selector via GSTA verticals.

*Calls to toll special service trunks*

Toll trunks are extended to toll special service trunks by the engaged sender transmitting digits 90 (which it supplies as a result of recognizing a toll special service reached through a second selector) to extend connections from the calling toll (which called in a toll group selector marker over the call signal path designated CS) to a junctor designated "WW* and 4A and 90" leading from the toll group selector to an input of the combination second selector stage (this junctor calling in a combination second selector over the call signal path designated CS); and subsequently transmitting particular ZZ digits (supplied by the sender upon recognition of the particular toll special service code received), to extend the connection from the junctor to a required toll special service trunk.

*Calls to local special service trunks*

Regular subscriber lines, measured service lines, coin box lines, free service trunks and ticketing trunks are extended to local special service trunks by the engaged sender transmitting digits 50 (which it supplies as a result of recognizing a local special service reached through a second selector) to extend connections from the calling line or trunk to a junctor designated "XX* and 4A and 50" leading from the local group selector to an input of the combination second selector stage, calling in a combination second selector over the path CS indicated; and subsequently transmitting particular YY digits (supplied by the sender upon recognition of the particular local special service code), received to extend the connection from the said junctor to a required toll special service trunk on the particular YY level.

*Calls to local lines reached from local group selector*

Local five-hundred line groups reached from first selector (i.e. the local group selector) have certain digital values. For example, five-hundred line groups 1–16 could be reached from the local group selector, and would be assigned certain values which are designated WW. Other five-hundred line groups reached from the combination second selector have certain other digital values. For example, five-hundred line groups 17–20 could be reached from the combination second selector, and would be assigned certain other values which we shall designate WW*.

Regular subscriber lines, free service trunks and test trunks are extended to local five-hundred line groups designated WW over IGSA and IGSB crosspoints by the sender sending digits WW.

Measured service lines are extended to these WW line groups, by a sender transmitting digits 66 to include an MST trunk over IGSA and IGSB crosspoints; and subsequently WW to extend the connection from the MST trunk in the wrap-around connection to an idle CRB in the WW line group.

Coin box lines are similarly extended by the sender transmitting 66 and subsequently WW.

Ticketing trunks are extended to WW line groups by the sender transmitting 68 to include a TRT trunk over IGSA and IGSB crosspoints; subsequently WW is transmitted to extend connections from the TRT trunk to a junctor "WW and WW*" over GSTA and GSTB crosspoints; and subsequently WW to extend connections from the junctor "WW and WW*" to a CRB over IGSA and IBSB crosspoints.

Toll trunks are extended to WW line groups by the sender transmitting WW to extend connections from the calling toll trunk to a junctor "WW and WW*" over GSTA and GSTB crosspoints; and subsequently WW to extend connections from the junctor "WW and WW*" to a CRB over IGSA and IGSB crosspoints.

*Calls to local lines reached from combination second selector*

Regular subscriber lines, free service trunks, and test trunks are extended to local line groups on outputs of the combination second selector as a result of a sender transmitting digits WW+ to route the call from the calling line or trunk through IGSA and IGSB crosspoints to a junctor designated "WW* and 4A and 50"; and subsequently sending digits WW* to route the said junctor through IGSA and IIGSB crosspoints to a CRB on the WW* level.

Toll trunks are extended to local line groups on outputs of the combination second selector as a result of a sender transmitting digits WW* to route the call from the calling trunk through GSTA and GSTB crosspoints to a junctor designated "WW* and 4A and 90"; and subsequently sending digits WW* to route the junctor through IIGSA and IIGSB crosspoints to a CRB on the WW* level.

Measured service lines are extended to WW* local line groups by a sender sending 66 to extend connections from the calling measured service line through IGSA and IGSB crosspoints to an MST trunk; subsequently sending WW* to extend connections in from the MST trunk in a wrap-around manner back through other IGSA and IGSB crosspoints to a junctor WW* and 4A and 50"; and subsequently sending WW* to extend connections from the junctor through IIGSA and IIGSB crosspoints to a CRB on the particular WW* level.

Coin box lines are extended to WW* local line groups by a sender sending 67 to extend connections from the calling coin box line through IGSA and IGSB crosspoints to a CBT trunk; subsequently sending WW* to extend connections from the CBT trunk in a wrap-around manner back through other crosspoints of the seized IGSA and IGSB switches to a junctor "WW* and 4A and 50"; and subsequently sending WW* to extend connections from such junctor through IIGSA and IIGSB crosspoints to a CRB on the particular WW* level.

Ticketing trunks are extended to WW* local line groups by a sender sending 68 to extend connections from the calling ticketing trunk through IGSA and IGSB crosspoints to a TRT trunk; subsequently sending WW* to extend connections from the TRT trunk in a wrap-around manner back through other crosspoints of the seized ones of the IGSA and IGSB switches to a junctor "WW* and 4A and 50"; and subsequently sending WW* to extend connections from this junctor through IIGSA and IIGSB crosspoints to a CRB on the particular WW* level.

*Calls to free service trunks reached from local group selector*

Regular subscriber lines and free service trunks are extended to free service trunks over IGSA and IGSB crosspoints as a result of a sender transmitting digits BC.

Measured service lines are extended to free service lines as a result of a sender transmitting 66 to extend connections over IGSA and IGSB crosspoints to an MST trunk; and subsequently BC to extend connections from the MST trunk in a "wrap-around" manner back over other crosspoints of the same IGSA and IGSB switches to a trunk on the BC level.

Coin box lines are similarly extended as a result of a sender transmitting 67 to pick up a CBT trunk and BC to reach an outgoing free service trunk.

*Calls to free service trunks reached from combination second selector*

Regular subscriber lines and free service trunks reach free service trunks off the combination second selector as a result of a sender transmitting digits 4A to route the call through IGSA and IGSB crosspoints to a junctor "WW* and 4A and 50"; and subsequently BC to reach a trunk on the particular BC level. It should be understood that when the sender called in the translator and passed the called office number received to the translator, the translator as a result of analyzing the called office number returned through routing digits, which we shall designate A, B, and C to the sender, each of which digits can have different digital values. The sender prefixes the digit 4 to the A digit for routing calls through the first group selector to a junctor. Thus, 40, 41, 42, etc., can be used to reach groups of junctors, a maximum of ten groups being possible which is far more than would ever be necessary. The BC digits route the call through the last stage of group selection. (From what has preceded it should be appreciated that if there is only one stage of group selection, it is the last stage and accordingly the BC digits are only necessary, without the 4A digits.)

Measured service lines reach free service trunks as a result of a sender transmitting 66 to pick up a MST trunk through IGSA and IGSB crosspoints; and subsequently transmitting 4A to route the call from the MST trunk in a "wrap-around" manner back through IGSA and IGSB crosspoints; to a "WW* 4A and 50" junctor and subsequently transmitting BC to route the call from the junctor to a trunk on the BC level through IIGSA and IIGSB crosspoints.

regular subscriber lines, measured service lines, and free service trunks would be routed to the called office over free service trunks, whereas ticketing trunks and toll trunks would be routed over toll trunks.

The foregoing call extensions are summarized in the following chart.

| From ↓ \ To→ | ZZ (toll sp. serv.) trk. | YY (local sp. serv.) trk. | WW (local line) on 1st local group sel. | WW* (local line) on 2nd comb. group sel. | BC (free serv. trk. on 1st local grp. sel.) | BC (free serv. trk. on comb. 2nd group sel.) | BC (toll trk. on toll group sel.) | BC (toll trk. on comb. 2nd grp. sel.) |
|---|---|---|---|---|---|---|---|---|
| Regular sub. line | | 50-YY | WW | WW*-WW* | BC | 4A-BC | 68-BC | 68-4A-BC. |
| Meas. serv. line | | 50-YY | 66-WW | 66-WW*-WW* | 66-BC | 66-4A-BC | 68-BC | 68-4A-BC. |
| Coin box line | | 50-YY | 67-WW | 67-WW*-WW* | 67-BC | 67-4A-BC | | |
| Free serv. trk. | | 50-YY | WW | WW*-WW* | BC | 4A-BC | 68-BC | 68-4A-BC. |
| Ticketing trunk | | 50-YY | 68-WW-WW | 68-WW*-WW* | | | 68-BC | 68-4A-BC. |
| Toll trunk | 90-ZZ | | WW-WW | WW*-WW* | | | BC | 4A-BC. |
| Local test trk. | | | WW | WW*-WW* | | | | |

NOTE.—Access digits for terminating points reached over local and toll group selector stages (FIGURE 4).

Coin box lines reach these trunks in a similar manner as a result of a sender transmitting 67—4A—BC.

*Calls to toll trunks reached from toll group selector*

Regular subscriber lines, measured service lines, free service trunks, and ticketing trunks are connected to toll trunks reached from the toll group selector as a result of the sender transmitting 68 to the local group selector marker to route the calling line or trunk through IGSA and IGSB crosspoints to a TRT trunk; and subsequently transmitting BC to the toll group selector marker to extend the connection from the TRT trunk through GSTA and GSTB crosspoints to a toll trunk on the particular BC level.

Toll trunks are connected to other toll trunks reached from the toll group selector as a result of a sender sending digits BC to the toll group selector marker to extend connections from the calling trunk over GSTA and GSTB crosspoints to a trunk on the particular BC level.

*Calls to toll trunks reached from the combination second selector*

Regular subscriber lines, measured service lines, free service trunks, and ticketing trunks are connected to trunks reached from the combination second selector by a sender sending 68 to a local group selector marker to route the call from the calling line or trunk to a TRT trunk over IGSA and IGSB crosspoints; subsequently sending 4A to a toll group selector marker to route the call from the TRT trunk through GSTA and GSTB crosspoints to a junctor "WW* and 4A and 90" and subsequently sending the BC digits to the combination second group selector marker to route the call from the junctor to a trunk on the particular BC level. It is noted that all signals for the extended connections occur in the next group selector marker as the call is advanced from stage to stage.

Toll trunks are connected to other toll trunks reached from the combination second group selector stage as a result of a sender transmitting 4A to extend connections from the calling toll trunk through GSTA and GSTB crosspoints to a junctor "WW* and 4A and 90"; and subsequently transmitting digits BC to route the call from the junctor through IIGSA and IIGSB crosspoints to a trunk on the particular BC level.

*Special case*

If a called office is reached over free service trunks and toll trunks, the free service trunks are reached on IGSB outputs or on IIGSB outputs a a result of the sender transmitting 8C as the BC digits to the local group selector marker or to the combination second selector marker as the case may be; whereas the toll trunks are reached on GSTB outputs or on IIGSB outputs as a result of the sender transmitting digits 5C (as the BC digits) to the toll group selector marker or to the combination group selector marker as the case may be. Thus

*System comprising first and second local group selector stages and first and second toll group selector stages*

Referring now to FIGURE 5, the first local group selector stage in indicated by a first switch IGSA and a second switch IGSB: the second local group selector stage by a first switch IIGSA and a second switch IIGSB: the first toll group selector stage by a first switch IGSTA and a second switch IGSTB: and the second toll group selector stage by a first switch IIGSTA and a second switch IIGSTB.

At the left of FIGURE 5, for example, local lines, free service trunks, ticketing trunks, and test trunks have access to the first local group selector stage via IGSA verticals; and toll trunks have access to the first toll group selector stage via IGSTA verticals.

Certain local line groups, certain free service trunk groups and certain groups of junctors between local first and second selector stages are reached from the first local group selector stage IGSA, IGSB: certain other local line groups, certain other free service trunks, and local special service trunks are reached from the second local group selector stage IIGSA, IIGSB; that certain toll trunk groups and certain groups of junctors between the first toll group selector stage to the first local group selector stage, to the second local group selector stage, and to the second toll group selector stage are reached from the first toll group selector stage IGSTA, IGSTB: and that certain other toll trunk groups and toll special service groups are reached from the second toll group selector stage IIGSTA, IIGSTB.

Referring more specifically to the junctors, it should be observed that junctors designated "WW*—4A—50" lead from the first local group selector stage IGSA, IGSB to the second local group selector stage IIGSA, IIGSB; that junctors designated WW and 4A may lead to another second local group selection stage from which other subscriber line groups WW and, if required, other free service trunk groups designated by digits A, B, and C by the translator may be reached; that junctors designated WW* lead from the first toll group selector stage IGSTA, IGSTB to the second local group selector stage; and that junctors designated 4A and 90 lead from the first toll group selector stage IGSTA, IGSTB to the second toll group selector stage IIGSTA and IIGSTB. From a given group selector stage, a maximum of ten groups of junctors corresponding to ten values of the A digit and designated 41, 42, . . . 49, and 40 may lead to other group selector stages. Each group of junctors may comprise from 10 to 40 junctors. Thus, for example, a first group of junctors designated 41 might lead from the first local group selector to the second local group selector; a second group of junctors designated 42 might lead from the first local group selector to another second local group selector; etc.

Also, a first group of junctors, designated 41, might lead from the first toll group selector stage to the second toll group selector stage. Of course, any such junctors from one group selection stage to another group selection stage are "all-purpose" junctors. Additionally, groups of junctors not associated with the "A" digit from a translator, such as junctors WW* and WW**, may lead from the first toll group selector to the second local group selector, and to another local second group selector respectively for completing calls to the associated five-hundred line groups. The further connectors of FIGURE 5 are believed to be obvious in view of the foregoing description of FIGURES 2–4.

In the special case in which a called office is reached over free service trunks and toll trunks, the free service trunks are reached over IGSB outputs or over IIGSB outputs by the sender transmitting 8C as the BC digits to the first local group selector markers or to the second local group selector marker as the case may be. The toll trunks are reached over IGSTB outputs or over IIGSTB outputs by the sender sending 5C (as the BC digits) to the first toll group selector or to the second toll group selector as the case may be. Thus regular subscriber lines, measured service lines, and free service trunks would be routed to the called office over free service trunks, whereas ticketing trunks and toll trunks would be routed thereto over toll trunks.

The nature of such connections is summarized in the following chart.

The various codes that the registers recognize are area codes, local office codes, and special service codes. The senders are required to analyze only special service codes and up to four local office codes. By the arrangement of the contact fans of the storage relays, as the result of the operation of these relays according to the received digital values, different leads are marked which indicate the specific code received.

*Certain more detailed register description*

Referring now to FIGURES 8 to 13, a marker selects a register such as Reg. O by placing ground on lead MB which operates hold relay H over an obvious circuit. Relay H operates and at its contacts H—*c* completes an operating circuit for relay HA which extends from battery through the winding of relay HA and contacts H—*c* and ON2— to ground.

When the calling line loop is switched into Reg. O over SRL crosspoints and conductors RR and RT, an operating circuit is completed to pulsing relay P; battery through the lowermost winding of relay P, contacts RD—*l*, CD—*j*, register ring lead RR, over SRL crosspoints and other equipment, over the calling line loop, back over other equipment and SRL crosspoints, register tip lead RT, contacts CD—*e*, RD—*e*, CF—*e*, through the uppermost winding of relay P to ground. Relay P oper-

| From ↓ / To→ | ZZ (toll sp. serv. trk.) | YY (local sp. serv. trk.) | WW (local line on 1st local grp. sel.) | WW* (local line on 2nd local grp. sel.) | WW** (local line on other 2nd local grp. sel.) | BC (free serv. trk. on 1st local grp. sel.) | BC (free serv. trk. on 2nd local grp. sel.) | BC (toll trk. on 1st toll grp. sel.) | BC (toll trk. on 2nd toll grp. sel.) |
|---|---|---|---|---|---|---|---|---|---|
| Regular sub. line | | 50-YY | WW | WW*-WW* | WW*-WW* | BC | 4A-BC | 68-BC | 68-4A-BC. |
| Meas. serv. line | | 50-YY | 66-WW | 66-WW*-WW* | 66-WW**-WW** | 66-BC | 66-4A-BC | 68-BC | 68-4A-BC. |
| Coin box line | | 50-YY | 67-WW | 67-WW*-WW* | 67-WW**-WW** | 67-BC | 67-4A-BC | | |
| Free service trk | | 50-YY | WW | WW*-WW* | WW**-WW** | BC | 4A-BC | 68-BC | 68-4A-BC. |
| Ticketing trunk | | 50-YY | 68-WW*-WW* | 68-WW**-WW** | | | | 68-BC | 58-4A-BC. |
| Toll trunk | 90-WW | | WW-WW | WW*-WW* | WW**-WW** | | | BC | 4A-BC. |
| Local test trunk | | | WW | WW*-WW* | WW**-WW** | | | | |

NOTE.—Access digits for terminating points reached over local and toll group selection stages (FIGURE 5).

*Code recognition by use of relays*

The foregoing description has been directed generally and specifically to the manner of operation of the equipment in extending calls to the register from incoming lines and trunks, and the manner of extending exemplary calls from the register over successive stages to the desired terminating points. The following description is concerned with the more specific operation of the register translator and sender in transmitting the signals (previously indicated herein) to the different stages to accomplish call routing in such manner.

The registers and the senders are operative to recognize the various codes by the value of the digits received from the originating station. Within the registers, the received digits are stored on relays and made continuously available to the senders. Storage of the digits is on a one or two out of four coded basis as illustrated in the following tabulation.

| Received digit value | Storage relay operated |
|---|---|
| 1 | 1 |
| 2 | 2 |
| 3 | 2 and 1 |
| 4 | 4 |
| 5 | 4 and 1 |
| 6 | 4 and 2 |
| 7 | 7 |
| 8 | 7 and 1 |
| 9 | 7 and 2 |
| 0 | 7 and 4 |

The storage relays for the first digit are designated as relays 11, 12, 14 and 17. The storage relays for the second digit are designated as relays 21, 22, 24, and 27. The storage relays for the other digits are designated in a similar manner.

ates, and at its contacts P—*e* completes a circuit for relay PA, which extends from battery over the lower winding of relay PA, contacts TR—*d*, P—*e* and RD—*j* to ground. Relay PA operates and at its contacts PA—*f* closes a holding circuit over its upper winding which extends from battery through the upper winding; contacts PA—*f*, CF—*d*, and HA—*v* to ground.

On the first release of relay P incident to receipt of the first pulse of a digit, it is effective at its contacts P—*b* to complete a circuit to off-normal relay ON1 over the circuit extending from battery through the upper winding of relay ON1, contacts P—*b* and PA—*h* to ground. Relay ON1 operates slow release relay ON2 over contacts ON1—*i* and an obvious circuit.

At the conclusion of the open period of the first pulse, relay P reoperates and at its contacts P—*c* completes the following circuit for the first counting chain relay C1: battery through the upper winding of relay C1, break contacts C2—*e*, C3—*e*, C4—*e*, C5—*e*, ON1—*f*, P—*c*, which makes before contacts P—*b* break, and contacts PA—*h* to ground. Relay P at contacts P—*b* opens the circuit of relay ON1 but relay ON1 has a circulating current path comprising its two windings in series-opposing relation, which path extends through contacts ON1—*j* to keep the relay from releasing between pulses of a digit, but to permit release thereof shortly after the conclusion of a digit.

On the release of relay P at the beginning of the open period of the next pulse, relay C2 operates in series with relay C1 over a circuit which extends from battery over the upper winding of relay C2, the lower winding of relay C1, contact C1—*h*, P—*b*, PA—*h*, to ground. The original operating circuit of relay ON1 is reclosed.

On the reoperation of relay P, relay C2 holds over the circuit from battery through the upper winding of relay C2, contacts C2—*g*, C3—*e*, C4—*e*, C5—*e*, ON1—*f*, P—*c*, PA—*h* to ground. The circuit of the upper winding of relay C1 is open at C2—*e* and the circuit for the lower winding of relay C1 is opened at P—*b*. Accordingly C1 releases.

Briefly summarized, if "0" were dialed, the operation would be as follows:

| Pulse | Break or make | P | ON1 and ON2 | Counting chain |
|---|---|---|---|---|
| 1 | Break | (P) | ON1, ON2 | |
| | Make | P | | C1 |
| 2 | Break | (P) | | C2 |
| | Make | P | | (C1) |
| 3 | Break | (P) | | C3 |
| | Make | P | | (C2) |
| 4 | Break | (P) | | C4 |
| | Make | P | | (C3) |
| 5 | Break | (P) | | C5 |
| | Make | P | | (C4) |
| 6 | Break | (P) | | C6, (C5) |
| | Make | P | | C1 |
| 7 | Break | (P) | | C2 |
| | Make | P | | (C1) |
| 8 | Break | (P) | | C3 |
| | Make | P | | (C2) |
| 9 | Break | (P) | | C4 |
| | Make | P | | (C3) |
| 10 | Break | (P) | | C5 |
| | Make | P | (ON1), (ON2) | (C4) |

At the end of the first digit, relay ON1 releases first and ON2 thereafter. With the counting chain selectively set, responsive to receipt of the first digit, and as relay ON1 releases, but before ON2 releases, ground paths are completed to selectively operate relays of the first "storage bin" comprising relays R11, R12, R14, and R17 in combination with one or two operated. For example, with counting chain relay C1 operated, relay R11 operates over the path which extends from battery through the winding of relay R11, conductor 11, cable, conductor 11, contacts RA1—*e*, LDA—*c*, conductor 1, cable (FIGURE 10, FIGURE 8), conductor 1 (FIGURE 9), contacts C1—*b*, C6—*f*, PA—*d*, HA—*g*, ON1—*a*, ON2—*e*, to ground.

Relays of "storage bin" 1 operated as a result of the various setting of the counting chain would be as follows:

| Digit value | "Storage bin" 1 operated |
|---|---|
| 1 | R11 |
| 2 | R12 |
| 3 | R11 and R12 |
| 4 | R14 |
| 5 | R11 and R14 |
| 6 | R12 and R14 |
| 7 | R17 |
| 8 | R11 and R18 |
| 9 | R12 and R17 |
| 0 | R14 and R17 |

Register advance relay RA1 is shunted until relay ON2 releases, at which time it operates in series with the predetermined "storage bin" 1 relay or relays operated. For example relay RA1 operates in series with a relay or relays of storage bin 1 over the path which extends from ground over contacts HA—*t* (FIGURE 10), LDA—*p*, PA—*m*, winding of relay RA1, conductor A1; cable (FIGURES 10, 11, 12), conductor A1, through make contacts (such as R11—1, for example) of any and all relays R11, R12, R14 and R17 which may be operated, through the winding(s) of said relay(s) to battery.

When relay ON1 releases, the holding circuit of the operated one of the counting chain relays (also relay C6 if operated) is transferred through closed contacts ON1—*e* and ON1—*f*, ON1, ON2—*g*, and PA—*h* to ground until ON2 releases. When ON2 releases, the counting chain is accordingly released.

Similarly at the end of the second digit, the value registered on the counting chain is transferred to the second digit storage bin comprising relays R21, R22, R24, and R27 and register advance relay RA2 operates. The values of each successive digit received is registered on each succeeding bin up to and including seven digits.

When register advance relay RA7 operates, it switches the storage bin pulling leads to an auxiliary register designated Reg. A which extends Reg. O to an eleven digit register plus a party bin.

For example, if an eighth digit 1 is forthcoming, relay C1 becomes operated, and the following circuit can be traced to lead R1 of Reg. A to operate relay R81 (not shown) which is in Reg. A: ground, ON2—*e*, ON1—*a*, HA—*g*, PA—*d*, C6—*b*, C1—*b*, conductor 1, cable, conductor 1, contacts LDA—*c*, RA1—*g*, RA2—*g*, RA3—*e*, RA4—*c*, RA5—*c*, RA6—*c*, RA7—*c*, conductor R1, cable, conductor R1 of Reg. A, through break contacts of relay RA8 (corresponding to RA1—*e*, not shown), cable, conductor 81, relay R81 (not shown but similar to R11) to battery. The eighth storage bin comprises relays R81, R82, R84, and R87. After this storage bin has been actuated relay RA8 operates upon the release of ON2.

If a ninth digit is forthgoming, register bin R91, R92, R94, and R97 is actuated, after which, register advance relay RA9 operates.

If a tenth digit is forthcoming, register bin R101, R102, R104, and R107 is actuated, after which register advance relay RA10 operates.

And, if an eleventh digit is forthcoming, register bin R111, R112, R114, and R117 is actuated, after which register advance relay RA11 operates.

*Digit "0" received*

With this background, it will be appreciated that if the calling subscriber dials "0" as the dial assistance code, relays R14 and R17 will become operated. Relay RSG (register sender guard) immediately operates over the circuit from battery, 300 ohms resistor, winding of relay RSG, contacts R14—*h*, R17—*h*, LDA—*p*, and HA—*t* to ground. Relay RSG closes the following circuit to the register sender guard circuit to inform the guard circuit this this particular register is calling: battery, contacts RSG—*d*, conductor CS to call in a sender immediately. Thereupon the register sender guard circuit RSG closes contacts which extend conductors M1, M2, M3, M4, ST, SR, and conductors 11 to 77 (and 81 to 117 if Reg. A is equipped) via the register sender link circuit RSL to an available sender (for example, under certain circumstances four senders may be assigned to work with twenty Reg. O's or with twenty DO's; four senders to eight Reg. I's or with eight Reg. MF's).

*Local special service code received*

If the calling subscriber had dialed a three digit code such as a local special service code (113 for information for example), relay PA3 (progress after third digit) would have been operated over the path from battery, 300 ohm resistor, winding of relay PA3, R17—*k*, R14—*k*, R12—*i*, RA—2*d*, LDA—*p*, and HA—*t*, to ground; and when register advance relay RA3 operates the following circuit is completed for relay RSG which calls in a sender: battery, 300 ohm resistor, RSG, contacts RA3—*o*, LD—*a*, PA3—*d*, PA4—*a*, PA5—*a*, PA6—*a*, PA7—*a*, PA10—*a*, LDA—*p*, and HA—*t* to ground. In other words all calls beginning with digit "1," which in Reg. I denote a special service code, will engage a sender immediately after the third digit; and the marking for this can consist of relays R12, R14, and R17 non-operated, since the operation of register advance relays RA2 and RA3 prove that a first digit was received in storage bin 1. It is therefore not necessary to carry this circuit through a make contact of relay R11.

*Area code received*

If an area code XX'X" is received in the register, the first storage bin will contain a digit other than digit "1"; and the second storage bin will contain digit "1" or "0."

Accordingly if an area code is received, relay PA10 (proceed after 10 digits relay) is operated by relay RA2 when it operates upon the release of relay ON1 after the second digit, the circuit extending over the circuit from battery, 300 ohm resistor, winding of PA10, contacts R27—*j*, R24—*j*, and R22—*j* if the second digit is "1" or over contacts R27—*l*, R24—*l* and R22—*j* if the second digit is "0"; and over one or two of the folowing make contacts R17—*m*, R14—*m*, and R12—*j*, contacts RA2—*d*, LDA—*p*, and HA—*t* to ground if the first digit is 2–9. It should be recalled that if the first digit received is "0," a sender is called in immediately as hereinbefore described over contacts R14—*h* and R17—*h*. Relay PA10 at its contacts PA10—*d* operates relay TNT over the circuit which extends from battery through the winding of relay TNT, contacts PA10—*d*, LDA—*p*, and HA—*t* to ground. Relay TNT at its contacts TNT—*p* removes direct battery potential from signaling lead M2 so that when a sender is engaged subsequently it will not find this potential on lead M2. Absence of potential on lead M2 constitutes a signal to the sender that the sender should call in a translator. (Note that if relay TNT is not operated, battery through contacts TNT—*p*, and PR—*k* obtains on lead M2 when a sender is engaged, and advises the sender that the call is a local or a special service call, and accordingly that a translator is not required.)

As the additional digits are received, they are stored in the various relay storage bins until the tenth or eleventh relay storage bin in Reg. A is actuated. After the storage of each digit, the associated register advance relay is operated up to and including RA10, whereupon ground through make contacts of this relay, lead RSG from Reg. A to Reg. O, winding of relay RSG, and 300 ohm resistor to battery operates relay RSG which places battery through its contacts RSG—*d* on the call signal lead CS to the register sender guard circuit RSG to call in an associated sender.

*Automatic toll ticketing code received*

It should be recalled that the register is designed for use with automatic toll ticketing access codes 112P and 1YP.

If 112P is received the operation of the system is as follows. The first digit "1" will be stored in storage bin 1 by the operation of relay R11 and the non-operation of relays R12, R14, and R17; the second digit "1" in storage bin 2 by the non-operation of relays R22, R24, and R27. After the third digit "2" is counted on the counting chain, and during the subsequent interval between the release of relay ON1 and relay ON2, a circuit is completed to operate relay LD (long distance) as follows: battery, winding of relay LD, conductor 1, cable, conductor 1, contacts CB—*a*, conductor 2, cable, conductor 2, contacts R11—*h*, R12—*g*, R14—*i*, R17—*i*, R22—*g*, R24—*g*, R27—*g*, C2—*m*, C6—*p*, RA3—*a*, RA2—*b*, ON2—*i*, and ON1—*g* to ground. Relay LD locks over the circuit from battery through the winding of relay LD, contacts LD—*d*, winding of relay LDA, and contacts HA—*r* to ground, operating relay LDA also.

Relay LDA transfers counting chain output leads 1, 2, 4, and 7 over break contacts of relay RAP to leads RP1, RP2, RP4, and RP7 to Reg. A in preparation of the storage of the calling party digit as subsequently received on the counting chain in the party storage bin in Reg. A. Such operation is effected in a manner similar to the digit storage in Reg. O. The operation of relay LDA releases storage bin 1 relays, storage bin 2 relays, RA1, and RA2 at LDA—*p*.

The calling party digit next received in the counting chain results in signals on one or two of the leads 1, 2, 4, 7 over make contacts of relay LDA, break contacts of relay RAP, conductors RP1—RP7 to Reg. A to thereby operate relay or relays of a four relay calling party storage bin in Reg. A. Relay RAP operates in series with the operated relay or relays of the calling party storage bin over lead PA in a manner similar to the operation of relays RA1—RA7 in Reg. O proper. When relay RAP operates, counting chain leads 1, 2, 4, 7 are transferred in preparation for the next digit received, the transfer being over make contacts of relay LDA and make contacts of relay RAP and break contacts of relays RA1 to storage bin 1 comprising relays R11, R12, R14, and R17 of Reg. O proper. The next digit received may be an area code or an office code. If it is an area code the operation is as described hereinbefore, except that the circuit is extended over make contacts of relays LDA and RAP.

If 1YP is received $Y$=2–0 but not 1) the first digit "1" will be stored in storage bin 1 by the operation of relay R11 and the non-operation of relays R12, R14, and R17; and the second digit in storage bin 2 by operation of at least one of the relays R22, R24, and R27. When ON1 releases with ON2 still up, an operating circuit is completed to relay LD which extends from ground through contacts ON1—*g*, ON2—*i*, and make contacts *i* of one or more of the relays R27, R24, and R21, and contacts R17—*i*, R14—*i*, R12—*g*, R11—*h*, conductor 2, cable, conductor 2, contacts CB—*a*, conductor 1, cable, conductor 1, winding of relay LD to battery, Relay LD locks in series with relay LDA, releasing RA1 and the first and second storage bin relays. The next digit received by the counting chain is routed to the party bin in Reg. A. Thus it is seen that Reg. O is arranged to receive either a 112P or a 1YP automatic ticketing access code.

*Local office code recognition in Reg. O*

The register is capable of recognizing four local office codes which may comprise any two office names, such as EN and LA, and any numerical digit 1 to 0.

Relay OC1 (FIGURE 11) operates for one office name, such as LA and relay OC2 for the other office name such as EN. It will be observed that battery through a 300 ohm resistor and the winding of relay OC1 can be traced to terminal 3, while battery through this same 300 ohm resistor and the winding of relay OC2 can be traced to terminal 38.

To mark LA, terminal 3 would be cross-connected to terminals 5 and 15 leading to break contacts *a* of storage bin 1, relays R11 and R14; to terminals 9 and 19 leading to make contacts *c* of storage bin 1 relays R12 and R17; to terminal 30 leading to break contacts *a* of storage bin 2 relay R22; and to terminals 24, 34, and 39 of storage bin 2 relays R21, R24, and R27. It should be noted that relay OC1 is normally operated over a circuit extending from battery through the winding of relay OC1 over break contacts of these storage bin relays, and contacts HA—*v* to ground so that if digit 5, corresponding to letter L, and digit 2, corresponding to letter A, are stored in storage bins 1 and 2 respectively, relay OC1 will be released. It should also be noted that if any other digits are stored in storage bins 1 and 2, relay OC1 will be operated over the aforesaid make contacts and contacts HA—*v* to ground.

To mark EN, terminal 38 would be cross-connected to terminals 2 and 7 which lead to break contacts *d* of storage bin 1 relays R1 and R12; to terminals 11 and 16 which lead to make contacts *f* of storage bin 1 relays R14 and R17; to terminals 27 and 32 which lead to break contacts *d* of storage bin 2 relays R22 and R24; and to terminals 21 and 36 which lead to make contacts *f* of storage bin 2 relays R21 and R27. It should be noted that relay OC2 is normally operated over a circuit extending from battery through the winding of relay OC2 through break contacts of these storage bin relays and contacts HA—*v* to ground, whereby if digit 3 corresponding to letter E, and digit 6 corresponding to letter N, are stored in storage bins 1 and 2 respectively, relay OC2 will be released. It should also be noted that if any other digits are stored in storage bins 1 and 2, relay OC2 will be operated through the aforesaid make contacts to ground through contacts HA—*v*.

Office *name* Lafayette (LA) can be associated with any digit 1 to 0 by cross-connecting one or more of terminals 11 and 12 associated with break contacts *a* and *c* of relay OC1 to counting chain terminals associated with the two lower make contacts of counting chain relays C1 to C5. Thus if it is desired to recognize the office *code* LA1, terminal 11 associated with break contacts *a* of relay OC1 should be cross-connected to counting chain terminal 1 leading to make contacts *m* of relay C1. If it is desired to recognize LA2, terminal 12 associated with break contacts *c* of relay OC1 should be cross-connected to counting chain terminal 2 leading to make contacts *m* of relay C2.

Office *name* Enterprise (EN) can be associated with any digit 1 to 0 by cross-connecting one or more of terminals 14 and 15 associated with break contacts *a* and *c* of relay OC2 to counting chain terminals associated with the two lower make contacts of counting chain relays C1—C5. Thus if it is desired to recognize office *code* EN1, terminal 14 associated with break contacts *a* of relay OC2 should be cross-connected to counting chain terminal 1 leading to make contacts *m* of relay C1. If it is desired to recognize EN0, terminal 15 associated with break contacts *c* of relay OC2 should be cross-connected to counting chain terminal 10 associated with make contacts *k* of relay C5.

Assuming, for exemplary purposes, that the office code LA1 is so arranged for, and is received in the register. When relay ON1 releases with relay ON2 still up after receipt of the third digit, a circuit is completed to operate relay PA7 ("proceed after seven digits" relay) as follows: battery, 300 ohm resistor, winding of relay PA7, conductor PA7, cable, break contacts *a* of relay OC1, terminal 11, cross connect to terminal 1 of the counting chain, contacts C1—*m*, C6—*p*, RA3—*a*, RA2—*b*, ON2—*i*, and ON1—*g* to ground.

Accordingly when register advance relay RA7 subsequently operates after the seventh digit, the following circuit is completed to operate relay RSG: battery, 300 ohm resistor, winding of relay RSG, contacts RA—*m*, PA7—*d*, PA10—*a*, LDA—*p* or RAP—*m*, HA—*t* to ground. (It should be observed that on an automatically ticketed call, any circuit which would otherwise be traced through contacts LDA—*p* will, after RAP is operated, be traced through RAP—*m*.) Relay RSG calls in a sender. It might be mentioned at this time that if the break of the first pulse of an extra digit, such as the last digit in code LLN—NNNN—N or XX'X"—LLN—NNNN—N is received in the register after the sender has been engaged, ground through contacts ON2—*j*, PRA—*i* on lead M4 to the sender marks the sender to wait a given period of time for this last digit before beginning to send, relay PRA having been operated by relay PR which has been operated by the sender to cause the register to signal the CRA circuit to call in a group selector marker. Relay PR operates as the result of the battery signal transmitted over lead M3 from the sender, through the rectifier, over contacts PRA—*c*, the winding of relay PR, and contacts HA—*v* to ground, and locks over contacts PR—*b* in series with relay PRA to battery when the sender subsequently removes the battery signal.

If it is desired to recognize LA1, LA2, LA3, and LA4, terminal 38 associated with relay OC2 would be connected to the same terminals as is terminal 3 of OC1, instead of as hereinbefore described. Accordingly both relays OC1 and OC2 would operate as a result of digits LA being received. However, in this case, terminals 14 and 15 associated with relay OC2 would be cross-connected with counting chain terminals 3 and 4 respectively which are associated with counting chain relays C3 and C4.

In cases wherein the local office code is recognized, relay TNT is not operated, and maintains battery through contacts TNT—*p* and PR—*k* on lead M2 to give the "local or special service" signal to the sender when engaged, thus informing the sender that it should not call in a translator.

*Non-recognition of office code*

If an office code is received, but does not result in relay PA7 operating (i.e. the office code is not recognized by the register), relay RTG (FIGURE 12) is operated through contacts of register advance relay RA3 after the third digit over the circuit from battery, 300 ohm resistor, winding of relay RTG, contacts RA3—*q*, contacts *a* of relays PA3, PA4, PA5, PA6, PA7, and PA10 in series, contacts LDA—*p*, or RAP—*m*, and HA—*t* to ground. Relay RTG at its contacts RTG—*d* connects battery to the call signal lead CS to signal the register translator guard circuit RTG to call in one of two translators TNS1 or TNS2 via the translator guard circuit TNG (see also FIGURES 20 and 35–38). Assume that translator TNS1 is engaged, the translator guard circuit TNG and the register translator guard circuit RTG extend the battery connected to contacts RTG—*d* and lead CS (see dotted line) over conductor TC1, thence into a cable, then out of the cable over conductor TC1, and the winding of relay TNS1 to ground, operating this relay.

It should be appreciated that generally every ten Reg. O's have an associated RTG circuit; every four senders have an associated STG circuit; that a combination totaling twelve of RTG's and STG's can work into a TNG which is common to two translators. Thus when a translator marking relay (such as relay TNS1, FIGURE 11) in a Reg. O operates, it is the only such relay of all the registers and senders associated with the given translator.

Figure 11:
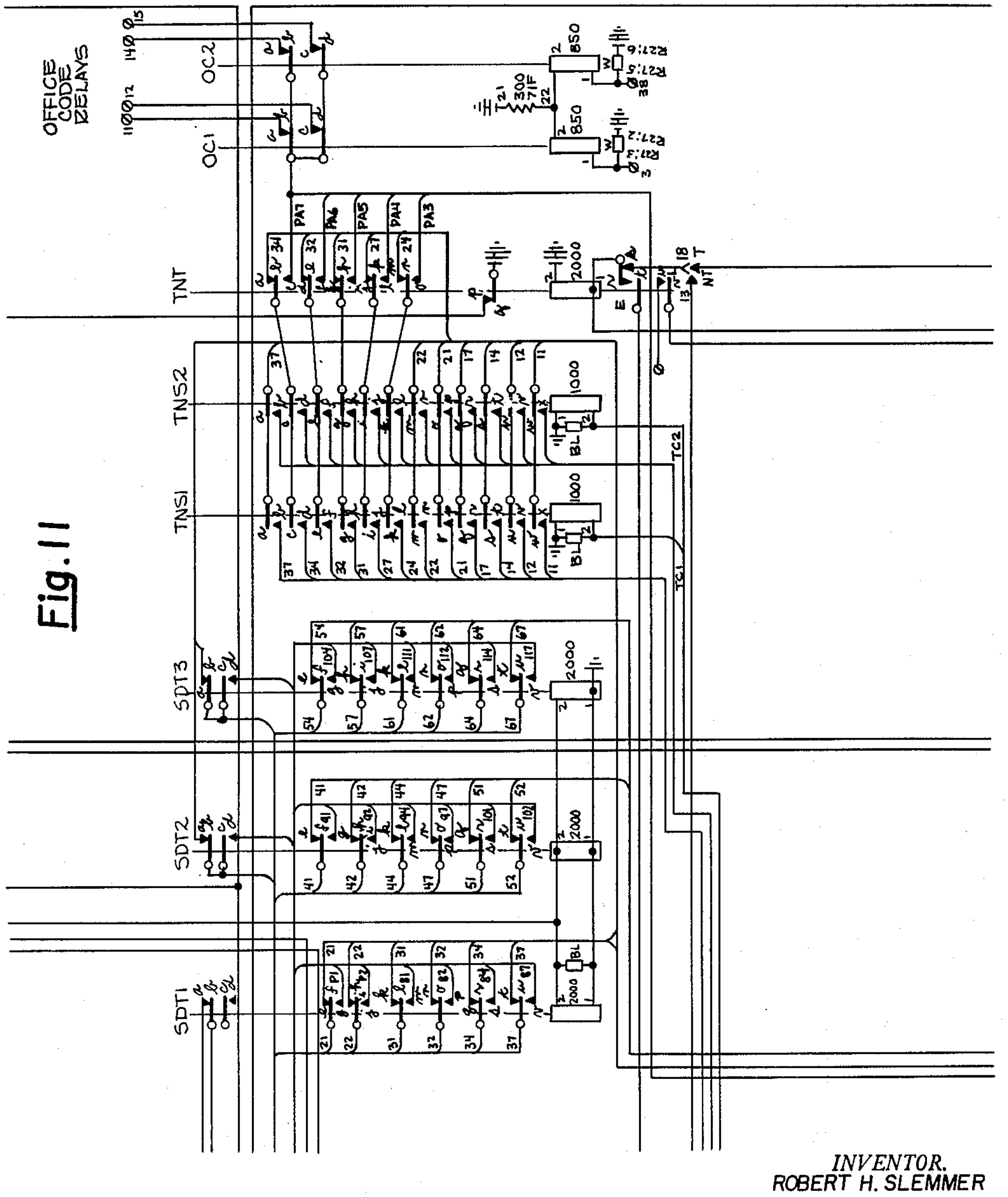
Figure 12:
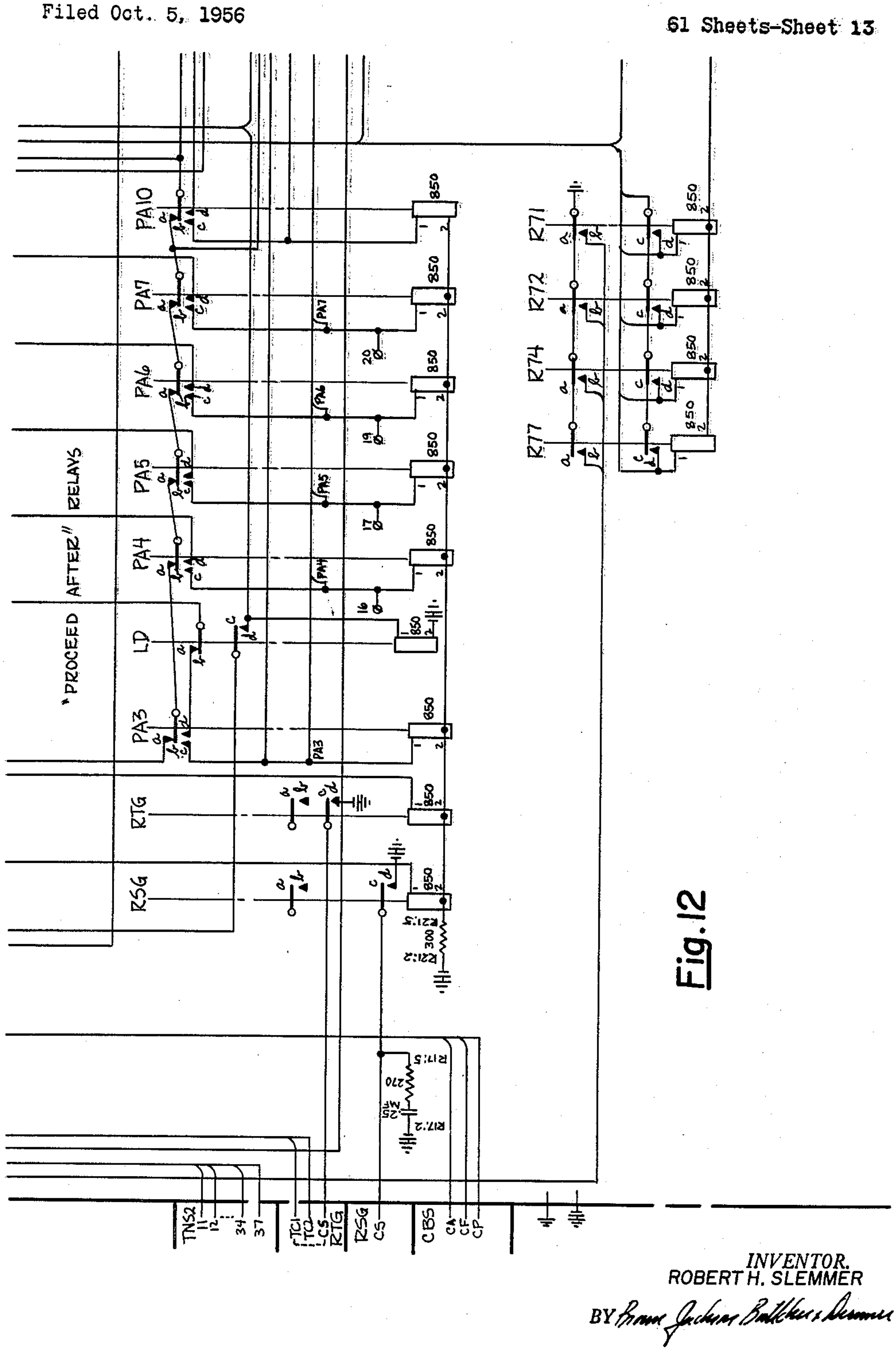
Figure 13:
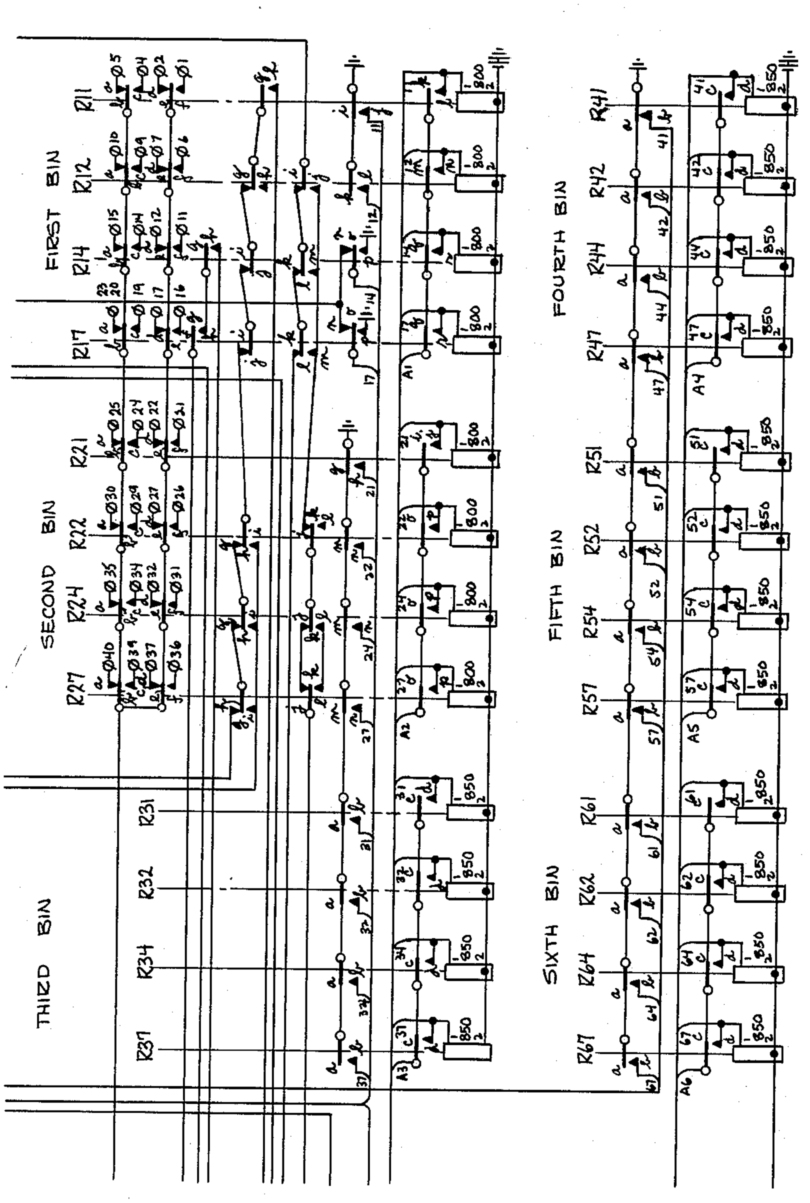
Figure 45:
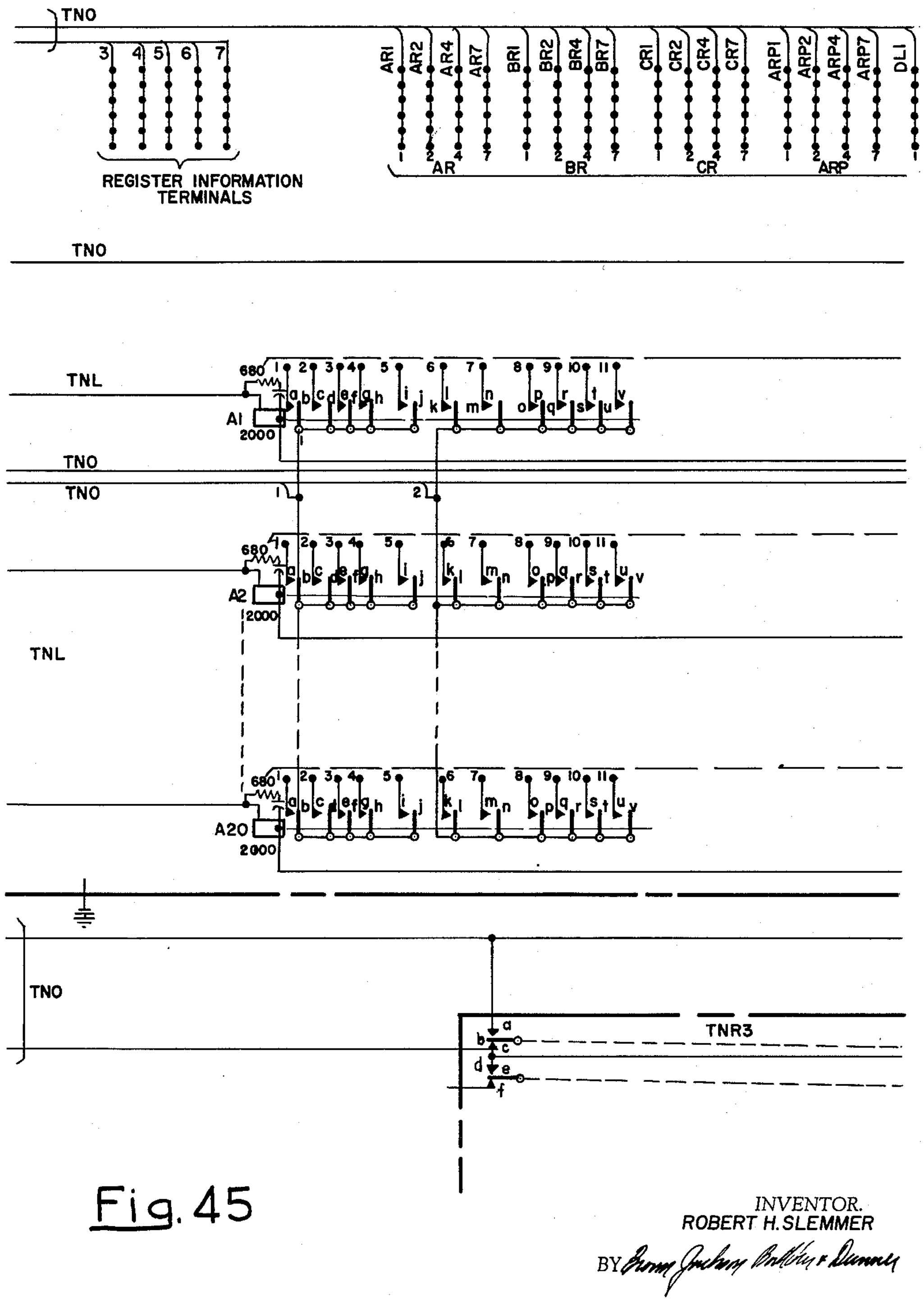
Figure 46:
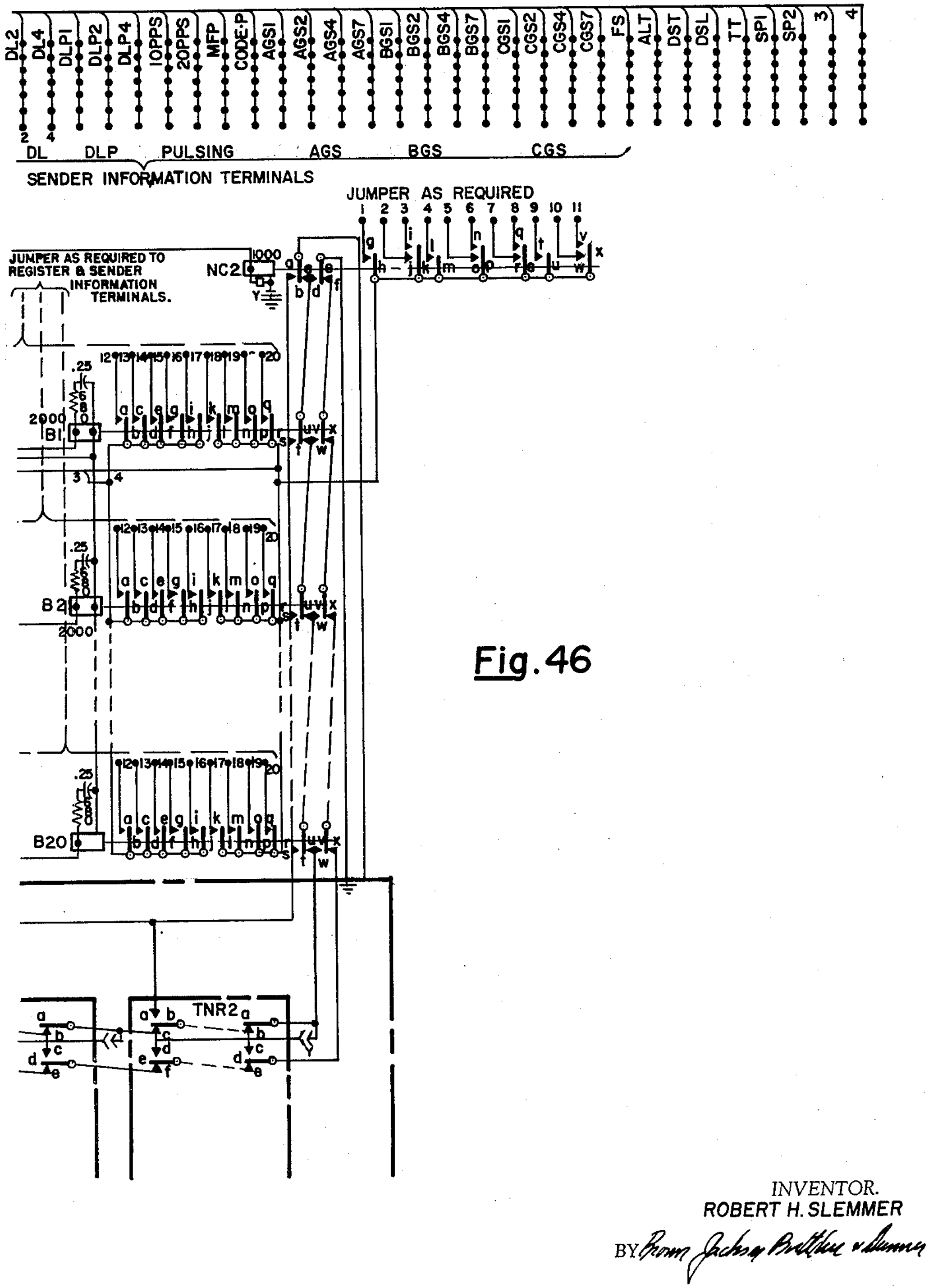

When relay TNS1 operates, conductors 11–37 (which are connected to battery over the windings of storage relays in the translator which correspond to the register storage relays R11 etc.) are extended to output contacts of storage relays R11 to R37 (leads 24, 27, 31, 32, and 34 via break contacts of relay TNT, FIGURE 11), and specifically to ground over contacts R11—*j*, R12—*l*, R14—*p*, R17—*p*, R21—*h*, R22—*n*, R24—*n*, R27—*n*, R31—*b*, R32—*b*, R34—*b*, and R37—*b* respectively, according as the associated relay is operated. Accordingly the storage relays in the translator corresponding to storage relays R11 to R37 in the register are operated in the same pattern as the relays in the sender, and locked. After storage has taken place in the translator, transfer relays in the translator operate which switch leads 24, 27, 31, 32, and 34 to a cross-connect panel in the translator at which point, as a result of translation of the received three digit office code, the translator route relays (see FIGURES 45–46) connect ground to one of these leads.

Also these transfer relays in the translator operate to transfer conductors 14 and 17 to ground, thus operating relay TNT (FIGURE 11) over a circuit which extends from battery through the winding of relay TNT, break contacts of relays R14 and R17 (which are never *both* operated on a translator type call inasmuch as first digit "0" is a special service code), cable, conductors 14 and 17, make contacts *t* and *r* of relay TNS1, conductors 14 and 17, cable to translator TNS1, and conductors 14 and 17 and contacts therein to ground.

Relay TNT operates, and locks over the circuit from battery through the winding of relay TNT, contacts *r—t* of relay TNT which close before contacts *r—s* open and contacts HA—*t* to ground. Relay TNT at its make contacts *o, l, i, f,* and *c,* transfers conductors 24, 27, 31, 32, and 34 from the translator to conductors PA3, PA4, PA5, PA6, and PA7 respectively, which extend through a cable, and emerge through the coils of relays PA3, PA4, PA5, PA6, and PA7 respectively through a 300 ohm resistor to battery, whereby the ground placed on one of these leads by the translator as just explained operates one of these relays.

If relay PA3 is operated, the call is destined for a manual office without call panel indicator. Since such call does not require outpulsing, relay RSG is operated immediately over the path from battery, 300 ohm resistor, winding of relay RSG, contacts RA3—*o,* break contacts LD—*a,* make contacts PA3—*d,* and break contacts *a* of relays PA4 to PA10 in series, contacts LDA—*o* or RAP—*m,* and through contacts HA—*t* to ground. A sender is thus seized immediately for calls of this class.

If one of the relays PA4 to PA7 is operated the call is for a destination requiring out-pulsing, and the cross-connect is so arranged in the translator so as to operate the relay PA4 to PA7 which will result in the engagement of a sender. In this manner sending begins as soon as possible, even while the register is receiving and register holding time and subscriber waiting time after dialing has been completed is substantially minimized. In other words, sending can begin before all digits are received but should not begin so early that the sender will have to wait for receipt of the digits.

*Recognition in Reg. I*

Hereat is set forth a description of the operation of Register I in recognizing codes.

Figure 14:
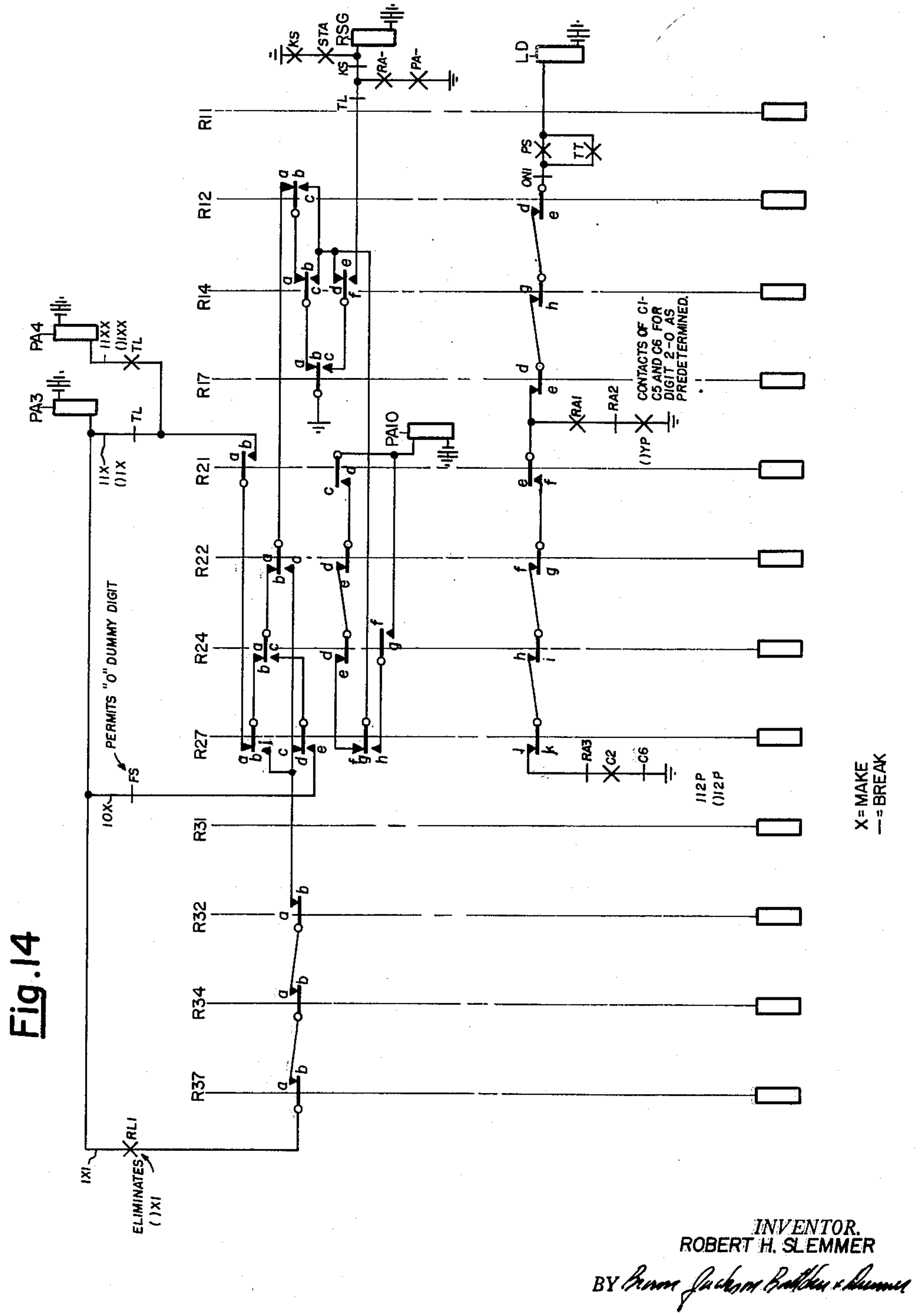
FIGURE 14 illustrates the principles of code recognition in Reg. I.

Reference should be made to FIGURE 14.

*Digit "0" received over free service trunk*

If digit "0" is to be received over a free service trunk for dial assistance, it is obvious that since only one digit is involved, the digit must not be lost. Therefore in a distant step-by-step office a trunk access code must precede the digit or a register-sender office must repeat the digit.

As a result of receipt of digit "0" in Reg. I relays R14 and R17 in the first storage bin of Reg. I will be operated. Relay RSG operates over a circuit extending from ground over R17—*c,* R14—*f,* break contacts of an incoming toll trunk marking relay TL (indicated —TL) and break contacts of an incoming operator's keyset relay KS (indicated —KS), through the winding of a relay RSG (corresponding to the relay RSG in register O), to battery. Relay RSG operates to send a call signal to a register sender guard circuit to call in a sender of an associated group of senders, there being less senders than registers.

*Local special service code received*

Reg. I is arranged to receive a local special service code 11X (such as 113) complete, or minus the first digit over a free service or ticketing trunk.

With receipt of the code 11X, all of the relays in storage bin 1 will be in the non-operated condition, and only relay R21 will be operated in the second bin. Accordingly, relay PA3 operates over a circuit which extends from ground through contacts R17—*a,* R14—*a,* R12—*a,* R22—*a,* R24—*a,* R27—*a,* R21—*a,* break contact of an incoming toll marking relay TL, through the winding of relay PA3 ("proceed after 3 digits" relay), to battery. Accordingly, with the third digit already received a circuit is completed over contacts of a register advance relay RA3 (not shown, but similar to that of Reg. O) to operate relay RSG which in turn operates to call in a sender, in similar manner as Reg. O.

As a result of the receipt of code ( )13 i.e., the same code minus the first digit, the same circuit tracing and description holds. In other words the first digit "1" is not necessary to operate relay PA3.

*Delayed special service code received*

Reg. I is arranged to receive a delayed special service code such as 11XX over a toll trunk.

As a result of the receipt of a code, such as 1152, relay PA4 operates over a circuit extending from ground through contacts R17—*a,* R14—*a,* R12—*a,* R22—*a,* R24—*a,* R27—*a,* R21—*b,* make contacts of an incoming toll marking relay T1, over the winding of relay PA4 to battery. When the fourth digit has been received, (register advance relay RA4, not shown, operated) relay RSG is operated to call in a sender. It should be observed thta if the first digit 1 is missing, the same circuit tracing holds and relay PA4 operates.

*Toll test code received*

Reg. I is arranged to receive test codes 10X, such as 100, with no lost digits over a toll trunk.

As a result of receipt of the code 10X, relay PA3 operates over a circuit which extends from ground through contacts R17—*a,* R14—*a,* R12—*a,* R22—*a,* R24—*c,* R27—*e,* and a break contact of an incoming free service marking relay FS, and the winding of relay PA3 to battery. Accordingly with the third digit already received (register advance relay RA3, not shown, operated) relay RSG is operated to call in a sender.

*Toll special service code received*

Reg. I is arranged to receive toll special service codes 1X1 such as 121.

As a result of receipt of the code 1X1, relay PA3 operates over a circuit which extends from ground over contacts R17—*a,* R14—*a,* R12—*a,* certain combinations of contacts of register bin 2, contacts R32—*a,* R34—*a,* R37—*a,* make contacts of relay RL1 (which operates after a digit has been registered in storage bin 1) and the winding of relay PA3 to battery. The fact that this circuit passes through a make contact of relay RL1 eliminates the recognition of such a code minus the first digit ( )X1, and accordingly such a code would not be recognized over a free service trunk.

The combinations of contacts of storage bin 2 for the recognition of various second digits of toll special service codes are as follows:

| Digit | Contacts |
|---|---|
| 2 | R22-c |
| 3 | R22-c |
| 4 | R22-a, R24-c, R27-c |
| 5 | R22-a, R24-c, R27-c |
| 6 | R22-a, R24-c, R27-c |
| 7 | R22-a, R24-a, R27-i |
| 8 | R22-a, R24-a, R27-i |
| 9 | R22-a, R24-a, R27-i |

*Area code received*

Reg. I is arranged to recognize area codes XX'X", such as 204 and 613. The first digit in such code is any digit except 1 and 0, and the second digit is either 1 or 0.

When such a code is received, relay PA10 operates over a circuit extending from ground through certain contact combinations of storage bin 1 in series with certain contact combinations of storage bin 2, through the winding of relay PA10 to battery. When the tenth digit has been received (relay PA10, not shown, operated), relay RSG is operated and calls in a sender.

The contact combinations for various first digits which are effective in this circuit are:

| Digit | Contacts |
|---|---|
| 2 | R17-a, R14-a, R12-c |
| 3 | R17-a, R14-a, R12-c |
| 4 | R17-a, R14-c |
| 5 | R17-a, R14-c |
| 6 | R17-a, R14-c |
| 7 | R17-c, R14-d |
| 8 | R17-c, R14-d |
| 9 | R17-c, R14-d |

The contact combinations for various second digits which are effective in this circuit are:

| Digit | Contacts |
|---|---|
| 1 | R27-f, R24-d, R22-d, R21-d |
| 0 | R27-h, R24-g |

*Automatic toll ticketing code received*

Reg. I is arranged to receive an automatic toll ticketing prefix code 112 (followed by the calling party number). Actually these 112P digits are dialed by the calling party before the directory number of the called party (or before the area code if such is involved).

When such a code is received, relay LD operates over a circuit which extends from ground over a break contact of counting chain relay C6 (similar to that of Reg. O), make contacts of counting chain relay C2, break contacts of register advance relay RA3, contacts R27—*j*, R24—*h*, R22—*f*, R21—*f*, R17—*d*, R14—*g*, R12—*d*, break contacts of off-normal relay ON1 (similar to ON1 of Reg. O), make contacts of a free service trunk origin marking relay FS (or of a toll ticketing trunk origin marking relay TT), and the winding of toll ticketing marking relay LD to battery.

Reg. I is also arranged to receive an automatic toll ticketing prefix code 1Y (followed by the calling party number), in which Y is any digit except "1."

When such code is received, relay LD operates over a circuit extending from ground through contacts of counting chain relays C2—C5 and C6 for digit 2 to 0 as predetermined to represent the digit (refer to Reg. O), break contacts of register advance relay RA2, make contacts of register advance relay RA1, contacts R17—*d*, R14—*g*, R12—*d*, break contacts of off-normal relay ON1, make contacts of a free service trunk origin relay FS or a toll ticketing origin marking relay TT and the winding of relay LD to battery.

Relay LD marks the register for automatic toll ticketing which directs the subsequent party digit into the party bin.

*Signaling from keyset trunk*

An operator's keyset trunk marks the register by operating relay KS over TRL crosspoints upon landing in the register. After all digits have been received in the register, the operator's keyset trunk gives an end of signaling indication over TRL crosspoints which operates start relay STA. Relay RS6 operates over a circuit extending from ground over make contacts of relay KS, make contacts of relay STA, and the winding of relay RSG to battery. Relay RSG operates to call in a sender for use in extending the connection.

*Translation by use of neon lamps*

It should be observed that a number group circuit is called in by a sender as a result of the register signaling same that the incoming call is to a "local subscriber or special service"; and as a result of the sender distinguishing local from special service by analyzing the first four digits received.

In the number groups (and also the translators), use is made of the voltage regulating characteristics of neon lamps in providing the translations. It is characteristic of a neon lamp that it will not conduct until a critical voltage across its terminals is reached. At this voltage, the neon in the lamp ionizes and conduction through the lamp occurs. Irregardless of the amount of current passing through the lamp, the voltage drop across the lamp remains constant during the time it is conducting. The voltage at which the neon ionizes is referred to as the "firing-voltage." The voltage drop during conduction is termed the "maintaining-voltage." The maintaining-voltage is less than the firing-voltage.

Figure 15:
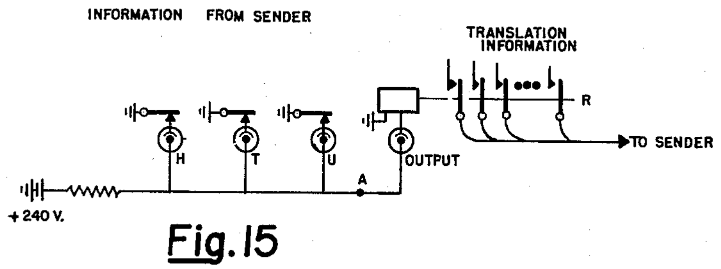
FIGURE 15 illustrates the principles of code translation.

FIGURE 15 indicates a schematic circuit for obtaining a three digit translation by use of a neon lamp cluster. The lamps designated as "H," "T" and "U" are used to recognize the incoming three digit code, for instance an office ode. The lamp designated as "output," controls the operation of a relay which closes the leads to extend the translated information. When the 240 v. positive potential is closed to the lamp cluster, one or all of the lamps H, T and U conduct. Due to variations in manufacturing, slight differences in the firing voltages of individual lamps occur. However, these differences have no practical effect on the circuit operation. When any of the lamps H, T or U conduct, the voltage at point "A" is held at the maintaining-voltage of the neon lamp that is conducting. Due to the delay factor introduced by the relay winding, the voltage across the output lamp does not reach this lamp firing-voltage before the voltage at point "A" is stabilized at a potential less than its firing-voltage. Since the firing-voltage was not reached, the output lamp does not conduct and therefore the relay "R" does not operate. The break contact in each of the H, T and U lamp leads provide a means of indicating the incoming code.

Figure 16:
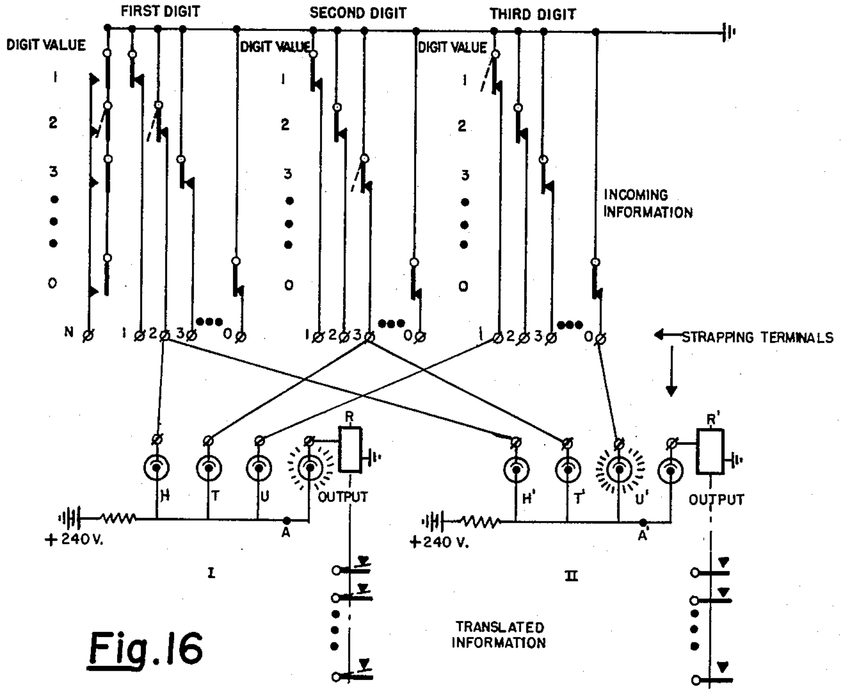
FIGURE 16 illustrates the manner in which the translator distinguishes between two three digit office codes which differ by the last digit only.

FIGURE 16 illustrates the principles involved in the translation of a specific code. Lamp cluster I is strapped to recognize office code ADams 1. When the dialled digits 231 are extended to the translator, the code marking relays for the first digit, in response to the value "2," removes ground from the first digit strapping terminal 2 and grounds terminal N. In response to the value "3," the second digit marking relays open ground from the second digit strapping terminal 3. As a result of the third digit value "1," ground is opened from the third digit strapping terminal 1. All other strapping terminals are grounded. Since the circuit has been opened to lamps H, T and U of cluster I, these lamps no longer conduct. With the removal of the voltage regulating effect of these neon lamps, the voltage of point "A" rises to the firing voltage of the output lamp. The output lamp conducts and the current flow operates relay R. The translation information is extended to the sender by the make contacts of operated relay R.

Lamp cluster II is strapped to recognize office code ADams 0. Since this cluster is strapped to recognize a digital value "0" for the third digit, the circuit to lamp U is not opened in this case and the lamp continues to conduct. Since one of the recognition lamps is conducting, the voltage at "A" remains below the firing-voltage of this cluster output lamp. Every lamp cluster strapped to provide a translation for any other office code, will have at least one lamp conducting. This is true because no two offices are assigned the same three digit code.

When providing tandem switching for traffic arriving with one or two digits lost in switching through a distant office of the direct control type, two or three lamp clusters may be associated with a specific office.

Figure 17:
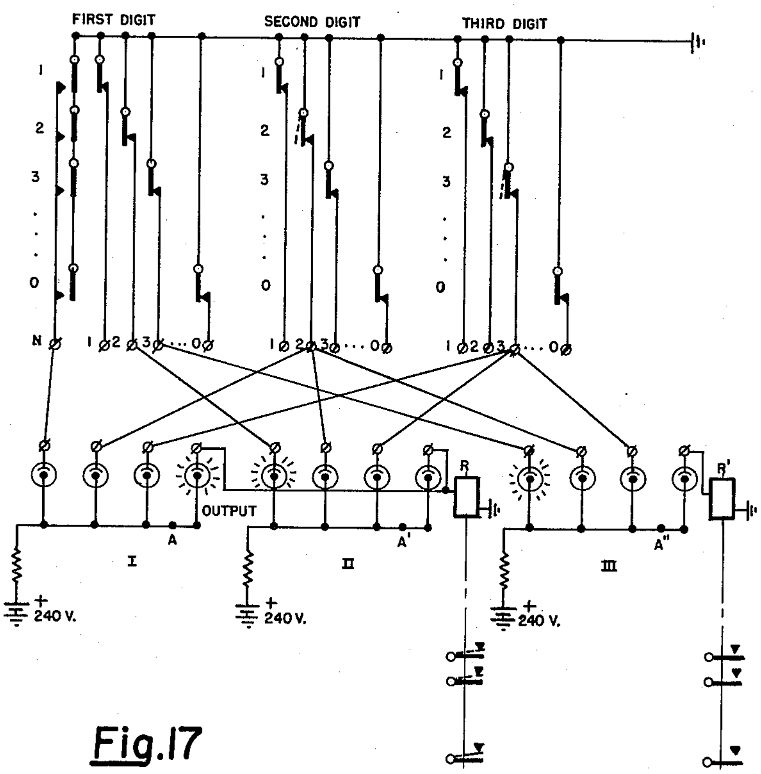
FIGURE 17 illustrates the manner in which the translator recognizes an office by its three digit code; by the same code minus the first digit; and distinguishes between another office code which differs from these only by its first digit.

FIGURE 17 indicates the strapping for a lamp cluster I to recognize ACademy 3 (digital value 223) for the portion of the traffic to ACademy 3 which arrives at the Reg. I with one lost digit. When traffic arrives from a "direct-control" type office in which one or more digits are lost, the Reg. I automatically stores the first received digit in the same storage bin in which it would have been stored if the lost digit or digits had been received, instead of lost.

Since no digit was stored in the first digit storage bin in the register, no digital value is extended to the translator's first-digit marking relays. Therefore, none of the first-digit marking relays operate. As shown in FIGURE 17, if none of the first-digit marking relays operate, first digit strapping terminal N will be open and terminals 1–0 will be grounded. Thus translations will occur for only those lamp clusters which are to recognize offices when the first digit is lost. Lamp cluster III illustrates that a three digit code beginning with N, such as N23 where N indicates no digit received, will not be the same as any other regularly-assigned code and will thus provide a unique recognition. Lamp cluster II recognizes ACademy 3 by its "regularly-assigned" code when all digits are received.

Figure 18:
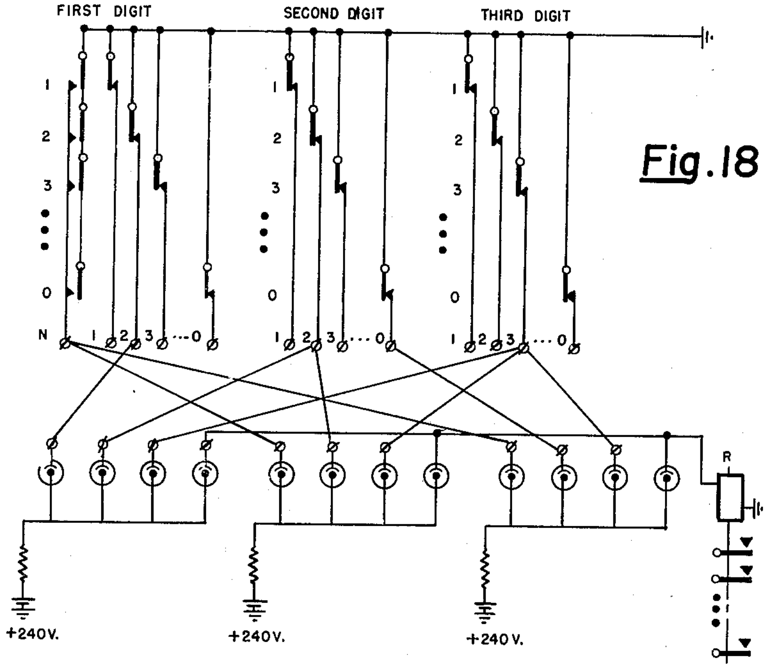
FIGURE 18 illustrates the manner in which the translator recognizes an office by its assigned three digit code; by the same code minus the first digit; and by the same code minus the first two digits plus a supplied second digit which is different from the regularly assigned second digit.

When traffic requiring tandem switching arrives at the Reg. I with two digits lost, the Reg. I automatically provides a digital value for storage in the second digit storage bin in the register. This digital value is such that the translator is enabled to provide a unique recognition of the office involved without conflict with any other office code. As illustrated in FIGURE 18, ACademy 3 can be recognized by the regularly-assigned code 223, by the code ( )23 and by the code ( )03. The code ( )03 will provide a unique recognition from any regularly-assigned code because by definition, the second digit of a regularly assigned office code must be a letter as indicated on the finger plate of a dial. No letters are assigned to digital value 0 on a dial. Theoretically digital value 1 could also be supplied by Reg. I since no letter values are assigned to digit 1 on the finger plate. However, the digital value "1" for the second digit in the Reg. I has a specialized use and cannot be supplied in place of a lost digit. Additionally, any other digit which does not conflict with any previously assigned code may be supplied. For instance, in handling tandem traffic for the connecting offices indicated in FIGURE 7, the Reg. I would supply the digital value 5 for the second lost digit on traffic arriving from PIoneer, SKyline, PResident and PYramid. On traffic arriving from TUrner and TUcker, the Reg. I supplies the digital value 9. On traffic arriving from TWining and TWinbrook, the Reg. I supplies the digital value 8. The translator would then contain lamp clusters strapped to recognize the following codes.

| | |
|---|---|
| PIoneer 7 | 747, ( )47, ( )57 |
| SKyline 5 | 755, ( )55 |
| SKyline 6 | 756, ( )56 |
| PResident 4 | 774, ( )74, ( )54 |
| PYramid 3 | 793, ( )93, ( )53 |
| TUxedo 3 | 883, ( )83 |
| TUrner 4 | 884, ( )84 |
| TUcker 6 | 886, ( )86 |
| TWinbrook 7 | 897, ( )97 |
| TWining 6 | 896, ( )96 |

It is to be noted that no two codes are the same and that each office can be identified even though one or two digits of the dialled office code are lost. For traffic which arrives with a lost digit or digits and is to be terminated in the local offices (LA2, LA3 and LA4), the Reg. I reconstructs the actual local office code to enable the sender to select the required number group.

The number of lamps contained in a lamp cluster is varied according to the requirements. Where six digit translations are required, for instance a combined area and office code, six recognition lamps are used in the lamp clusters. In the number group lamp clusters, five output lamps are used.

Figure 19:
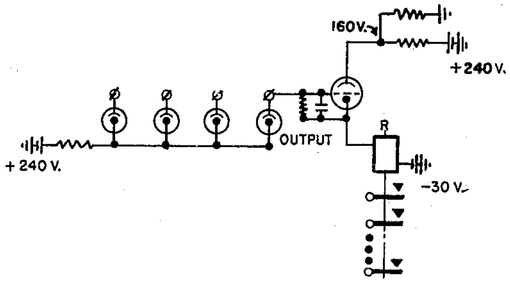
FIGURE 19 illustrates the use of a cold cathode tube and relay in conjunction with the translator office code recognition means.
Figure 20:
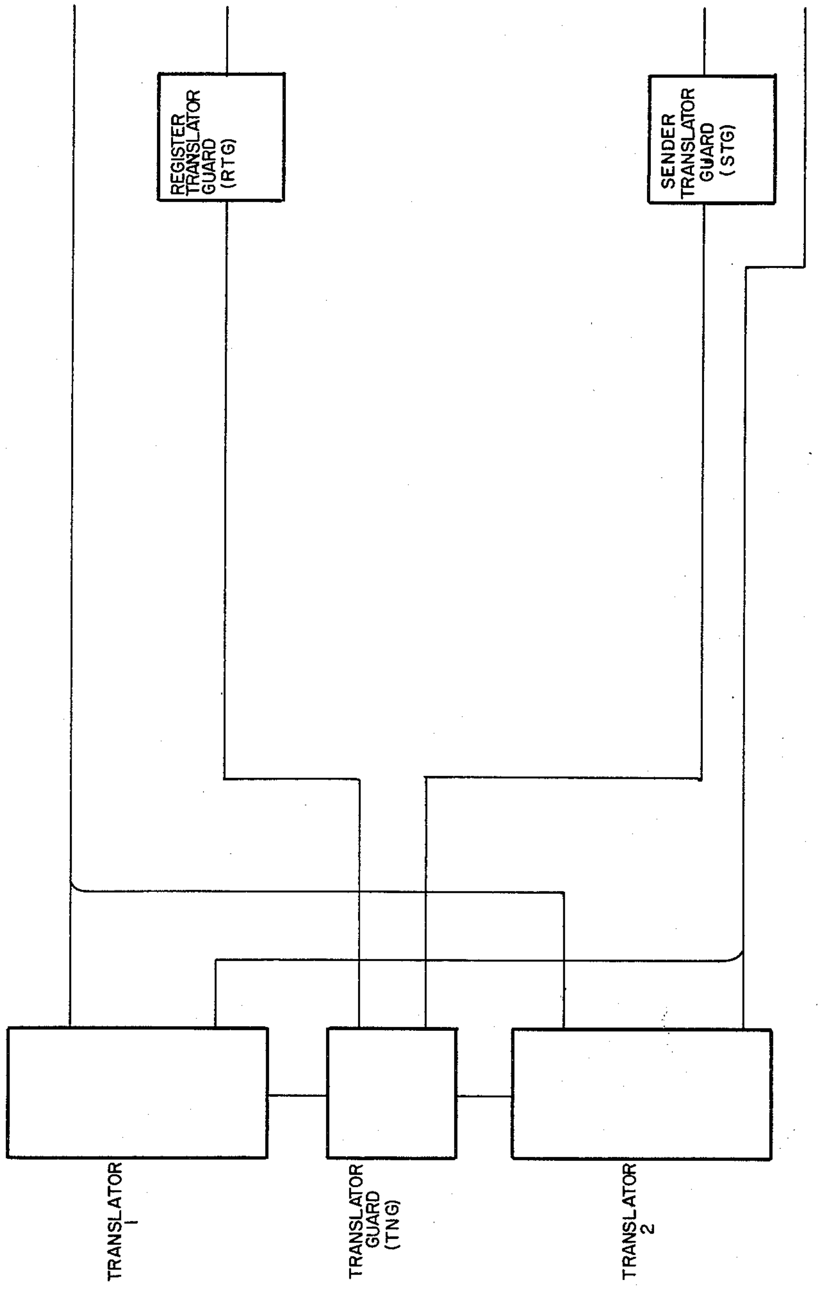
FIGURES 20–24 illustrate cerain features of register-sender-translator functioning.

The amount of current which an output lamp will pass is relatively small, therefore in practical applications this current flow is used to develop a voltage which is impressed between the cathode and the starter anode of a cold cathode tube. This application is illustrated in FIGURE 19. The impressed voltage is large enough to fire the tube and cause it to conduct. The current capacity of the tube is much greater than that of the neon lamp. As shown, the relay R is therefore connected in the cathode circuit of the cold cathode tube.

*Additional details of register-sender-translator cooperation*

The manner in which the register operates to control the sender and translator operations responsive to receipt of the different codes is now set forth in more detail. With reference to FIGURES 20–24, and particularly to the upper part of FIGURE 21, eleven boxes represent eleven register bins, and each bin comprises four relays, for example, the first bin comprising relays such as R11, R12, R14, and R17. Registers I and MF are eleven digit registers plus a party bin. Registers O and DO are seven digit registers, but by use of auxiliary register A, registers O and DO are expanded to eleven digit registers plus party bin. Below the register bins are shown the digits of various codes stored therein.

Figure 10:
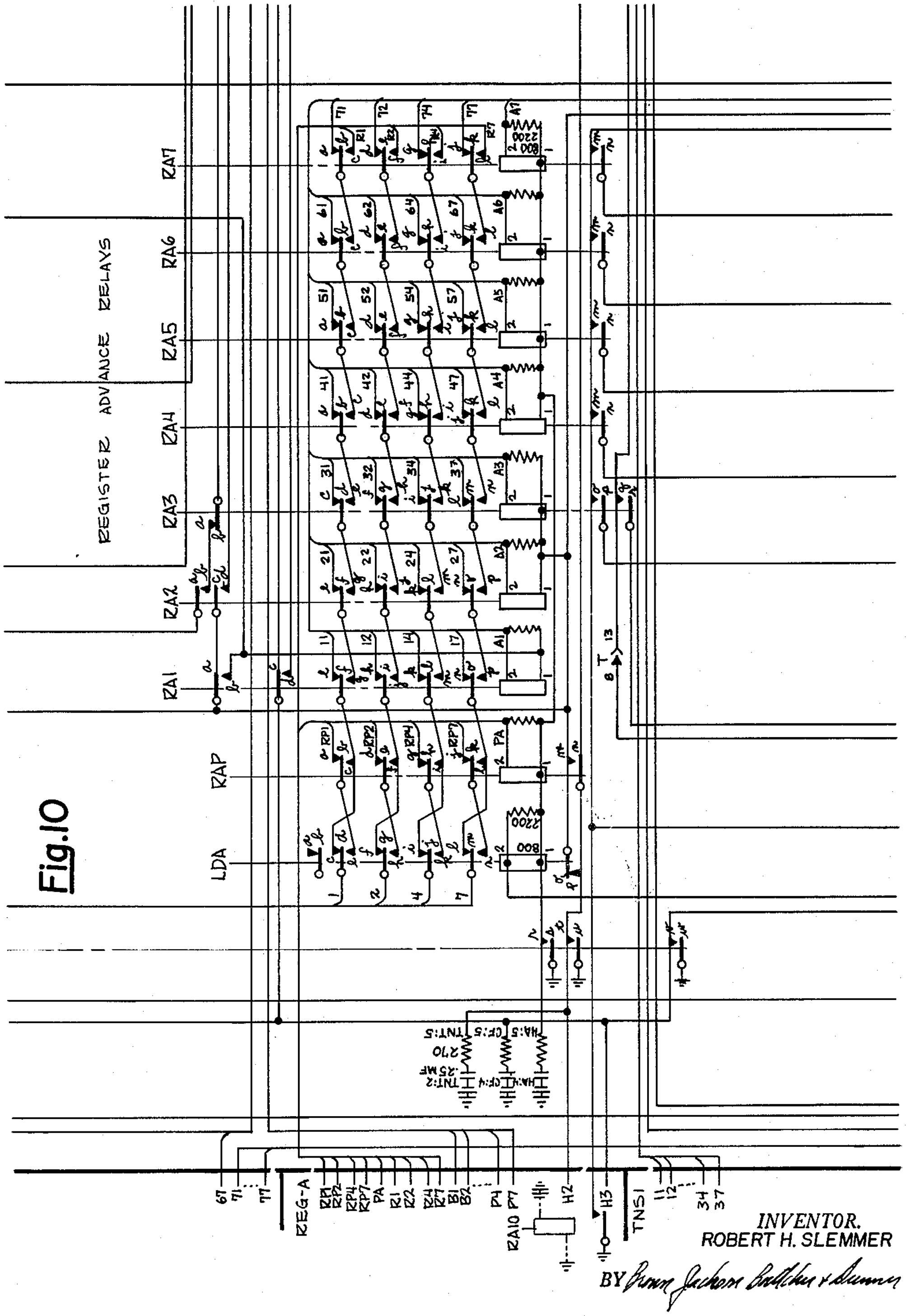

When a toll ticketing access code 112P is received the pulses of the digits are counted on the counting chain and the first three digits are registered in register bins 1st, 2nd, and 3rd; the first digit may be missing. Responsive to receipt of this code, relay LD is operated and the first three storage bins are returned to normal. When relay LD is operated (and its slave relay LDA, FIGURE 10, is also operated) the calling party digit next received is stored in the party bin P. Such register operation has been more fully described hereinbefore.

When the register is ready to call in a translator, the register translator guard circuit RTG is signalled by applying battery to the call signal conductor CS. Guard circuit RTG can serve a maximum of ten registers, and at any one time allows only one register of the ten to signal the translator guard circuit TNG.

Similarly, whenever a sender is ready to call in a translator, a sender translator guard circuit STG is signalled by applying battery to the call signal lead CS. Guard circuit STG can serve a maximum of four senders, and at anytime allows only one sender of the four associated therewith to signal the translator guard circuit TNG.

The translator guard circuit TNG allows only one of twelve RTG's and STG's to engage its services in calling in a translator at a time. Furthermore, translator guard circuit TNG constantly is marked to indicate the busy and idle condition of the two translators, and alternates their use. Accordingly, the first call signal received by translator guard circuit TNG from either an RTG or an STG effects switching of the calling register or sender, as the case may be, into translator 1. Responsive to a signal back from an RTG or STG, relay TNSI in the register or relay T1 in the sender respectively, is operated. The operated relay at its make contacts switches a plurality of leads between translator and register or between translator and sender as the case may be. The box with a contact in it in these paths indicates that contact means are used to switch the individual leads.

When the register is ready to engage a sender, it applies battery to the call signal conductor CS, and over CS to a register-sender guard circuit RSG, there being an RSG circuit associated with a maximum of ten registers. The RSG circuit allows only one of the associated registers to engage its services in seeking a sender at a time. Two RSG's can switch their associated registers to a maximum of four senders, each RSG indicating the busy condition of the associated four senders.

An RSG circuit accordingly closes contacts in an associated register-sender link circuit RSL and thereby switches a plurality of leads from the register to a sender.

Traffic considerations determine the ratio of registers to senders. The various types of registers such as register O, DO, I, have their distinctly associated groups of senders. Optional wiring O in the sender frame upright adapts it to its assigned use with register O; optional wiring I adapts it to register DO, register I, or register MF.

After the leads have been switched from a register to a translator and the translated information has been received, the call signal is removed from the register translator guard circuit RTG, which in turn removes the signal from translator guard circuit TNG, and RTG and TNG can be used for another call. In addition, after the leads are switched from a sender to a translator and the translated information is received, the call signal is removed from STG, which in turn removes the signal from TNG, and STG and TNG can be used for another call.

It is noted that the registers first engage a translator and thereafter release the translator. In certain instances the translator controls the time of sender seizure at a particular time by the register, and the sender subsequently engages a translator whenever necessary.

When a trunk engages a register, certain markings are received in the register over conductors M1 and M2 via TRL crosspoints, as noted on the chart shown hereinbefore.

*Signals from register to sender*

Figure 22:
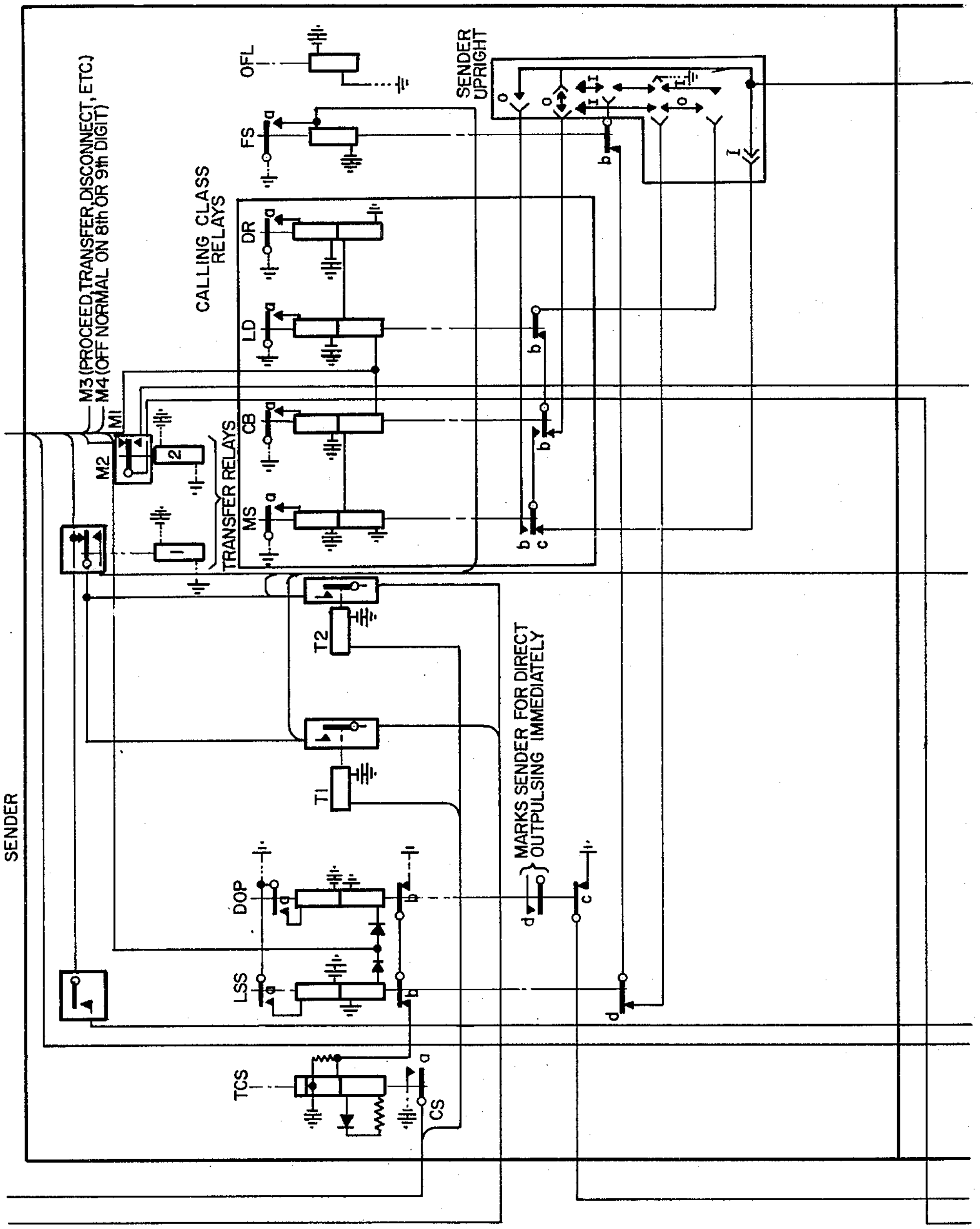
Figure 23:
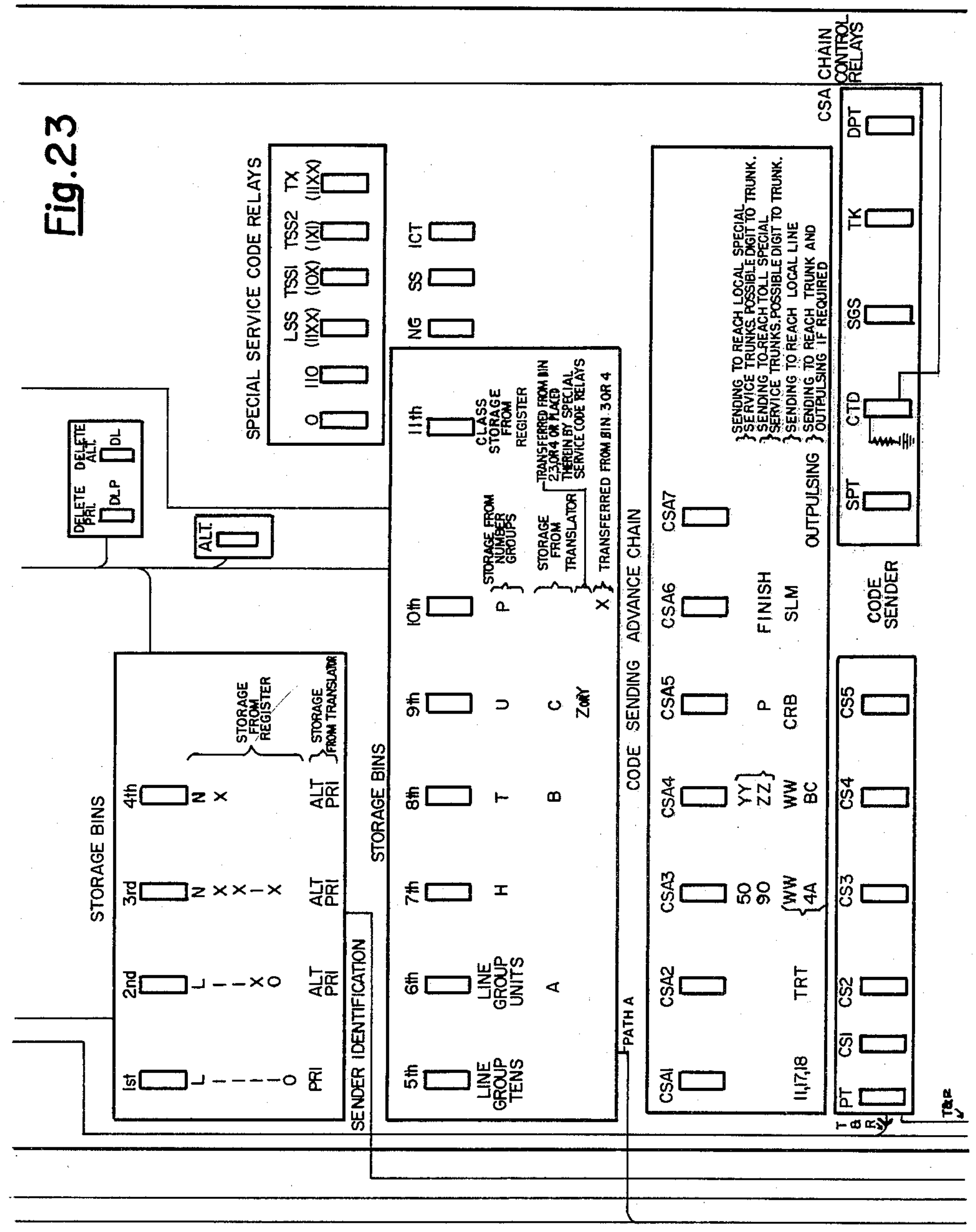
Figure 24:
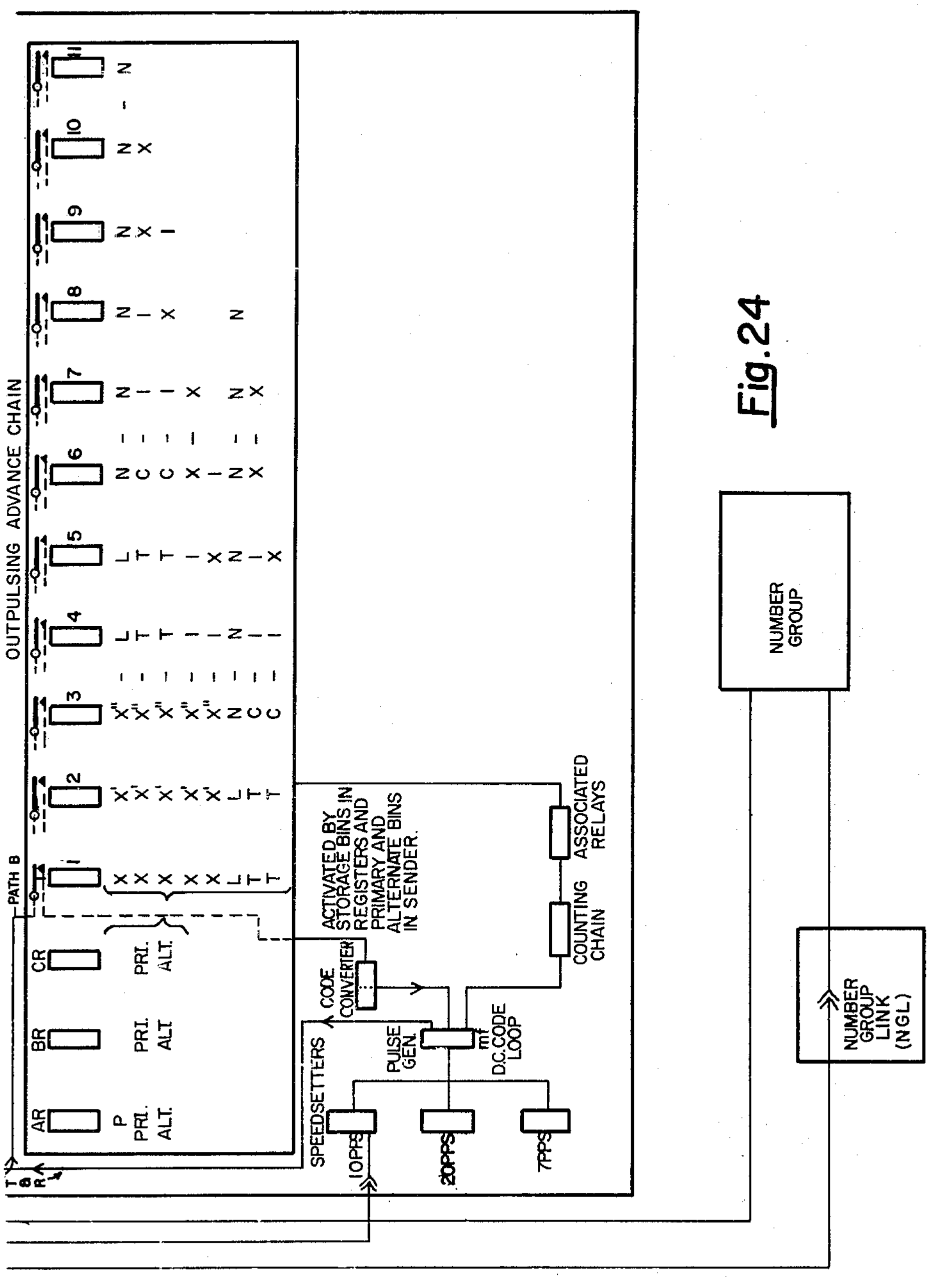
Figure 25:
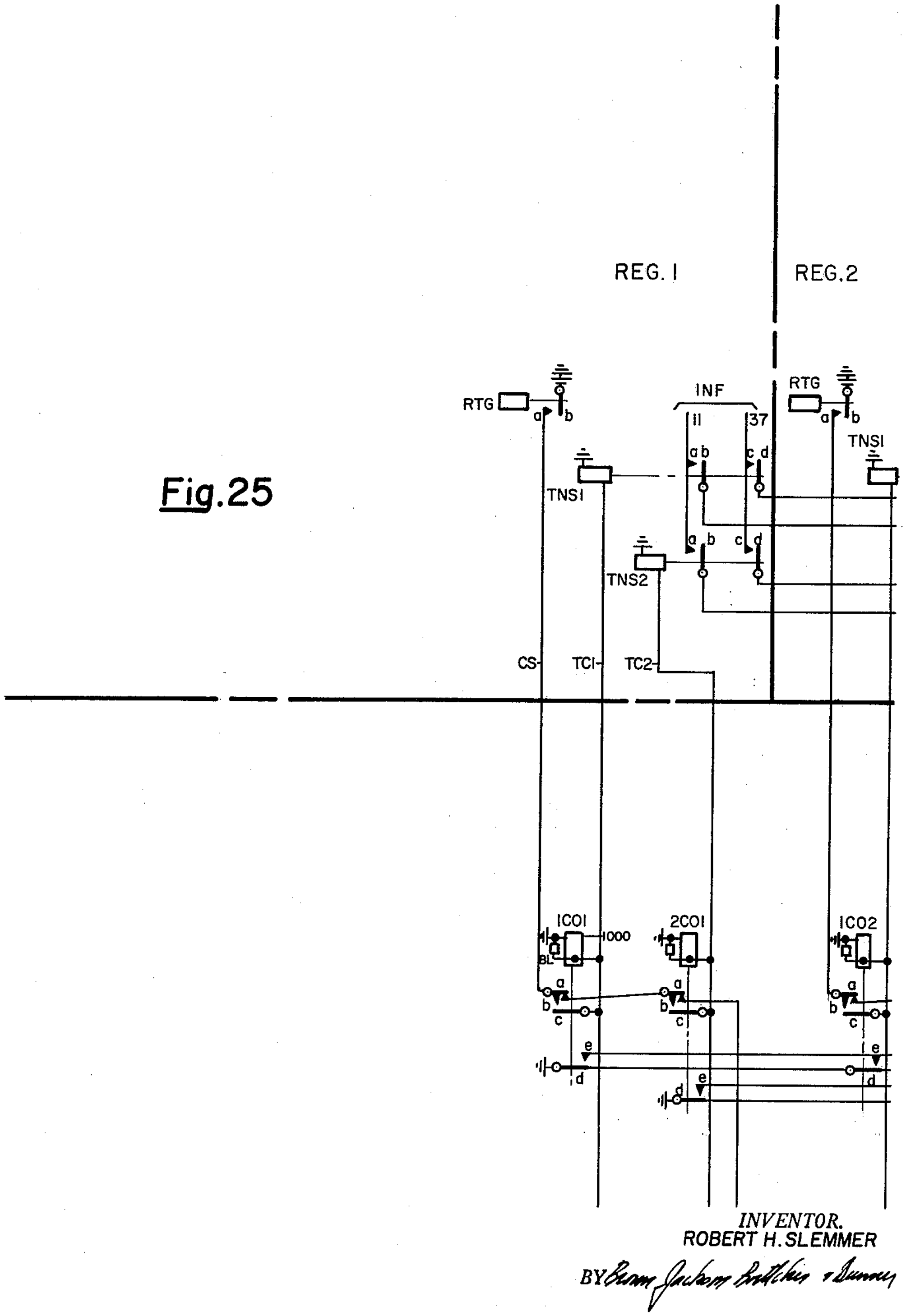
FIGURES 25–46 illustrate certain additional detail of translator functioning.
Figure 26:
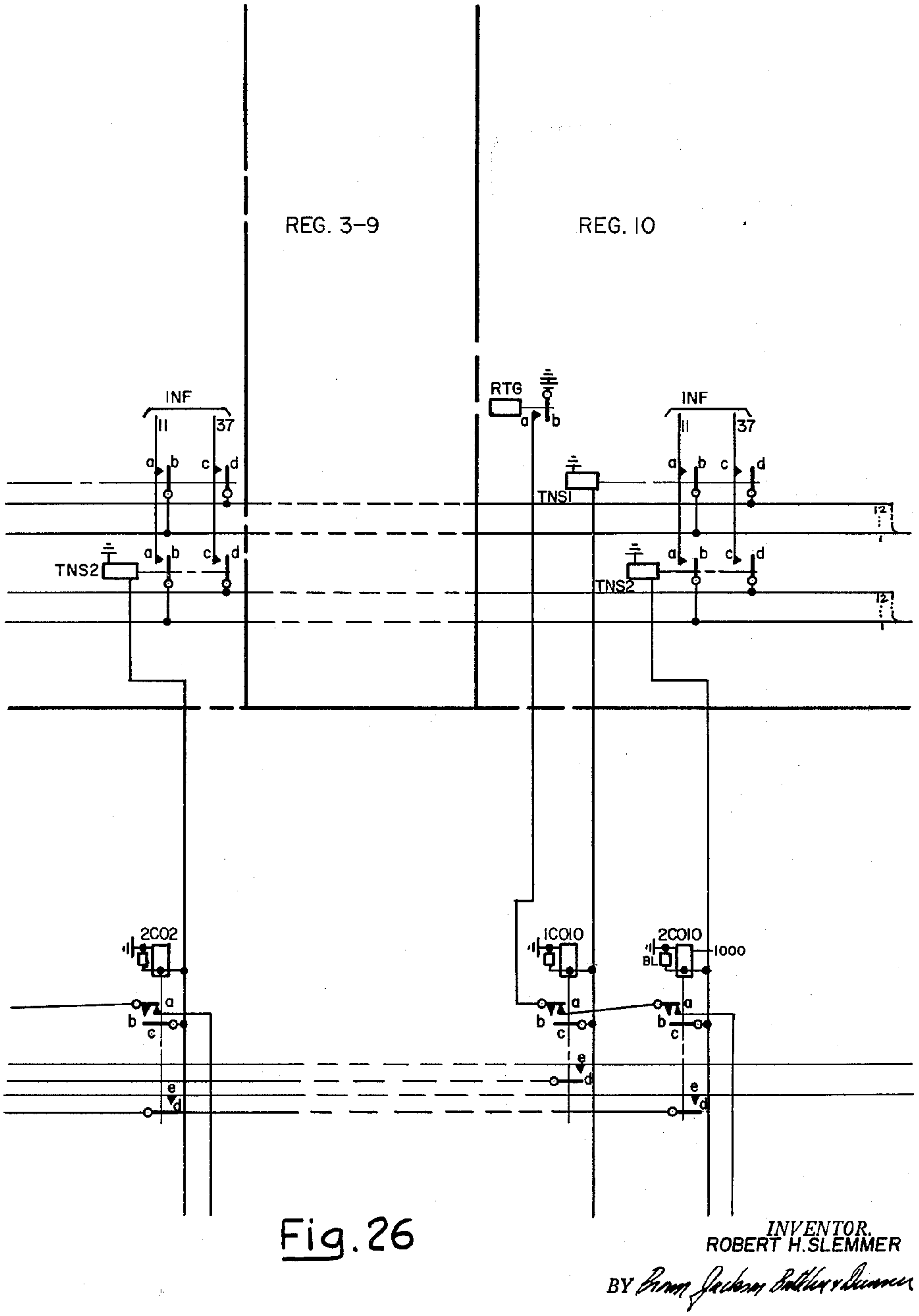
Figure 27:
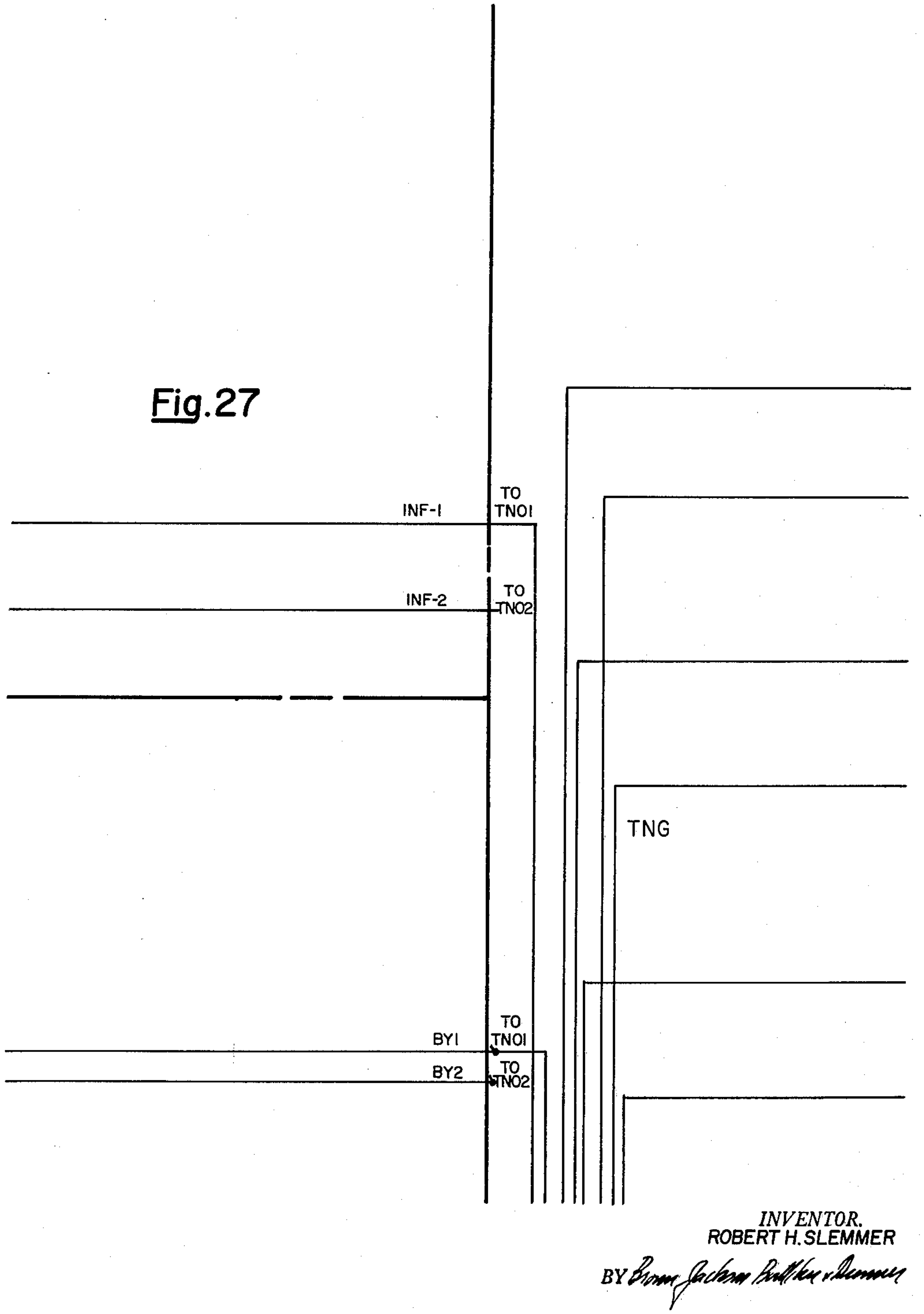
Figure 28:
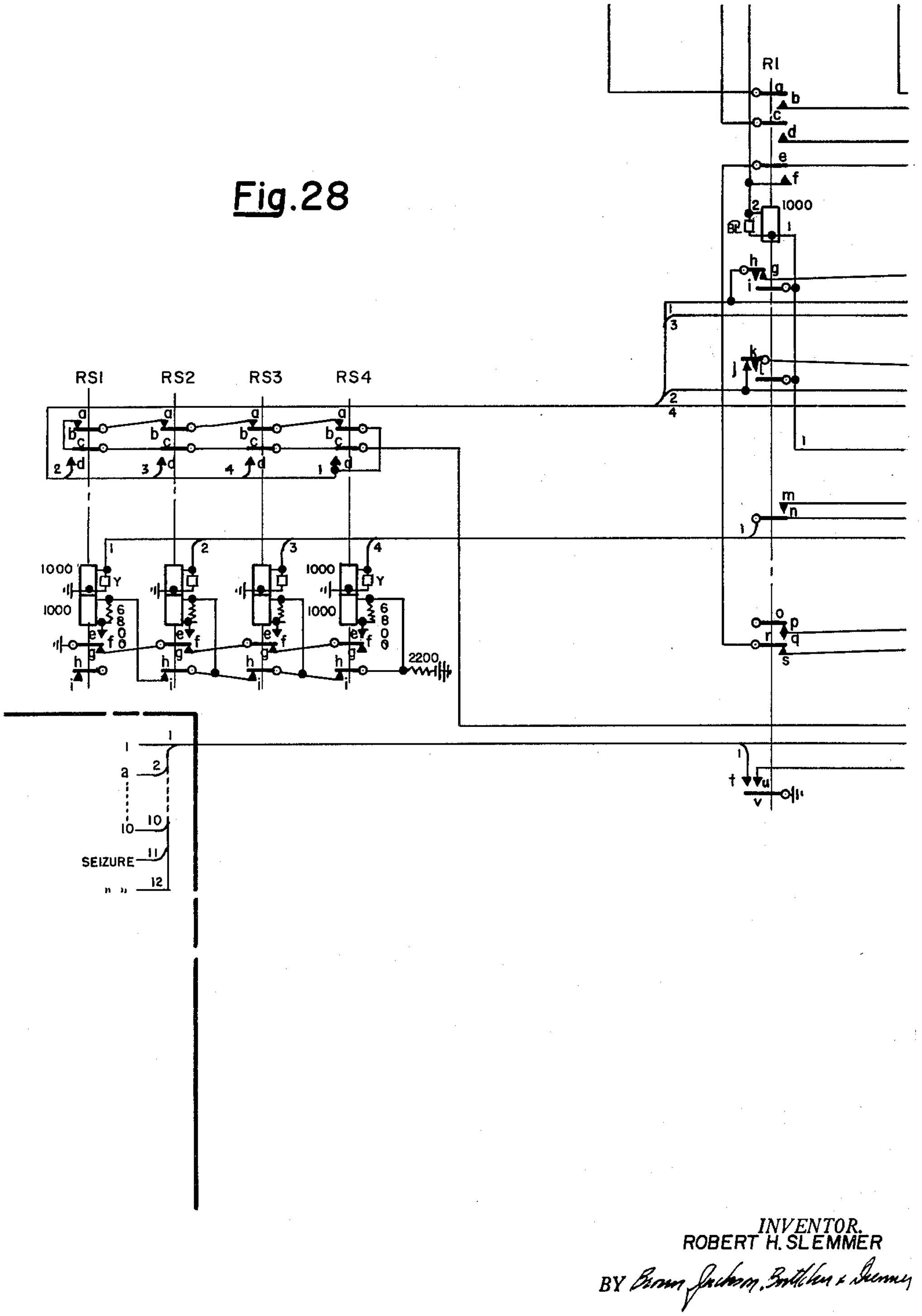
Figure 29:
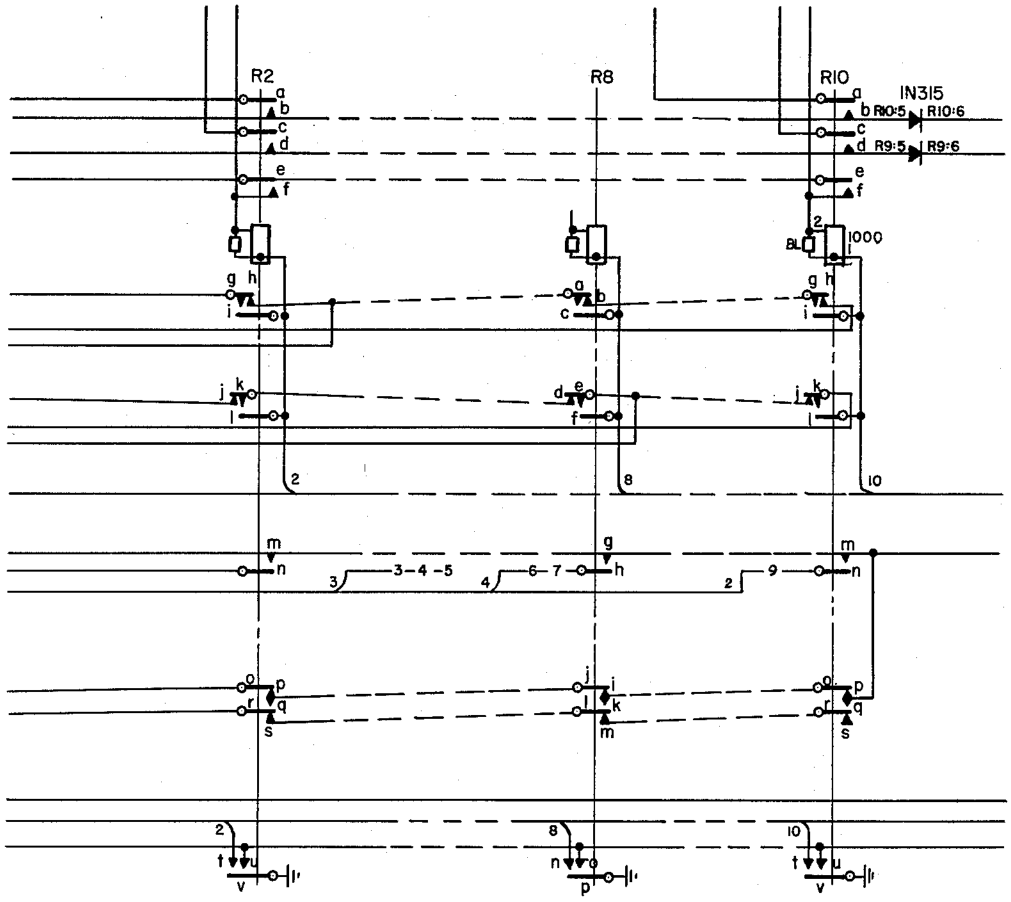
Figure 30:
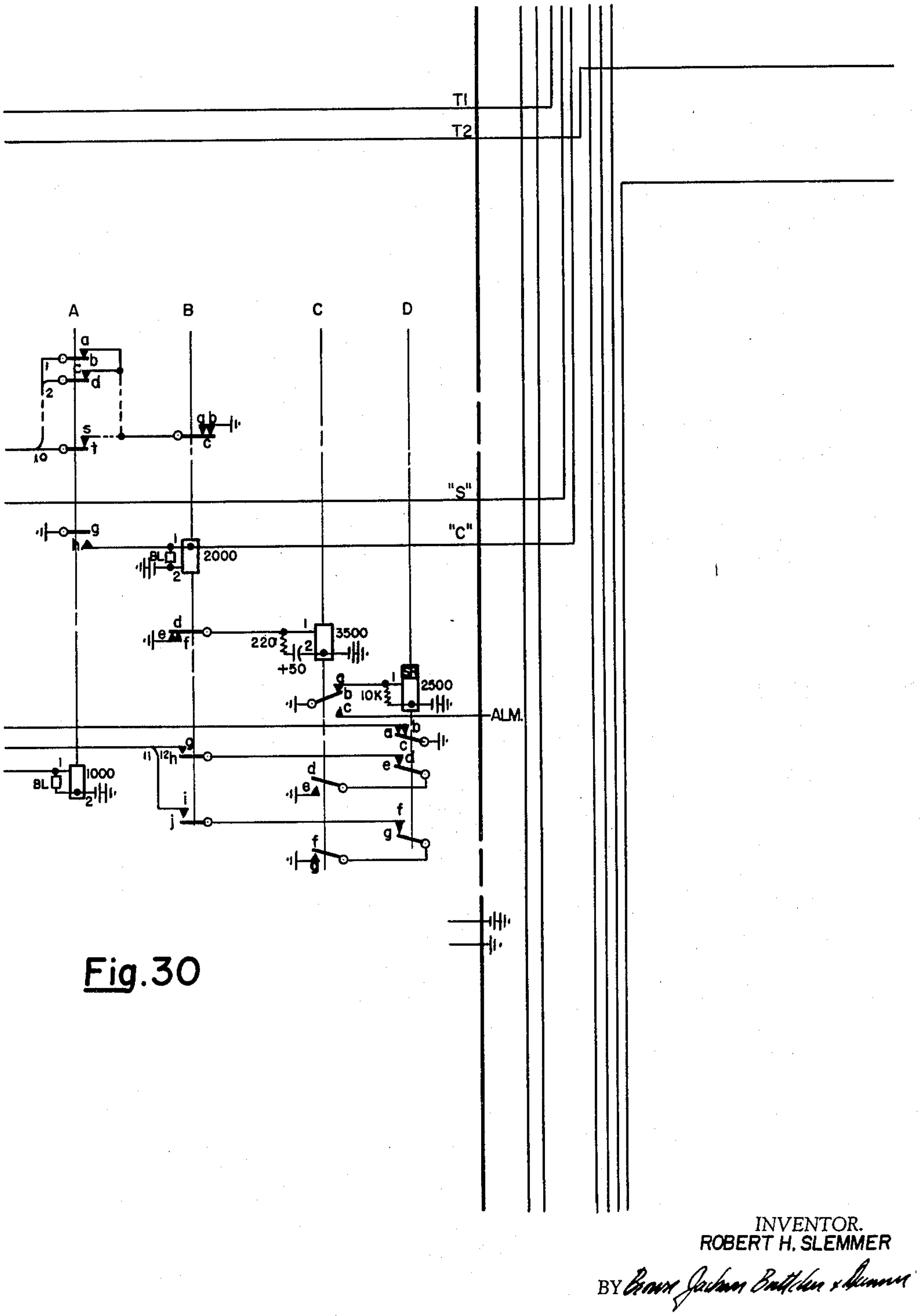
Figure 31:
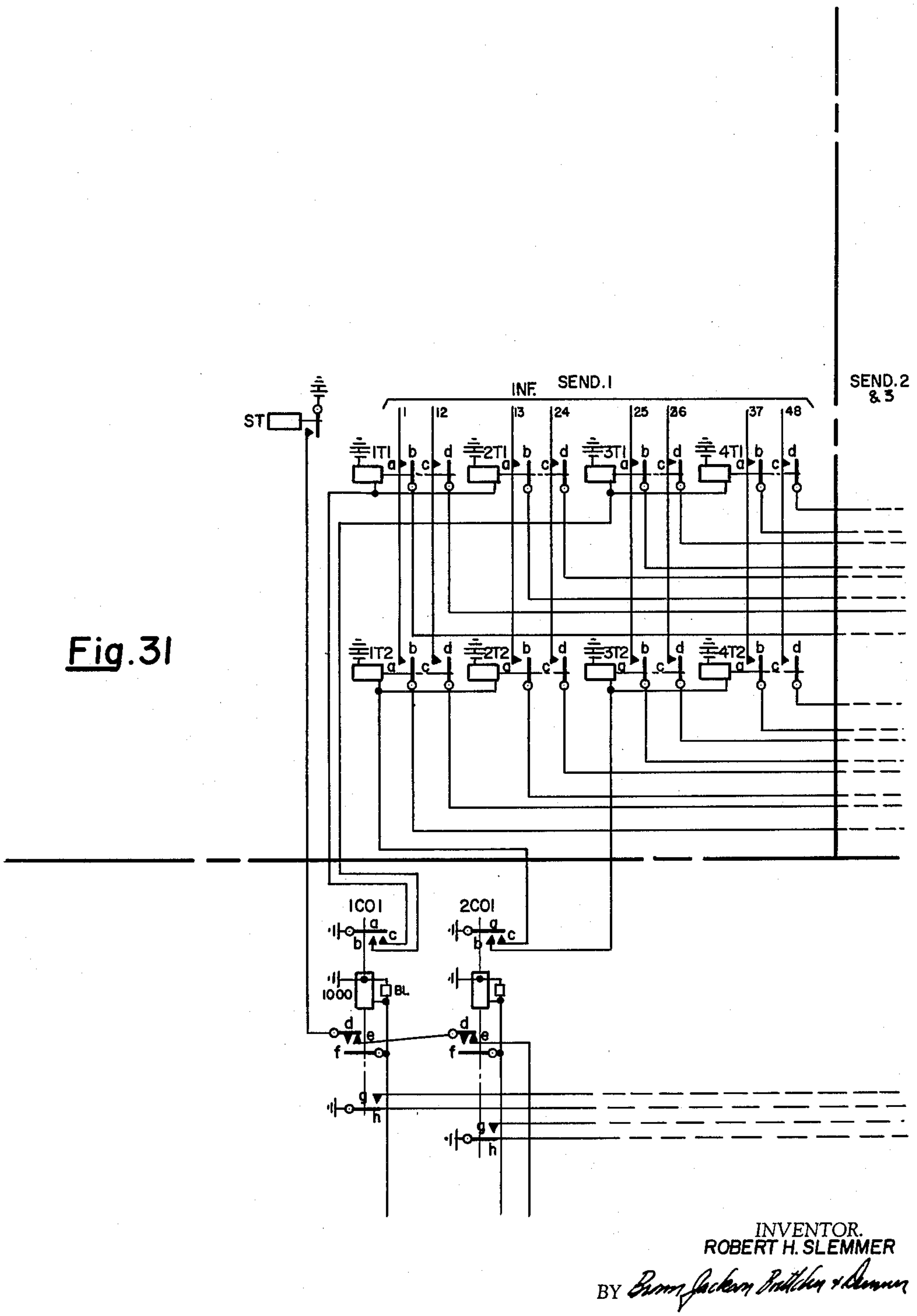
Figure 32:
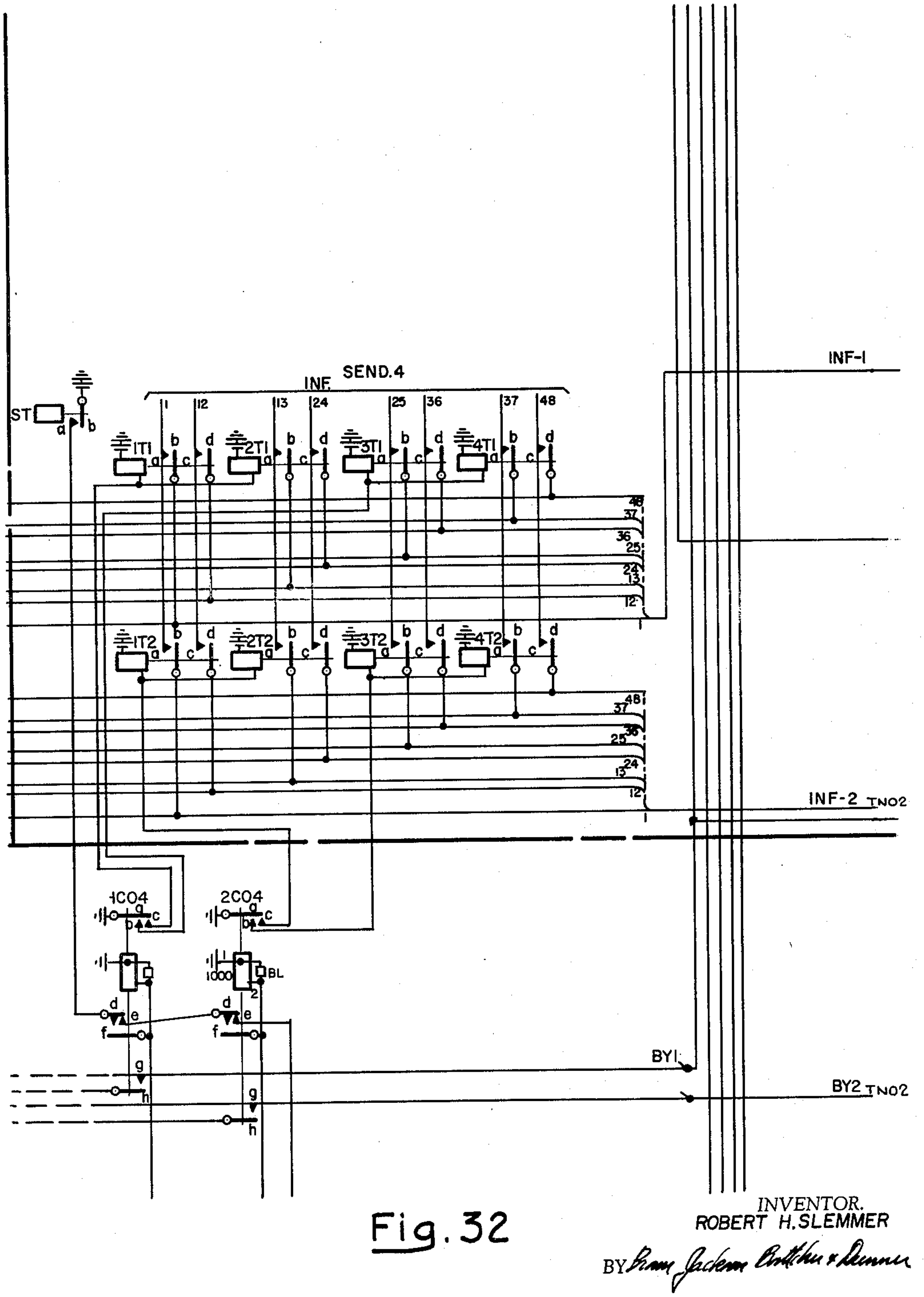
Figure 33:
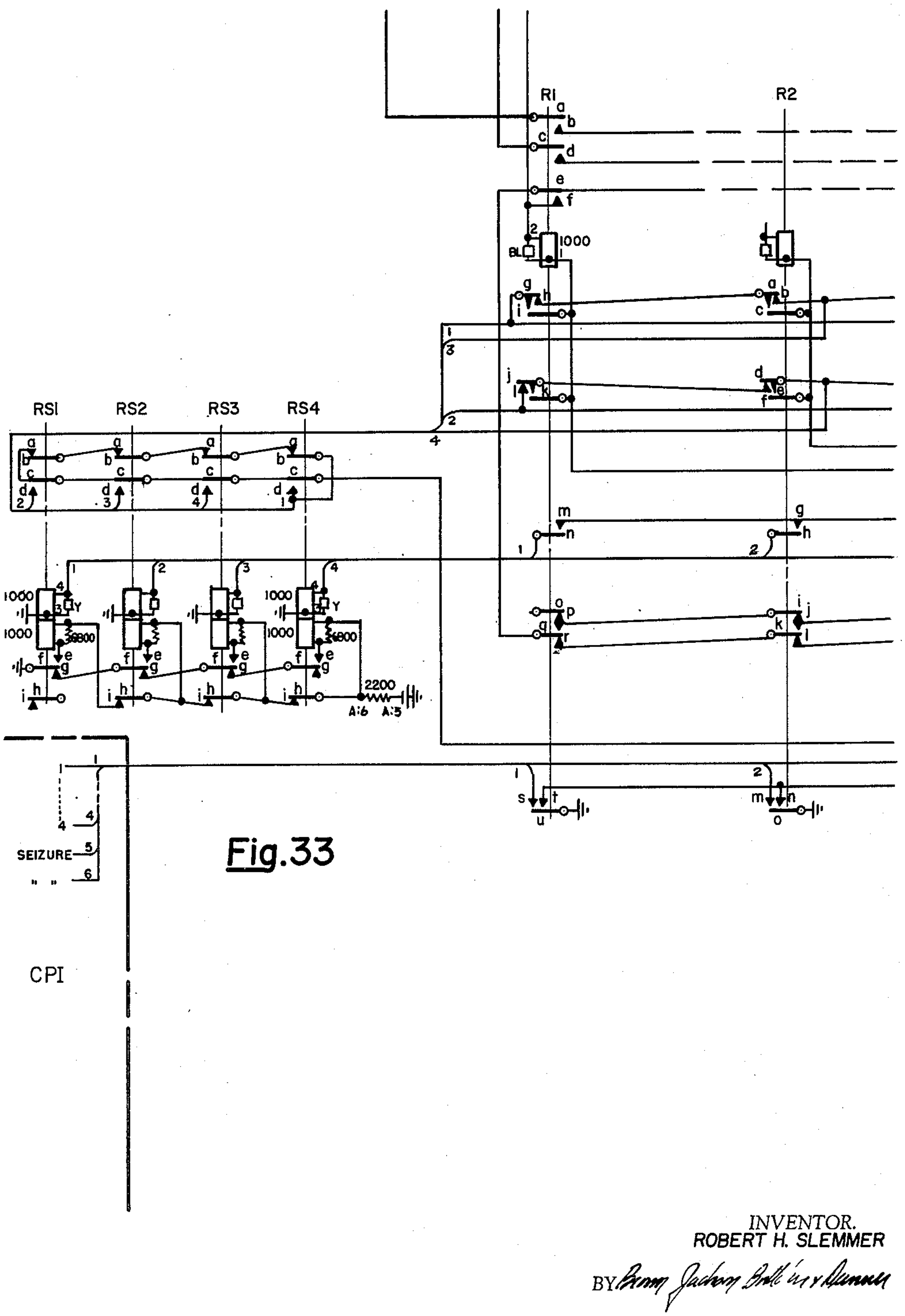
Figure 34:
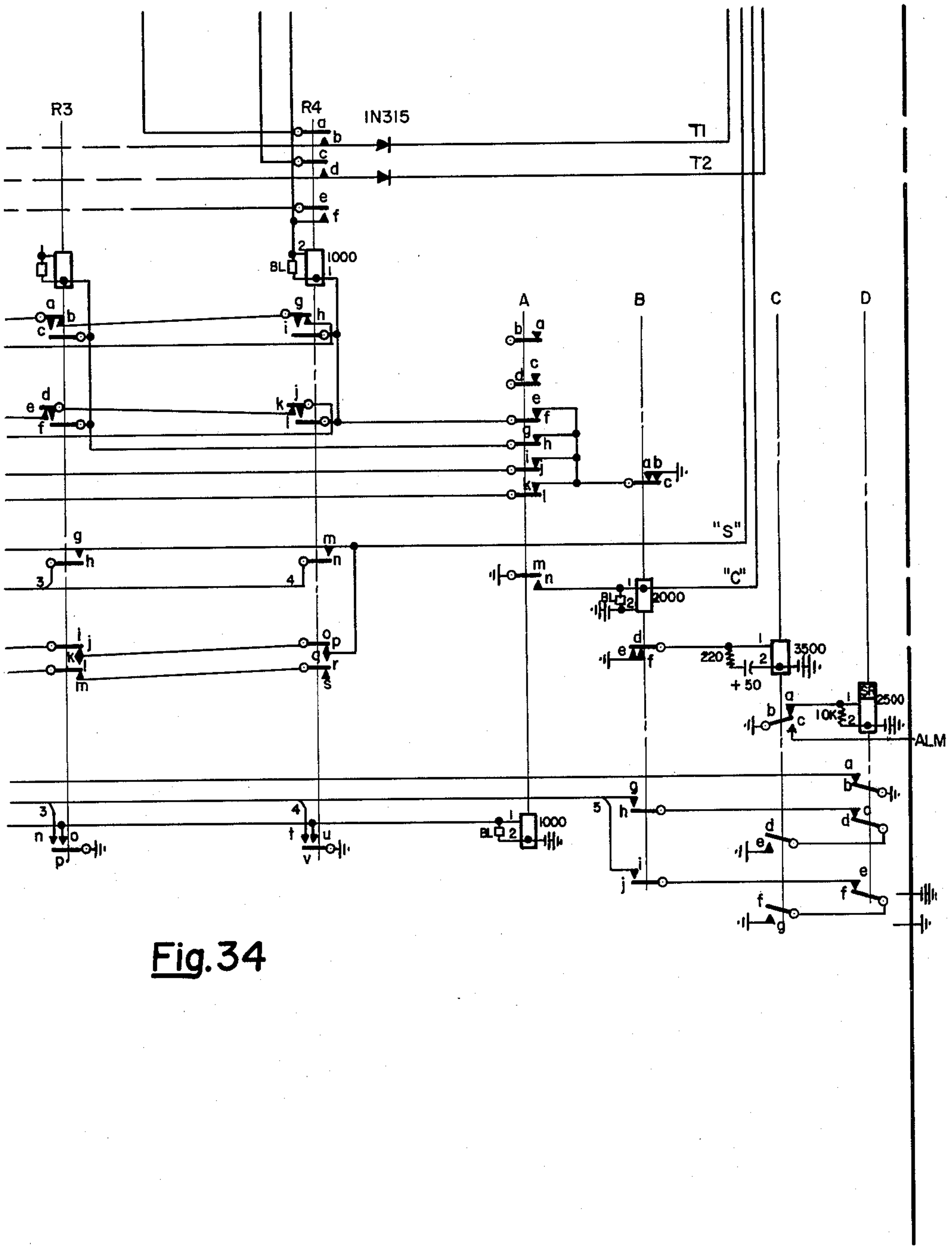
Figure 35:
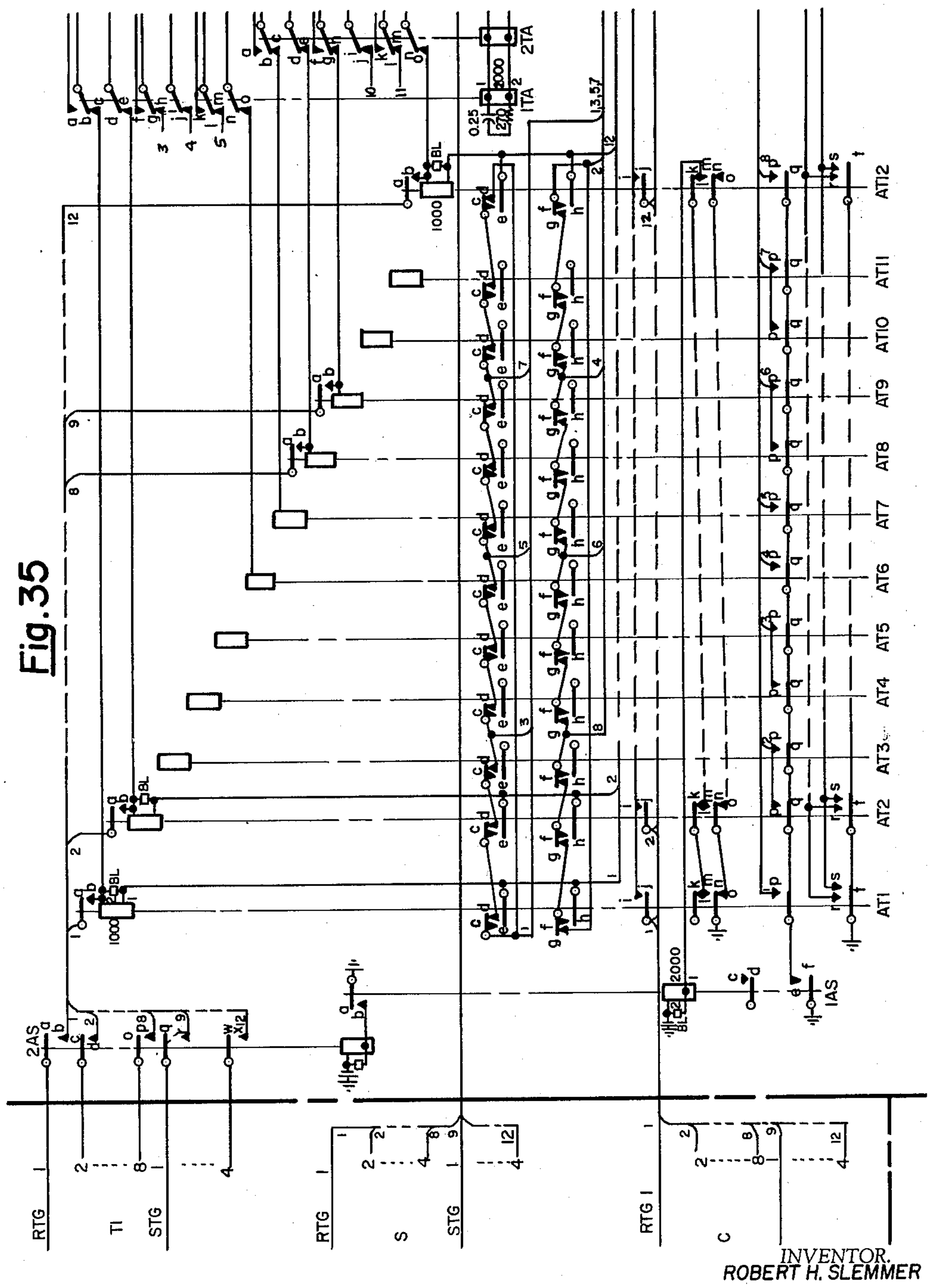
Figure 36:
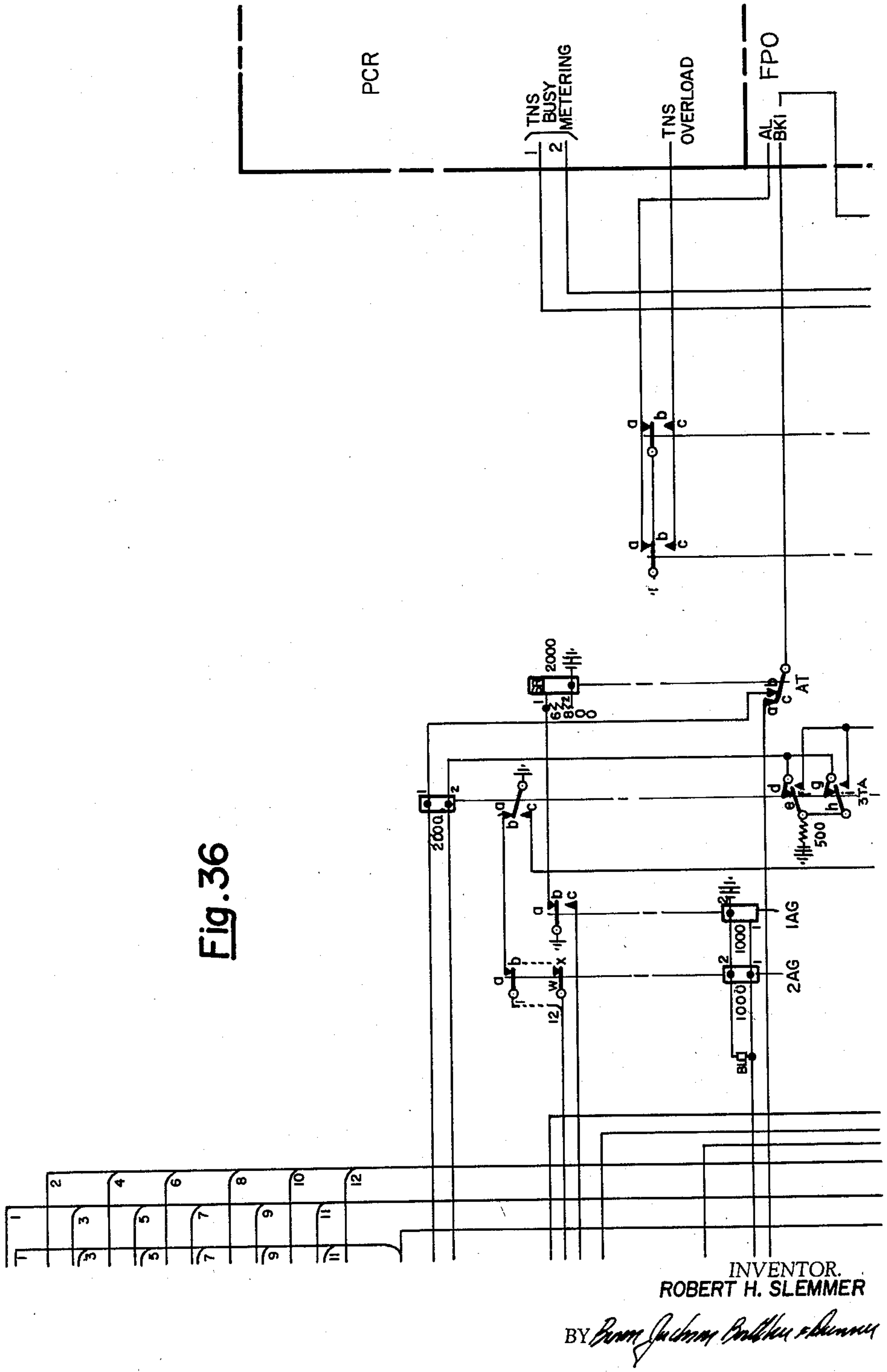
Figure 37:
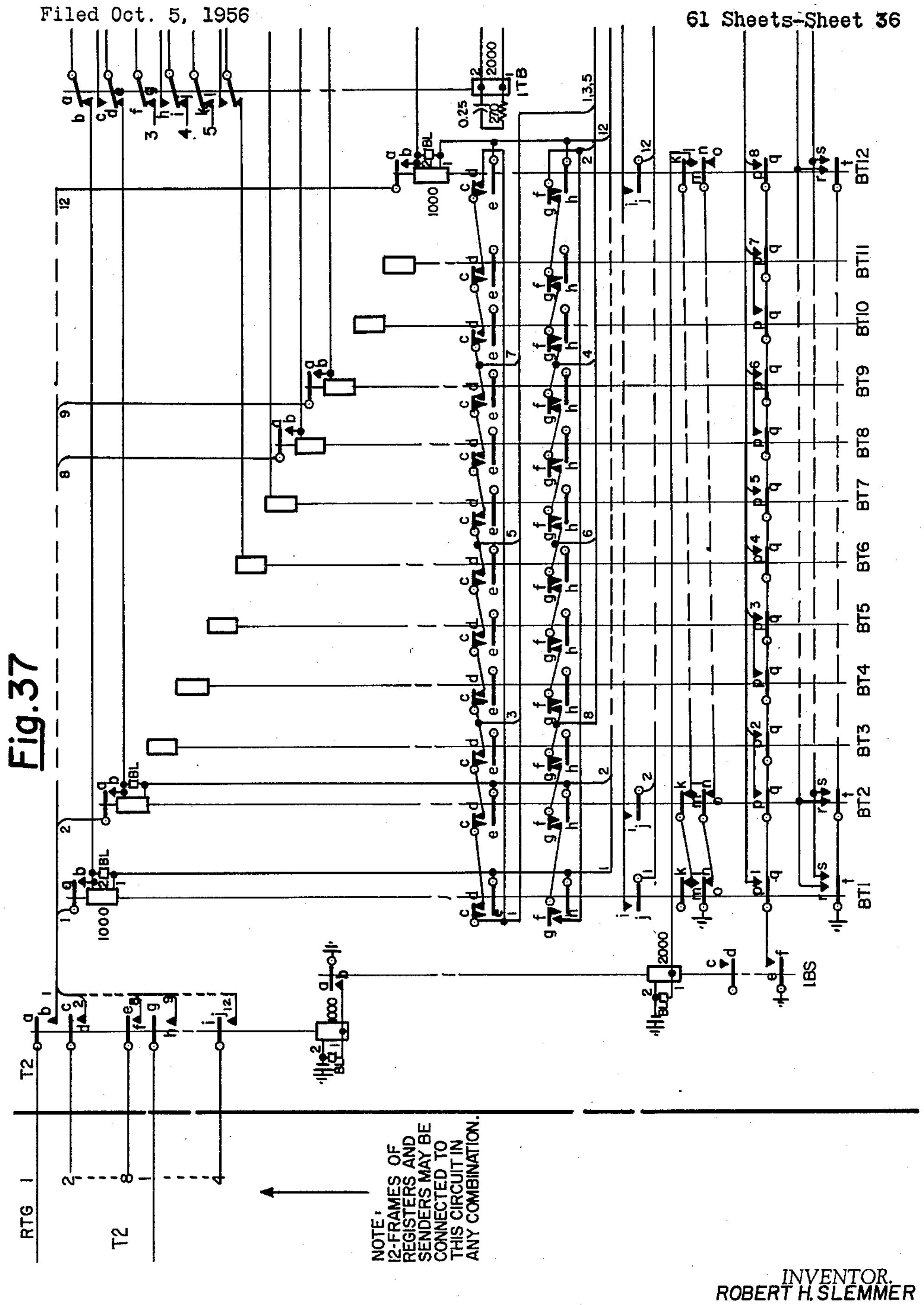
Figure 38:
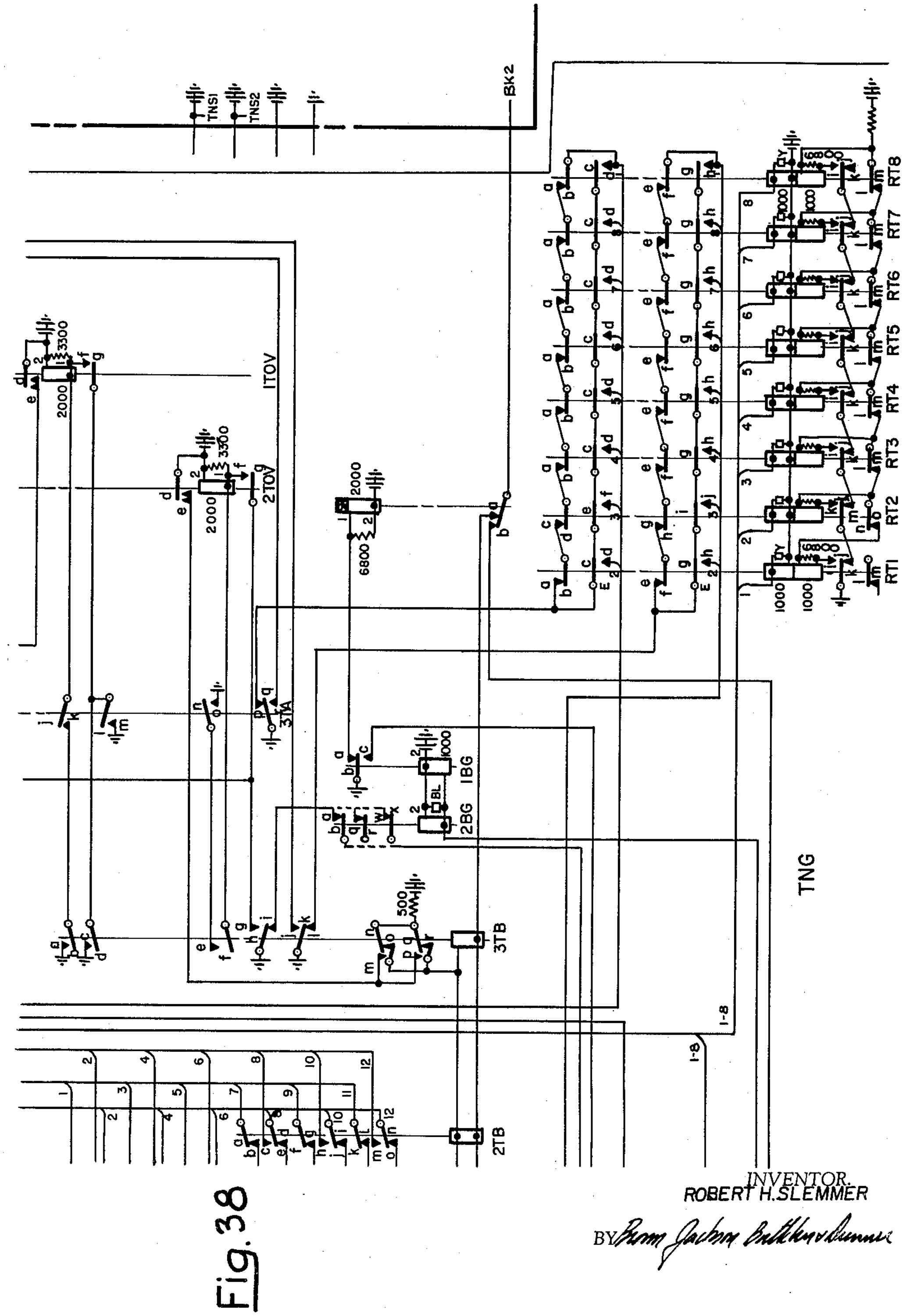
Figure 39:
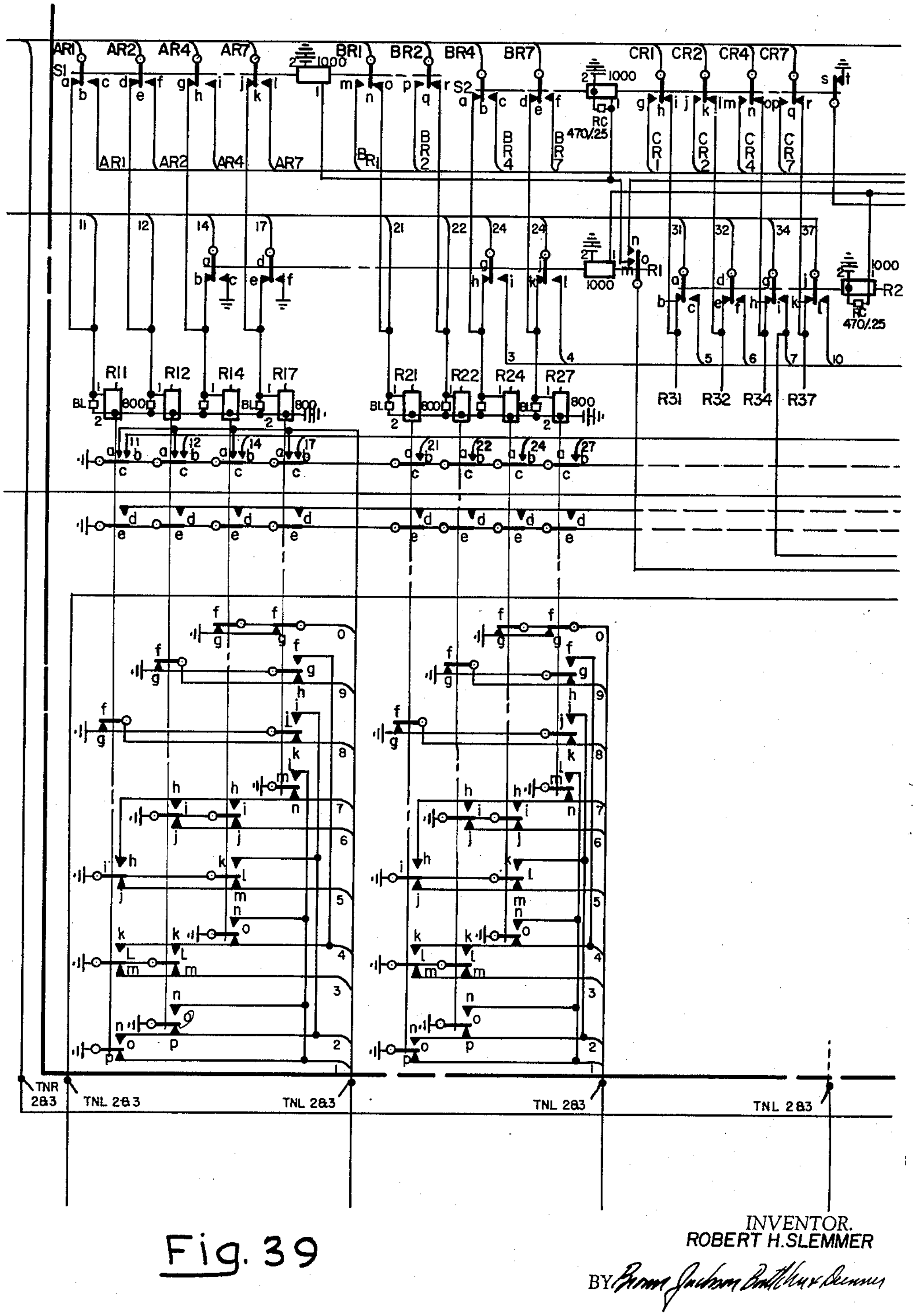
Figure 40:
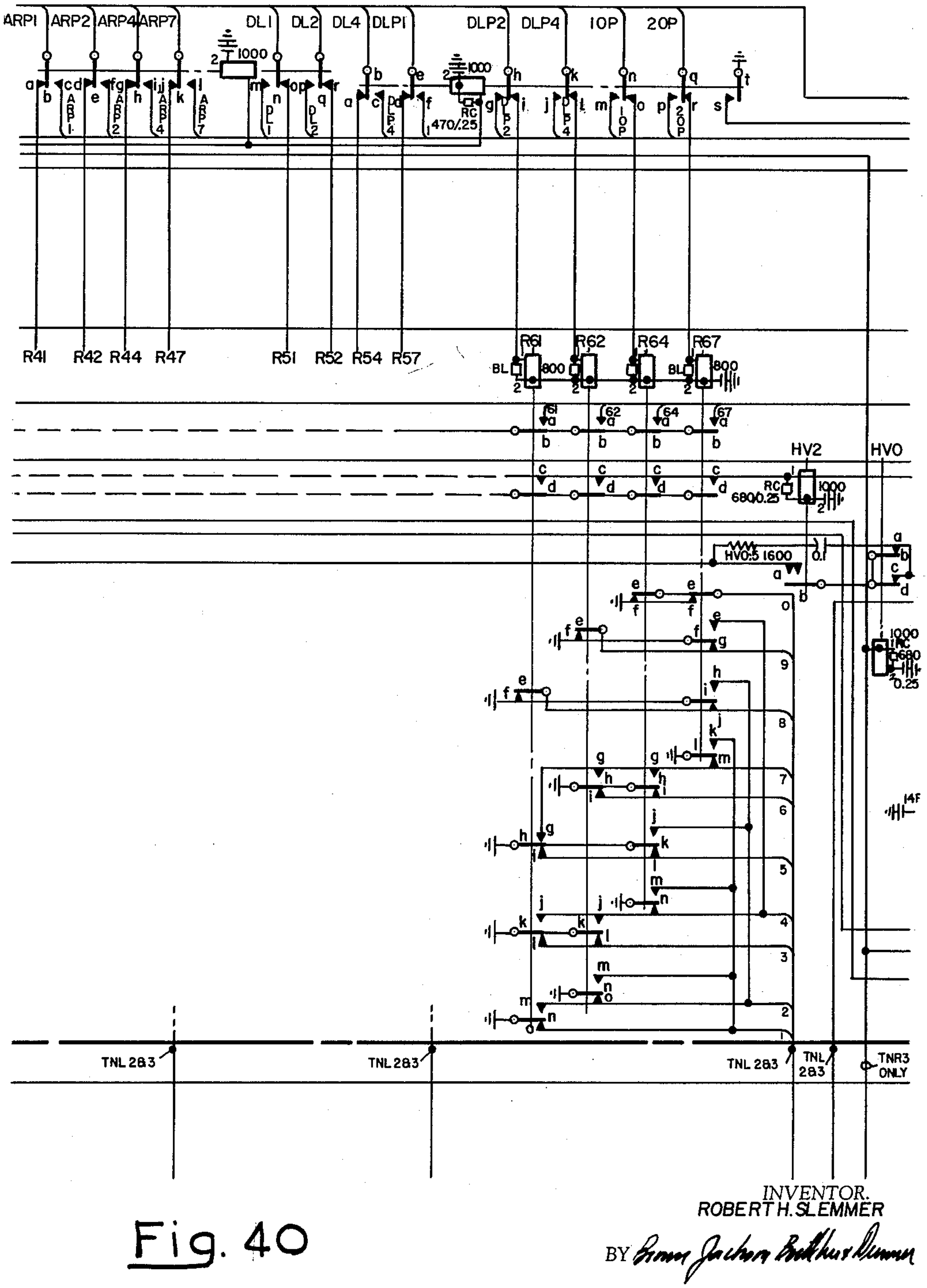
Figure 41:
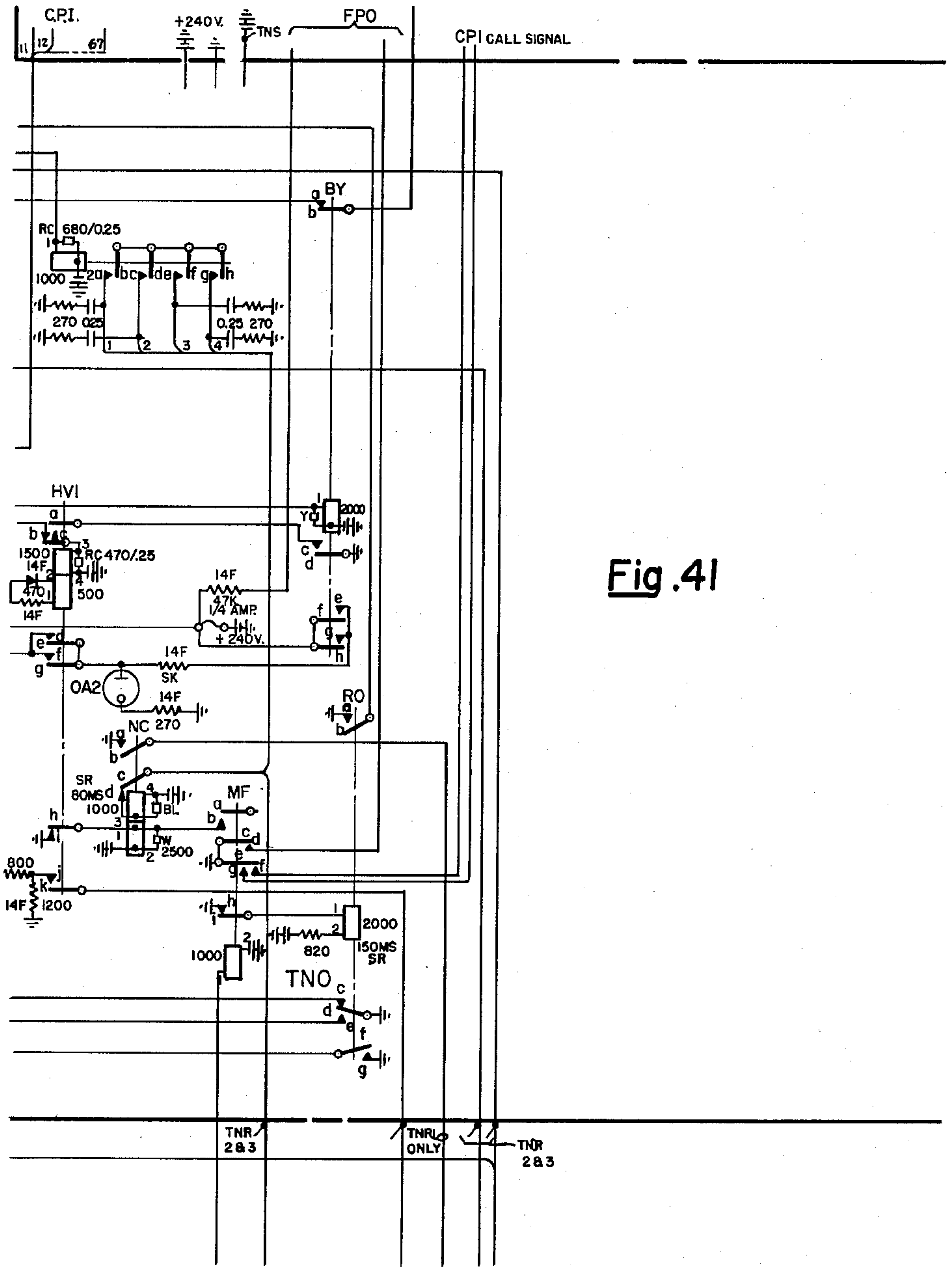
Figure 42:
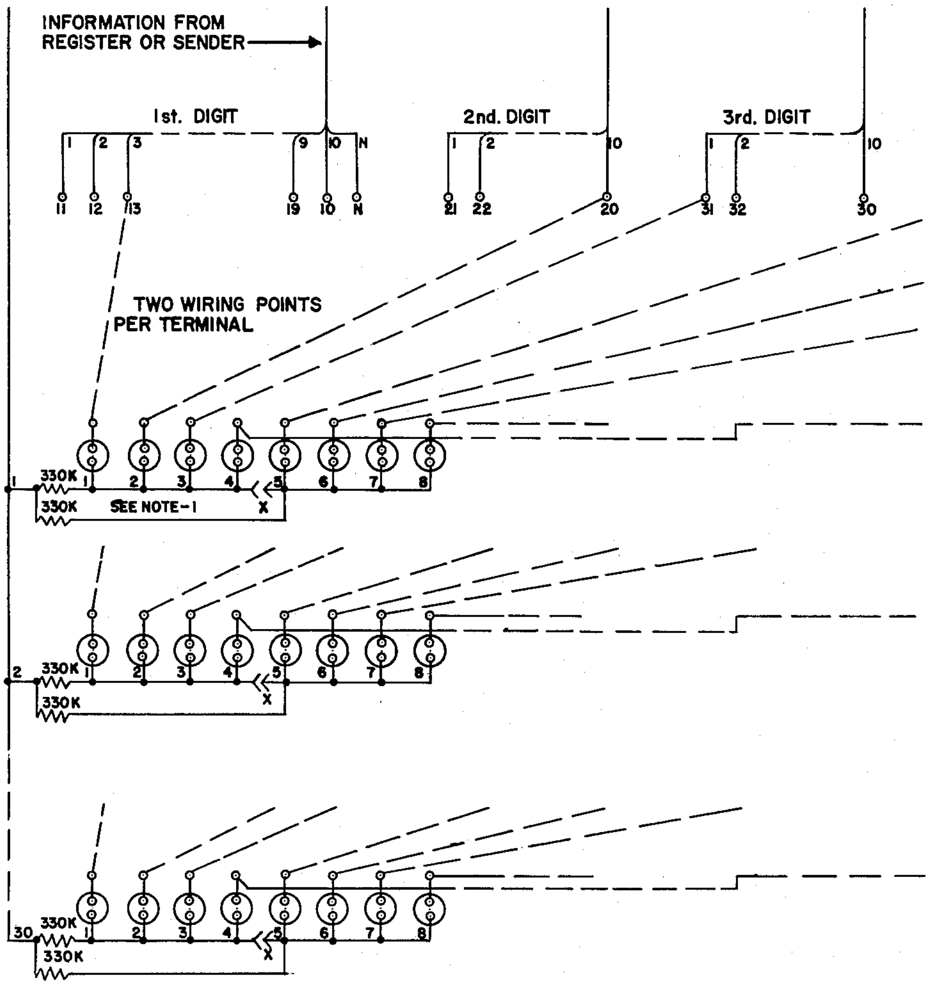
Figure 43:
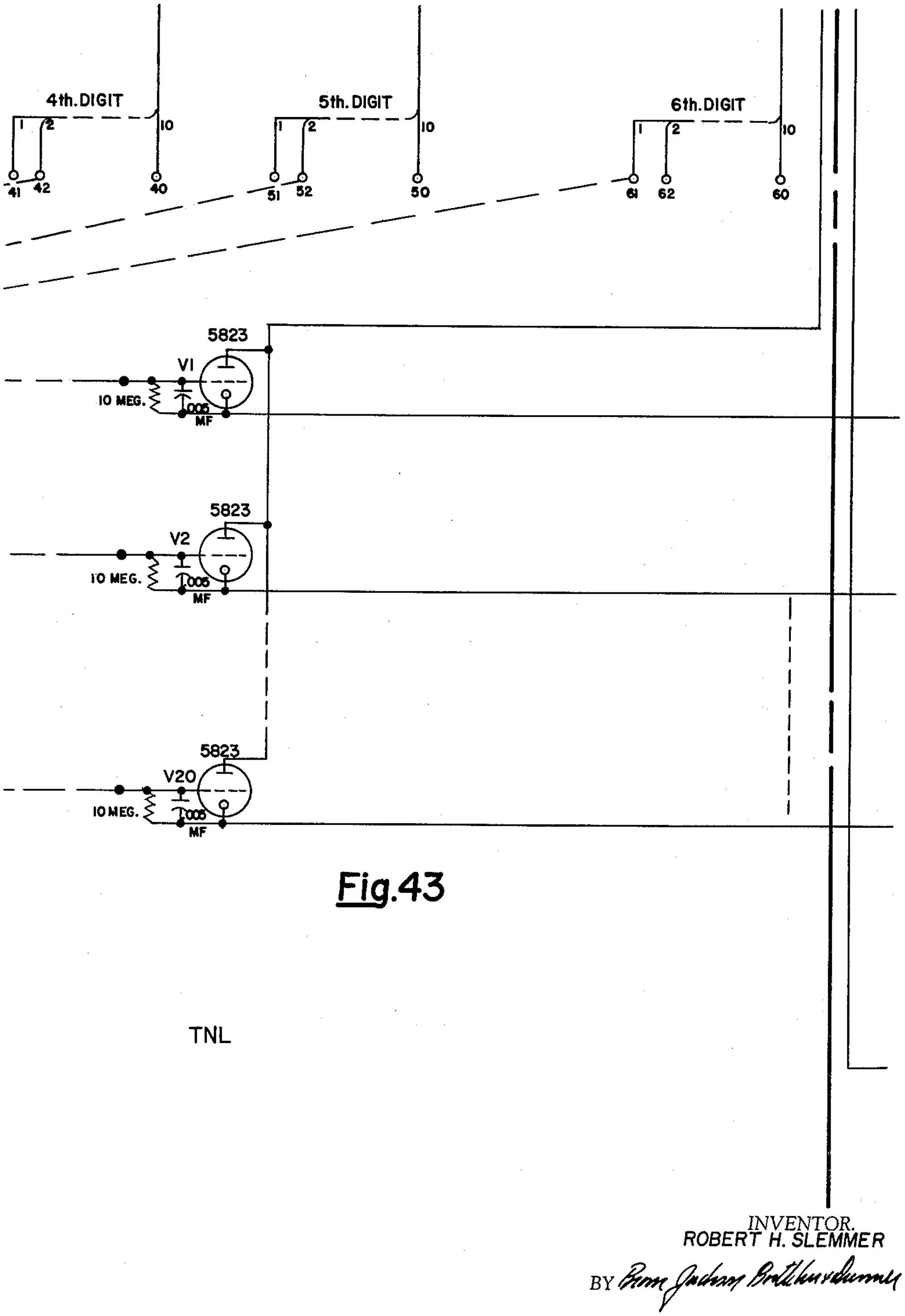
Figure 44:
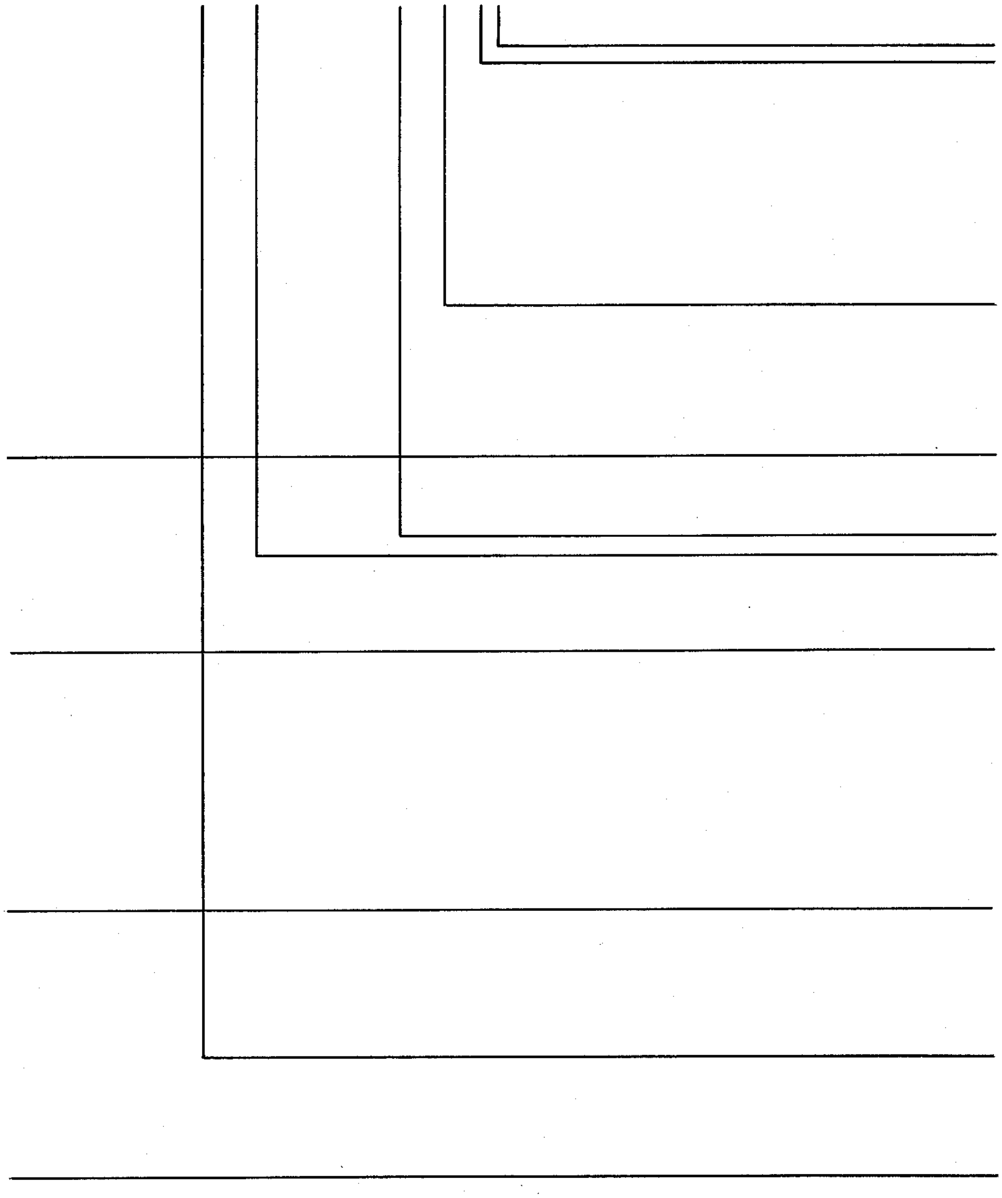

Responsive to engagement of a sender by a register, certain markings are received in the sender over conductors M1, M2, M3, and M4 via contacts of relay RSL (FIGURE 22).

For example, when a coin box trunk originates a call, register O connects 1200 ohm battery, which is designated "—R," on the M1 conductor, which passes through a rectifier and the lower windings of relays CB and MS in series to ground. High impedance relay CB operates alone to signal the sender that a coin box originated the call. When a measured service line originates the call, register O signals the sender by connecting direct battery (which is designated "—") over lead M1 through the rectifier; both relays MS and CB operate and thus notify the sender that a measured service line originated the call. It is noted that these relays lock over their upper windings.

If an automatic toll ticketing trunk originates the call, register I connects 1200 ohm battery to the M1 lead conductor, and relay CB operates to notify the sender of such fact. If a test trunk originates the call, register I connects direct battery on lead M1, and both relays MS and CB operate to notify the sender. If a toll trunk originates the call, register I connects 1200 ohm positive potential, which is designated "+R," over conductor M1, through a rectifier and the lower windings of relays LD and DR in series to ground, thus operating relay LD alone to indicate a toll trunk call. Whenever a delayed ring trunk originates the call, register I connects direct positive potential, designated "+," on lead M1; both relays LD and DR operate to notify the sender.

If a trunk requires direct outpulsing for a call, the register notifies the sender by connecting direct positive potential over conductor M2, through the rectifier and the lower winding of relay DOP to ground, to thus signal the sender. Relay DOP operates and closes contacts which mark the sender for direct outpulsing of the digits in register I immediately. If a local or special service code has been received in the register storage bins, the register notifies the sender by connecting direct negative potential over lead M2, through the rectifier and the lower winding of relay LSS, to ground. Relay LSS operates, and relays DOP and LSS lock over their upper windings.

The sender signals "proceed," "transfer," and "disconnect" to the register over lead M3 if the sender is associated with register O. If the sender is associated with register I, MF, or register DO, the sender signals "proceed," "transfer" and time out disconnect to the register over lead M3, normal disconnect or 2 dial stops disconnect over lead M2, CBY and LBY disconnect over lead M1.

The register signals the sender over lead M4 that the open period of the first pulse of an eighth or an eleventh digit (not counting toll ticketing code) has been received, thus notifying the sender to wait for the completion of said digit or digits.

If neither relay LSS nor relay DOP are operated, a circuit is completed after 20 milliseconds from ground, through break contacts of relays DOP and LSS and the upper winding of relay TCS to battery; relay TCS operates to notify the sender that a translator should be called in. At the proper time battery is connected over make contacts of relay TCS, and thus gives a call signal to the associated STG circuit requesting service of a translator. When a translator is called in, ground is connected over a lead back from the STG circuit through relay T1 or T2 to battery; relay T1 or T2 operates, according to which translator has been called in. The operated one of relays T1 and T2 extends leads (FIGURES 22, 21, 20) from register storage bins 1—6 via RSL, a break contact *a* of a transfer relay 1, make contact *a* of relay T1 or T2 as the case may be, to translator 1 or translator 2. At an appropriate time transfer relay 1 operates, transferring leads from the translator to the storage bins of the sender. It is noted that a path through contacts of T1 or T2 to these storage bins bypasses the contacts of transfer relay 1 as not all leads from the translator are transferred, but some run directly. Information from the translator may be received in storage bins 1st, 2nd, 3rd, 4th, 6th, 8th and 9th.

With reference to a call from a toll ticketing trunk through register I, relay CTD operates and marks the sender for customer toll dialing over the circuit which extends from battery through a resistor, the winding of relay CTD, I-wiring, break contact *c* of relay MS, make contact *b* of relay CB, break contact *b* of relay LD, I-wiring, to ground; it is noted that this circuit is independent of the contacts of relay FS.

When a local subscriber calls to a non-free-service destination (relay FS not operated), relay CTD operates and marks the sender for customer toll dialing over a circuit extending from battery through a resistor and the winding of relay CTD, O-wiring, contacts CB—*b*, LD—*b*, O-wiring, contacts LSS—*d*, FS—*b*, O-wiring, to ground. It is noted that on a call to a free service destination, relay FS operates from the translator and locks to disable this circuit.

Relay OFL is operated to mark a call to an official line.

*Direct outpulsing*

Assuming, for purposes of explanation, that an operator trunk has landed in the register over TRL crosspoints and has marked the register to indicate that the call was originated by a keyset trunk requiring direct outpulsing; the keyset trunk marks the register I over leads M1 and M2 as indicated hereinbefore and the register in response thereto switches connections from the counting chain to a code receiver, which receives direct current codes over the trunk on a 1 or 2 out of four basis.

The operator keys the called digits into the register; they are received by the code receiver, and stored on the registers. After keying, the operator's keyset transmits an ST signal, and the register calls in a sender over the RSG circuit, thereby extending conductors between the register and the engaged sender. Relay DOP operates and at its break contacts *b* prevents seizure of a translator and at its contacts DOP—*d* marks the sender for direct outpulsing, and at contacts DOP—*c* actuates a 10 p.p.s. speed setter by ground through optional wiring; this operation in turn actuates the pulse generator.

Figure 9:
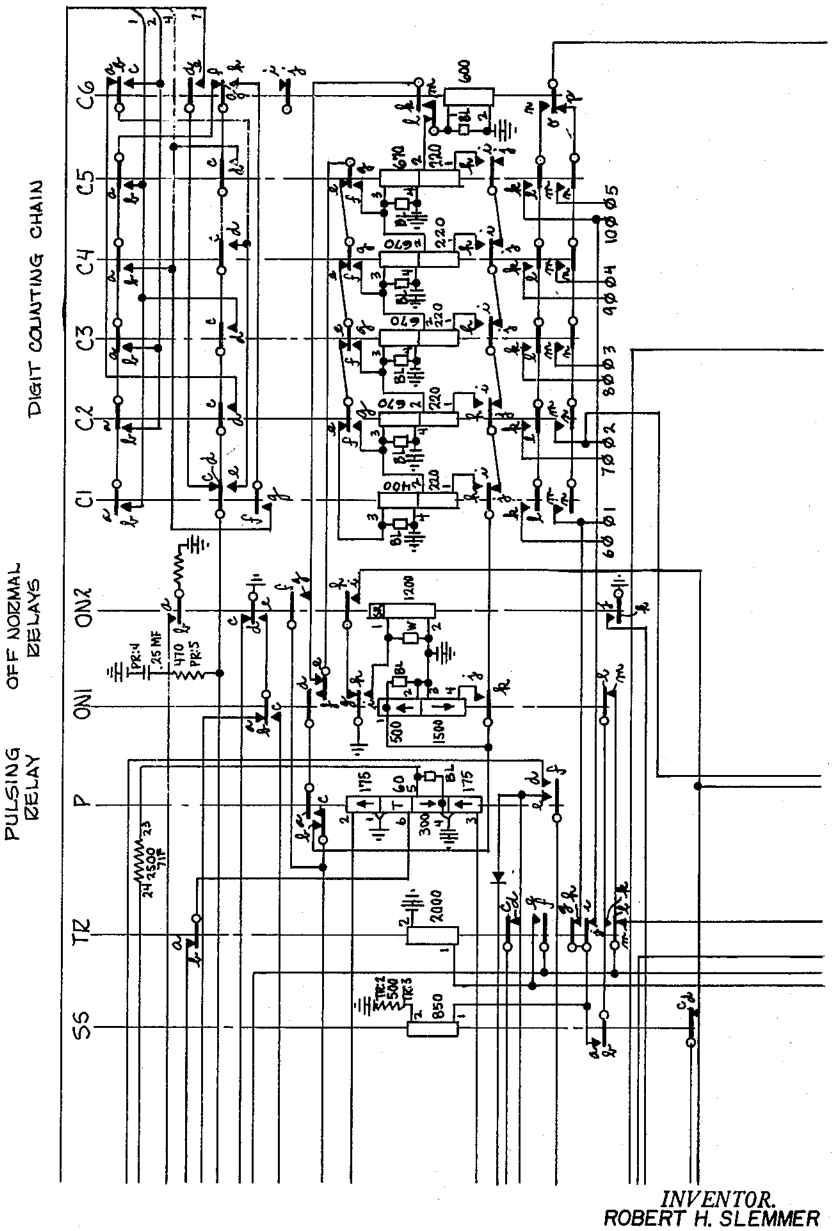

The pulse generator, via a counting chain and associated relay set, drives the outpulsing advance chain one step for each digit transmitted, beginning with outpulsing advance chain relay 1. When this relay is operated, the setting of the relays in the first storage bin of the register of FIGURE 9 is transferred over contacts of relay 1 to corresponding relays in the code converter; these circuits pass over RSL contacts. One such conductor is indicated by dotted lines in the "onpulsing advance chain" box. Thereupon the pulse generator in accordance with this setting transmits the indicated digit over the tip and ring connections, over make contacts of relay PT (shown in the cross bar code sender box) over RSL contacts, the register, TRL contacts, and over the associated calling trunk. The pulse generator and associated circuitry advances the Outpulsing Advance Chain to relay 2, whereupon the setting of storage bin 2 in the register of FIGURE 9 is transferred to the code converters over contacts of relay 2, and the pulse generator transmits the second digit to trunk, etc., until all digits in the register of FIGURE 9 have been sent.

*Call involving number group*

Assuming now that a CRA over SRL crosspoints or a trunk over TRL crosspoints has entered the register of FIGURE 9, it is further assumed that the digits of the called number LLN—NNNN have been received and stored in the first seven storage bins.

After the seventh digit is received, the register calls in a sender via RSG and RSL. Upon landing in the sender, the register, having recognized the local office code by the contents of the first three storage bins, gives the sender the "local or special service" signal by applying direct negative potential over the M2 lead; relay LSS operates and locks, and opens the circuit to relay TCS, preventing the seizure of a translator.

Over contacts such as *c* (shown in an enclosed box) of relay LSS, the setting of the first four storage bins of the register of FIGURE 9 is transferred to the first four storage bins of the sender.

On the basis of the registration in these first four bins, the sender selectively extends sender identification signals to a particular number group circuit which connects itself, if it is idle, over number group line contacts (NGL) to the calling sender. The number group looks back through the sender over break contacts such as contacts *c* of transfer relay 2 and RSL contacts at the contact fans of the 5th, 6th, and 7th storage bins of the register and makes a translation therefrom and returns to bins 5th, 6th, 7th, 8th, 9th, and 10th of the sender over a path indicated as Path A the called line group tens digit (5th bin); the called line group units digit (6th bin); the called hundreds digit (7th bin); the called units digit (9th bin), and the called party digit (10th bin). The sender is arranged to select either a 1000 directory number number group or a 2000 directory number number group, by means of optional strapping. Thereupon the sender gives the proceed signal to the register, which signals the CRA and in its turn the CRA calls in a group selector marker.

In addition the sender operates relay CSA4 in the crossbar Sending Advance Chain and crossbar code sender relays CS3, CS4, and CS5 in preparation for sending. This operation prepares a circuit to extend the Tip and Ring through contacts of the Crossbar Code Sender and contacts of relay CSA4; make contacts of relay CSA4 extend to the 5th and 6th sender storage bins.

However, relay PT is in the operated condition at this time, holding the Tip and Ring disconnected from the crossbar code sending facilities, and extending the Tip and Ring to circuitry responsive to the start signal from the group selector marker.

When the sender receives the start signal over tip and ring connections from the engaged group selector marker code receiver relay PT releases, initiating the sequential dropping of crossbar code sender relays CS3, CS4, and CS5. When PT releases, the Tip and Ring are connected to appropriate potentials through contacts of relay CS3, contacts of relay CSA4, and contacts of the sender 5th storage bin which indicates the first "*x*" digit to the group selector marker which was called in (assuming one stage of group selector).

When relay CS3 releases, relay CS4 has not yet released and the Tip and Ring will be open at contacts of CS4.

When CS4 releases and CS5 has not yet released, the Tip and Ring are connected to appropriate potentials through break contacts of relay CS4 and make contacts of relay CS5, relay CSA4, and contacts of the sender 6th register bin which indicates the second "*x*" digit on the group selector marker.

When relay CS5 releases, the Tip and Ring are opened. (With digits XX in the group selector marker, the marker is enabled to extend the connection to a CRB circuit in the called 500 line group.)

Relay PT reoperates.

Relay CSA5 operates and CSA4 releases. The sender operates relays CS3, CS4, and CS5. When the sender receives the start signal from the CRB circuit code receiver, relay PT releases, the Tip and Ring are connected to appropriate potentials over make contacts of relay CS3, make contacts or relay CSA5, and contacts of the sender 11th storage bin to appropriate potentials relays which indicate the value of the class of origin digit on the CRB circuit.

When relay CS3 releases with CS4 still operated, potentials are disconnected from the Tip and Ring.

When relay CS4 releases with relay CS5 still operated, the Tip and Ring are connected over make contacts of relay CS5, make contacts of CSA5, and contacts of the sender 10th storage bin relays to appropriate potentials which indicate the value of the called party digit to the CRB circuit.

Relay PT reoperates.

Relay CSA6 operates and relay CSA5 releases. The sender operates relays CS1, CS2, CS3, CS4, and CS5. With the class of origin and party digits in the CRB circuit, the CRB circuit is properly marked and extends connections to a subscriber's line marker SLM. When the sender receives the start signal from the code receiver in SLM relay PT releases, and the Tip and Ring are connected through make contacts of relay CS1, make contacts of relay CSA6, and contacts of the sender 7th storage bin relays to appropriate potentials which mark the called hundreds digit to the subscriber's line marker.

When relay CS1 releases with CS2 operated, potentials are disconnected from Tip and Ring.

When relay CS2 releases with CS3 still operated, Tip and Ring are extended over make contacts of CS3, make contacts of CSA6, and contacts of the sender 8th storage bin to appropriate potentials which indicate to the SLM code receiver the value of the translated called tens digit.

When relay CS3 releases with relay CS4 still operated, potentials are removed from Tip and Ring.

When relay CS4 releases with CS5 still operated, Tip and Ring are extended to appropriate potentials over contacts of CS5, CSA6, and contacts of the sender 9th storage bin relays to indicate the translated called units digit to the SLM code receiver.

Relay PT reoperates.

Relay CSA7 operates and with the receipt of a signal back from the CRB, the sender gives the register a release signal.

*Special service code calls*

The receipt of special service codes, and the operation of equipment responsive thereto, will now be described.

Special service codes are received in the register and stored in the first one, the first three, or the first four storage bins thereat.

Responsive to the particular code received, the register calls in a sender after the first, third, or fourth digit and the special service code is transferred to the sender storage bins 1st; or 1st, 2nd and 3rd; or 1st, 2nd, 3rd, and 4th as the case may be.

When "0" is received requesting dial assistance, special service code relay 0 is operated in series with relay SS by the 1st sender storage bin. When "110" is received to reach the toll operator, relay 110 is operated in series with relay SS by the 1st, 2nd, and 3rd storage bins. When other local special service codes indicated by the formula 11X are received, relay LSS is operated in series with relay SS. When test special service codes indicated by the formula 10X are received, relay TSS1 is operated in series with relay SS. When toll special service codes of the variety 1X1 are received, relay TSS2 is operated in series with relay SS. When toll special code of the TX (delayed service) variety indicated by the formula 11XX are received, relay TX is operated in series with relay SS.

When the special service is reached from a single group selector or a first group selector, relays CSA4, PT, CS3, CS4, and CS5 are operated and digits are sent to the group selector code receiver via tip and ring over contacts of CSA4 and contacts of a special service relay, etc., as these relays perform.

When the special service is reached from a second group selector, relays CSA3, PT, CS3, CS4, and CS5 are operated. Through contacts thereof, appropriate potentials are placed on Tip and Ring to send 50 or 90 to the group selector marker code receiver as PT, CS3, CS4, and CS5 perform, as a local or toll special service call, respectively, is involved; relays CSA4, PT, CS3, CS4, and CS5 operate and apply appropriate potentials to Tip and Ring over contacts of a special service relay, etc., as they perform.

For example, if 0 is received and the dial assistance trunks are reached over a single group selector, relay 0 is operated in series with relay SS. Relays CAS4, PT, CS3, CS4, and CS5 operate and relays PT, CS3, CS4 and CS5 perform: When relay PT releases with relay CS3 still operated, Tip and Ring are connected through make contacts of relays CS3, CSA4, relay 0 to appropriate potentials to send first the "Y" digit to the group selector marker code receiver. The circuits for marking these potentials pass through contacts of "coin box" relay CB so that if relay CB is down, "7" is sent as the first digit, and if CB is operated, "6" is sent as first digit. When relay CS3 releases with CS4 still operated, the potentials are removed from Tip and Ring. Relay CS4 releases with CS5 still operated and Tip and Ring are connected to appropriate potentials through contacts of the 9th storage bin to send the second "Y" digit to the group selector marker code receiver. This "Y" digit may be "2." Thus on a regular local call the sender extends connections to a dial assistance operator only one group of trunks by sending 72, whereas on a call from a coin box, the sender extends connections to a dial assistance operator over a different group of trunks by sending 62.

As another example, if 113 is received and the local information trunks are reached from a single group selector, relay LSS becomes operated in series with relay SS over contact fans of sender storage bins, 1st, 2nd, and 3rd; and the setting of the sender third storage bin is transferred to the sender 9th storage bin. Relays CSA4, PT, CS3, CS4, and CS5 operate. When the start signal from the group selector marker is received, Tip and Ring are connected to appropriate potentials through contacts of relays CS3, CSA4, and contacts of the unoperated sender 8th storage bin relays, thus sending the first "Y" digit, which may be "7," to the group selector marker; when relay CS3 releases with CS4 operated, potentials are removed from Tip and Ring. Relay CS4 releases and appropriate potentials are applied to Tip and Ring through contacts of relays CS5, CSA4, and contacts of the activated sender 9th storage bin relays, to send the second "Y" digit to the group selector marker. If the 113 trunks had been reached from a second group selector, relays PT, CS3, CS4, and CS5 and CSA3 would have been operated and responsive to receipt of the start signal from the sender, the Tip and Ring would have been connected to appropriate potentials via contacts of relays CS3, CSA3, and LSS to send digit "5" to the group selector marker. When relay CS3 releases with CS4 still operated, potentials would have been removed from Tip and Ring. Then relay CS4 would have released, connecting Tip and Ring through contacts of relays CS5, CSA3 and LSS to send digit "0." This would have enabled the group selector marker to switch connections through the first group selector to the second selector calling in a second selector group selector marker. When the start signal is received Tip and Ring connections would be connected to appropriate potentials through contacts of relays CS3, CSA4, and contacts of the unoperated sender 8th storage bin and the sequence described above would ensue to enable the second group selector marker to route the call through the second group selector to an idle 113 trunk.

By way of further example, if 121 had been received, the setting of register bins 1st, 2nd, and 3rd of FIG. 9 would have been transferred to sender bins 1st, 2nd and 3rd, and relay TSS2 would have been operated as a result of the setting of these storage bins. If the toll inward trunk 121 is reached from a second group selector, relays PT, CSA3, CS3, CS4, and CS5 would be operated. When the start signal is received from the first group selector, the Tip and Ring would be connected to appropriate potentials to send 90.

Relays PT, CSA4, CS3, CS4, and CS5 would be operated and when the start signal from the second group selector is received the Tip and Ring would be connected to appropriate potentials to send "92."

On a call to a multipurpose trunk into which is sent a digit, the sender operates as aforedescribed to reach the multipurpose trunk through the operation of CSA4 and CSA3 if the multipurpose trunk is off a second group selector. Subsequently relays PT, CSA5, CSB, CS4 and CS5 operate. When the start signal is received from the trunk, relay PT releases and these other relays perform. When relay CS4 releases with CS5 still up, the Tip and Ring are connected to appropriate potentials, to send the said digit into the multipurpose trunk, through contacts of the 10th storage bin in the sender.

*Call involving translator*

As a result of translation of the digits up to six in the register looked at by the translator back through the sender, the translator may store a primary routing digit in the 1st storage bin in the sender and alternate routing digits in none, any or all of the 2nd, 3rd, and 4th storage bins in the sender. If there are no alternate routing digits the translator may store primary routing digits in any or all of the 2nd, 3rd, and 4th storage bins in the sender. Also the translator may store a B digit in the 8th sender storage bin and a C digit in the 9th sender storage bin to route the call through the crossbar switches to a trunk if only one stage of group selection is involved. If two stages of group selection are involved the translator stores digit A in the 6th bin, digit B in the 8th bin and digit C in the 9th bin. In this case the sender supplies a 4 as the first digit and sends 4A to the first group selector marker and BC to the second group selector marker. Additionally, the translator may store information in a "Delete Pri" bin comprised of three relays which may be operated in combination to indicate a count of 1 to 6; such operation informs the sender to delete from 1 to 6 of the digits first received in the register if the primary route is used so that they will not be outpulsed subsequently. Alternately the translator may store information on the three relays which may be operated in combination to indicate a count of 1 to 6, which count informs the sender to delete 1 to 6 of the digits first received in the register if the alternate route is used so that they will not be outpulsed subsequently. Additionally the translator may operate a free service relay FS, to notify the sender that a free service destination has been dialed so that the sender may so handle the call. Also other markings may be received in the sender from the translator.

It is also noted that single group selector relay SGS operates to route calls through a single group selector, unless it is disabled. Accordingly, if digit A from the translator is in the 6th bin, 6th bin contacts disable the circuit of relay SGS. (Also, on calls to local the circuit completed over contacts in sender bins 5 and 6 on calls to certain 500 line groups disables the circuit of relay SGS.)

To continue the explanation, it is now assumed that primary and alternate digits have been stored in sender bins 1—4; digit A in the sender 6th bin; B in sender 8th bin; C in sender 9th bin; that a "delete three digits" delete signal has been received on primary and "delete no digits" signal has been received on alternate; and that XX'X"—LLN—NNNN—N is stored in the register bins of FIG. 21.

Relays PT, CSA3, CS3, CS4, and CS5 operate. When the start signal from the first group selector marker is received, relay PT releases and relays CS3, CS4, and CS5 release in turn, sending digits BC to the second group selector marker, thereby enabling same to extend the connections to the trunk. For the B digit, appropriate potentials are connected to the Tip and Ring through contacts of the 8th sender storage bin; for the C digit, through contacts of the sender 9th storage bin.

Thereupon relay CSA7 operates and relay PT reoperates; assuming an idle trunk on the primary route was engaged, the pulse generator drives the outpulsing advance chain.

Relay AR operates, and the pulse generator sends the primary routing digit as stored in the sender 1st storage bin out over the trunk to switch connections through a tandem point. As a primary route was used, relays BR and CR are passed over (being so conditioned by the sender). In addition, relays 1, 2, and 3 are passed over, being so conditioned by the "Delete Pri" bin.

Relay 4 of the outpulsing advance chain operates, and the pulse generator sends out over the Tip and Ring the digit L, found in the register 4th storage bin.

Relays 5–10 of the "Outpulsing Advance Chain" operate inturn; the pulse generator sends out over the Tip and Ring the corresponding digits as found in register storage bins 5–10, to extend connections through the distant exchange and ring the called party.

In the event that the group selector marker has been unsuccessful in routing the call to a trunk on the primary route because all trunks are busy, the group selector marker notifies the sender. Assuming that no delete information was received from the translator in Delete Alternate Bin DL, the outpulsing advance chain runs through relays AR, BR, CR, 1–10, sending three alternate digits (if three were supplied from translator), and the digits XX'X"—LLN—NNNN. As relays AR, BR, and CR operate, connections are made from the 2nd, 3rd, and 4th storage bin fans to the code converters; and as relays 1–10 of the advance chain operate, connections are made from the contact fans of the 1st–10th storage bins of the register (FIG. 21) to the code converter relays.

*Toll ticketing call involving translator*

Having described a call utilizing the translator, a call which employs the translator and also engages toll ticketing equipment will now be described. When a call to a toll destination is originated, the sender engages the translator, and the free service relay FS does not operate; relay CTD operates as described hereinbefore, and all of the relays CSA1–CSA7 operate and release in turn.

With relays PT, CSA1, CS3, CS4, and CS5 operated responsive to receipt of the start signal from the first group selector marker, relay PT releases. Appropriate potentials are connected to Tip and Ring over make contacts of CS3 and CSA1 to send digit "6" to the first group selector marker. When relay CS3 releases while relay CS4 remains operated, potentials are removed from Tip and Ring. When CS4 releases with CS5 still operated, appropriate potentials are connected to Tip and Ring over break contacts of CS3, break contacts of CS4, and make contacts of CS5 and CTD, to send digit "8" to the first group selector marker. This operation enables the first group selector marker to extend connections to a TRT circuit. Relay CSA1 releases; relay PT operates, switching Tip and Ring to the pulse generator.

Figure 21:
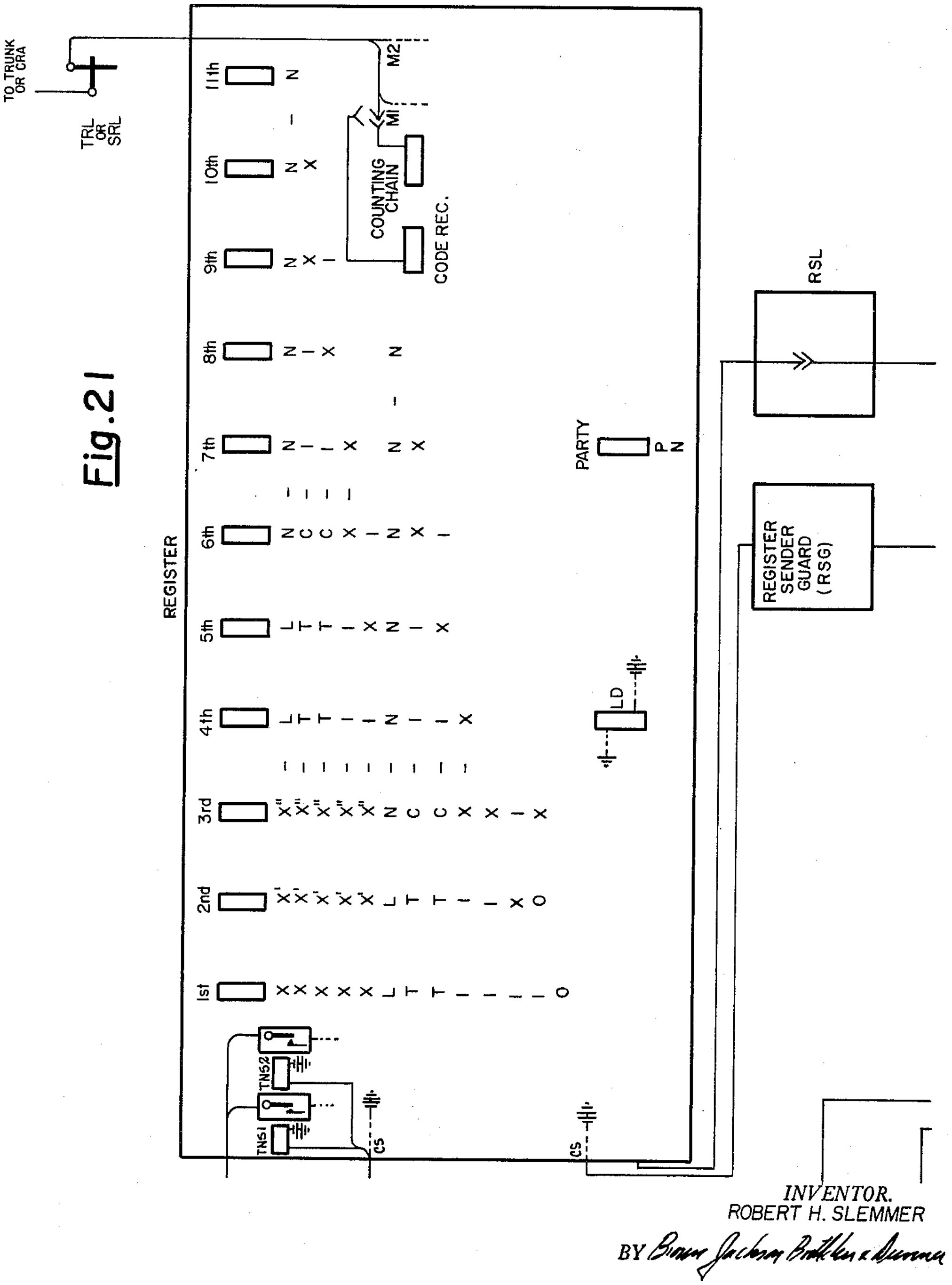

Upon receipt of the start signal from the TRT circuit, relay AR of the outpulsing advance chain operates and the code converter relays are connected over make contacts of relay AR and path B to the contact fans of the party bin of the register of FIG. 21. Accordingly the pulse generator places direct current code signals on the Tip and Ring to the TRT corresponding to the calling party identification digit which is stored in the TRT.

As relays 1–10 of the outpulsing advance chain operate, connections are made between the contact fans of the 1st to 10th storage bins of the register of FIG. 21 and the code converter relays, so that the pulse generator places D.C. signals on the Tip and Ring to the TRT to enable the code punch associated therewith to punch the paper tape accordingly. Obviously, if fewer than ten bins contain the called number in the register of FIG. 21, only these digits are sent to the TRT. An extra digit, called the ST signal, is sent to the TRT to thereby indicate that all digits have been sent, and relay CSA2 releases. The TRT calls in a first group selector marker (assuming only one stage of group selection). The operation and release of relay ST causes the CSA chain to advance.

Relays PT, CSA4, CS3, CS4, and CS5 operate.

Responsive to receipt of the start signal from the first group selector marker (assuming only one group selector stage), relay PT releases, and the Tip and Ring are connected to appropriate potentials to send the B digit to the group selector marker, through contacts of storage bin 8.

When relay CS3 releases with relay CS4 still operated, potentials are removed from Tip and Ring.

When CS4 releases with CS5 still operated, Tip and Ring are connected to appropriate potentials through contacts of the 9th storage bin to send the C digit to the group selector marker; relay CSA4 releases.

Relays CSA7 and PT operate. Relay PT switches Tip and Ring to the pulse generator. The operation of relay CSA7 steps the outpulsing advance chain. When the group selector marker succeeds in routing the call over the primary route, relay AR operates and connects the code converter to contacts of the first storage bin. When the group selector marker fails to reach a primary route and uses an alternate route, relays AR, BR, and CR operate sequentially, connecting Tip and Ring in turn to the contacts of 2nd, 3rd, and 4th storage bins to enable the pulse generator to send routing digit or digits as determined thereby. Thereafter relays 1–11 of the outpulsing advance chain operate in sequence to enable the pulse generator to send the corresponding digits as found in the register storage bins. Each relay that operates connects the code converter to the contacts of the associated bin in the register of FIG. 21.

When the DELETE PRI bin DRP is actuated, from one to six of the outpulsing advance chain relays 1–6 may be passed over.

If the DELETE ALT. bin DL is actuated, from one to six of the outpulsing advance chain relays 1–6 may be passed over.

*Toll ticketing call from ticketing trunk to local*

To extend a call from a ticketing trunk, relay CB operates to mark the sender and completes a circuit to operate customer toll dialing relay CTD, which in turn is effective to mark the sender. This path extends from battery through a resistor, over the winding of relay CTD, I-wiring, contacts MS—*c*, CB—*b*, LD—*b*, and I-wiring to ground.

All of the relays CSA1–CSA7 operate and release in sequence.

Relay CSA1 operates, as do relays PT, CS3, CS4, and CS5. Responsive to receipt of the start signal from the group selector marker, relay PT releases and relays CS3, CS4, and CS5 release, sending digits 66 which enables the group selector marker to route the call to a TRT trunk. Relay CSA1 releases and relays CSA2 and PT operate, switching the call signal receiving circuitry and the outpulsing advance chain.

Responsive to receipt of the start signal from the TRT, relays AR and 1–11 of the outpulsing advance chain operate in sequence, causing the pulse generator to send calling digit P and as many of the digits as are found in register bins 1–11. Relays PT, CSA2, CS3, CS4, and CS5 operate, and relay CSA2 releases.

Upon receipt of the start signal from the first group selector marker, relay PT releases and the Tip and Ring are connected to appropriate potentials to send the first "X" digit through make contacts of CS3, CSA4, and the contact fans of the 5th storage bin (line group tens bin), thus responding to the information returned from the number group. (This assumes one stage of group selection.)

When relay CS3 releases with relay CS4 still operated, potentials are removed from Tip and Ring.

When CS4 releases with CS5 still operated, Tip and Ring are connected to appropriate potentials to send the second "X" digit to the group selector through break contacts of CS3, break contacts of CS4, make contacts of CS5, make contacts of CSA4, and contacts of the 6th storage bin of the sender (line group units bin), thus responding to information received from the number group. CSA4 releases.

Relays PT, CSA5, CS3, CS4, and CS5 operates.

When the start signal is received from the CRB, relay PT releases and the Tip and Ring are connected to appropriate potentials; the first digit is thus transmitted to the CRB through make contacts of relays CS3, CSA5, and the contacts of storage bin 11 which comprises contact fans of calling class relays MS, CB, LD, and DR.

Responsive to release of relay CS3 with relay CS4 still operated, potentials are removed from Tip and Ring. When CS4 releases with CS5 still operated, Tip and Ring are connected to appropriate potentials to send the called party digit to CRB over break contacts of CS3 and CS4, make contacts of CS5 and CSA5, and the contact fan of the 10th storage bin of the sender, thus responding to the party information received from the translator.

Relay CSA5 releases.

Relays PT, CSA6, CS1, CS2, CS3, CS4 and CS5 operate.

Upon the receipt of the start signal from the subscriber's line marker, relay PT releases. As aforedescribed, while relays CS1–CS5 perform, correct potentials are connected to Tip and Ring to give three signals to the SLM, these potentials being placed on Tip and Ring as follows: the hundreds digit from the contact fan of the sender 7th bin through contacts of CSA6 and CS1; the tens digit from the contact fan of the sender 8th bin and contacts of CSA6 and CS3; and the units digit through contacts of the sender 9th bin and contacts of relays CSA6 and CS5; thus the equipment responds to information returned from the number group.

Relay CSA6 releases and relay CSA7 operates, and the Tip and Ring are connected to receiving circuitry in preparation to receive a completion, congestion busy, or line busy signal from the group selector marker, whereby the call is completed or connections released.

If the call had been to a distant subscriber through a second group selector, relays CSA3, CSA4, and CSA7 would have operated instead of CSA4, CSA5, CSA6, and CSA7.

With relay CSA3 operated, appropriate potentials are applied to Tip and Ring through make contacts of relays CS3 and CSA3 to send "4" to the first group selector; and through break contacts of CS3, CS4, and make contacts of CS5 and CSA3, and the contact fan of the sender 6th storage bin, thus reacting to information received from the translator.

When relay CSA4 is operated, appropriate potentials are placed on Tip and Ring through make contacts of CS3 and CSA4 and contact fan of the sender 8th storage bin, thus reacting to information received from the translator; and through break contacts of CS3 and CS4 and make contacts of CS5 and CSA4 and contact fan of the sender 9th storage bin, thus responding to information from the sender.

Subsequently relays PT and CSA7 operate, connecting the Tip and Ring as aforedescribed.

It is noted that a relay SGS (single group selector); a relay NG (number group); SS (special service); and ICT (intercept) signify these different situations. Certain paths for applying appropriate potentials to Tip and Ring are controlled by these relays.

*Additional consideration of sender*

*Storage bins 1–4*

Referring now to storage bins 1–4, it is apparent that on calls to local, the settings of the first four bins of the register of FIG. 21 are transferred to storage bins 1–4 of the sender, thus placing LLNN in these bins. If the value of these digits indicates a call involving a number group, relay NG operates. On a call to a TX operator, 11XX is transferred from the register to these sender bins. On a call to a local service operator, the digits 11X are transferred from the first three bins of the register to the first three storage bins of the sender. On a call to a toll special service, digits 1X1 are thus transferred. On a call to a test trunk, digits 10X are thus transferred, and on a call to a dial assistance operator, digit "0" is thus transferred.

On calls for which the sender calls in a translator, the translator may store a primary routing digit in the first bin and from one to three alternate routing digits in the 2nd, 3rd, and 4th bins; or if there are no alternate routing digits, the translator will store from one to three routing digits in the 2nd, 3rd, and 4th bins.

*Special service code relays*

When the first storage bin contains the digit "0," a special service code relay 0 operates to indicates a call to a dial assistance operator.

When the first three storage bins contain the digits 110, a special service code relay 110 operates to signify a call to a long distance operator.

When the first three storage bins contain the digits 11X (but not 110), a special service code relay LSS operates to mark a call to a "local special service."

When the first three storage bins contain the digits 10X, a special service code relay TSS operates to mark a call to a "toll special service code" of a first variety.

When the first three storage bins contain the digits 1X1, a special service code relay TSS2 operates to mark a call to a "toll special service code" of a second variety.

Relay SS (special service) operates in series with any of the aforementioned special service code relays.

*Storage bins 6–10*

When a call involving a number group is initiated, the number group stores information as to the terminal location of the called line in these bins as follows: line group tens digit information in bin 5, line group units information in bin 6, the hundreds digit of the called line in bin 7, the tens digit of the called line in bin 8, the units digit of the called line in bin 9, and the party digit of the called party in the line in bin 10.

For calls in which a translator is called in by the sender, the translator stores an "A" cross-bar routing digit in the 6th storage bin. This digit, together with a "4" supplied elsewhere by the sender, enables the sender to transmit the digits 4A to a first group selector marker, to route a call through the first group selector to a second group selector when the called trunk is off the second group selector. The translator also stores a "B" routing digit in bin 8 and a "C" routing digit in bin 9, to enable the sender to send digits BC to the second group selector marker to route the call from the first selector through the second selector. If only one group selector is involved, the translator stores only the B and C digits and does not store the A digit in the sender. If the A digit is not found in the 6th bin, "single group selector" relay SGS, in the group of relays designated "CSA" chain control relays, operates.

For a 11X call, the third digit X is transferred from bin 3 to bin 9. On a 1X1 call the second digit X is transferred from bin 2 to bin 9.

For a 10X call the third digit X is transferred from bin 3 to bin 10.

On a 11XX call, the first three digits 11X are used to operate the TX relay. With one type of optical wiring (not shown), this digit is transferred by relay TX from the fourth bin to the 9th bin, becoming the second "z" digit for trunk routing; ten values of X (or "Z") are possible, and each value routes to a TX team. The first "Z" digit is supplied over make contacts of relays SS and TX. With an alternate type of optional wiring connected instead, the fourth digit X of 11XX is transferred by relay TX from the 4th bin to the 10th bin for transmission to a code receiver in the TX trunk, whereby the trunk routes to a particular team of ten TX teams.

*Storage bin 11*

Certain contacts of calling class relays MX, CB, LD, and DR constitute an 11th storage bin, whereby the sender is marked as to the origin of the call when sending to the CRB.

*Intercept relay 1CT*

Whenever the sender is required to route a call to intercept, relay 1CT operates. For example, if no information is received back from the number group circuit engaged, and accordingly all bins 5–10 are empty, relay 1CT operates and Tip and Ring are connected over contacts of relay 1CT to appropriate potentials, to route the call to intercept.

*Crossbar sending advance chain*

Relays CSA1–CSA7 operate and release successively, programming the sending out of the sender.

When relay CSA1 is operated, the sender sends two digits 66, 67 or 68 to route the call through a first group selector to a measured service trunk (66), a coin box trunk (67), or a customer toll dialing trunk (68). Relay CSA1 causes relays CS3, CS4, and CS5 to operate; to send the first "6," appropriate potentials are applied to Tip and Ring over contacts of CS3 and CSA1; and appropriate potentials are applied to Tip and Ring over contacts of CS5 and CSA1 to send the second digit "6," "7," and "8."

Relay CSA2 operates and completes a circuit to operate relay PT, to shift the Tip and Ring to the outpulsing advance chain; the successive operation and releasing of relays 1–10 thereof enables the pulse generator to pulse the called number to the TRT circuit.

When relay CSA3 is operated, the sender sends two digits 50, 90, WW, or 4A. Relay CSA3 causes relays CS3, CS5 to operate. The Tip and Ring are connected to appropriate potentials through contacts of relays CS3 and CSA3 to send the first digit and through contacts of CS5 and CSA3 to send the second digit. Digits 50 route calls to local special services through a first group selector to a second group selector from which the local special services are reached. Digits 90 route calls to toll special services through a first group selector to a second group selector from which the toll special services are reached. Digits WW route calls destined for local lines through a first group selector to a second group selector from which the local 500 line group is reached. Digits 4A route calls destined for trunks through a first group selector to a second group selector from which the trunk group is reached.

Relay CSA4 causes relays CS3, CS4, and CS5 to operate. Appropriate potentials are applied to the Tip and Ring through contacts of relays CS3 and CSA3 to send the first digit, and through contacts of CS5 and CSA4 to send the second digit. Digits YY route the call to local special services through a second group selector. Digits ZZ route the call to toll special services through a second group selector or through a single group selector if there is only one. Digits WW (which are the same as the WW digits sent when CSA3 is operated) route the call to local line groups through a second selector or through a single group selector if there is only one. Digits WW (which are the same as the WW digits sent when CSA3 is operated) route the call to local line groups through a second selector or through a single group selector if there is only one. Digits BC route the call to a trunk through a second selector or through a single group selector if there is only one.

Upon operation of relay CSA5, the sender sends two digits to a CRB or a single to a multi-purpose trunk. In either case, relay CSA5 operates relays CS3, CS4, and CS5. On a call to a CRB, appropriate potentials are applied to the Tip and Ring through make contacts of CS3 and CSA5 to send a class of origin digit to the CRB, and through make contacts of relays CS3 and CSA5 to send a called party digit to the CRB. On a call to a multi-purpose trunk, Tip and Ring are connected to appropriate potentials through contacts CS5 and CSA5 to send a discriminating digit into the seized trunk, to direct the call to a particular exit of a plurality of exits from the trunk.

When relay CSA6 is operated, the sender sends three digits to a subscriber line marker SLM. Relay CSA6 operates relays CS1, CS2, CS4, and CS5. The Tip and Ring are connected to appropriate potentials through make contacts of CS1 and CSA6, to send a hundreds digit as found in bin 7 to SLM. Appropriate potentials are applied to the Tip and Ring through make contacts of CS3 and CSA6, to send a tens digit as found in bin 8 to SLM. In addition, the Tip and Ring are connected to appropriate potentials through make contacts of CS5 and CSA6, to send a units digit to SLM.

Relay CSA7 operates, and connects Tip and Ring appropriately, depending upon whether the call is to local or to a trunk. If the call is to a local line, the Tip and Ring are connected to a code receiver to receive a completion signal, or a congestion busy or line busy signal. If the call is to a trunk relay, PT operates and Tip and Ring are connected to the outpulsing advance chain; the pulse generator places appropriate signals on Tip and Ring as it drives the outpulsing advance chain, to outpulse the digits successively found in bins 1–4 of the sender and 1–11 in the register.

*Crossbar code sender*

The crossbar code sender comprises relays CS1–CS5. If three digits are to be sent, all five relays CS1–CS5 are operated simultaneously and then released in sequence, like "falling dominoes." The first digit is sent over make contacts of CS1; the second digit over make contacts of CS3; and the third digit over make contacts of CS5. If two digits are to be sent, relays CS3, CS4, and CS5 are operated and released in sequence, the first digit being sent over make contacts of CS3 and the second digit over make contacts of CS5. If one digit is to be sent, relays CS3, CS4, and CS5 are operated and released in sequence, the digit being sent over make contacts of relay CS5. Relay PT is shown together with relays CS1–CS5. Relay PT transfers the Tip and Ring between the crossbar code sender when PT is non-operated, and between the pulse generator or completion, congestion busy and line busy signaling circuitry when PT is operated.

*CSA chain control relays*

Control of this chain, which comprises relays SPT, CTD, SGS, TK, and DPT, will now be described.

Relays SPT (special purpose trunk) operates if an MS, CB, or MRT trunk is to be included in the connection, and causes the operation of chain CSA1–CSA7 to begin with operation of relay CSA1.

Relay CTD (customer toll dialing) operates if a TRT trunk should be called in, and causes CSA2 to be next operated after CSA1 (i.e., includes CSA2 in the sequence of operation).

Relay SGS (single group selector) operates if no digit is in bin 6 or trunk calls; if the particular configuration of contacts in bins 5 and 6 indicates a 500 line group reached from a single group selector or from the first group selector stage; and if the configuration of contacts of the "Special Service Code Relays" and relay LD so indicates that a special service is located off a first group selector. With optional wiring, all local special services may be off a first or second group selector and all toll special services may be off a first or second group selector.

Relay TK (trunk) operates if the call is to a trunk (not involing an SLM), and causes relays CSA5 and CSA6 to be skipped; relay TK operates through break contacts of relays NG and DPT.

Relay DPT (dual purpose trunk, or multi-purpose trunk) operates on a 10X code, or a 11XX code if a digit is sent to the trunk. The contacts of the TSS1 and TX relays and of bin 10 are involved in the operation of this relay.

*Outpulsing advance chain*

The outpulsing advance chain, as it advances, provides paths for certain storage bins to the code converter. The code converter is a group of relays which operate in combination responsive to the setting of the particular bin to which they are connected, as the various outpulsing advance chain relays operate and release in sequence; such operation enables the pulse generator to place corresponding signals on Tip and Ring to outpulse the corresponding digits.

Relay AR operates and extends connections from the code converter to various bins under three circumstances: (1) to the party bin in the register, if outpulsing is to TRT or when CSA2 is operated; (2) to the sender 1st storage bin, if a single primary routing digit is to be sent; and (3) to the sender 2nd storage bin for outpulsing the first primary routing digit, if no alternate digits are involved to outpulse the first primary routing digit, or if alternate routing digits are involved to send the first alternate routing digit when required.

Relay BR operates and extends connections from the code converter to the sender 3rd storage bin, to send the 2nd primary or alternate routing digit.

Relay CR operates and extends connections from the code converter to the sender 4th storage bin, to send the 3rd primary or alternate routing digit.

Relay 1 operates and extends connections from the code converter to register bin 1 of FIG. 1, to enable the pulse generator to outpulse the digit stored therein as indicated below bin 1 in both register and sender.

The operation of the equipment with bins 2–11 is similar to that just described.

*Delete bins*

The translator may return signals to cause the registration of any digit from 1 to 6 in a three relay delete bin DLP, and likewise in DL.

If the group selector completes the call over the primary route, delete bin DLP functions to prohibit the operation of from one to six of the relays 1–6 of the outpulsing advance chain; these digits are thus deleted.

Similarly, if the group selected is unable to complete connections over the primary route but completes connections over the alternate route, delete bin DL functions and prohibits operation of from one to six of the relays 1–6 of the outpulsing advance chain; thus these digits are deleted.

*Additional consideration of contact fans for applying potentials to tip and ring*

Figure 47:
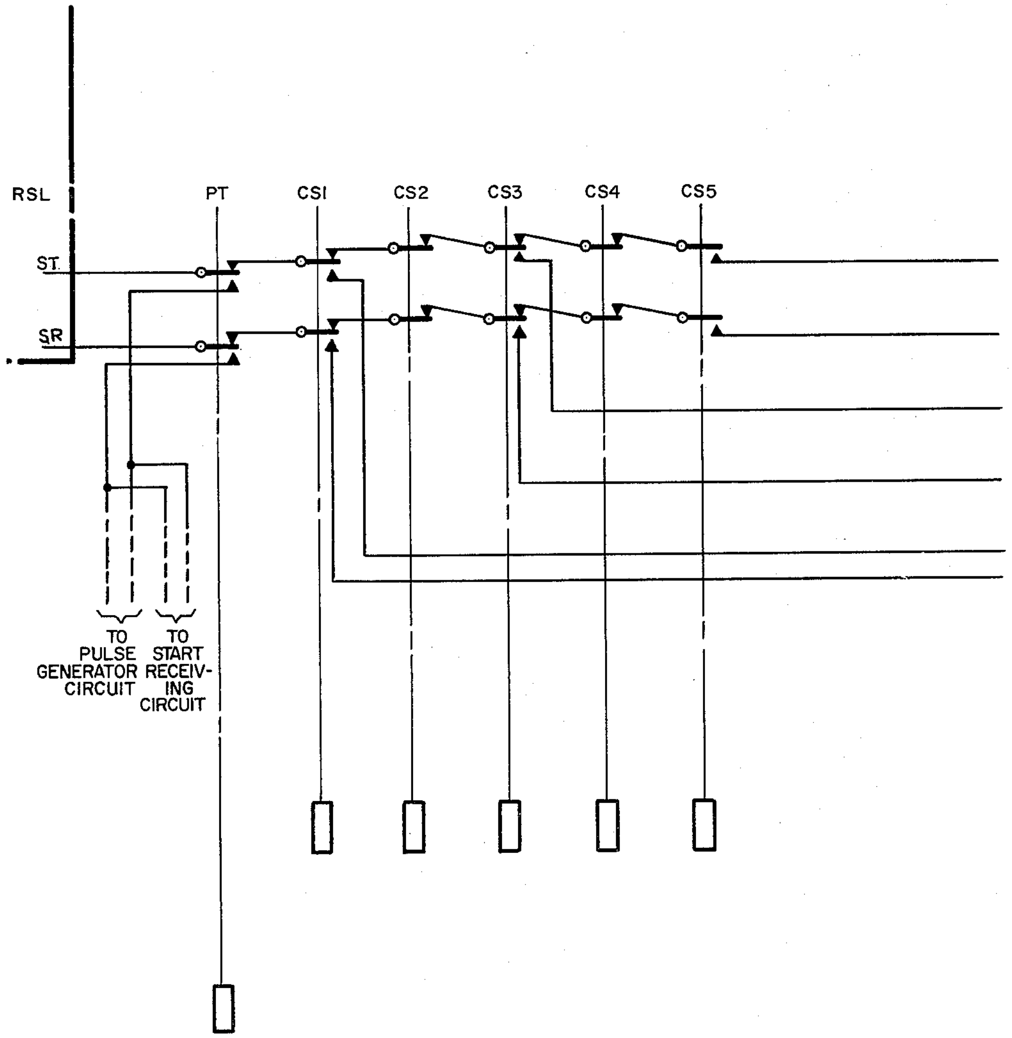
FIGURES 47 and 48 show more details of certain relay chains in the sender.
Figure 48:
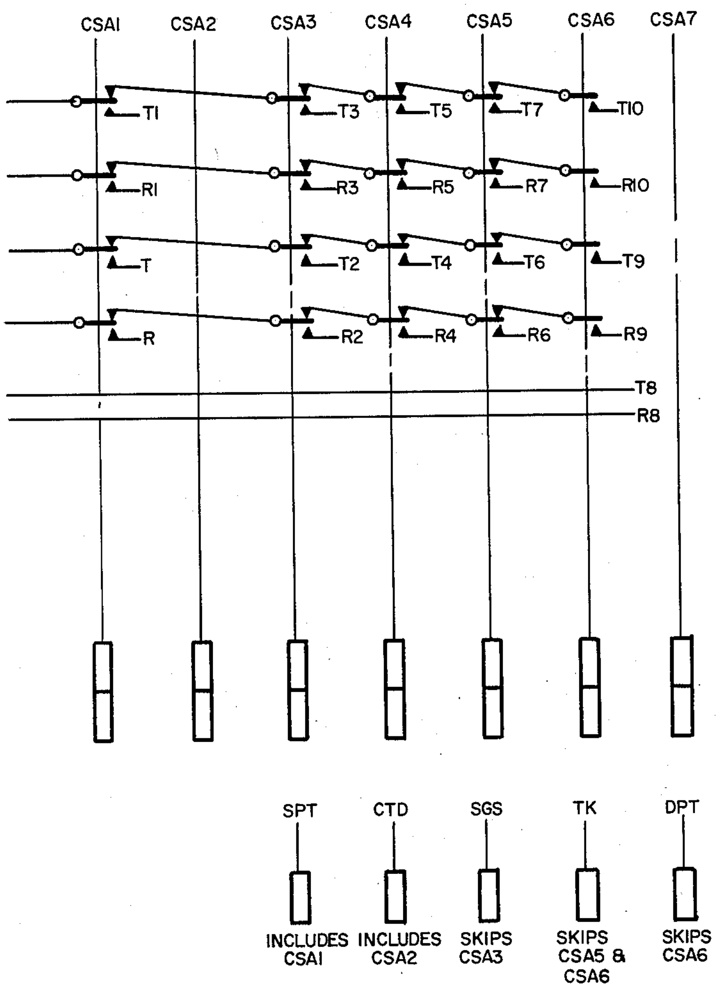
Figure 49:
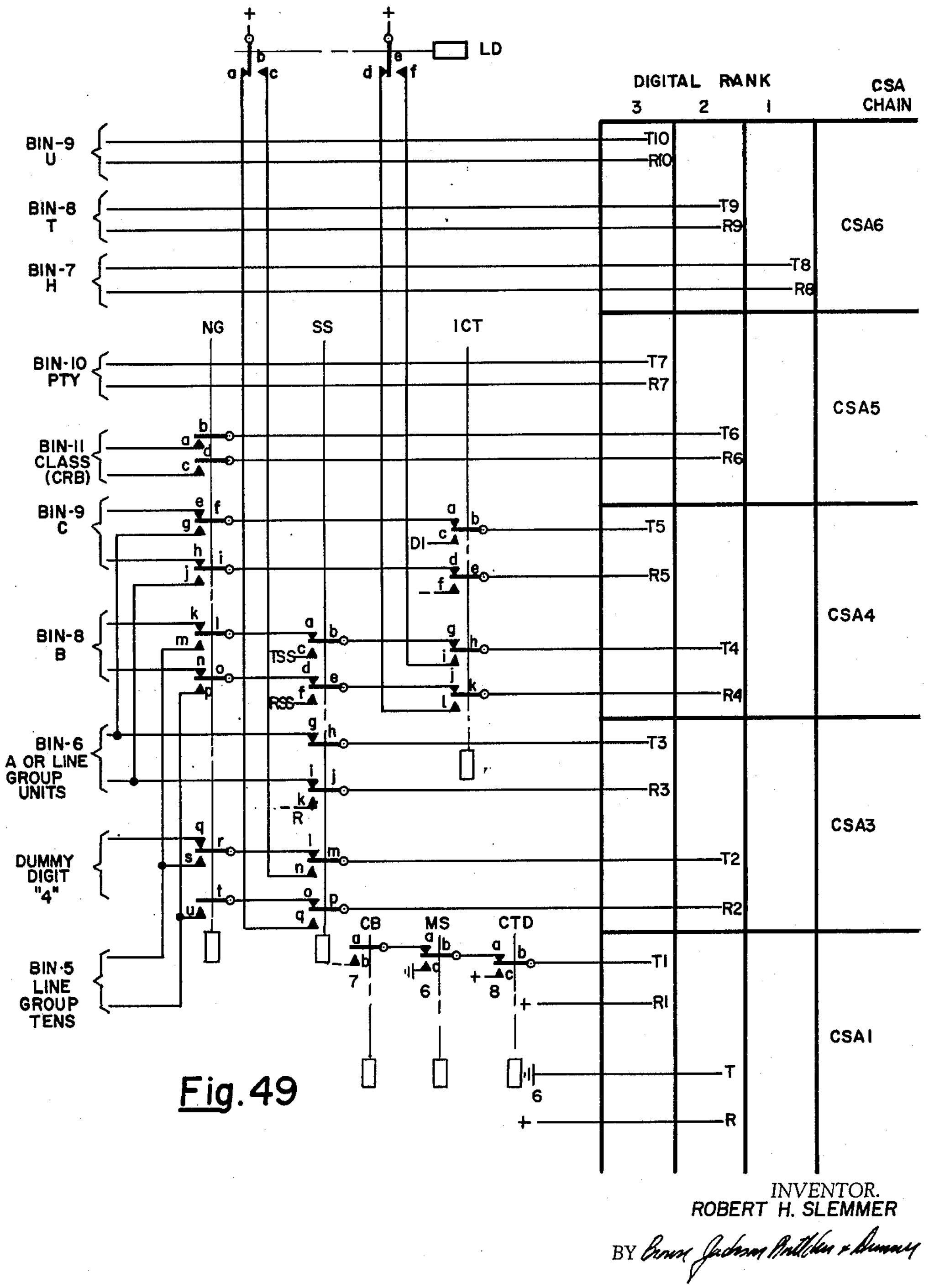
FIGURE 49 shows additional detail as to how signaling potential is placed on tip and ring by the sender.

FIGS. 47 and 48 illustrate the connections from Tip and Ring through contacts of relays PT, CS1–CS5, and thence through contacts of relays CSA1, CSA3, CSA4, CSA5, and CSA6 to certain sender circuitry shown in FIG. 49, whereby appropriate potentials are applied to Tip and Ring.

Leads R and T of FIG. 48, accessed over make contacts of relay CS3 (FIG. 47) and CSA1 (FIG. 48), connect to leads R and T of FIG. 49 in the CSA1 digital rank 2 position (the "digital rank" is determined by which contacts of the relay group CS1–CS5 are utilized to complete the circuit; relay CS1 has digital rank 1, relay CS3 digital rank 2, and relay CS5 digital rank 3).

Leads R1 and T1, accessed over make contacts of relay CS5 (FIG. 47) and make contacts of relay CSA1 (FIG. 48), connect to leads R1 and T1 of FIG. 49 in the CSA1 digital rank 3 position.

Leads R2 and T2 of FIG. 48 connect to leads R2 and T2 of FIG. 49 in the CSA3 digital rank 2 position. The connections of the remaining ring and tip connections are obvious from the foregoing explanation.

It is observed that leads R8 and T8, reached through make contacts of relay CS1 (FIG. 47), are the only ones which appear in the digital rank 1 position, and which do not have to pass through contacts of relay CSA6 although they are shown in the CSA6 digital rank 1 position. In fact, leads R8 and T8 could pass through make contacts of relay CSA6, but this is unnecessary.

The particular relays of the group CSA1–CSA7 which are required for a particular type of call are predetermined for operation by certain markings, and are operated and released in order from CSA1–CSA7 as start signals are received over make contacts of relay PT.

When relay CSA1 of FIG. 48 is operated, relays PT, CS3, CS4, and CS5 of FIG. 47 are operated; these relays released in the sequence PT, CS3, CS4, and CS5 upon receipt of a start signal by a start receiving circuit, over ring and tip connections SR and ST from the group selector marker through the RSL circuit. The start receiving circuit is shown in more detail in both the aforementioned patent applications. The start signal consists of application of a negative 24 volts potential to the ST conductor. When relay PT releases, conductors SR and ST are connected over break contacts of relay PT, break contacts of relays CS1 and CS2, make contacts of relay CS3, and make contacts of relay CSA1, to leads R and T. When relay CS3 releases, conductors SR and ST are opened until relay CS4 releases. When relay CS4 releases, conductors SR and ST are connected over break contacts of relays PT, CS1, CS2, CS3, CS4, and make contacts of CS5 and CSA1 to conductors R1 and T1, until relay CS5 releases. When relay CS5 releases, conductors SR and ST are opened.

When relay CSA2 is operated, relay PT operates and extends the ring and tip connections SR and ST first to the Start Receiving Circuit, which causes them to be transferred to the pulse generator circuit, which in turn pulses over SR and ST to the TRT circuit.

When relay CSA3 operates, relays PT, CS3, CS4, and CS5 of FIG. 47 operate and perform. Connections to leads R2, T2, R3, and T3 are extended over break contacts of relay CSA1 and make contacts of relay CSA3; such circuits are obvious from the preceding explanation.

When relay CSA4 is operated, relays PT, CS3, CS4, and CS5 of FIG. 47 operate and perform. Obvious connections are thereby established to leads R4, T4, R5, and T5.

When relay CSA5 operates, relays PT, CS3, CS4, and CS5 of FIG. 47 operate and perform. The connections thus effected to leads R6, T6, R7 and T7, are obvious from the foregoing explanation.

When relay CSA6 is operated, relays PT, CSA1, CSA2, CSA3, CSA4, and CSA5 of FIG. 47 operate, and release in the order PT, CS1, CS2, CS3, CS4, and CS5. Relay PT releases, and conductors SR and ST are thereby connected over break contacts of relay PT and make contacts of relay CS1 to leads R8 and T8. Relay CS1 releases, and opens leads SR and ST at contacts of relay CS2, until relay CS2 releases. Relay CS2 releases, and connects conductors SR and ST over break contacts of relays PT, CS1, CS2, make contacts of relay CS3, break contacts of relays CSA1, CSA3, CSA4, CSA5, and make contacts of relay CSA6, to conductors R9 and T9. Relay CS3 releases and opens conductors SR and ST until relay CS4 releases. Relay CS4 releases, and connects conductors SR and ST over break contacts of relays PT, CS1, CS2, CS3, CS4, make contacts of relays CS5, break contacts of relays CSA1, CSA3, CSA4, CSA5, and make contacts of relay CSA6 to conductors R10 and T10 until relay CS5 releases, at which time conductors SR and ST are opened.

Thus, to send signals to group selector markers for routing through the cross bar switches of the system, relays of the group PT and CS1–CS5 go through a cycle for each relay CSA1, CSA3, CSA4, CSA5, and CSA6 which is operated.

Considering an automatically ticketed call with relay CSA2 operated, relay PT is held operated by relay CSA2 to enable the pulse generator to pulse certain details of the call to the tape recorder via the TRT circuit.

With respect to a call to a trunk over which out-pulsing occurs, with relay CSA6 released, the call is extended through the crossbar switches to the trunk. Relays CSA7 and PT reoperate and relay CSA7 holds relay PT operated, so that the pulse generator circuit can outpulse into the trunk signals to route the call to its destination.

For a call to a local line or to a trunk requiring no cut-pulsing, relay CSA6 releases and relays CSA7 and PT reoperate to route the conductors SR and ST to the Start Receiving Circuit, whereby the completion signal to the send is constituted by potential through battery feed coils connected to the SR and ST circuit by the CRB circuit or the trunk, whereupon the sender signals the register to release. The register signals the CRA circuit, which extends Ring and Tip connections; the register releases the SRL or TRL, as the case may be, and the sender.

Normally, the circuitry in the sender is arranged to include relays CSA3, CSA4, CSA5, CSA6, and CSA7 in its operations. Such arrangement would obtain for a call to a local line through two group selector stages.

When the call is to be automatically ticketed or is from a coin box line or a measured service line, certain marking in the sender causes relay SPT (special purpose trunk) to operate and as indicated on FIG. 48, this operation includes relay CSA1 in the functioning of the sender; signals are sent over contacts of relay CSA1 and leads R, T, R1, and T1 to the group selector marker to serially include a TRT, a CBT, or an MST circuit in the connection.

When the call is to be automatically ticketed, certain marking in the sender operates relay CTD, and relay CSA2 also operates. Relay CSA2 holds relay PT operated while the sender sends to the TRT.

If the destination is reached through a single stage of group selection only, the sender operates relay SGS which causes relay CSA3 to be skipped; thus leads SR and TR are not connected to leads R2, T2, R3, and T3, which are utilized to send signals to a first stage group selector marker when there is a second group selector stage to be subsequently passed through.

If the destination is to a trunk rather than to a CRB, the sender operates relay TK which causes relays CSA5 and CSA6 to be skipped, which relays control sending to a CRB and an SLM on a call to a local line.

When the destination is to a multi-purpose trunk into which the sender sends a digit, the sender operates relay DPT which causes relay CSA6 to be skipped. Accordingly, with relay CSA4 released, the call is routed to the trunk. With relay CSA5 operated, relays PT, CS3, CS4, and CS5 release in turn. When relay CSA4 releases with relay CS5 still operated, conductors SR and ST are connected to conductors R7 and T7 to bin 10 (see FIG. 49), through contacts to which appropriate potentials are applied to these conductors to send the digit into the multi-purpose trunk.

The relays of the CSA chain are schematically illustrated on the right side of FIG. 49. In parallel columns the digital ranks 1, 2, and 3 through contacts of the various relays of the CSA chain as determined by the relays CS1–CS5, are indicated.

Thus it is noted that leads T and R issue from contacts of relay CSA1 in the second digital position; T is connected to ground and R to +48 volt battery, which constitutes the first digit "6" on Tip and Ring.

The following table lists potentials applied to the Tip and Ring by the sender to send the various digits and signals.

| Digit | Tip | Ring |
|---|---|---|
| 0 | -------- | −48 |
| 1 | Grd | −48 |
| 2 | −48 | −48 |
| 3 | +48 | −48 |
| 4 | Grd | -------- |
| 5 | -------- | +48 |
| 6 | Grd | +48 |
| 7 | −48 | +48 |
| 8 | +48 | +48 |
| 9 | +48 | -------- |
| 10 | −48 | -------- |
| 11 | -------- | Grd |
| 12 | −48 | Grd |
| 13 | +48 | Grd |
| 14 | Grd | Grd |

It is also noted that leads T1 and R1 issue from contacts of the relay CSA1 in the third digital position, R1 being connected to +48 volt battery and T1 being selectively connected to +48 volt battery through make contacts of customer toll dialing relay CTD, which constitutes the second digit "8" on Tip and Ring. Alternatively, T1 may be selectively connected through break contacts of relay CTD and make contacts of measured service relay to ground, which constitutes the second digit "6" on Tip and Ring. Again, T1 may be selectively connected through break contacts of relays CTD and MS and make contacts of relay CB to 48 volt battery, which constitutes the second digit "7" on Tip and Ring. It is observed that leads T and R are extended through contacts of relay CSA1 by contacts of relay CS3, and leads T1 and R1 are extended through contacts of relay CSA1 by contacts of relay CS5.

Leads T2 and R2 are extended through contacts of relay CSA3 by contacts relay CS3, and leads T3 and R3 by contacts of CS5.

When relay SS (special service) is operated incident to passage of a special service call, lead R2 is extended over contacts SS—*q* and, with relay LD down from a non-toll call, through contacts LD—*a*, to +48 volts. With such connection lead T2 extends through contacts SS—*n* to the open contacts of relay LD. Thus a combination of +48 volts on Ring and no potential applied to the Tip enables the sender to send digit "5." If relay LD operates ,+48 volts is applied to Tip and no potential to Ring, enabling the sender to send digit "9" instead of "5."

Additionally, with SS operated, lead R3 is connected through contacts SS—*k* to −48 volts potential and lead T3 is connected to open contacts of relay SS. This connection enables the sender to send digit "0" whether relay LD is up or down.

Thus, with relay SS and LD operated, the sender sends 50 if the call is to a local special service, and 90 if the call is to a toll special service. This is for the purpose of routing the call through a first group selector to a second group selector through which the special service will be found.

If relay SS is non-operated but relay NG is operated, leads R2 and T2 are connected over break contacts SS—0 and SS—1, NG—*u* and NG—*s* to bin 5 contacts, which contain line group tens information returned from the engaged number group circuit. Also leads R3 and T3 are connected through break contacts SS—*i* and SS—*g* to bin 6 contacts, which contain line group units information returned from the engaged number group circuit. Thus the sender is enabled to send digits WW to a first group selector to enable it to route the call therethrough to a second group selector, through which the required line group is reached by a second sending of digits WW (see CSA4 below). Each distinct WW code provides for a distinct group of W junctors between first and second group selectors.

When relays SS and NG are both non-operated, lead R2 is connected over break contacts SS—0 to open lever NG—*t*, and lead T2 is connected through contacts SS—*l* and NG—*q* to ground. This connection enables the sender to send dummy digit "4." Also leads R3 and T3 are connected through break contacts SS—*i* and SS—*q* to sender bin 6 contacts, which contain the A digit information from the translator. Thus the sender is enabled to send digits 4A to a first group selector marker to route the call to a second group selector marker, through which the required trunking is accomplished. Digit A may have ten values and accordingly 4A may have ten values to provide for as many as ten groups of junctors between first and second selectors.

Leads R4 and T4 are extended through contacts of relay CSA4 by contacts of relay CS3, and leads R5 and T5 by contacts of CS5.

When the intercept relay 1CT is operated, R4 is connected through contacts 1CT—*l* and LD—*d* (if relay LD is non-operated on a non-toll origin call) to +48 volt battery; with this condition, lead T4 is connected through contacts 1CT—*i* to open contacts LD—*f*. This connection enables the sender to send digit "5." Also lead R5 is connected through contacts 1CT—*f* to −48 volts potential, and lead T5 is connected through contacts 1CT—*c* to lead D1. Lead D1 is extended through contacts of storage bins 5–10. If no potential is detected, as a result of no information returned by the number group, the sender is enabled to send digit "0." However if part but not all of the bins 5–10 have received information from the number group circuit which was engaged, lead D1 will be connected to ground, enabling the sender to send digit "1." Thus, if the sender send digits 50 to the group selector marker, the call is routed to local automatic intercept. However, if the sender sends digits 51, the call will be routed to local manual intercept.

If relays 1CT and LD are operated on a toll margin call, lead R4 is connected over contacts 1CT—*l* to open contacts LD—*d*, and lead T4 is connected through contacts 1CT—*i* and LD—*f* to +48 volts potential. Thus, the sender is enabled to send 90 or 91, to route the call to toll automatic intercept or toll manual intercept, respectively.

If desired, local and toll automatic intercept may physically be the same group of trunks. Also local and toll manual intercept may be the same group of trunks.

In this manner any unequipped or changed number can be intercepted.

When intercept relay 1CT is non-operated and special service relay SS is operated, leads R4 and T4 are connected through contacts 1CT—*j* and 1CT—*i* and through contacts SS—*f* and SS—*c* to leads RSS and TSS respectively, which pass through contacts of special service relays 0, 110, LSS, TSS1, TSS2, and TX and in the case of relays 0 and 110, also through contacts of relay CB. Accordingly, if relay 0 or 110 is operated and relay CB is non-operated, RSS is connected to +48 volts potential to enable the sender to send digit "7" which is the first "Y" digit; whereas if relay 0 or 110 is operated and relay CB is also operated, RSS is connected to +48 volts potential but TSS is connected to ground to enable the sender to send digit "6." Also under both these circumstances, leads R5 and T5 are connected over contacts 1CT—*d* and 1CT—*a* and over contacts NG—*h* and NG—*e* to the 9th storage bin contacts which contain the Y digit. When relay 0 is operated this digit is stored in the 9th bin by the operation of relay 0, and conditions the sender to send digit "2," i.e. −48 volts on Tip and −48 volts on Ring. However, in the case in which relay 110 is operated, relay 110 does not have to actuate bin 9, the non-operated position of the relays of this bin connecting the Ring to −48 volts and the Tip to no potential, whereby the sender is conditioned to send digit 0. Thus if "0" is dialed by a non-coin box line, the sender sends digits 72 to the group selector marker to route the call to a dial assistance operator over a CLR trunk; whereas, if "0" is dialed by a coin-box line, the sender sends digits 62 to the group selector marker to route the call to a dial assistance operator over a PCLR trunk. Also if "110" is dialed by a non-coin box line, the sender sends digits 70 to the group selector marker to route the call to a toll operator over CLR trunks; but if "110" is dialed by a coin box line, the sender sends 60 to the group selector marker to route the call to a toll operator over a PCLR trunk.

When a local special service code other than 0 or 110 is dialed, relays LSS and SS operate and lead RSS is connected to +48 volts and TSS to −48 volts, whereby the sender is enabled to send digit "7" to the group selector marker, this being the first "Y" digit. Leads R5 and T5 are connected over break contacts of relays SS and NG to the 9th storage bin, to which has been transferred the digit which was stored in the 3rd storage bin. For example, if 113 had been dialed, R5 would be connected to −48 volts and T5 to +48 volts, thus enabling the sender to send digit "3" to the group selector marker to route the call to an information trunk. This is the second "Y" digit. Thus a maximum of eight local special services, in addition to "0" and "110," is possible by the sender sending code 7X to the group selector.

If a toll special service code 10X is received, relays TSS1 and SS operate. Lead TSS is connected to +48 volts and lead RSS is open, thus enabling the sender to send digit "9." Also lead T5 is connected to ground through contacts of bin 9 and lead R5 is connected to open contacts in bin 9, relay TSS1 having stored digit 4 in bin 9. Thus the sender is enabled to send digits 94 to the group selector marker to route the call to a test trunk. (When CSA5 operates, a digit is sent into the trunk.)

When a toll special service code 1X1 is received, relays TSS2 and SS operate. Lead TSS is connected to +48 volts through make contacts of relay TSS2 and lead RSS is open, thus enabling the sender to send digit "9." This is the first "Z" digit. Leads T5 and R5 are connected to appropriate potentials or are left open by contacts of the 9 bin to enable the sender to send the second "Z" digit. For example, if digits "121" had been received by Reg. I, digit 2 would have been transferred from bin 2 in Reg. I to bin 2 in the sender, and from this bin to bin 9 in the sender. In this event leads R5 and T5 will both be connected to negative potential, enabling the sender to send digit "2." Thus the sender is enabled to send digits 92 to the group selector marker to reach an inward operator trunk.

When a toll special service code 11XX is received in the sender from Reg. I, relays TX and SS are operated by the 11X part of the code. Leads RSS and TSS are connected to +48 volts by relay TX, enabling the sender to send digit "8." This is the first "Z" digit. Leads R5 and T5 will be connected to appropriate potentials (or no potential) in bin 9 to send the second "Z" digit if the various TX teams are reached from different group selector levels, relay TX having transferred the code in bin 4 to bin 9. For example, if 1159 is received, digits 115 effect operation of relays TX and SS being operated. Digit 3 effects connection of leads T5 to +48 volts and lead R5 to —48 volts by contacts of bin 9. Thus the sender is enabled to send digits 93 to the group selector marker to route the call to a certain TX team. If 1151 had been received, the sender would have sent 91 to the group selector marker to route the call to a different TX team. It is noted that if alternatively a single group of multipurpose trunks are used for TX, the operation of relay TX does not transfer the digit in bin 4 to bin 9 but stores a digit (determined by strapping) in bin 9. This digit might be "1," whereby R5 and T5 are connected to —48 volts and ground, respectively, so that the sender is enabled to send digit "1." Accordingly in this event the sender sends digits 91 to the group selector marker to route the call to a TX trunk of the single group of TX trunks. (When relay CSA5 operates, a digit is sent into the trunk to select a particular TX team.)

When both relays 1CT and SS are non-operated and relay NG is operated, leads R4 and T4 are extended over contacts 1CT—*j* and 1CT—*g*, SS—*d* and SS—*a*, and NG—*p* and NG—*m* to sender bin 5; leads R5 and T5 are extended over contacts 1CT—*d* and 1CT—*a*, and NG—*j* and NG—*g* to sender bin 6. Sender bins 5 and 6 contain line group tens and line group units information from the number group, and accordingly Tip and Ring are connected to appropriate potentials to enable the sender to send the proper WW digits to the group selector marker, as can be seen by reference to charts herein. If CSA2 was not operated prior to this time, this is the first sending of digits WW; but if CSA3 was operated prior to this, this is the second sending of digits WW.

If relays 1CT, SS, and NG are all non-operated (on a call involving a translator called in by a sender), leads R4 and T4 are extended over contacts 1CT—*j* and 1CT—*g*, SS—*d* and SS—*a*, and NG—*n* and NGR to the contacts of bin 8, which contains information from the translator regarding the "B" crossbar routing digit; thus the sender is enabled to send same to the group selector marker in extending connections to a trunk. Appropriate potentials are placed on Ring and Tip by the contacts of bin 8 to send the B digit, which may have any one of ten variations according to digits 0–9 defined in a chart herein.

Leads R6 and T6 are extended through contacts of relay CSA5 by contacts of relay CS3; leads R7 and T7 are extended through contacts of CSA5 by relay CS5.

When relay NG is operated, leads R6 and T6 are extended to bin 11, which comprises certain contacts of the calling class relays whereby, if the call is from a trunk, the Ring conductor R6 will be connected to —48 volts and the Tip will be open; the sender is thus enabled to send digit or signal "0" to the CRB which informs the CRB that a trunk is calling, so that it can adjust itself accordingly. If the call is from a delayed ring trunk the Tip conductor T6 will be connected to ground and the Ring conductor R6 will be open, enabling the sender to send digit or signal "4" to the CRB, which is the signal thereto that a delayed ring trunk is calling, so that the CRB can adjust itself accordingly. If the call is from a test trunk lead R6 will be connected to ground and lead T6 will be open, whereby the sender sends a signal "11" to the CRB, which is the signal thereto that a test trunk is calling so that the CRB can adjust itself accordingly. If the call is from a local line, the lead T6 will be connected to —48 volts and the ring will be open whereby the sender sends the signal "10" to the CRB; this is the signal thereto that a local line is calling, thus enabling the CRB to be adjusted accordingly. Leads R7 and T7 extend to contacts of bin 10 which contains information from the number group as to the party on the line the called party is. Leads R7 and T7 have potentials selectively applied thereto, as given on pages 76 and 77 of the U.S. application having Serial No. 522,233.

When relay NG is non-operated, leads R6 and T6 are open and leads R7 and T7 extend to bin 10, into which has been transferred from bin 3 the digit to be sent to a test trunk, or into which has been transferred from bin 4 the digit to be sent to a TX trunk.

Leads R8 and T8, R9 and T9, and R10 and T10 extend to bins 7, 8 and 9 respectively which, on a call to a local line involving a number group, contain the hundreds, tens, and units digit information from the number group whereby R8 and T8, R9 and T9, and R10 and T10 are connected to appropriate potentials to enable the sender to send these digits to the subscribers line marker SLM according to a chart herein which is the same as the chart for digits 0–9 on page 69 and digits 10–14 on page 77, of the U.S. application bearing Serial No. 522,233.

*Additional details relative to register-translator cooperation*

The cooperation of the register and translator will now be further explained, in conjunction with FIGURES 25–46 of the drawings, wherein are illustrated ten registers and four senders, and others are indicated, for cooperating with two translators.

When relay RTG in register 1 (FIG. 25) operates and places battery on the call signal lead CS to indicate that the first three digits received were not recognized, or as a result of recognizing an area code, this battery is applied through make contacts of relay RTG, over call signal lead CS, contacts 1CO1—*a*, 2CO1—*c*, winding of relay R1, conductor 1, cable, conductor 1, contacts A—*a*, common conductor through double contacts B—*a* to ground.

Relay R1 operates and locks to ground over contacts R1—*g* or R1—*k*. If ground is reached over contacts R1—*g*, the circuit extends over conductor 1, cable, conductor 1, contacts of the jump rotator comprising relays RS1—RS4 (see U.S. application Serial No. 522,233 for operation of jump rotator), contacts *a* and *b* of slow release relay D, to ground. It is noted that relay D is normally operated over make contacts C—*a*, and that relay C is normally operated over break contacts *d* of relay B. It is also noted that relays R1—R10 have ascending and descending priority locking contact circuits which are fed at appropriate points by the said jump rotator; thus the locking priorities of relays R1—R10 are shifted, so that simultaneous calls into RTG by various registers are given a shifting preference for a particular one to engage RTG.

Relay R1 completes an energizing circuit for relay A, from ground, through contacts R1—*u* and the winding of relay A, to battery. Relay A operates and opens the original energizing ground of the R1–R10 relays at its contacts *a* to *s*, whereupon only one relay of the group R1–R10 can lock; in this case R1 locks. Relay A completes an energizing circuit for relay B over an obvious circuit. Relay B operates and opens the circuit of relay C at contacts *d*. Ordinarily this circuit will be recompleted before relay C releases, but if not relay C releases, in turn opening the circuit of slow release relay D. If C releases, ground is applied throught contacts C—*c* to an alarm terminal AL leading to an alarm circuit. It is noted that contacts R1—*t* apply ground over conductor 1, cable and conductor 1 to a call progress indicator circuit CPI, in preparation to identify the particular register to the CPI. After relay C releases and before the release of relay D, ground is applied over contacts C—*d*, D—*c*, B—*e*, conductor 12, cable, conductor 12, to the CPI circuit; and also ground is applied over contacts C—*g*, D—*e*, B—*g*, conductor 11, cable, and conductor 11 to the CPI circuit. These two last-mentioned ground connections identify the particular RTG circuit to the CPI, and the lead 1 ground identifies the particular register associated with RTG to the CPI circuit. Relay D releases, and the holding ground of relays R1–R10 is opened. In this example, relay R1 releases and removes its ground over conductor 1 to the CPI circuit. The releases of relay D also removes the conductor 11 and conductor 12 ground. The release of relay R1 releases relay A, which releases relay B (unless held by the TNG circuit), and the RTG circuit is returned to normal.

Resuming the description of a call passing through the RTG circuit normally, relay R1 operates and extends a circuit from battery over contacts R1—*e*, R1—*q*, R2—*p*, corresponding break contacts of relays R3–R7, contacts R8—*i*, corresponding break contacts of relay R9, and contacts R10—*p* to conductor S.

The battery thus applied to conductor S is channeled in two directions. Relay RS1 is operated over a circuit extending from contacts R1—*m*, conductor 1, cable, conductor 1, upper winding of jump rotator relay RS1, to ground. Relay RS1 operates and locks over its lower winding, releasing any other jump rotator relay which may have been in the operated condition.

This same S-wire battery extends over conductor S to the RTG—*l* conductor, entering the associated TNG circuit which is also designated conductor 1. This circuit extends through contacts 1TA—*c* (assuming translator #1 idle and reset in TNG), winding of relay AT1, conductor 1, cable, conductor 1, contacts 2AG—*a*, 3TA—*a* to ground. Relay AT1 in TNG operates and locks to ground over contacts AT1—*c* or AT1—*f*. If locked over AT1—*c*, this circuit extends over conductor 1, cable, conductor 1, through contacts of jump rotator comprising relays RT1–RT8, and contacts 3TA—*q* to ground. This jump rotator shifts the priority of locking relays AT1–AT12 so that, although a plurality of inputs to TNG from RTG's or STG's may signal TNG simultaneously and thus operate a plurality of the relays AT1–AT12, only one can lock.

Relay AT1 operates relays 1AG, 2AG, 1AS and RT1. Relays 1AG and 2AG operate over the circuit extending from battery over their windings in parallel, and contacts AT1—*r* to ground. Relay 1AS operates over the circuit extending from battery, over the winding of relay 1AS, break contacts 1 of relays AT12–AT2, and contacts AT1—*m* to ground; this circuit constitutes a "one-up" chain, whereby the energizing circuit of relay 1AS can only be completed if one, and only one, of the relays AT1–AT12 is operated.

Relay 1AG operates and at its contacts 1AG—*b* opens the energizing circuit of slow release relay AT, which releases after an interval; and at its contacts 1AG—*c* connects ground through contacts AT1—*i* to conductor 11, which circuit extends over the conductor C to relay B in the calling RTG to hold same operated if the TNG guard circuit is not cleared.

Relay 2AG operates and opens the original ground supply circuits which extend to relays AT1–AT12, and the priority locking circuit functions.

Relay 1AS completes an energizing circuit for jump rotator relay RT1, the circuit extending from ground over contacts 1AS—*e*, RT1—*p*, conductor 1, cable, conductor 1, upper winding of relay RT1, to battery. Relay 1AS also completes an obvious energizing circuit for relay 2AS.

Relay 2AS operates and extends the operating battery of relay AT1 over contacts AT1—*b*, conductor 1, cable, conductor 1, contacts 2AS—*b*, conductor 1 (which is the T1 conductor to RTG—*l*), and thence through the rectifier, contacts R1—*b*, through the parallel windings of relay 1CO1 in RTG—*l* and TNS1 in Reg. 1, to ground; relays 1CO1 and TNS1 thereupon operate.

Relay 1CO1 operates and closes a locking circuit for itself and for relay TNS1 in parallel over contacts 1CO1—*b*, which close before contacts 1CO1—*a* open, over contacts RTG—*a* in Reg. 1, to battery. The removal of battery from relay R1 at contacts 1CO1—*a* releases relays R1 and AT1. Additionally, relay 1CO1 applies ground over contacts 1CO1—*d* to the Reg. 1 BY1 lead which, in multiple with other BY1 leads from the other RTG's and STG's of the group, extends to the winding of busy relay BY in translator #1 and through this winding to battery; busy relay BY thus operates. Relay R1 releases relay A. Relay AT1 releases relays 1AG and 2AG; relay 1AG removes ground from conductor C associated with RTG—*l* whereby, with relay A released, relay B is released. The release of relay BY in translator #1 opens the holding circuit of relays 1TA, 2TA, and 3TA, and these relays release.

It is noted that lever *b* of relay 1TA in releasing transfers the S-wire circuit of RTG—*l* from the winding of relay AT1 to the winding of relay BT1, preparatory to operating relay BT1 on the next call from RTG—*l*; relays BT1–BT12 constitute a guard circuit between the twelve RTG's and STG's and translator #2. When relays 1TA, 2TA, 1TB and 2TB are all operated, and if the eight RTG's and 4STG's are numbered 1–12 respectively, then odd RTG's and STG's have their S-wire seizing circuits connected over make contacts of relays 1TA and 2TA to guard relays AT1, AT3, AT5, AT7, AT9 and AT11 associated with translator #2, whereas even RTG's and STG's have their S-wire seizing circuits connected over make contacts of relays 1TB and 2TB to guard relays BT2, BT4, BT6, BT8, BT10, and BT12 associated with translator #2. It is further noted that when relays 1TA, 2TA, 1TB, and 2TB are released, all RTG's and STG's associated with the TNG circuit have their S-wire seizing circuits extended to open contacts of guard relays 1TA, 2TA, 1TB, and 2TB. Additionally, if relays 1TA and 2TA are released but relays 1TB and 2TB are operated, RTG's and STG's 1–12 have their S-wire seizing circuits connected to the windings of relays BT1–BT12, respectively. It is further apparent that if relays 1TA and 2TA are operated and relays 1TB and 2TB are released, RTG's and STG's 1–12 have their S-wire seizing circuits connected to the windings of relays AT1–AT12, respectively.

Responsive to the normal passage of a call, relay 1AG releases in time to re-establish the circuit of relay AT before it has time to release.

When relay TNS1 in Reg. 1 was operated, it extended information leads 11–37, which are individually in multiple with the corresponding leads of the other registers 2–10 in the same group of registers into cable INF–1, which extends directly to translator #1. It is recalled that these leads extend from make contacts of the associated register relays R11–R37 in the register to whichever ground may be selectively connected by the register. These leads extend from the INF–1 cable to the windings of relays R11–R37 in translator #1 and thence to battery, so that when relay TNS1 operates in Reg. 1, the setting of the first three bins of the register is extended to the first three bins in translator #1, whereas certain of relays R11–R37 are operated in translator #1 corresponding to the ones operated in Reg. 1.

The operation of any relay R11–R67 in the translator energizes relays HV1 and HV2 over the circuit extending from battery, over the windings of these relays in parallel (upper winding of relay HV1), through make contacts of any of relays R11–R67, to ground.

Relay HV2 operates and extends +240 volt regulated battery, the negative pole of which is grounded, over contacts HV0—*d*, HV2—*a*, conductors 1–30 in circuit TNL in parallel, and thence through resistors to neon lamp clusters. The regulation of the —240 volt supply is accomplished over the circuit extending from +240 volt battery through a ¼ ampere fuse, contacts BY—*e*, a 5000 ohm resistor, gas tube OA2, through a 270 ohm resistor to ground.

The other side of the lamp clusters are cross-connected to the contact fans relays R11–R37; each lamp of a cluster of three is connected to a different bin. Referring to the first lamp clusters energized by conductor 1, these might be considered two lamp clusters, lamps 1, 2, 3, and 4 relating to one cluster and accordingly one called office code; lamp 1 is cross-connected to appropriate contacts of translator bin 1 comprised of relays R11, R12, R14 and R17 so that if bin one contains the cross-connected digit, ground will be removed from lamp 1, whereas if bin 1 does not contain the cross-connected digit, ground will not be removed from lamp 1. Lamp 2 is cross-connected to bin 2, comprised of relays R21, R24, and R27, and lamp 3 is cross-connected to bin 3, comprised of relays R31, R32, R34, and R37. When bins 1, 2, and 3 all contain the cross-connected digit, ground is removed from lamp 1, 2, and 3 and lamp 4 will be permitted to fire when its circuit is completed. For example, with lamp 1 cross-connected to terminal 13 and hence to conductor 3, cable 1, conductor 3 to break contacts *m* of relays R11 and R12 to ground in parallel, if relays R11 and R12 are both operated corresponding to digit "3" ground is removed from lamp 1, but if either relay R11 or R12 is non-operated, ground will not be removed from lamp 1. Accordingly, if translator bins 1, 2, and 3 contain the digits of the called number, ground is then disconnected from lamp 1, 2, and 3; lamp 4 is prepared for operation when its circuit is completed.

Relay HV1 is a 25 millisecond slow operate relay, and operates after the lamps of the lamp clusters have had time to reach a steady state condition. Relay HV1 locks over make-before-break contacts through the circuit extending from battery over the upper winding of relay HV1, contacts HV1—*c*, and BY—*c*, to ground. Relay HV1 extends +160 volt battery from a point on the regulator circuit voltage divider over contacts HV1—*b* to the anodes in parallel of twenty cold cathode tubes, corresponding to twenty possible routes.

It is observed that lamp 4 of the first cluster associated with +120 volt lead 1 represents a dialed office code of a certain combination of three digits, whereas lamp 8 of the second cluster associated with this same +240 volt lead 1 represents a different office code of a different combination of three digits. One element of each of these lamps is connected through a resistor to the +240 volt supply; the other element of each of these tubes 4 and 8 is cross-connected to the grid of any of the twenty cold cathode tubes, according to routing requirements. For example, the other element of tube 4 may be cross-connected to the control electrode of cold cathode tube V1; and the other element of tube 8 to the control electrode of cold cathode tube V20.

For use with a six digit code comprising a three digit area code followed by a three digit office code X-wiring is connected and only lamp 8 is cross-connected to the control element of a cold-cathode tube.

When three digit office codes are considered, the potential of the control element of the cold cathode tube cross-connected to gas tube 4 is kept from rising only as long as ground is kept on any one of tubes 1, 2, and 3 by the relay contact fans. On the other hand, if ground is removed from tubes 1, 2, and 3, the potential of the said control electrode is conditioned to rise as soon as 25 millisecond slow operate relay HV1 operates, supplying +160 volts potential to the anodes of the cold cathode tubes.

Accordingly, when relay HV1 operates, the control path of any cold cathode tube so conditioned fires, whereupon the main path fires; the associated translator relays operate in series with the cathode in the main path of the cold cathode tube. For example, as shown, if digit 3 is stored in the first bin, digit 2 in the second bin, and digit 1 in the third bin, cold cathode tube V1 fires, operating relay A1 over the path extending from the +160 volt point in the voltage divider, contacts HV1—*f*, the anode of cold cathode tube V1, the internal main path thereof, the main path cathode, the winding of relay A1, the winding of associated relay B1, contacts HV1—*j*, to the approximately —30 volt point of the voltage divider comprising the circuit extending from ground through a 1200 ohm resistor, an 800 ohm resistor, the negative pole of a 48 volt battery, and through the said battery to ground.

When one set and only one of the translator relays A1, B1, A2, B2, . . . A20, B20 is operated and relay NC2 is non-operated, relay R1 operates and closes a circuit to operate relays R1, R2, and HVD in the TNO circuit. This operating path extends from battery over these three relays in parallel, over break contacts of translator relays of a second and a third TNR circuit, which may be connected in parallel to the TNR circuit shown if a maximum of forty or sixty routings are required instead of twenty routings or X and Y wiring; in lieu thereof the circuit is completed over contacts B20—*u*, through similar break contacts of relays B19—B3, contacts B2—*u*, B1—*v*, and NC2—*b* to ground.

Relay R1 at its contacts R1—*c* and R1—*f* extends ground to translator information leads 14 and 17 which pass through the INF—1 cable back to Reg. 1; relay TNT in the register operates, as explained hereinbefore in connection with register description.

Relay R1 also operates relays S1, S2, S3 and S4 over the path extending from battery, over the windings of relays S1 and S2 to one contact of the set R1—*n* and battery, over the windings of relays S3 and S4 to another contact of the set R1—*n*, through contacts R1—*n*, and R0—*c* to ground.

Relay S4 operates and completes an energizing circuit for relay SG over the path extending from ground, over contacts SG—*s* and the winding of relay SG, to battery.

Relay SG operates and connects ground through its contacts *a*, *c*, *e*, and *g* to leads 1, 2, 3, and 4 respectively, which pass into a cable. A branch of lead 4 emerges from this cable to supply ground, to hold 80 milliseconds slow release relay NC operated, the circuit extending over its contacts NC—*d*, its upper winding, to battery; relay HV1 has opened its operating circuit comprising its first winding at contacts HV1—*h*, thus starting a timing period. Leads 1, 2, 3, and 4 emerge from the cable to supply ground, the levers of relays A1, B1 to A20, B20, and to certain levers of NC2 as shown.

Contacts *a* of relay A1 are cross-connected to one of the register information terminals which connect with leads 3, 4, 5, 6, and 7, which in turn pass into a cable and emerge at contacts R1—*i*, R1—*l*, R2—*c*, R2—*f*, and R2—*i*, respectively. If, for example, contacts A1—*a* are cross-connected to a register information terminal which is connected to lead 5, when ground is extended over this lead through contacts R2—*c*, conductor 31, cable INF—1 cable, and emerges through conductor 31 in Reg. 1, the signal is given to the register to call in a sender after the 5th digit has been received, as described relative to the register in more detail hereinbefore. While the description hereinbefore was Reg. O, this aspect also holds for Reg. 1 and Reg. DO.

The receipt of this information in the register (Reg. 1, for example), results in the release of relay RTG, which removes the holding battery of relays 1CO1 in the RTG circuit and relay TNS1 in Reg. 1.

Relay 1CO1 releases and releases relay BY in the translator. It is noted that when HV0 operates, it disconnects the +250 volt circuit from the lamp cluster, allowing any lamps therein to extinguish; the fired cold cathode tube remains fired over its main path.

Relay BY releases and removes the +160 volt potential from the anodes of the cold cathode tubes, extinguishing the fired tube (tube V1, for example), and further releases the associated relays (relays A1 and B1, for example). The release of relay BY also releases relay HV1 which locked thereto over make-before-break contacts. The release of relay BY also prepares the circuit for the reoperation of relays 1TA, 2TA, and 3TA in the TNG circuit.

The release of relay B1 releases redays R1, R2, and HV0; the release of relay R1 releases relays S1, S2, S3 and S4; and the release of relay S4 releases relay SG.

The release of relay R2 further prepares the circuit for the reoperation of relays, 1TA, 2TA, and 3TA in the TNG circuit.

*Additional details relative to sender-translator cooperation*

Referring again to FIGS. 25–45, when relay TCS (FIG. 31) in the sender (SEND. 1, for example) applies battery to the call signal lead CS, relay R1 in the STG circuit operates in a manner analogous to the operation of relay R1 in the RTG circuit. It is observed that there are four relays R1–R4 in the TNG circuit, corresponding to four senders, whereas there are ten relays R1–R10 in the RTG circuit, corresponding to ten registers. It is further observed that relay 1CO1 at its contacts 1CO1–*b* operates relays 1T1 and 2T1, and at its contacts 1CO1–*c* operates 3T1 and 4H1; whereas relay 1CO1 in the RTG circuit is operated in parallel with a single relay TNS1, the difference being occasioned by the fact that more leads must be switched between the sender and translator than between the register and translator, there being forty-eight leads (1–48) switched between sender and translator and twelve leads (1–12) switched between register and translator. With these differences noted, the operation of STG is so closely related to that of RTG that a detailed explanation is not repeated hereat.

As before stated relay TCS operates and effects operation of relay R1.

Relay R1 operates and in turn effects operation of relays RS1 and A, which operates relay B. Relay R1 at its contacts R1—*f* and R1—*q*, extends its operating battery to the *s*-conductor of STG which enters the TNG circuit as lead 9, which is the first lead of the STG group. This lead enters a cable, emerges as lead 9, and is extended over contacts 2TB—*g*, the winding of relay BT9, conductor 9, cable, conductor 9, contacts 2BG—*q*, and 3TB—*i* to ground.

Relay BT9 operates and in its turn effects operation of relays 1BG, 2BG and 1BS.

Relay 1BS operates and at its contacts BT9—6 completes an energizing circuit for relay RT6 and also completes an operating circuit for relay 2BS.

Relay 2BS operates and closes an energizing circuit for relay 2CO1, which operates and in turn effects operation of relays, 1T2, 2T2, 3T2, and 4T2, and relay BY in translator #2 (TNS2) over BY2 to TNO2, which is multipled to the other STG's which work into TNG. Relay 2CO1 also opens the circuits of relays R1 and BT9. Relay R1 releases and releases relay A. Relay BT9 releases and in its turn releases relay 1BG and 2BG. When relays A and 1GB are released, relay B is released.

Relay BY in translator 2 operates and releases relays 1TB, 2TB, and 3TB in TNG, which are analogous to 1TA, 2TA and 3TA relative to translator 1.

The release of relay 3TB, when relay 3TA is released, operates relays 1TOV and 2TOV.

Relay 1TOV operates over the circuit extending from battery, over the winding of 1TOV, contacts 3TB—*a*, and contacts 3TA—*j* to ground. Relay 1TOV locks over a circuit extending over contacts 1TOV—*f*, contacts 3TB—*b* and 3TA—*l* in parallel, to ground; thus although only one of the relays 3TB or 3TA may operate, relay 1TOV holds until the second one operates.

Relay 2TOV operates over the circuit extending from battery over the winding of relay 2TOV, contacts 3TB—*e*, and contacts 3TA—*o*, to ground; relay 2TOV locks over a circuit extending from contacts 2TOV—*f*, over contacts 3TB—*g* and 3TA—*c* in parallel, to ground, so that although only one of the relays 3TB and 3TA may operate, relay 2TOV does not release until the other one has also operated.

After relay BY in translator 1 has released, a circuit is completed to operate relays 1TA, 2TA as follows: battery, contacts 1TOV—*e*, 3TA—*f* and 3TA—*i* in parallel, windings of relays 1TA, 2TA, and 3TA in parallel, contacts AT—*a*, and contacts BY—*a* and S2—*t* in translator 1, to ground. Relays 1TA, 2TA, and 3TA operate and lock over a circuit extending over make-before-break contacts 3TA—*d* and 3TA—*g*, a 500 ohm resistor, to battery, as relay 3TA operates.

The operation of relays 1TA and 2TA switches the odd numbered S-lead pulling circuit back to the AT1—AT12 chain.

When relays 1T2, 2T2, 3T2, and 4T2 operate, forty-eight information leads labeled 1–48 are switched via the 1NF—2 cable from STG—*l* to translator 2 (TNO2). Because TNO2 is only indicated in the drawings, explanation thereof is made in connection with the TNO1 lead; the two translators are the same, and only connections thereto are varied. With reference to the TNO circuit shown in FIGS. 39–41, which can represent either or both translators, these leads emerge from cable ING—2, leads 1–24 connecting to levers of relays S1, S2, S3, and S4 labeled AR1—20P; leads 25–47 entering the TNR circuit and emerging from the cable therein, as leads MFP—4; and lead 48 emerging from the cable from STG and connecting to lever *b* of relay RO. It is observed that leads 25–47 from STG connect individually in parallel to corresponding leads in TNR1, TNR2, and TNR3.

Leads 1-24 as extended over break contacts of relays S1–S4, and connect to the windings of relays R11–R67. Circuits are thus completed from make contacts of relays R11–R67 in the register which has engaged the sender, over break contracts of sender, transfer relays SDT1, SDT2, and SDT3 (FIG. 11) in the register, cable, RSL circuit to the sender, through the sender, leads 1–24 from the sender to the translator, through the windings of operated relays R11–R67 in the register, which operates its corresponding relay in the translator over a circuit extending from ground over the contacts associated with the levers in the register. Accordingly, any digits stored in register bins 1–6 will be transferred to translator bins 1–6.

The operation of any relay in bins 1–6 of the translator completes energizing circuits for relays HV2 and HV1.

Relay HV2 operates, and after an interval relay HV1 also operates.

Relay HV1 effects operation of a set of relays (for example, relay A1 and B1) in the TNR circuit, corresponding to the setting of the bins 1–6 in the TNO circuit. Relay HV1 also operates relay HV0 in the TNO circuit.

Relay R1 operates and energizes relays S1, S2, S3, and S4 in the TNO circuit.

The operation of relays S1–S4 release any of the operated relays R11–R67, which in turn releases relay HV2.

Relay S4 operates and energizes relay SG.

Relay SG operates and connects ground to levers of relays A1–B20 of the TNR circuit. Associated make contacts of these relays (for example, contacts C—*u* of relay A1 and contacts *c–r* of relay B1) are appropriately cross-connected to terminals on leads AR1, AR2, etc. to SP4 in the TNR circuit, to provide the appropriate translation information to the sender. These leads enter a TNO cable and emerge, and are extended over make contacts of relays S1–S4, into the ING—2 cable from TNO2 to the sender (SEND. 1, for example).

The AR, BR, and CR information is the routing information stored in sender bins 2, 3, and 4. None, one, or two of the leads of each the AR, BR, CR groups may be grounded.

The ARP information is the routing information stored in sender bin 1.

The DL information is the information to the sender respecting the number of digits, of the first six received in the register, which should be deleted if the alternate route is used. None, one, or two of the DL leads may be grounded.

The DLP information is the information to the sender giving the number of digits, of the first six received in the register, which should be deleted if the primary route is used. None, one, or two of the DLP leads may be grounded.

The pulsing information is that which enables the sender to send 10 p.p.s., 20 p.p.s., multifrequency pulses, or code pulses. Only one of the pulsing leads is grounded.

The AGS, BGS, and CGS information is the crossbar group selector routing digit information stored in the sender 6th, 8th and 9th storage bins. One or two of the leads in each group may be grounded. The cross-connecting to the ASG group may be omitted if only one group selector is involved.

The FS information notifies the sender that the call is to a free service trunk. If no cross-connect to the FS terminal is provided, the absence thereof indicates to the sender that the destination is not a free service but is a toll location.

The TT information notifies the sender that both toll trunks and free service trunks extend to the destination, operating relay ALT in the sender. Accordingly when a toll trunk engages the sender it, contrary to the free service information received, routes the call over the toll trunks. The DSL information notifies the sender that if the call, from free service or local origin, is routed over free service trunks, then a dial stop signal is to be expected. The DST information notifies the sender that if the call from a toll trunk, and is routed over the toll trunks then a dial stop signal is to be expected. In such event, either the DST or DSL information may be missing.

The SP1, SP2, SP3, and SP4 terminals are spares.

Responsive to receipt of translated information in the sender bins, the sender removes call signal lead battery, releasing relay SCO1.

Relay 2CO1 releases and in turn releases relays 1T2, 2T2, 3T2, 4T2, and relay BY in translator 2.

Relay BY releases and effects releases of relaps HV1, A1, and B1.

Relay B1, in its release, also releases relays HV2, R1 and R2.

Relay R1 releases and effects release of relays S1, S2, S3, and S4.

Relay S4 releases and opens the circuit of relay SG, which releases.

Relay S2 releases and completes the energizing circuit to reoperate relays 1TB, 2TB, and 3TB. This energizing circuit extends from battery, over contacts 2TOV—*e*, contacts 3TB—*m* and 3TB—*p* in parallel, windings of relays 1TB, 2TB, and 3TB in parallel, contacts BT—*b*, conductor BK2 (refer now to conductor BK1 for convenience), translator 2, contacts BY—*b* and S2—*t* in translator 2, to ground. Relays 1TB, 2TB, and 3TB operate and lock over a circuit extending from make-before-break contacts of relay 3TB, a resistor, to battery.

The operation of relay 3TB removes the holding circuits from relays 1TOV and 2TOV, releasing those relays.

It is noted that ground is extended over contacts 3TA—*r*, conductor 1, to the PCR circuit, and thus a signal is given to the translator-1 busy circuit; ground is also extended over contacts 3TB—*j*, conductor 2, to the PCR circuit, to give a signal to the translator-2 busy circuit.

It is also noted that both relays 1TOV and 2TOV apply ground to a translator overload circuit in PCR, the duration of this ground application to the lead being indicative of the busy condition of the translators. Accordingly a timing circuit in PCR can detect an unduly long relative period of time.

It is observed that when Reg. 1, for example, is extended to translator 1, relay 1CO1 operates responsive to relay AT1 extending its battery pulling circuit; and if Reg. 1, for example, is extended to translator 2, relay 2CO1 operates responsive to relay BT1 extending its battery pulling circuit.

Accordingly it is possible that Reg. 1 might engage translator 1; as soon as ground is reestablished through contacts B—*a* and break contacts of relay A, Reg. 2 might operate relay R2, engaging translator 2, and operating relay 2CO2. Under such conditions, all circuits extending to the windings of relays AT1–AT12 and BT1–BT12 are open at contacts of relays 1TA, 2TA, 1TB, and 2TB; accordingly if another register or sender (Reg. 10, for example) attempts to seize a translator, batter is extended over contacts of relay RTG—*a* in Reg. 10 and relay R10 operates, but relay R10 cannot operate relay AT1 or BT1.

A similar situation obtains relative to senders and translators.

A register may seize translator 1 and a sender may seize translator 2; in such event, no other register or sender can seize a translator until one of the translators is released.

Alternatively, a sender may seize translator 1 and a register translator 2, but in this event, no other register or sender can seize a translator until one of the translators is released.

In other words, the two translators may be seized by any combination of registers and senders, but when both translators are in use, no other register or sender can seize a translator until a translator becomes idle. When a translator becomes idle it can be seized, even though the other translator is still in use.

*Relay ALT in sender*

Figure 50:
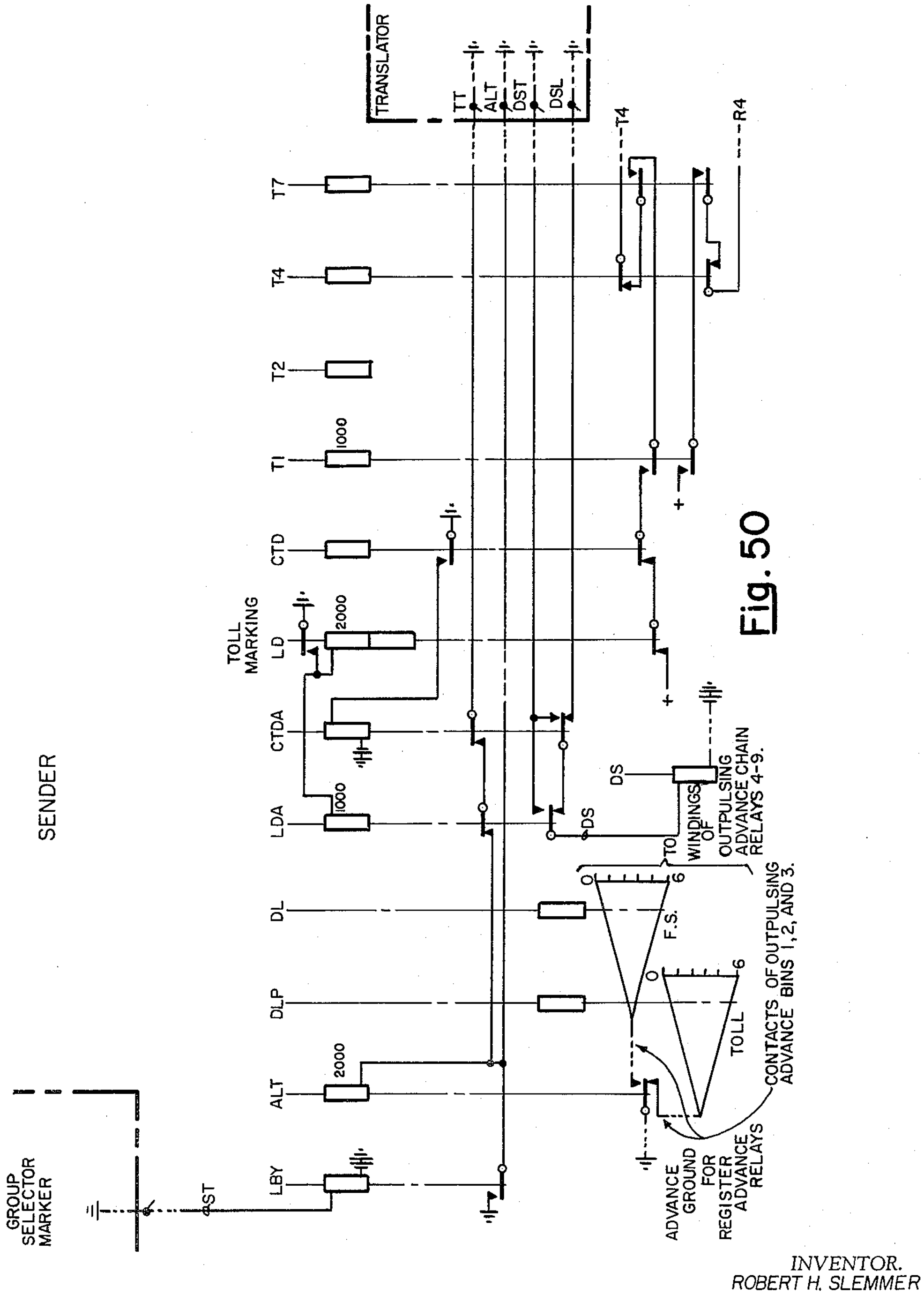
FIGURE 50 shows TT, DSL, and DST signals from translator to sender.
Figures 51, 52:
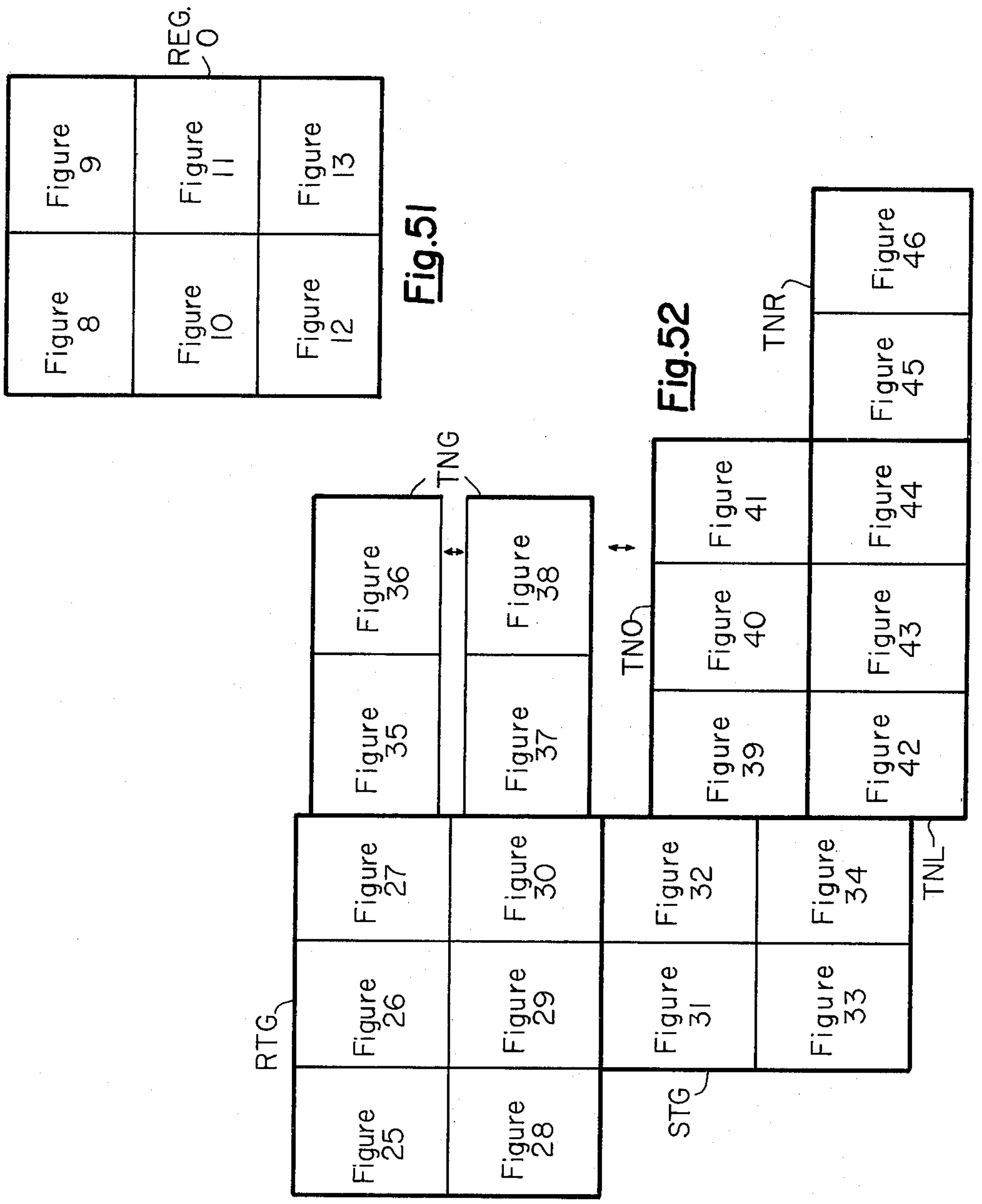
FIGURE 51 is an assembly schematic for Reg. O of FIGURES 8–13.
FIGURE 52 is an assembly schematic for the translator and guards of FIGURES 25–46.
Figure 53:
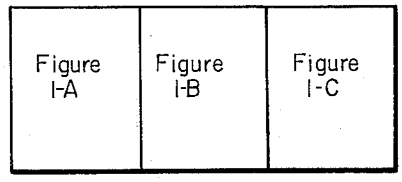
FIG. 53 is an assembly drawing for the schematic diagram of FIGS. 1A, 1B, and 1C.
Figure 54:
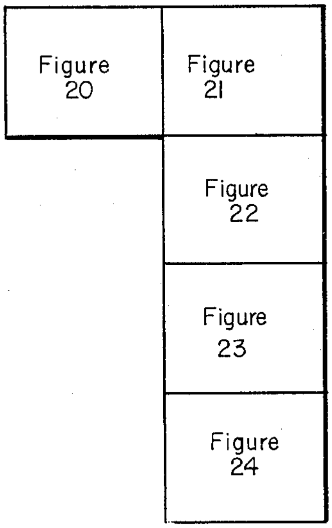
FIG 54 is an assembly schematic for FIGS. 20–24 illustrating certain features of register-sender-translator functioning.
Figure 56:
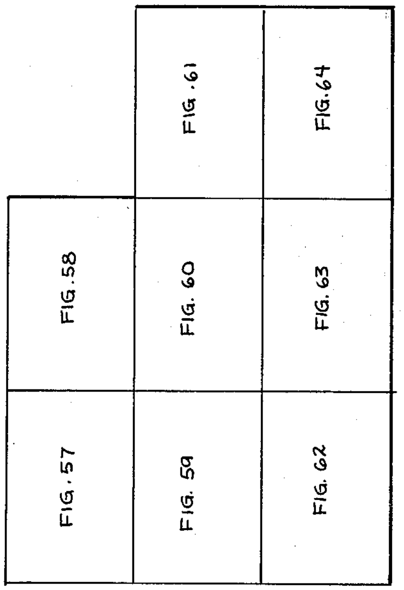
FIG. 56 is an assembly schematic for Register I of FIGURES 57–64.
Figure 55:
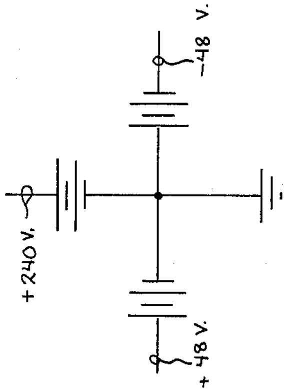
FIG. 55 is a schematic drawing of certain battery sources used in the illustrated crossbar system including −48 volt battery with the positive pole grounded, +48 volt battery with the negative pole grounded, and +240 volt battery with the negative pole grounded.
Figure 57:
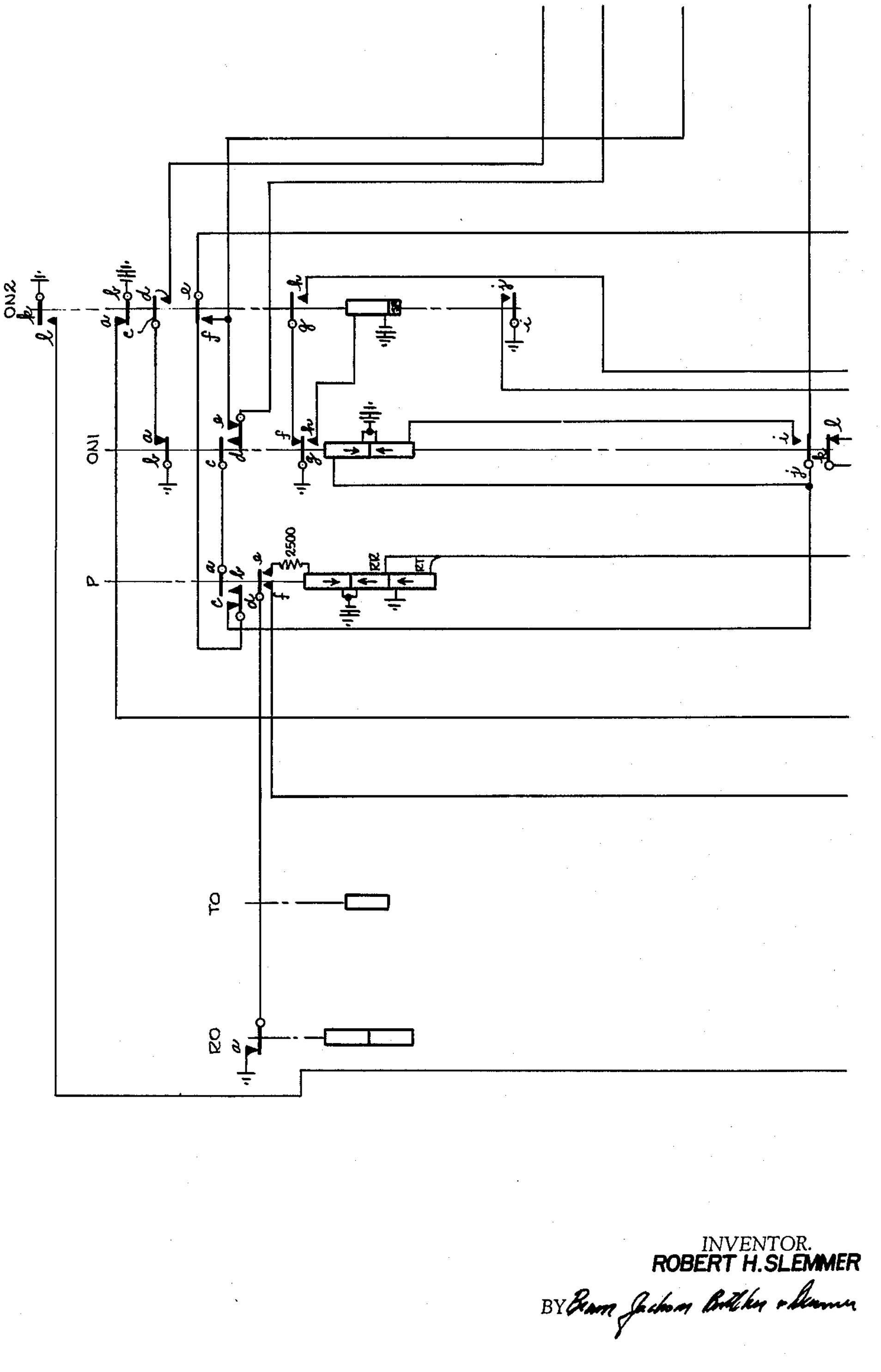

Relay ALT in the sender (FIGS. 23 and 50) functions in three different situations:

(1) The situation in which there is only a primary route to a destination;

(2) The situation in which there is both a primary and an alternate route to a destination; and (3) The situation in which there are neither primary nor alternate routes, but direct free service trunks and direct toll trunks to the same destination. The three situations will be considered separately.

*Primary route only*

From one to three primary routing digits are stored in "alternate" routing bins 2, 3, and 4 of the sender. Relay ALT is operated over a circuit including the ALT lead from translator. The operation of relay ALT:

(1) Transfers the "read-out" leads of outpulsing advance chain relay 1 from sender bin 1 output contacts to sender bin 2 output contacts.

(2) Includes outpulsing advance chain relays 2 and 3.

(3) Routes the start circuit of outpulsing advance chain relays 4–9 through contacts of the "DELETE ALTERNATE" bin DL, so that from none to six of the relays 4–9 can be skipped, according to the setting of the bin DL.

*Primary and alternate routes*

A primary routing digit is stored in sender bin 1, and from one to three alternate routing digits are stored in sender bins 2, 3, and 4.

If the group selector succeeds in routing the call over the primary route, no LBY (line busy) back signal is sent from the group selector marker to the sender. Accordingly neither relay LBY nor relay ALT operates. With relay ALT non-operated:

(1) The "read out" leads of outpulsing advance chain relay 1 are directed to the output contacts of sender bin 1.

(2) The outpulsing advance chain relays 2 and 3 are excluded.

(3) The start circuit of outpulsing advance chain relays 4–9 is routed over contacts of "DELETE PRIMARY" bin DLP, so that from none to six of the relays 4–9 are skipped, according to the setting of the bin DLP.

If the group selector is not successful in routing the call over the primary route, a back signal from the group selector marker operates relay LBY, which completes an energizing circuit for relay ALT. With relay ALT operated:

(1) The "read-out" leads of outpulsing advance chain relay 1 are directed to the output contacts of sender bin 2.

(2) The outpulsing advance chain relays 2 and 3 are included.

(3) The start circuit of outpulsing advance chain relays 4–9 is routed over contacts of "DELETE ALTERNATE" bin DL, so that from none to six of the relays 4–9 are skipped, according to the setting of the bin DL.

*Toll and free service trunks to same destination*

When a group of direct toll trunks and a group of direct free service trunks are employed, no routing digits are necessary. Therefore the register advance chain begins with relays 4–9, modified by any deletion of 4–9. In such a situation, the translator returns neither primary nor alternate routing digits, and the translator returns no signal on the ALT lead. Instead, the translator applies ground to the TT lead, and returns free service indication by applying ground to the FS lead. Additionally the translator may or may not place ground on lead DST (Dial Stop Toll), and may or may not place ground on lead DSL (Dial Stop Local). Also the translator stores a "B" crossbar routing digit of value 8 in sender bin 8, and a "C" crossbar routing digit of a value high enough to insure no conflict with any TX code in sender bin 9. When there is only one TX team, digits 81 are assigned thereto; therefore, digits 82 can be assigned to the free service trunks, with digit 2 in bin 9.

When the call originated is of non-toll type, relay LD does not operate and accordingly relay LDA is non-operated. When the call is non-machine toll ticketed, with relays CTD and CTDA non-operated, a +48 volts potential is applied over break contacts of relay LD, make contacts of relay T1 of bin 8, make contacts of relay T7 of bin 8, break contacts of relay T4 of bin 8, etc., to lead T4; +48 volts potential is applied over make contacts of relays T1 and T7 of bin 8, break contacts of relay T4 of bin 8, etc., to lead R4. Thus leads T4 and R4 are conditioned to send digit 8 as a condition for reaching the toll trunks. If the translator had placed ground on the DSL lead, such ground would be extended over break contacts of relay CTDA and break contacts of relay LDA, the winding of relay DS (Dial Stop), to battery; relay DS would operate and function to cause the sender to delay sending until a dial start signal is received over the free service trunk. Also, ground is extended over lead TT from the translator, over break contacts of relays CTDA and LDA, the winding of relay ALT, to battery. Relay ALT operates and extends advance ground for register advance relays 4–11 over make contacts of relay ALT, break contacts indicated of storage bins 1, 2, and 3, and contacts of the DL bin to an output lead 0–6. If ground is applied to lead 0, ground enters the outpulsing advance chain of relays including relays 4–9 at such point to cause the deletion of no relays 4–9, i.e., relay 4 and all subsequent relays operate. If ground is applied to lead 1, relay 4 is deleted; relay 5 and all subsequent relays operate. If ground is placed on lead 6, relays 4–9 are deleted and relay 10 (and possibly 11) operate. Thus certain digits may be deleted and not sent over the trunk.

If the origin of the call is toll, relays LD and LDA are operated. When the origin is automatic toll ticketing trunks, relays CTD and CTDA operate. Relay LD or relay CTD operates and at its break contacts removes +48 volts from lead T4 (+48 volts remaining on lead R4 through make contacts of relays T1 and T7 of sender bin 8). It is noted that +48 volts applied to the ring conductor is the signal from the sender to the group selector marker for digit 5 instead of 8, whereby the sender sends a crossbar "B" marking digit of 5 to the group selector marker. As codes 50 and 51 are used for other purposes, in this case the crossbar "C" routing digit sent will be a character other than "0" or "1," for example, "2." Thus code 52 sent to the group selector marker enables the marker to route the call to toll trunks. If the translator applies ground to lead DST, this ground is extended over make contacts of relay LDA or CTDA, the winding of relay DS, to battery; relay DS operates and conditions the sender to wait for a start signal before sending. Also when relay LDA or CTDA is operated, the TT lead ground is withheld from relay ALT, which does not operate.

When relay ALT is non-operated, advance ground for register advance relays 4–11 is extended over make contacts of relay ALT, break contacts indicated of storage bins 1, 2, and 3, and contacts of the DLP bin to an output lead 0–6, whereby from none to six of the outpulsing advance chain relays are deleted and not sent over the toll trunk.

The deletions effected by either bin DL or DLP for the outpulsing advance relays when ground is applied to the various leads are given below:

| Grounded lead | Deletion |
|---|---|
| 0 | Delete no relays of group 4–9. |
| 1 | Delete relay 4. |
| 2 | Delete relays 4 and 5. |
| 3 | Delete relays 4, 5, and 6. |
| 4 | Delete relays 4, 5, 6, and 7. |
| 5 | Delete relays 4, 5, 6, 7, and 8. |
| 6 | Delete relays 4, 5, 6, 7, 8, and 9. |

*Additional consideration of digital handling in Reg. I*

Referring to FIGS. 57–64, therein Reg. I is shown in more structural detail.

Responsive to a lost digit trunk seizing its associated TRL circuit, the TRL circuit tests for idle registers. If a Reg. I is idle, battery is applied to its TB conductors, the circuit extending over contacts ON2—*a*, RC—*c*, SC—*g*, over lead GTB, and this same ground applied through a 500 ohm resistor to lead TB is an indication of its being idle to the TRL circuit.

Assuming that the TRL seizes the Reg. I shown (which represents all Reg. I's), the TRL connects the register ring and tip leads RR and RT together through pulsing contacts in the trunk circuit; pulsing relay P in Reg. I operates over the circuit extending from battery through the middle winding of relay P, lead RR, cable, lead RR, contacts KS—*a*, TO—*a*, lead RR, through TRL crosspoints (not shown), through closed pulsing contacts in the calling trunk, over TRL crosspoints (not shown), lead RT, contacts TO—*c*, KS—*d*, lead RT, cable, lead RT, and lower winding of relay P to ground. It is noted that, as indicated by arrows, these windings of relay P are in aiding relationship.

Additionally the TRL circuit extends other circuits between the trunk and Reg. I, including lead TH which provides a holding ground to the trunk from the pulse relay; lead TBY which carries trunk and busy signals from the sender to the trunk; and lead RH which extends a holding ground to the TRL. Sender ring and tip leads SR and ST are extended from the trunk over TRL crosspoints, and when relay H subsequently operates, these leads are extended to the RSL (register sender link circuit associated with the register). The TRL circuit also extends lead RC to the trunk and the trunk applies battery thereto; relay RC operates, the circuit extending over its upper winding and contacts RD—*a* to ground.

Relay RC marks the register as busy from the trunk. Relay RC at its break contacts RC—*c* removes battery from leads GTB and TB; at its make contacts RC—*f* extends a holding ground over lead RH to the trunk. Relay RC at its contacts RC—*b*, completes an operating circuit for relay SC over the path which extends from battery through the winding of relay SC, and contacts RC—*b* and H—*f* to ground; relay SC locks over contacts SC—*f* and H—*f* to ground. Relay SC further holds open the battery circuits to leads GTB and TB.

Upon seizure of the register, marking signals on leads M1 and M2 from the trunk over TRL crosspoints condition the trunk as described hereinafter. Discussion of various incoming conditions is included in the description.

*M2 lead*

If the call is from a keyset trunk (such as trunk D), +48 volts potential on lead M2 is extended from the trunk over TRL crosspoints through the rectifier as shown, over the winding of relay TL (500 ohm resistance), upper winding of relay KS, contacts KS—*q*, cable contacts RC—*g* to ground; relays TL and KS operate. Relay KS locks over the circuit extending from battery through its lower winding and contacts KS—*r*, which make before contacts KS—*q* break, to this same ground. The opening of contacts KS—*q* releases relay TL. With relay KS operated, Reg. I is conditioned for a call from a keyset trunk. It is observed that in coming ring and tip conductors RR and RT are switched over contacts KS—*a* and KS—*f* through rectifiers poled as shown to keyset code receiving relays R1–R7, which are successively operated in combination for various digits by the operator's keyset.

The potentials applied to leads RR and RT by the operator's keyset are as follows:

| Digital value | RT | RR | Relays operated |
|---|---|---|---|
| 0 | -------- | +48 | R4, R7 |
| 1 | −48 | -------- | R1 |
| 2 | Grd | -------- | R2 |
| 3 | +48 | -------- | R1, R2 |
| 4 | -------- | −48 | R4 |
| 5 | −48 | −48 | R1, R4 |
| 6 | Grd | −48 | R2, R4 |
| 7 | -------- | Grd | R7 |
| 8 | −48 | Grd | R1, R7 |
| 9 | Grd | Grd | R2, R7 |

If the call is from a toll trunk (for example, from trunk B), +48 volts potential through a resistance is applied to lead M2 by the trunk through TRL crosspoints; relay TL operates but KS does not operate. Relay TL marks the register for cooperation with an incoming toll trunk.

When the call is from a free service trunk which may have lost digits, −48 volts on lead M2 is extended through the rectifier as shown, over the winding of relay TT (500 ohms), the upper winding of relay FS (15 ohms), contacts FS—*p*, conductor C, cable, conductor C, and contacts RC—*g* to ground; relays TT and FS operate. Relay FS locks over its lower winding and make before break contacts *g*—*p*, releasing relay TT. Relay FS conditions the register for cooperating with a free service trunk which may have lost digits.

If the call is from a ticketing trunk, −48 volts potential through a resistor is applied to lead M2 by the trunk, over TRL crosspoints, through the rectifier as shown, winding of relay TT, upper winding of relay FS to ground, as before described; only relay TT operates, thus conditioning the register to cooperate with a ticketing trunk. By ticketing trunk is meant a trunk which by origin presupposes that calls will be automatically ticketed.

When the call is from a free service trunk over which no lost digits occur, no potential is extended over lead M2 and thus relays FS, TT, TL, and KS are non-operated, conditioning the register for cooperation with such a trunk; see classes KS0–FS4.

*Lead M1*

In similar fashion when no potential is extended over lead M1, class relays CL1, CL2, CL3, and CL4 are non-operated to indicate class 0, designated on a chart hereinbefore as KS0, TL0, N0, TT0, and FS0 according to the type of incoming trunk, as otherwise indicated via lead M2 just described. When positive 48 volts potential is applied over lead M1, relay CL1 operates to indicate class 1 for the various types of trunks, this class for the various trunks being indicated on a chart hereinbefore as KS1, TL1, N1, TT1, and FS1. When positive 48 volts potential is applied through a resistance to lead M1, relay CL2 operates to indicate class 2 for the various types of trunks, being indicated on a chart hereinbefore as KS2, TL2, N2, TT2, and FS2. When a negative 48 volts potential is applied through a resistor to lead M1, relay CL3 operates to indicate class 3 for the various types of trunks, being indicated on a chart hereinbefore as KS3, TL3, N3, TT3, and FS3. When negative 48 volts potential is applied to lead M1, relay CL4 operates to indicate class 4 for the various types of trunks, being indicated on a chart hereinbefore as KS4, TL4, N4, TT4, and FS4. It is noted that these designations are descriptive. For example, KS4 means "keyset class 4"; TL4 means "toll class 4"; N4 means "no lost digits class 4"; TT4 means "ticketing class 4"; and FS4 means "free service class 4."

*Storage of incoming digits in general*

Relay P (the pulsing relay) operates and at its contacts P—*e* closes a circuit to energize its third winding (upper winding), which is much weaker than and opposed to the other two windings; the energizing circuit extends from battery through the upper winding of relay P, 2500 ohm resistor, contacts P—*e* and RO—*a* to ground, thus making relay P quick to release when the pulsing loop is opened. Relay P at its contacts P—*f* completes an operating circuit for slow release master ground hold relay H, the circuit extending over the path from battery through the winding of relay H, contacts SC—*i*, P—*f*, and RO—*a* to ground.

When the trunk opens the RR—RT loop for the first pulse, relay P releases. Relay ON1 operates over the circuit extending from ground, through contacts H—*f*, and SC—*f* and RC—*b* in parallel, KS—*g*, conductor B, cable, conductor B, contacts P—*c*, and the upper winding of relay ON1 to battery, and completes an obvious circuit over contacts ON1—*i* to connect the two windings in series, in preparation for release. Relay ON1 at its contacts ON1—*h* completes an obvious circuit for relay ON2.

When the loop is reclosed, relay P reoperates. A circuit is then completed to operate counting chain relay C1 over the path extending from ground through contacts H—*f*, SC—*f*, KS—*g*, conductor B, cable, conductor B, contacts P—*b*, ON1—*d*, break contacts *i* of counting chain relays C5, C4, C3, C2 and the upper winding of relay C1 to battery. The circuit of ON1 is opened when contacts P—*c* open. Relay ON1 is so designed that it holds between pulses, but releases at the conclusion of a digit.

When relay P releases on the next pulse break, relay ON1 is reenergized and counting chain relay C2 operates in series with C1, over the path extending from battery through the upper winding of relay C2, through the lower winding of relay C1, contacts C1—*l*, P—*c*, conductor B, cable, conductor B, contacts KS—*g*, RC—*b* and SC—*f*, and H—*f*, to ground.

When relay P reoperates on the second pulse, relay C2 holds over the circuit extending from battery through the upper winding of relay C2, contacts C2—*k*, break contacts *i* of relays C3, C4, and C5, contacts ON1—*d*, P—*f*, conductor B, cable, conductor B, contacts KS—*g*, RC—*b* and SC—*f* in parallel, and contacts H—*f* to ground.

As the operation of relays P, ON1, ON2 and the counting chain is readily understood after reading the similar description hereinbefore relative to Reg. O, further detailed description of such operation is not necessary.

At the conclusion of a digit, circulating current through the upper winding of relay ON1 gives it a slow to release characteristic, which is modified in the fast direction by the weaker lower winding. Relay ON1 opens the circuit of slow release relay ON2, which releases after an interval. The interval between the release of ON1 and the release of ON2 is designated the "registration period."

Assuming the call is not a "lost digit" call, the equipment operates during the registration period at the conclusion of the first digit to register the received digit in the first bin. The register circuit extends from ground through contacts ON1—*a*, ON2—*d*, through contacts of counting chain relays of the group C1–C6 on appropriate lead or leads of the group of leads 1, 2, 4, 7, into and out of a cable, through break contacts of relays LDA and RA1, to corresponding leads 11, 12, 14, 17, into and out of a cable, through a coil or coils of the group of relays R11, R12, R14, and R17, comprising the first register bin, to battery, whereby one or two of these relays (according to the position of the counting chain) is operated to register the received digit. Any of the relays R11–R17 which operate close a locking circuit to conductor A1, the circuit extending through a cable, emerging over conductor A1, through the winding of relay RL1 and a parallel resistor, contacts LDA—*t* (RAP—*q* if RAP has been operated as a result of storage of a digit in the party bin comprising relays RP1–RP7) and contacts H—*o* to ground. This ground, through contacts H—*o* is denominated HB ground; ground through contacts H—*m*, is HA ground; and ground through contacts H—*g*, is HC ground. Relay RL1 does not operate immediately, as it is shunted at this time by ground on both sides of its winding.

When relay ON2 releases, removing this ground shunt, relay RL1 operates in series with the operated relay or relays of the associated group R11–R17. Relay RL1 completes an operating circuit for relay RA1, which circuit extends from ground through contacts RL1—*b* and the winding of relay RA1 to battery. Relay RA1 at its made contacts *c*, *f*, *i*, and *l* routes leads 1, 2, 4, 7 respectively from the counting chain over break contacts *a*, *d*, *g*, and *j* respectively of relay RA2 to conductors 21, 22, 24, 27 respectively, leading through a cable and emerging therefrom into the coils of storage bin 2 relays R21, R22, R24, and R27 respectively.

During the registration period at the conclusion of the second digit, ground is selectively placed on leads 1, 2, 4, 7 issuing from the counting chain contacts, to selectively operate relays R21–R27.

When relay ON2 releases, relay RL2 operates, the circuit extending over lead A2 in series with the operated relay or relays of the group R21–R27. Relay RL2 operates and completes an obvious energizing circuit for relay RA2. Relay RA2 directs the circuit of relay RL2 independent of relay ST and directs leads 1, 2, 4, 7 over break contacts of relay RA3 to leads 31, 32, 34, 37 and thence through a cable to the windings of storage bin relays R31–R37.

During the registration period at the conclusion of the third digit, ground is selectively placed on leads 1, 2, 4, 7 issuing from the counting chain contacts to selectively operate relays R31–R37.

When relay ON2 releases, relay RL3 operates in series with bin 3 relay or relays. Relay RL3 operates and completes an obvious energizing circuit for relay RA3. Relay RA3 directs the circuit of relay RL3 independent of relay ST and routes leads 1, 2, 4, 7 from the counting chain over break contacts of relay RA4 to storage bin 4 relays.

During the registration period at the conclusion of the fourth digit, ground is selectively placed on leads 1, 2, 4, 7 from counting chain contacts to selectively operate relays of the fourth storage bin group R41–R47. Any operated relay or relays of this group closes a locking circuit which extends over lead A4 through a cable with lead A4 emerging, through the winding of relay RA4. Relay RA4 is shunted until relay ON2 releases.

When relay ON2 releases the shunt on relay RA4 is removed; relay RA4 operates in series with the operated relay or relays of storage bin 4, which circuit extends from battery through the winding of a relay or relays of the group R41–R47, make contacts *b* of the operated relay or relays, conductor A4, cable, conductor A4, winding of relay RA4, contacts RA4—*o*, ST—*h*, LDA—*t* (or RAP—*q*) to HB ground. Relay RA4 at its contacts RA4—*n* which make before contacts RA4—*o* break, transfers this circuit to HB ground through LDA—*t* (or RAP—*q*) independent of relay ST.

In a similar manner the succeeding digits received by the chain are transferred during the registration period at the conclusion of the various digits, the register being adapted to store up to eleven digits in the various bins. At such time relay RA11 will be operated, and the storage operation is complete.

Certain operational features of Reg. I will now be considered in more detail.

*1. Automatic ticketing codes*

It is noted that if an automatic ticketing code 112P is received, relay LD operates over the circuit extending from battery through the winding of relay LD, make contacts *f* of relay TT or FS, break contacts *l* of relay ON1, and contacts R12—*i*, R14—*k*, R17—*k*, RA3—*s*, R21—*i*, R22—*i*, R24—*i*, R27—*i*, terminal C17 cross connected to counting chain terminal C17, contacts C2—*b*, and C6—*a* to ground.

When an automatic ticketing code 1YP is received, relay LD operates over the circuit which extends from battery through the winding of relay LD, make contacts *b* of relay TT or FS, break contacts *l* of relay ON1, and contacts R12—*i*, R14—*k*, R17—*k*, make contacts RA1—*q*, break contacts RA2—*r*, to a counting chain terminal as determined by the digit Y in the 1YP code, for example, to terminal C17 for digit 2.

Relay LD extends its operating circuit to relay LDL, the other side of which is connected to HA ground, so that relay LDL is shunted until relay ON2 releases.

When relay ON2 releases, relay LDL operates in series with relay LD and the resistor in parallel with relay LDL helps to hold relay LD. Relay LDL operates relay LDA over the circuit which extends from ground through contacts LDL—*b*, winding of relay LDA to battery.

Relay LDA extends selection conductors 1, 2, 4, and 7 from the counting chain through make contacts *i*, *l*, *o*, and *r* respectively of relay LDA and break contacts *e*, *h*, *k*, and *n* respectively of relay RAP through cables, and emerging therefrom to the windings of party bin relays RP1, RP2, RP4, and RP7 respectively.

It is noted that relay LDA at its contacts LDA—*t* opens the circuits of relays RL1, RL2, and storage bin relays R11–R17 and R21–R27 so that these relays are released. The release of relays RL1 and RL2 effects the release of relays RA1 and RA2. During the registration period, at the conclusion of the next digit received, i.e., the calling party digit, grounds selectively placed on leads 1, 2, 4, 7 from the counting chain are routed over make contacts of relay LDA, and break contacts of relay RAP and conductors RP1, RP2, RP4, and RP7 through cables, and over the windings of relays RP1, RP2, RP4, and RP7 to battery, selectively operating these relays.

Any of these relays which operate extend their operating ground over lead AP, over cables and conductor AP, through the winding of relay RAP to HA ground, relay RAP being shunted by ground on both sides of its winding until relay ON2 releases.

When relay ON2 releases, the shunt on relay RAP is removed and relay RAP operates in series with the operated relay or relays of the party bin relays RP1–RP7. The resistor in parallel with relay RAP helps to hold the party bin relay or relays locked.

With relays LDA and RAP both operated, and relays RA1 and RA2 released, the selection leads 1, 2, 4, 7 from the counting chain are routed over make contacts of relays LDA and RAP through break contacts *a, d, g,* and *j* of relay RA1 to conductors 11, 12, 14, and 17 leading to storage bin 1 relays R11–R17, so that the next digit received will me stored in bin 1, the following digit in bin 2, etc.

*2. Tandem call from free service trunk with one lost digit*

As noted previously all free service trunks which may have lost digits mark Reg. I by operating relay FS (free service) upon landing in the register.

Relay FS operates relay RA1, over the path extending from battery through the winding of relay RA1, contacts LDA—*a*, and FS—*e* to ground.

With relay RA1 "pre-pulled," during the registration period at the conclusion of the first digit received ground selectively placed on leads 1, 2, 4, 7 through counting chain contacts is routed over break contacts of relays LDA and RAP and make contacts *c, f, i,* and *l* respectively of relay RA1 and break contacts *a, d, g,* and *j* respectively of relay RA2, to conductors 21, 22, 24, and 27 through cables, to the windings of storage bin relays R21, R22, R24, and R27 respectively, so that the first received digit is stored in storage bin 2.

This operation is appliacable to classes FS0, FS1, FS2, FS3, and FS4, if only a single first digit is missing.

*3. Tandem call from free service trunk with two lost digits*

As before noted, a call from a free service trunk (class FS0, FS1, FS2, FS3, and FS4) operates relay FS which completes an operating circuit for relay RA1.

When the first two digits are missing, it is necessary to route the first digit received into storage bin 3, and therefore relay RA2 must also be operated. Additionally a second digit must be supplied to enable the translator to identify the called exchange.

Referring to FIGURE 7, dialing pattern A may be assigned as class FS1, so that trunks from Pioneer, Skyline, President, and Pyramid operate relay CL1 upon landing. Of course, these trunks also operate relay FS.

Reference to FIGURE 7 also shows that with dialing pattern A, in a two lost digit situation, the first digit received on a call to Pioneer-7 is 7; the first digit received on a call to Skyline-5 is 5; the first digit received on a call to Skyline-6 is 6; the first digit received on a call to President-4 is 4; and the first digit received on a call to Pyramid-3 is 3. Accordingly the following terminals associated with relay CL1 are cross-connected to indicated terminals associated with the counting chain:

C6—C21—Digit 6 (Terminal D2 is also cross-connected to terminal D1)
C7—C22—Digit 7
C8—C18—Digit 3
C9—C19—Digit 4
C10—C20—Digit 5

The terminals of the counting chain bear the following relationship to received digits:

| Digit | Terminal |
|---|---|
| 1 | C16 |
| 2 | C17 |
| 3 | C18 |
| 4 | C19 |
| 5 | C20 |
| 6 | C21 |
| 7 | C22 |
| 8 | C23 |
| 9 | C24 |
| 0 | C25 |

It is noted that these terminals are connected through contacts of the counting chain directly to ground, not through contacts of ON1 and ON2. Accordingly, if the counting chain stops in the digit 3, 4, 5, 6, or 7 position, relay RA2 operates. For example, if the digit 3 is received on a call from a dialing pattern A office to Pyramid-3, such as a call from Pioneer-7 to Pyramid-3, relay RA2 operates over a circuit extending from battery through the winding of relay RA2, contacts LDA—*c*, FS—*h*, TRA—*f*, rectifier as shown, CL1—*j*, terminal C8 cross-connected to counting chain terminal C18, and contacts C3—*b* and C6—*a* to ground.

Accordingly with relays RA1 and RA2 operated, when relay ON1 releases after an interval, ground through contacts ON1—*a*, ON2—*d*, is selectively placed on leads 1, 2, 4, 7 by counting chain relays through break contacts of relays LDA and make contacts of relays RA1 and RA2 and break contacts of relay RA3 via leads 31, 32, 34, 37, through cables, through windings of relays R31, R32, R34, R37, to selectively operate these relays and store the first received digit in storage bin 3. Relays R31 and R32 will be operated to indicate the receipt of digit 3. When relay ON2 releases, relay RL3 operates in series with storage bin relays R31 and R32, in turn completing an operating circuit for relay RA3.

Reference to FIGURE 7 shows that second digit 5 is supplied as follows. Terminal B25 (FIG. 59), connected to contacts CL1—*b*, is cross-connected to terminal B24 (FIG. 61) which is connected to lever *b* of relay TR3; and terminal B30 connected to contacts CL1—*d* is cross-connected to terminal B34 connected to lever *f* of relay TR3. During the registration period at the conclusion of receipt of the first digit received, simultaneously with the storage of this first received digit in bin 3, relay TR3 operates over the circuit extending from ground over contacts ON1—*f*, ON2—*h*, break contacts RL2—*c*, make contacts RA2—*t*, contacts RAP—*v* and the winding of relay TR3 to battery. Relays R21 and R24 are operated over a circuit extending from ground through contacts CL1—*b* and CL1—*d*, over the above described strapping, contacts TR3—*a* and TR3—*e*, leads 21 and 24, through cables, through the windings of relays R21 and R24 to battery. Relays R21 and R24 operate and lock over conductor A2, through cables, the winding of relay RL2, the parallel resistor and contacts RA2—*n*, LDA—*t*, to HB ground; relay RL2, however, is shunted.

It is observed that during the pulsing of a digit the counting chain is held through make contacts ON1—*d*. When ON1 releases to begin the registration period, the chain holding circuit is transferred over contacts ON1—*e* (which close before contacts ON1—*d* open), through contacts ON2—*f*, to the B conductor ground traced above. When relay ON2 releases, this chain holding ground is opened and the operated counting chain relay or relays are released. Additionally, when relay ON2 releases the shunt is removed from relay RL2, which operates and at contacts RL2—*b* prepares a holding circuit for relay RA2. With contacts ON2—*h* open, relay TR3 releases and this circuit is held open at contacts RL2—*c*. Relay RA2 may flutter, but this is immaterial as the first received digit has already been stored in bin 3 and the next digit has not yet been received.

With relays RA1, RA2, and RA3 operated, the next received digit is routed over break contacts of relay LDA and make contacts of relays RA1, RA2, RA3 and break contacts *a*, *d*, *g*, and *j* of relay RA4 via conductors 41, 42, 44, and 47 to storage bin 4 relays R41, R42, R44 and R47.

Succeeding digits will be stored in regular manner.

*4. Tandem call from free service trunk with one or two lost digits (ambiguous case)*

Figure 59:
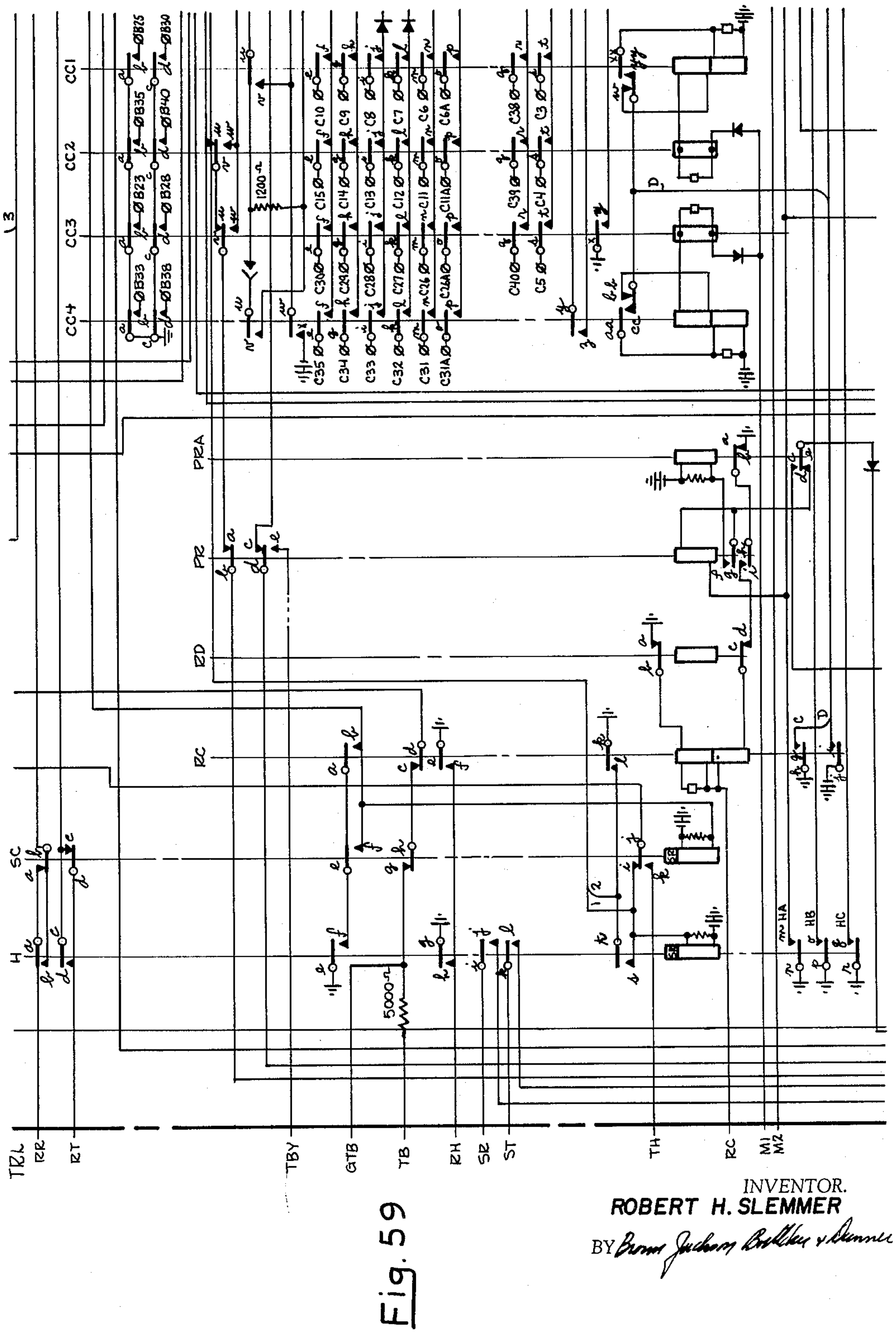

Referring again to FIGURE 7, incoming trunks from Turner and Tucker associated with dialing pattern B operate class relay CL2, FIGURE 59 (the trunks belonging to free service class FS2). Of course, relay FS also operates, in turn operating relay RA1.

Figure 58:
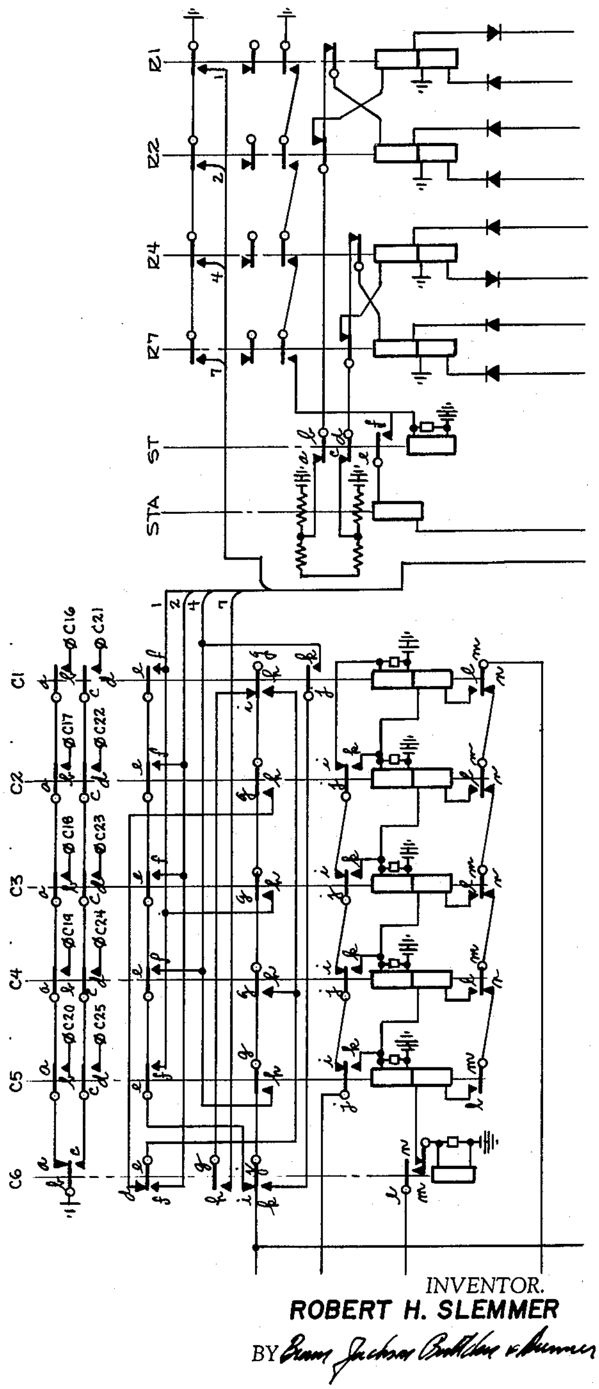

Two digits are lost on calls to Twining-6, and accordingly terminal C11 associated with make contacts CL2—*n* are cross-connected to terminals C21, FIG. 58, of the counting chain so that relay RA2 also operates if the chain comes to rest with relays C1 and C6 operated for digit 6.

Figure 61:
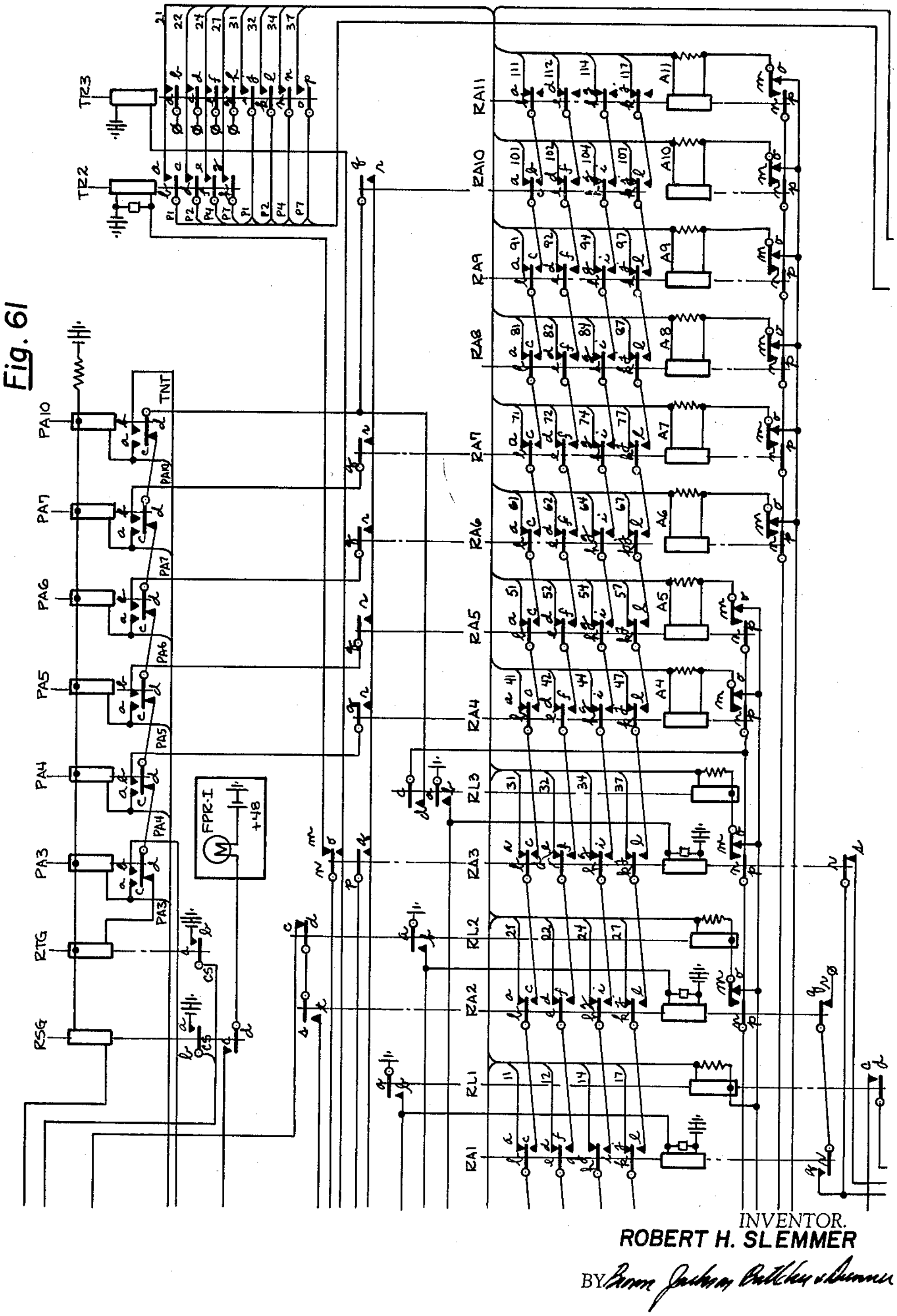
Figure 62:
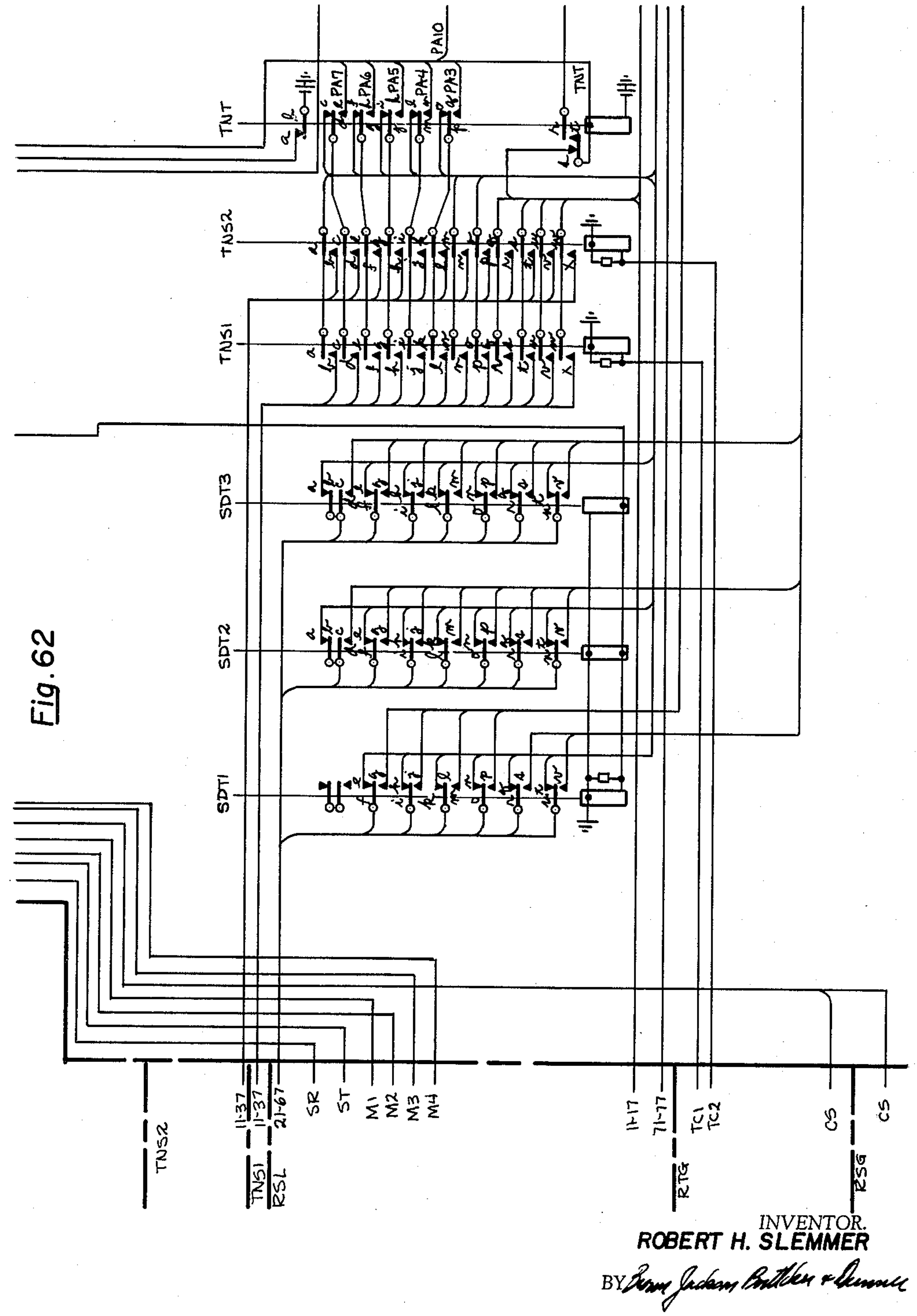
Figure 63:
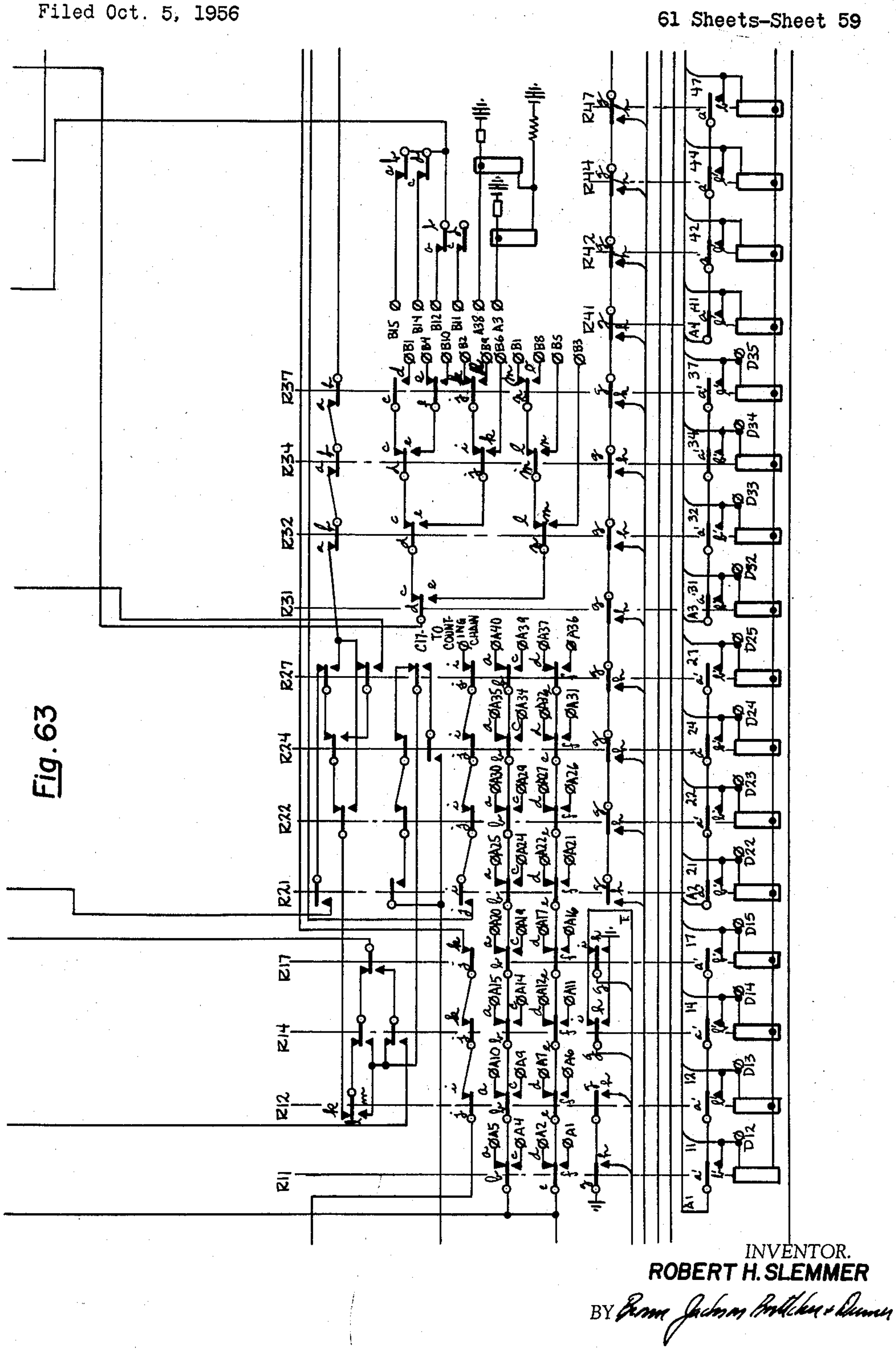
Figure 64:
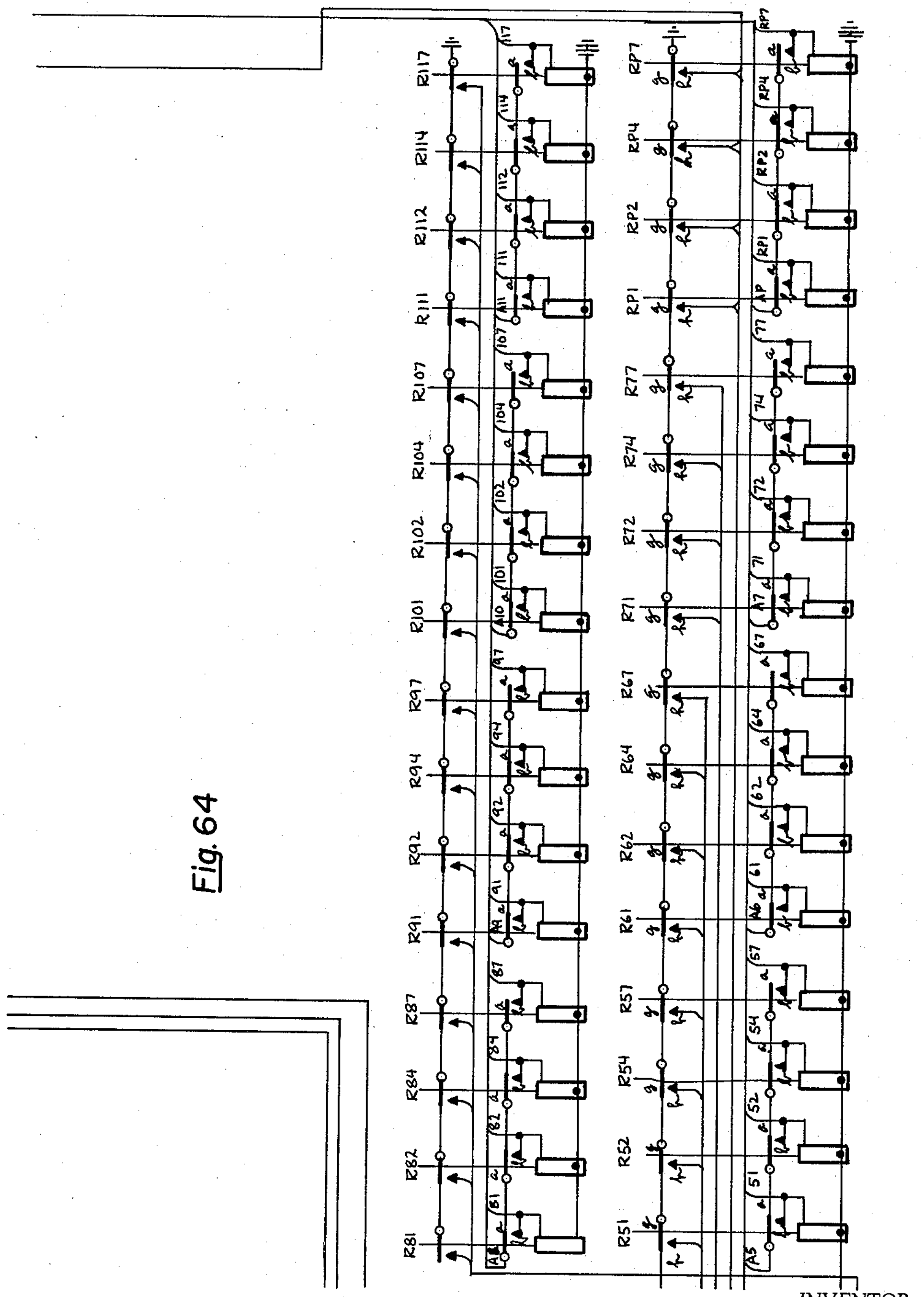

The second digit to be supplied in lieu of the lost second digit of the office code is 9, and accordingly terminals B35 and B40 associated with relay CL2 (FIG. 59) are cross-connected to terminals B29 and B39 respectively associated with relay TR3 (FIG. 61). Accordingly, on calls to Twining-6, relays RA1 and RA2 operate; the first received digit is stored in bin 3 and the operation of relay TR3 stores digit 9 in bin 2. These paths extend from ground through terminals B35 and B40 cross-connected to terminals B29 and B39, contacts *c* and *g* of relay TR3, conductors 22 and 27, cable, conductors 22 and 27, windings of relays R22 and R27 to battery. Relays R22 and R27 close a circuit to RL2, which operates at the conclusion of the registration period when relay ON2 removes the shunt therefrom. Relay RL3 also connects ground to relay RA3, operating this relay. The closure of contacts *i*, *k*, *m*, and *o* of relay TR3 is without effect, because no digit has been stored in the party bin.

On calls to Twining-7, however on a "dialing pattern B" call, the first digit received is 7 (the third digit of the office name); however, on calls to President-4 with one lost digit on a "dialing pattern B" call, the first digit received is also 7 (the second digit of the office name). Accordingly, whenever 7 is received as the first digit, it is routed into the party bin until a determination is made by the next received digit as to whether 7 should be stored in the second or third bin, such operation being accomplished as follows.

Terminal 4, connected to lever *s* of relay CL2 (FIG. 59), is cross-connected to terminal C22 (FIG. 58) and connected to contacts *d* of counting chain relay C2. Accordingly if the first digit received is 7, relay LDA operates, the energizing circuit extending from ground through contacts C6—*c*, C2—*d*, terminal C22 cross-connected to terminal C4, contacts CL2—*t*, FS—*n*, TRA—*n*, and the winding of relay LDA to battery.

After relay ON1 releases relay LDA routes digit 7 into the party bin over the circuit extending from ground through contacts ON1—*a*, ON2—*d*, C1—i, C6—*h*, conductor 7, cable, conductor 7 contacts LDA—*r*, RAP—*n*, conductor RP7, cable, conductor RP7, winding of relay RP7 to battery.

After relay ON2 releases, relay RAP operates in series with relay RP7. Contacts ON2—*b* release the counting chain, and the release of the counting chain releases relay LDA.

Parenthetically, it is also noted that relay TR operates during the first registration period over the circuit extending from battery over winding of relay TR, contacts TRA—*t*, ON2—*d*, and ON1—*a* to ground. Relay TR extends this ground through contacts TR—*b*, the winding of relay TRA, to HA ground, so that relay TRA is shunted until relay ON2 releases. When relay ON2 releases, relay TRA operates in series with relay TR, the resistor in parallel with TRA aiding in holding relay TR. The operation of relay TRA opens the circuit from relay ON2; relays TR and TRA remain locked until the register is released.

Returning to the description of the ambiguous case, when the first (ambiguous) digit 7 is stored in the party bin, the next digit received (4 if the call is to President 4, or N, which must be other than 4, if the call is to Twinbrook-7) should go in either bin 3 or bin 4 respectively. In any event bin 2 must be skipped, and accordingly relay RA2 is operated over the circuit extending from ground through contacts TRA—*c*, FS—*h*, LDA—*c*, and the winding of relay RA2 to battery.

Furthermore, if the call is to Twinbrook 7, the digit after 7 should go into storage bin 4. Accordingly, in preparation therefor, relay RA3 operates over the path extending from battery through the winding of relay RA3, contacts RS3—*a*, RAP—*b*, LDA—*e*, and TL—*e* to ground. Leads 1, 2, 4, 7 from the counting chain are thus routed over break contacts of relay LDA, make contacts of relays RA1, RA2, and RA3, and break contacts *a*, *d*, *g*, and *j* of relay RA4 to conductors 41, 42, 44, and 47, leading through cables to the windings of relays R41, R42, R44, and R47, in preparation for the next received digit to selectively operate one or two of these relays.

In the event that the next digit received is 4 for a call to President-4, terminal C39 (FIG. 59) connected to lever *g* of relay CL2 is cross-connected to counting chain terminal C19 (FIG. 58) and relay RS3 operates over a circuit completed thereby, to release relay RA3 so that this digit 4 can be stored in storage bin 3. Specifically, relay RS3 operates over the path which extends from battery through the winding of relay RF3, contacts RAP—*d*, FS—*l*, CL2—*r*, terminal C39 connected to terminal C19, contacts C4—*b* and C6—*a* to ground. Relay RS3 at its contacts RS3—*a* releases relay RA3.

When relay ON1 releases, digit 4 is stored in bin 3, and relay TR2 is operated to transfer the digit which was stored in the party bin to bin 2.

Briefly, when relay ON1 releases after an interval, ground is extended over contacts ON1—*a*, ON2—*d*, C6—*i*, C4—*f*, conductor 4, cable, conductor 4, contacts LDA—*m*, RA1—*i*, RA2—*i*, RA3—*g*, conductor 34, cable, conductor 34, through the winding of relay R34 to battery. When relay ON2 releases, relay RL3 operates in series with relay R34 and in turn operates relay RA3, which prepares to route the next digit received into bin 4.

Moreover, inasmuch as it was determined from the value of the digit 4 received that it should be stored in bin 3, it was also determined that the ambiguous digit in the party bin should be stored in bin 2; this is accomplished as follows before receipt of the next digit.

Relay TR2 operates over the path extending from battery over the winding of relay TR2, break contacts RA3—*n* contacts RAP—*x*, RA2—*t*, RL2—*c*, ON2—*h*, ON1—*f*, to ground. As digit 7 is in the party bin, relay RP7 was operated. Relay R27 operates over a circuit extending from ground, through contacts RP7—*h*, conductor P7, cable, conductor P7, contacts TR2—*g*, conductor 27, cable, conductor 27, and the winding of relay R27 to battery. Relay R27 operates and extends its operating ground over conductor A2, cable, conductor A2 to the winding of relay RL2. When relay ON2 releases, relay RL2 operates, also connecting ground through contacts RL2—*b* to relay RA2.

On the other hand, if the digit following the ambiguous digit is other than 4 on a call to Twinbrook-7, relay RS3 is not operated to release relay RA3. Accordingly the digit following the ambiguous digit 7 is routed into bin 4 instead of bin 3. Any operated storage bin 4 relay extends its operating ground over a circuit comprising conductor A4, cable, conductor A4, the winding of relay RA4 and parallel resistor, contacts RA4—*o*, ST—*h*, LDA—*t* and RAP—*q*, to HB ground. When relay ON2 releases, the shunt is removed from relay RA4, which relay operates in series with the operated storage bin 4 relay or relays. Relay RA4 transfers its holding ground over contacts RA4—*n*, which make before contacts RA4—*o* open, independent of contacts ST—*h*. It is noted that the circuits of relays RL2 and RL3 through make before break contacts of associated relays RA2 and RA3, and the circuits of relays RA4–RA11 through their own make-before-break contacts, prevents the registration when all relays R1, R2, R4 and R7 operate responsive to the operator pressing the start key at the conclusion of sending, in turn operating relay ST. That is, even though all relays in a bin may operate, the sequence relay (RL2, RL3, RA4, etc.) cannot lock in series therewith as its circuit passes through open contacts of the start relay ST.

Also, relay TR3 is operated over the path extending from battery through the winding of relay TR3, contacts RA3—*o*, RAP—*x*, RA2—*t*, RL2—*c*, ON2—*h*, and ON1—*f* to ground, during the registration period at the conclusion of the digit following the ambiguous digit.

The operation of relay TR3 effects transfer of the ambiguous digit, stored in the party bin, to bin 3, and supplies digit 9 to the second bin.

Briefly, as relay TR3 operates, a circuit is completed to operate relay R37 over the path extending from ground through contacts RP7—*d*, conductor P7, cable, conductor P7, contacts TR3—0, conductor 37, cable, conductor 37, and the winding of relay R37 to battery. When relay ON2 releases, relay RL3 operates in series with relay R37. Relay RL3 also connects holding ground to relay RA3.

With relay TR3 operated, circuits are also completed to operate relays R22 and R27 to store digit 9 in storage bin 2, as aforedescribed. After relay ON2 releases, relay RL2 also operates in series with relays R22 and R27; relay RL2 also connects holding ground to relay RA2.

*5. Free service trunk call to local with one lost digit*

When a free service trunk which may have lost digits is connected to Reg. I, free service relay FS operates, in turn operating relay RA1 to prepare for direction of the first received digit into storage bin 2.

Referring to FIG. 7, the local offices Lafayette-2, Lafayette-3, and Lafayette-4 (the switching equipment for which is the same switchboard which switches tandem traffic) have digital values 522, 523, and 524, so that on a call from any origin to one of these offices with a single lost digit, the digit received is 2.

Accordingly, terminal C37 (FIG. 60) connected through contacts TRA—*p* to the winding of local name relay LOC1 is cross-connected to counting chain terminal C17. When the counting chain stops with relay C2 operated and relay ON1 releases, relay TR operates over a path previously traced; and a circuit is completed to operate relay LOC1 from battery through contacts TR—*c*, the upper winding of relay LOC1, break contacts P of relay TRA, terminal 37 cross-connected to terminal C17A, contacts C2—*b'* and C6—*a'* to ground.

Figure 60:
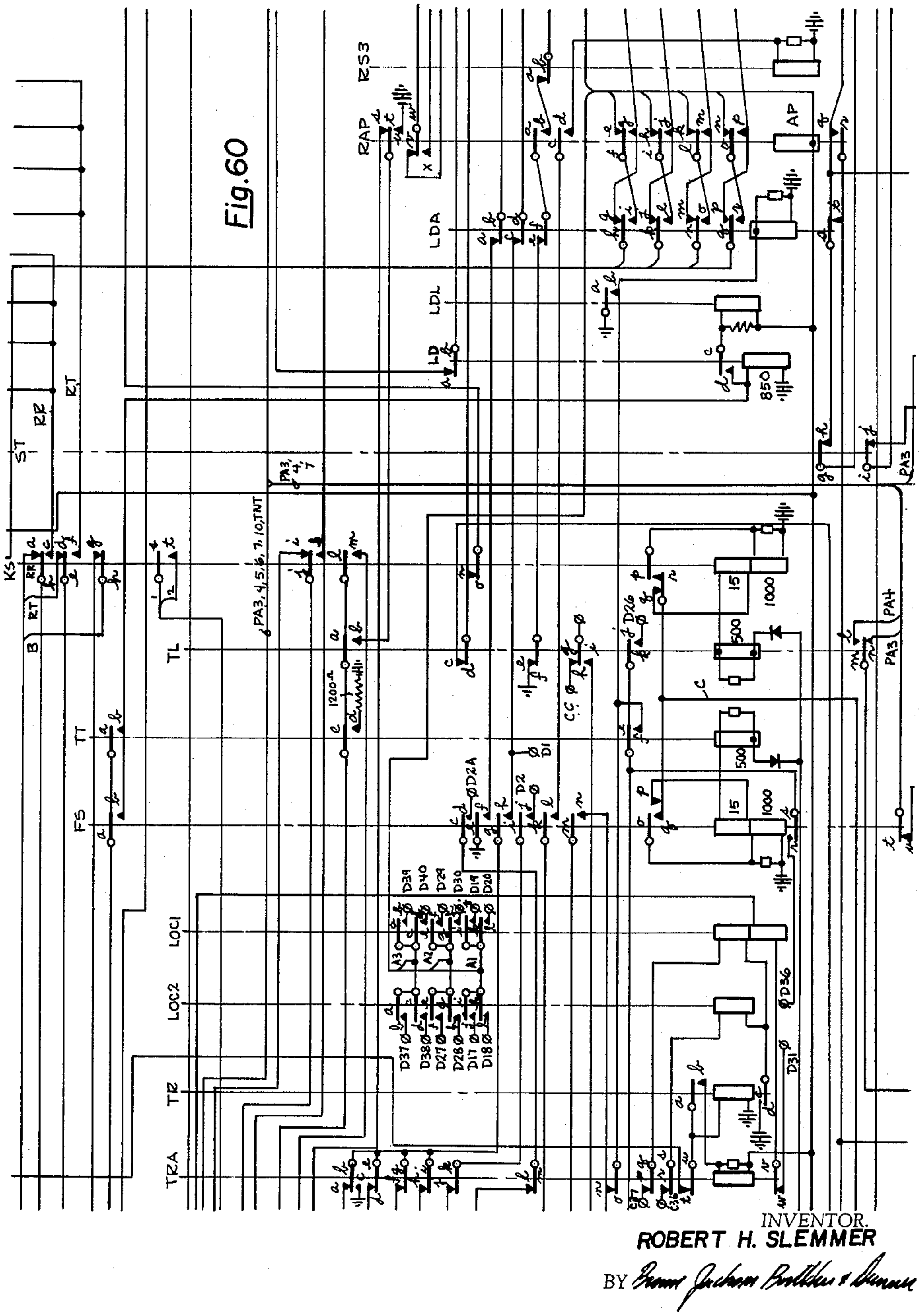

The operation of relay LOC1 reconstructs the lost digit 5 by storing digit 5 in storage bin 1. That is, terminal D12 (FIG. 63) connected to the winding of relay R11 is cross-connected to terminal D19 (FIG. 60) and terminal D14 (FIG. 63) connected to the winding of relay R14 is cross connected to terminal D20 (FIG. 60). Accordingly when relay LOC1 operates, circuits are completed immediately to operate relays R11 and R14. The circuit of relay R11 can be traced from battery through the winding of relay R11, terminal D12 cross-connected to terminal D19, contacts LOC1—*j*, conductor A1, cable, conductor A1, winding of relay RL1 and parallel resistor, contacts ST—*h*, LDA—*t*, to HB ground. The circuit of relay R14 can be traced from battery through the winding of relay R14, terminal D14 cross-connected to terminal D20 contacts LOC—*l*, conductor A1 to HB ground over the circuit just traced. Relay RL1 operates over this path in series with relays R11 and R14. When relays R11 and R14 close their contacts *b*, circuits for relay RL1 in series with relays R11 and R14 over conductor A1 independent of relay LOC1 contacts is established. Relay RL1 also closes holding ground to relay RA1.

When relay ON2 releases, the counting chain is released at contacts ON1—*b*; the shunt is removed from relay TRA at contacts ON2—*d*; and the circuit of relay LOC1 is opened at contacts TRA—*p* and C2—*b'*.

With relays RA1 and RA2 operated, the third digit, which may be 2, 3, or 4 according to the local office destination, is routed into storage bin 3.

To enable relay OC1 to operate in recognition of office name Lafayette, terminal A3 is cross-connected by a running jumper to terminals A2, A6, A12, A16, A21, A27, A31 and A36. It will be seen that HA ground is connected to the levers associated with the contacts of storage bin relays connected to these terminals. Accordingly, relay OC1, to the other side of which is connected battery through a resistor, is normally operated and will release only if storage bin 1 contains digit 5 (i.e. L) and storage bin 2 contains digit 2 (i.e. A).

Also terminal B11 connected to contacts OC1—*c* is cross-connected to terminal B2 connected to contacts R37—*j*; and terminal B12 connected to contacts OC1—*a* is cross connected to terminal B3 connected to contacts R32—*n*.

The third digit received is directed to and stored in bin 3.

Accordingly if LA2 is stored in bins 1, 2, and 3, relay OC1 releases due to the storage in bins 1 and 2; and relay PA7 is operated over the path from battery through a resistor, winding of relay PA7, conductor PA7, cable, conductor PA7, contacts OC1—*d*, terminals B11 cross-connected to terminal B2, contacts R37—*j*, R34—*i*, R32—*e*, R31—*c*, LDA—*t* to HB ground. After the seventh digit has been received and stored, relay RA7 is operated and the following circuit is completed to operate relay RSG: battery, resistor, winding of relay RSG, contacts KS—*n*, RA7—*r*, PA7—*b*, PA10—*d*, RL3—*d*, LDA—*t*, to HB ground. Relay RSG connects battery over the call signal lead CS to the RSG circuit over contacts RSG—*a*, lead CS, cable, lead CS to the RSG (register sender guard) circuit to call in an idle one of a group of associated senders. With relay TNT non-operated, negative battery through contacts TNT—*a*, break contacts CL2—*u* and CL3—*u* or break contacts KS—*i*, and a make contact CL2—*w* or CL3—*w*, contacts PR—*a*, on lead M2 to the sender conditions the sender for a call from "local or special service."

If LA3 is stored in bins 1, 2 and 3 instead of LA2, relay OC1 operates over the path before described. Relay PA7 (precede after seven) operates over the path from battery through a resistor, winding of relay PA7, conductor PA7, cable, conductor PA7, contacts OC1—*a*, terminal B12 cross-connected to terminal B3, contacts R32—*n*, R31—*e*, LDA—*t*, to HB ground and the procedure is the same as described above.

To make provisions for Lafayette-4, terminal A38 is cross-connected by a running jumper to terminals A39, A34, A30, A24, A19, A15, A9, and A5. Also terminal B14 is cross-connected to terminal B4. Accordingly, when 54 (i.e. LA4) is stored in bins 1, 2, and 3, relay OC2 operates and a circuit is completed to operate relay PA7 from battery through the winding of relay PA7, conductor PA7, cable, conductor PA7, contacts OC2—*c*, terminal B14 cross-connected to terminal B4, contacts R37—*e*, R34—*e*, R32—*c*, R31—*c*, LDA—*t* to HB ground. The ensuing operation is the same as just described.

Digressing, if it were desired to recognize offices LA2, LA3, and EM5 and EM6 (assuming no other conflicts), connections for LA2 and LA3 are as described. The connections for EM5 and EM6 are as follows. Terminal C36 would be connected to counting chain terminal C20 associated with counting chain count 5 and terminal C21 associated with counting chain count 6. With FS operated, digit 5 or 6 first received would be stored in bin 2 whereupon relay RL2 and RA2 would operate. Also relay LOC2 would operate over the path from battery through contacts TR—*c*, winding of relay LOC2, contacts TRA—*r*, terminal C36 cross-connected to counting chain terminals C20 and C21, etc. to ground. Terminals D17 and D18 would be cross-connected to terminals D12 and D13 so that relays R11 and R12 would be operated to store digit 3 (i.e. the E of EM5 or EM6) in storage bin 1. Also terminal A38 would be connected to terminals A39, A35, A30, A24, A19, A14, A10 and A5 instead of as described before so that relay OC2 would operate as a result of digits 3 and 6 (i.e. E and E) being in storage bins 1 and 2. Also terminal B14 would be cross-connected to terminal B5 instead of as described hereinbefore; and terminal B15 would be cross-connected to terminal B6; so that relay OC2 would extend ground to operate relay PA7 when the third bin contained digit 5 or 6.

*6. Free service trunk call to local with two lost digits*

On this type of call, relay FS is operated by a trunk marking signal. Relay FS in turn operates relay RA1.

This type of call is not found in FIG. 7. Assuming that connections have been made as just described for local offices LA1, LA2, EM5, and EM6. The following additional connections will also be made, assuming that trunks of classes FS2 and FS3 may have two digits missing on calls to local. Terminals C13, C28, C11 and C26 will be cross-connected to both counting chain terminals C16 and C17; and terminals C12, C27, C11A and C26A will be cross-connected to counting chain terminals C20 and C21. Also terminal C37 will be cross-connected to terminal D2 (with the strap cut from D2 to D1); terminal C36 will be cross-connected to D2A.

Thus for example if a free service trunk of class FS2 lands in the register operating relay CL2, and the first digit received is 1, with the counting chain stopped for digit 1, relay RA2 operates over the path from battery through the winding of relay RA2, contacts LDA—*c*, FS—*h*, rectifier as shown, contacts CL2—*j*, terminal C13 cross-connected to terminal C16, contacts C1—*b* and C6—*a* to ground. When relay ON1 releases, the first digit received having value 1 will be stored in bin 3. Relay TR will be operated. Relay LOC1 will operate over the path from battery through contacts TR—*c*, the upper winding of relay LOC1, terminal C37 cross-connected to terminal D2, contacts FS—*j*, TRA—*j*, CL2—*n*, terminal C11 cross-connected to terminal C16, contacts C1—*b* and C6—*a* to ground.

Also when ON1 releases relay R31 operates from ground through contacts ON1—*a*, ON2—*d*, C6—*i*, C1—*f*, conductor 1, cable, conductor 1, contacts LDA—*g*, RA1—*c*, RA2—*c*, RA3—*a*, lead 31, cable, leads 31, winding of relay R31 to battery.

In addition to the cross-connections already described from terminals D19 and D2 to bin 1 to enable the operation of relay LOC1 to place digit 5 (i.e. L in bin 1), terminals D29 will be cross-connected to terminal D23 whereby the operation of relay LOC1 operates relay R22 to store digit 2 (i.e., A) in bin 2. When relay ON2 releases, in turn releasing the counting chain relay C1, the shunt is removed from relays RL1 and RL2 to operate same. Also the release of the chain releases relay LOC1. Relay TRA also operates.

Also for example, if a free service truck of class FR3 lands in the register operating relay CL3, and digit 5 is received for EM6, similar action ensues to place digit 6 in bin 3 and to place digit 3 in bin 1 (i.e. E) and digit 6 (i.e. M) in bin 2. In this case relay RA2 operates over the path from battery through the winding of relay RA2, contacts LDA—*c*, FS—*h*, rectifier as shown, contacts CL3—*l*, terminal C27 cross-connected to terminal C21, contacts C21—*d* and C6—*a* to ground. Also relay LOC2 operates over the path from battery, contacts TR—*c*, winding of relay LOC2, contacts TRA—*r*, terminal C36 cross-connected to terminal D2A, contacts FS—*d*, TRA—*l*, CL3—*p*, terminal C26A cross-connected to terminal C21, contacts C1—*d* and C6—*c* to ground.

Also in this case terminals D17 and D18 would be cross-connected to terminals D12 and D13 and terminals D27 and D28 to terminals D23 and D24 to enable relay LOC2 to store digit 3 in bin 1 (i.e. E) and digit 6 (i.e. M) in bin 2.

*7. Free service trunk call to local with three lost digits*

On this type of call relay FS is operated by a trunk free service marking signal. Relay FS in turn operates relay RA1.

With three lost digits only one office code and accordingly one office name can be accommodated. This service is arranged as shown for class 3 trunks. Accordingly, if a free service trunk of class FS3 lands in the marker, relay LOC1 operates upon the receipt of the digit first received, over the path from ground through contacts CL3—*y*, FS—*r*, terminal D36 cross-connected to terminal D31, contacts TRA—*w*, lower winding of relay LOC1, and contacts ON2—*j* to battery. It should be observed that this arrangement allows relay FS to release relay TT which operates incidentally, before relay LOC1 operates.

It will be assumed for example that the office code is LA1. In addition to storing digits 5 and 2 in bins 1 and 2, contacts of relay LOC1 are cross-connected to the coils of bin 3 as follows. Terminal D39 would be cross-connected to terminal D32 so that, upon the operation of relay LOC1, digit 1 would be stored in bin 3 by operating relay R31 over the path from battery through the winding of relay R31, terminal D32 cross-connected to terminal D39, contacts LOC1—*b*, conductor A3, cable, conductor A3, winding of relay RL3, contacts RA3—*o*, KS—*h*, LDA—*t*, to HB ground, operating relay RL3 immediately, as it is not shunted. Similarly, relays RL1 and RL2 are operated immediately. Relays RA2 and RA3 are operated by relays RL2 and RL3, relay RA1 having already been operated.

When relay ON1 releases at the conclusion of receipt of the digit first received, i.e., the next digit following the office name, 2 for example, this digit is directed into bin 4 over the path from ground, contacts ON1—*a*, ON2—*d*, C6—*l*, C2—*f*, conductor 2, cable, conductor 2, contacts LDA—*j*, RA1—*f*, RA2—*f*, RA3—*f*, RA4—*d*, conductor 42, cables, conductor 42, winding of relay R42 to battery.

*8. Tandem call from toll trunk with one lost digit*

Class 3 toll calls (i.e. class TL3 which operate relays CL3 and TL), may have one lost digit on tandem calls with strapping from terminal D21 to D26.

Thus upon landing relay RA1 is operated over the path from battery through the winding of relay RA1, terminal D21 cross-connected to terminal D26, contacts TL—*k* and CL3—*y* to ground.

Accordingly the digit first received is routed into storage bin 2.

*9. Toll trunk call to local with one lost digit*

This type of call is arranged for class 3 toll calls and operates relay RA1 upon landing as described above in subsection 8.

According to the first digit received, which is the office code second digit, the counting chain operates relay LOC1 or LOC2 to place the proper first digit in bin 1, whereupon relay RL1 operates. When relay ON1 releases at the end of receipt of this digit, this digit is directed over break contacts of relay LDA, make contacts of relay RA1, and break contacts of relay RA2 into bin 2, whereupon relays RL2 and in turn RA2 operate. Succeeding digits are stored in bins 3, etc.

*10. Toll trunk call to local with two lost digits*

Toll trunks of class TL3 (which operate relay CL3 and TL upon landing in the register) can be arranged with two lost digits to operate relay LOC1 upon receipt of the first pulse of the first received digit by cross-connecting terminal D26 to terminal D31.

Relay LOC1 operates over the path from ground through contacts CL3—*y*, TL—*k*, terminal D26 cross-connected to terminal D31, contacts TRA—*w*, lower winding of relay LOC1, and contacts ON2—*j* to battery.

With terminals D19 and D20 cross-connected to appropriate terminals of storage bin 1 (for example D19 to D12, D20 to D14 to store digit 5 i.e. L; and terminal D39 to D23 to store digit 2, i.e. A), relays R11, R14, R22, RL1, RL2, RA1, and RA2 operate.

During the registration period of the first received digit which is the third office code digit, this digit is stored in storage bin 3 over break contacts of LDA, make contacts of RA1 and RA2 and break contacts of RA3.

*11. Toll trunk call to local with three lost digits*

Class 3 (TL3) trunks may be arranged to complete calls to a local office by cross-connecting terminal D26 to terminal D31; and by cross-connecting one or more terminals D19 and D20 selectively to one or more terminals D12, D13, D14, and D15 of bin 1; similarly for terminals D29 and D30 to bin 2; and similarly for terminals D39 and D40 to bin 3.

Accordingly, on the first pulse of the digit first received which will be the first digit of the directory number following the office code, relay LOC1 operates and stores the office code, LA1 for example with appropriate cross-connections, in bins 1, 2, and 3. Relays RL1, RL2, RL3, RA1, RA2, and RA3 operate.

During the registration period at the conclusion of the digit first received, this digit is stored in bin 4 over break contacts of relay LDA, make contacts of relays RA1, RA2, RA3, and break contacts of relay RA4.

*12. Call from free service trunk which becomes ticketed*

Free service trunks of classes FS0, FS1, FS2, FS3, FS4 operate relay FS upon the trunk landing in the register. Relay FS operates relay RA1. As described hereinbefore, relay RA2 may be operated as a result of the first received digit.

If a 112P code or a 1YP code is received, relay LD is operated and, when relay ON2 releases the counting chain at the conclusion of the registration period following the digit 2 or Y, relay LDL operates, in turn operating relay LDA.

Relay LDA at its opened contacts LDA—*t* releases relay RA1, and relay RA2 if it was operated.

Accordingly, the calling party digit is routed over make contacts of LDA into the party bin after which relay RAP operates as a result of storage of the calling party digit in the party bin and as a result of the release of relay ON2, the leads 1, 2, 4, and 7 from the counting chain are routed over make contacts of relay LDA, make contacts of relay RAP, break contacts of RA1 to the first bin; and after RA1 operates, to the second bin.

*Busy verification call*

Arrangements may be made for class 4 toll trunks (TL4) with no lost digits to have prefix busy verification privileges. In such case, the terminal connected to lever *h* of relay TL is cross-connected to a counting chain terminal representing the busy verification prefix digit (terminal C25 for digit 0 in one example). Of course other digits may be used with corresponding cross-connection.

With this arrangement, when a class TL4 toll trunk lands in the register and digit "0" is received, relay LDA is operated when the counting chain stops with relays C5 and C6 operated, the circuit extending from battery through the winding of relay LDA, contacts TRA—*n*, CL4—*z*, TL—*l*, terminal connected to lever *h* of relay TL cross-connected to counting chain terminal C25, contacts C5—*d* and C6—*c*, to ground.

When relay ON1 releases to begin the registration period following the receipt of digit "0," leads 7 and 4 from the counting chain are grounded and these signals pass over make contacts *r* and 0 of relay LDA and break contacts *n* and *k* of relays RAP, conductors RP7 and RP4 in and out of cables to the windings of relays RP7 and RP4 to battery, operating these relays, thus storing the prefix busy verification digit in the party bin.

When relay ON2 releases relay, RAP operates in series with relay RP7 and RP4. Also when relay ON2 releases, the circuit of LDA is open and it releases.

The next digit received is routed over leads 1, 2, 4, 7 selectively from the counting chain over break contacts of relay LDA and RA1, leads 11, 12, 14, 17, in and out of cables to the windings of relays R11, R12, R14, and R17, the sequence from here on being as described hertofore.

*A more detailed consideration of lead D1 of FIGURE 49 and associated circuitry*

Earlier in the present disclosure, it was stated that conductors R4 and T4 were switched by contacts of relay ICT in the operated position, and by contacts of relay LD in the non-operated position to send digit 5 of the code 50 or 51 in routing the call to local automatic intercept or to local manual intercept respectively. It was also stated that conductors R4 and T4 were switched by contacts of relay ICT in the operated position by contacts of relay LD in the operated position to send digit 9 of the code 90 or 91 in routing the call to toll automatic intercept or to toll manual intercept.

In these various cases leads R5 and T5 are routed by contacts of relay ICT in the operated position; lead R5 to negative 48 volts potential and lead T5 to lead D1. A more detailed description of lead D1 and associated circuitry is given at this point.

Referring to FIGURE 65, a short form of circuitry is presented to show how lead D1 is conditioned by bins 5, 7, 8, 9 and 10 in the sender. In each of these bins, which comprises a plurality of storage relays, a group of associated break contacts, make contacts levers of these relays are connected as shown wherein the levers are in series through the break contacts and are in parallel through the make contacts, so that if one or more storage bin relays is operated the series break circuit is opened and the parallel make circuit is closed. Accordingly these associated contacts of a register bin can be represented by a single transfer comprising lever, break, and make contacts; and this single transfer can be represented in schematic form in which symbol X represents make contacts, symbol · represents the lever and symbol 1 represents break contacts. Thus the symbolism is used to represent these contacts of sender bin 6 (line group units bin); the symbol is used to represent these contacts of sender bin 7 (hundreds bin); and similarly for the sender 8 bin (tens or B digit bin), sender bin 9 (units or C digit bin) and sender bin 10 (party bin).

Assuming a call to a local line involving a number group, if information is stored in each of the sender bins 6, 7, 8, 9, and 10 indicating that a regularly equipped directory number was dialed, the associated break contacts are open and sender master "HA" ground cannot get through the break contacts to operate the intercept relay ICT.

Assuming that an unequipped directory number was dialed, no information will be stored in sender bins 6, 7, 8, 9, and 10 by the number group circuit and sender HA ground can get through break contacts of each of said bins and passes through battery, make contacts of a relay NG in the sender which is operated on a call involving a number group, make contacts of a relay PR in the sender which is operated when the sender is ready to pass a signal to call in a group selector marker, the winding of intercept relay ICT to battery, operating this relay. Relay LSS in the sender marking local and special calls, is operated, but with make contacts of register bins 6, 7, 8, 9, and 10 open, sender HA ground cannot reach lead D1. Under these circumstances, lead T4 is extended through make contacts of relay ICT to an open circuit as shown on FIGURE 65 and lead R4 is extended over make contacts of relay ICT and break contacts of incoming toll trunk marking relay LD in the sender to positive 48 volts; thus enabling the sender to send digit 5.

Also lead R5 is connected over make contacts of relay ICT to minus 48 volts; and lead T5 is connected over make contacts of relay ICT and LSS to the make contacts of the relays storage bins 6, 7, 8, 9, and 10 which are all open, thus causing lead T5 to be open, thus enabling the sender to send digit 0.

Thus the sender sends 50 to route the call to local automatic intercept.

Again, assuming that the directory number of a changed number or of a number which it is desired to route to manual intercept is received, partial strapping is made in the number group circuit so that information is stored only in some of the sender bins 6, 7, 8, 9 and 10. Accordingly sender HA ground can get through break contacts of a bin or bins which does not have information stored therein, and through make contacts of sender relays NG and PR and through the winding of relay ICT to minus 48 volt battery, operating relay ICT. This same ground can get through break contacts of said bin or bins which does not have information stored therein, thence through make contacts of a bin or bins which does have information stored therein, through make contacts of relay LSS, which is operated on local or special service calls, to lead D1 and thence over make contacts of relay ICT to lead T5, thus enabling the sender to send 51 to route the call to manual intercept facilities.

In the case of a call in which the sender engages a translator instead of a number group, sender bins 8 and 9 and in some cases bin 6, will have information stored therein but bins 7 and 10 will not. Accordingly sender HA ground gets through break contacts of at least sender bins 7 and 10 and through at least make contacts of at least sender bins 8 and 9 and break contacts of relay LSS which will not be operated on this type of call to lead TNT and thence through the winding of a translator transfer relay 1 (see FIGURE 22) which effects the transfer of certain leads from the translator from certain equipment in the sender to certain other equipment in the sender.

*Certain transfer relays in registers*

Referring to FIGURE 11 (Reg. O) and to FIGURE 62 (Reg. I), relays SDT1, SDT2, and SDT3 in the register are operated at an appropriate time to transfer certain leads from the sender from certain equipment in the register to certain other equipment in the register, i. e., from certain storage bin readout circuits to certain other storage bin readout circuits.

*Additional consideration of coin box calls*

Calls initiated from coin box lines result in the coin box line being switched into a Register O, which has provisions for automatically refunding an initial coin deposited. This is necessitated by the fact that with coin box trunks (CBT) reached from the selector multiple, provision for initial coin refund must be in Reg. O so that if the call does not progress to the point where a CBT is included in the connection, the initial coin can be automatically refunded by the register. This applies to calls directed to a manual operator or otherwise. After the call has progressed to the point that a coin box trunk (CBT) has been included in the connection, the coin box trunk has provisions therein for automatically collecting and refunding coins deposited according to the answered or unanswered condition of the call.

On calls to a manual operator, a PCLR trunk which may be a trunk such as illustrated trunk F in FIGURE 1C, is serially included in the connection rather than a CBT trunk. The PCLR trunk has means for cooperating with an operator's position equipment to provide manual collect and refund, but also includes means for automatic collect, whereby, if the operator fails to collect, such collection is automatically accomplished.

*No code provisions in translator*

It should be observed that if a register calls in a translator and the translator does not recognize the stored digital information in the sender, the no code relay NC2 in the translator is operated, cross connections are provided through the contacts of this relay to advise the register to call in the sender immediately.

The register calls in the sender and gives the sender the signal to call in a translator.

The sender calls in a translator. Again the translator does not recognize the stored digital information in the register. The no code relay NC2 in the translator operates, cross-connections may be connected through the contacts of relay NC2 to alternatively:

(1) Enable the sender to route the call to intercept facilities.

(2) Enable the sender to route the call to the nationwide dialing homing office and retransmit pertinent digital information thereto to enable the homing office to complete the call.

What is claimed is:

1. In an automatic telephone system including switching means for selectively extending incoming connections over further switching equipment toward a desired destination, each destination being represented by a code comprised of a set of digit-representing signals, register means for receiving and storing each set of digit-representative signals, common translator means, sender means, recognition means in said register means operative responsive to receipt of a signal set which is representative of certain ones of said codes to engage said translator means to obtain information relative to the number of digit-representative signals of the set to be received by the register means prior to the seizure of the sender means, the number of digit-representing signals to be received being of one preassigned value for one of said certain code sets and of a second preassigned value for another of said code sets.

2. In an automatic telephone system having switching equipment for extending incoming lines to outgoing lines including register means for registering incoming signals sets including a code designator representative of the desired outgoing line, sender means connected for engagement by the register means for controlling further extension of the call over the switching equipment, translator means including code designator identification means operative responsive to seizure by said register means for controlling the time of seizure of the sender means by the register means during receipt of a signal set, the time of seizure for certain lines having certain code designators being different than the time of seizure for other lines having other of said code designators, means in the register operative responsive to the registration of signals thereon for extending calls to said certain and said other lines to signal the sender means to engage said translator means, and means in said translator means including said code designator identification means operative with engagement by said sender means at such time to transmit tthe necessary routing and handling information to said sender means for use in extending the call toward the desired outgoing line.

3. In an automatic telephone system including an automatic switchboard for selectively extending connections received over incoming lines to outgoing lines responsive to the receipt of digit representing signal sets, translator means, register means including code recognition means operative to recognize only calls established toward certain of said outgoing lines, means in said register means operative to automatically seize sender means whenever the call is established toward said certain outgoing lines, and means in said register means for seizing said translator means whenever calls are not directed toward said certain lines, means in said translator means operative as seized by said register means for directing the register means to seize said sender means at times which vary with the destination of the call, the time of seizure of the sender means by the register means being adjusted to predetermined different values for the calls directed to different ones of the destinations; register link means for extending the registered codes for registration in the sender and means in the sender means for seizing said translator means for use in determining the desired handling and routing digit representative signals only with receipt of a signal by the sender means from the register means indicating that such information is required.

4. In an automatic telephone system an automatic switch-board for extending connections to different groups of lines associated therewith, translator means, register means including code recognition means operative to recognize calls directed toward lines in only certain of said groups and means for seizing said translator only when the call is directed toward a line in one of the other groups; sender means; identification means in said translator operative to signal the register means to seize the sender means at a predetermined time during progression of the call, the time of seizure for calls to certain of said groups of lines being different than the time of seizure for calls to others of said groups of lines, means in the register for signalling the sender whenever the call is to a line in predetermined ones of said certain and said other groups which require additional handling and routing information, and means in said sender for seizing said translator to obtain such call routing and handling information responsive to receipt of the register signal.

5. In an automatic telephone system, including at least a local office for serving a number of local subscriber lines with a plurality of distant offices having subscriber lines associated therewith, register means connected for use by the local office for receiving and storing digital information relating to the office code and directory number of the called subscriber, sender means, translator means engaged by said register means responsive to the receipt of codes of distant offices for enabling the register means to engage said sender means selectively after a variable number of digits have been received by said register means, the time of selection varying for different distant offices to thereby vary the duration of the holding time of the sender means in each connection; and means in the sender means for engaging said translator means on calls to said distant offices for the purpose of obtaining the handling and routing information from the translator for use in directing the call toward its destination.

6. In an automatic telephone system including means for extending connections from incoming lines to outgoing lines associated therewith, translator means, register means for registering call information including recognition means operative to recognize calls directed toward only certain of said lines, means in the register means for seizing said translator only when the calls are directed toward lines not recognized by the register means for assistance in further extending the connection; sender means; means in said translator means operable as engaged by the register means to signal the register means to seize the sender at a predetermined time during the progression of the call; means in the register for signalling the sender whenever the call is to a destination which requires additional handling and routing information; means in said sender for seizing said translator to obtain such call routing and handling information responsive to receipt of the register signal; and means in the translator means operative with seizure by the sender to provide operating data relative to the call information registered on the register means to said sender means.

7. An automatic telephone system as set forth in claim 6 which said register means includes a plurality of digit storage means, and said translator means includes means for examining the first six digit storage means of the register means for the call information.

8. In an automatic telephone system for extending calls to different destinations represented by different codes including distant office codes; translator means, register means including means for seizing said translator means responsive to receipt of a distant office code; means in the translator means for controlling said register means to seize the sender means subsequent to receipt of the distant office code; sender means; and means in the register means operative responsive to receipt of a distant office code for signalling said sender means to subsequently engage said common translator means for the purpose of obtaining the necessary call routing and handling information.

9. In an automatic telephone system for extending calls to different destinations represented by different codes including at least local office codes, area codes, and distant office codes, translator means; sender means, register means including means for seizing said translator means responsive to receipt of a distant office code for assistance in selecting the sender means; and means in the register means for signalling said sender means to engage said common translator means thereafter only responsive to receipt of an area code or a distant office code for the purpose of obtaining the necessary call routing information therefrom.

10. An automatic telephone system as set forth in claim 9 in which said register means includes means operative responsive to receipt of said local office code to positively signal the sender that a translator is not required for the call.

11. An automatic telephone system as set forth in claim 9 in which special service codes are additionally used to effect call extension, and in which said register means includes means operative responsive to receipt of said local office code or said special service code to positively signal the sender that a translator is not required for the call.

12. In an automatic telephone system for extending calls to different destinations as represented by different signal sets including different codes, such as local office codes, special service codes and other codes therein; translator means; sender means; and register means including means operative responsive only to the receipt of the other of the codes to signal the sender to engage said translator means for the purpose of obtaining therefrom the necessary routing and handling information for the call; means in the register means operative responsive to receipt of signal sets including the local office code and special service code to transmit to said sender means signals indicative of the receipt of said codes, and means in the sender for discriminating between the signals received from said register means to condition the sender means for seizure of the translator means as indicated by the incoming signals.

13. An automatic telephone system as set forth in claim 12 which includes a number group circuit for translating local directory numbers and equipment terminal location indications, and means in the sender means for seizing the number group responsive to detection of signal sets indicating a local office call.

14. In an automatic telephone system for extending calls to different destinations as represented by different digital representations including different predetermined codes therein, translator means; sender means; register means for registering the digital representations transmitted in the establishment of each call including means operative responsive only to the receipt of digital representations having a code indicating a distant office there-into transmit a predetermined signal to the sender means, means in said sender means operative responsive to receipt of said predetermined signal to engage said translator means for the purpose of obtaining therefrom the necessary routing and handling information for the call, means in said register means operative responsive to receipt of digital representations including local office codes and special service codes for transmitting to said sender means a variable number of digits, and means in the sender for analyzing the received digital information received from said register means to discriminate between the calls for the purpose of determining the need for said translator means in certain of said calls.

15. An automatic telephone system as set forth in claim 14 in which the register means which are operative to transmit a variable number of digits to the sender includes means for transmitting a local office code which comprises four digits including the local office code and the thousands digit of the called subscriber number.

16. In an automatic telephone system having a plurality of offices, a plurality of incoming trunk means in at least one of said offices for interconnecting same with at least one other office, register means in said office connected for use by said trunks with the receipt of calls thereover, a plurality of digit storage means in said register arranged in sequence, each digit storage means being assigned to store one digit, and each successive digit storage means being normally connected to store the successive one of the received digits of a call, and means responsive to receipt of a call over a predetermined one of the trunks for registering the first received digit in the second storage digit storage means, whereby loss of a digit in the equipment is properly anticipated in the register means.

17. An automatic telephone system as set forth in claim 16 which includes means for automatically reconstructing the lost digit, and means for supplying said reconstructed digit to said first digit storage means for storage therein.

18. In an automatic telephone system having a plurality of offices, a plurality of incoming trunk means in at least one of said offices for interconnecting same with at least one other office, register means in said office connected for use by said trunks with the receipt of calls thereover, a plurality of digit storage means in said register arranged in sequence, each digit storage means being assigned to store one digit, and each successive digit storage means being normally connected to store the successive one of the received digits, and means responsive to receipt of a call over a predetermined one of the trunks and a first received digit of a preassigned value for registering the first received digit in the third digit storage means, whereby two digits lost in the equipment are properly anticipated in the register means.

19. An arrangement as set forth in claim 18 which includes means for supplying only to said second digit storage means a digit to replace the lost digit which is of a value which is preassigned to provide recognition of the called office in the translator.

20. An automatic telephone system as set forth in claim 18 which includes means for automatically reconstructing the two lost digits in calls being extended to certain destinations, and means for supplying said reconstructed digits to said first and second digit storage means respectively.

21. In an automatic telephone system having a plurality of offices, a plurality of incoming trunk means in at least one of said offices for interconnecting same with at least one other office, register means in said office connected for use by said trunks with the receipt of calls thereover, a plurality of digit storage means in said register, each digit storage means being normally assigned to store one digit, different successive digit storage means being assigned to store different ones of the successive digits, means operative responsive to receipt of a call over a predetermined one of the trunks to reconstruct one, two, or three digits as are lost from the transmitted digital information and to supply same to the digit storage means in proper sequence, and means in the register means operative to register the digit first received in the digit storage means next in the sequence after the one of the digit storage means having the last reconstructed digits.

22. In an automatic telephone system having a plurality of offices, a plurality of incoming trunk means for connecting at least one office to other offices arranged according to a predetermined dialling pattern, the digital information as received in the office over certain of said trunks being minus the first digit and alternatively the first and the second digits, register means connected for use by said trunk means to register digital information as to the called destination, means in the register operative responsive to receipt of a call from one of said certain trunks to indicate the first, or first and second digits of the digital information, are missing, and means in the register for determining from the value of the digit first received as to whether the first received digit is the second or third digit of the digital information transmitted.

23. An arrangement as set forth in claim 22 in which the preassigned dialling pattern for a given group of trunks comprises means for preassigning certain digit values of the digit first received to second digit positions of the incoming digital information and other digit values to third digit positions, means for assigning at least one different value of the digit first received to both the second and third positions of the incoming digital information, and means operative to route said different value digits to different positions in accordance with the value of the digit secondly received.

24. In an automatic telephone system having a plurality of offices, a plurality of incoming trunk means for connecting at least one office to other offices arranged according to a predetermined dialling pattern, the digital information as received in the office over certain of said trunks being minus alternatively one or two digits, register means in said office connected for use by said trunk means to register incoming digital information, including a plurality of digit storage means in said register means arranged in a given sequence, each digit storage means being assigned to store one digit, and each successive digit storage means being normally connected to store the successive one of the received digits, means in the register operative responsive to receipt of a call over one of said certain trunk means to prepare to register the digit first received in the second digit storage means, means for preassigning digits of certain values as second digit numbers and other values for use as third digit numbers for the trunks in a dialling pattern, and means in the register operative responsive to the digit first received to register the digit in the digit storage means predetermined by its assigned value.

25. In an automatic telephone system having a plurality of offices, a plurality of incoming trunk means for connecting at least one office to other offices arranged according to a predetermined dialling pattern, the digital information as received in the office over certain of said trunks being minus alternatively one or two digits, register means in said office connected for use by said trunk means to register incoming digital information, including a plurality of digit storage means in said register means arranged in a given sequence, each digit storage means being assigned to store one digit, and each successive digit storage means being normally connected to store the successive one of the received digits, means in the register operative responsive to receipt of a call over one of said certain trunk means to prepare to register the digit first received in the second digit storage means, means for assigning at least one different value for use as a digit number in both the second and third positions of said digital information, an auxiliary digit storage means, means for automatically routing the first received digit into said auxiliary digit storage means whenever said digit is of said different value, means for preassigning at least one specific digit for use in the third position with said different number in the second position, means for determining the value of the second received digit and operative whenever the second received digit is of said specific value to transfer the digit which is stored in the auxiliary digit storage means into the second digit storage means, and the specific digit into the third digit storage means; and means operative whenever the second received digit is of a value other than said specific value to transfer the digit in said auxiliary digit storage means to the third digit storage means, and the second received digit in the fourth digit storage means, and means for supplying a digit in the second digit storage means to properly identify the office code to the translator.

26. In an automatic telephone system having switching means for extending connections between incoming and outgoing lines in accordance with the digital information received, certain sets of said information including prefix codes, trunk means over which incoming calls are received, register means including a plurality of sequentially arranged digits storage means for storing the digital information received, and cycle means for normally cycling said digit storage means for use in a normal sequence to store at least a portion of the prefix code, means in the register operative responsive to receipt of certain of said prefix codes to clear the sequentially arranged digit storage means of the prefix code digits which are registered therein, and means operative to prepare the first digit storage means for receipt of the first digit of the digital information following the prefix code for cycling in the normal sequence with receipt of the furthere digital information.

27. An arrangement as set forth in claim 26 in which said digital information received over certain trunks includes a prefix code plus a special designator digit comprised of a toll ticketing code plus a calling party identification digit, and in which said register includes an auxiliary digit storage means for said calling party identification digit, and means operative to control the means for clearing the sequentially arranged digit storage means of the prefix code only with registration of said calling party identification digit in said auxiliary digit storage means.

28. In an automatic telephone system having switching means for extending connections between incoming and outgoing lines in accordance with digital information received, certain sets of said information including prefix codes, trunk means over which incoming calls are received, register means including a plurality of sequentially arranged digit storage means and means for normally cycling said digit storage means for use in normal sequence, means operative responsive to receipt of a call over a certain one of said trunks to register the first received digit in the second sequence digit storage means, means in the register for examining the digit stored in the second digit storage means and the second received digit prior to storage in a digit storage means, and means operative thereafter only when said examined digits indicate receipt of a predetermined code to clear the sequentially arranged digit storage means of the prefix code digits registered in the sequentially arranged digit storage means in preparation for normal cycling in registration of the digital information following the prefix code.

29. In an automatic telephone system having switching means for extending connections between incoming and outgoing lines in accordance with digital information received, certain sets of said information including prefix codes, trunk means over which incoming calls are received, register means including a plurality of sequentially arranged digit storage means, and means for normally cycling said digit storage means for use in a given sequence, means operative responsive to receipt of information over a predetermined trunk to automatically prepare the register to store the first received digit in the second digit storage means, and means in the register operative to detect the receipt of a certain predetermined code prior to registration of any of the prefix code digits in the sequentially arranged digit storage means, and means responsive to the detection thereof to prepare control of the sequentially arranged bins for normal sequence cycling with the first bin storing the first digit of the digital information following the prefix code.

30. In an automatic telephone system, switching equipment for extending connections between incoming and outgoing lines including register and sender equipment, automatic toll ticketing equipment and at least one group selector stage for directing calls toward the desired outgoing lines, means for marking the sender responsive to extension of a ticketing call thereto, means in the sender operative responsive to said marking to effect seizure of a group selector stage, means in the sender responsive to seizure thereof to transmit a routing code directing the group selector stage to establish a path from the calling sender over the group selector stage to the toll ticketing equipment, and means including the sender and the group selector stage for extending the path from the toll ticketing equipment over the same group selector stage toward the desired line.

31. An arrangement as set forth in claim 30 in which said last means includes means for connecting a toll group selector stage in the connection outgoing from the toll ticketing equipment to the group selector stage.

32. In an automatic telephone system including switching means for selectively extending incoming connections over further switching equipment toward a desired destination, each destination being represented by a code comprised of a set of digit-representative signals, register means for receiving and storing a set of digit-representative signals, common translator means, sender means, recognition means in said register means operative responsive to receipt of signal sets which are representative of certain ones of said codes to engage said translator means to obtain information relative to the number of digit-representative signals of the incoming set to be received by the register means prior to the seizure of the sender means, the number of digit-representing signals to be received being of one preassigned value for one of said certain code sets and of a second preassigned value for another of said code sets, and means in the sender means for engaging said common translator means for use in determining the desired handling and routing information necessary to the completion of calls to destinations having said certain codes.

References Cited in the file of this patent

UNITED STATES PATENTS

| | | |
|---|---|---|
| 2,447,533 | Retallack | Aug. 24, 1948 |
| 2,631,195 | Ostline | Mar. 10, 1953 |
| 2,678,353 | Ostline | May 11, 1954 |
| 2,740,836 | Ostline | Apr. 3, 1956 |
| 2,848,543 | Breed et al. | Aug. 19, 1958 |